US009806781B2

(12) United States Patent
Rahman et al.

(10) Patent No.: US 9,806,781 B2
(45) Date of Patent: Oct. 31, 2017

(54) CODEBOOK DESIGN AND STRUCTURE FOR ADVANCED WIRELESS COMMUNICATION SYSTEMS

(71) Applicant: Samsung Electronics Co., Ltd, Suwon-si (KR)

(72) Inventors: Md. Saifur Rahman, Mountain View, CA (US); Young-Han Nam, Mountain View, CA (US); Youngwoo Kwak, Suwon-si (KR); Hoondong Noh, Suwon-si (KR); Eko Onggosanusi, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/995,126

(22) Filed: Jan. 13, 2016

(65) Prior Publication Data

US 2016/0323022 A1 Nov. 3, 2016

Related U.S. Application Data

(60) Provisional application No. 62/154,525, filed on Apr. 29, 2015, provisional application No. 62/187,585, filed on Jul. 1, 2015, provisional application No. 62/194,404, filed on Jul. 20, 2015, provisional application No. 62/198,408, filed on Jul. 29, 2015, provisional application No. 62/199,637, filed on Jul. 31, 2015, provisional application No. 62/201,926,
(Continued)

(51) Int. Cl.
*H04B 7/04* (2017.01)
*H04B 7/10* (2017.01)

(52) U.S. Cl.
CPC ......... *H04B 7/0478* (2013.01); *H04B 7/0469* (2013.01); *H04B 7/10* (2013.01)

(58) Field of Classification Search
CPC .................................................. H04B 7/0456
USPC ......................................................... 375/267
See application file for complete search history.

(56) References Cited

U.S. PATENT DOCUMENTS

| 2013/0308715 A1 | 11/2013 | Nam et al. |
| 2014/0301492 A1 | 10/2014 | Xin et al. |
| 2017/0041051 A1* | 2/2017 | Rahman ............... H04B 7/0456 |

FOREIGN PATENT DOCUMENTS

WO 2014126992 A2 8/2014

OTHER PUBLICATIONS

International Search Report dated Aug. 12, 2016 in connection with International Application No. PCT/KR2016/004566, 3 pages.
(Continued)

*Primary Examiner* — Michael Neff

(57) ABSTRACT

A base station capable of communicating with a user equipment (UE) includes a transceiver configured to transmit downlink signals containing first and second antenna numbers, first and second oversampling factors indicating respective oversampling rates in first and second dimensions for each beam group, first and second quantities of beams indicating respective quantities of beams in the first and second dimensions for each beam group, and first and second beam skip numbers indicating respective differences of leading beam indices of two adjacent beam groups in the first and second dimensions, receive uplink signals containing a plurality of precoding matrix indicators (PMIs) from the UE. Other embodiments including methods and UEs and methods are disclosed.

20 Claims, 36 Drawing Sheets

Related U.S. Application Data filed on Aug. 6, 2015, provisional application No. 62/241,512, filed on Oct. 14, 2015, provisional application No. 62/213,988, filed on Sep. 3, 2015, provisional application No. 62/216,610, filed on Sep. 10, 2015, provisional application No. 62/222,102, filed on Sep. 22, 2015, provisional application No. 62/239,587, filed on Oct. 9, 2015.

(56) References Cited

OTHER PUBLICATIONS

Written Opinion of the International Searching Authority dated Aug. 12, 2016 in connection with International Application No. PCT/KR2016/004566, 7 pages.

Ericsson, "2D Codebook with KP Structure and Associated Feedback", 3GPP TSG-RAN WG1#80bis, R1-151926, Belgrade, Serbia, Apr. 20-24, 2015, 3 pages.

Huawei, et al., "Codebook Enhancements for EBF/FD-MIMO", 3GPP TSG RAN WG1 Meeting #80bis, R1-151285, Belgrade, Serbia, Apr. 20-24, 2015, 4 pages.

\* cited by examiner

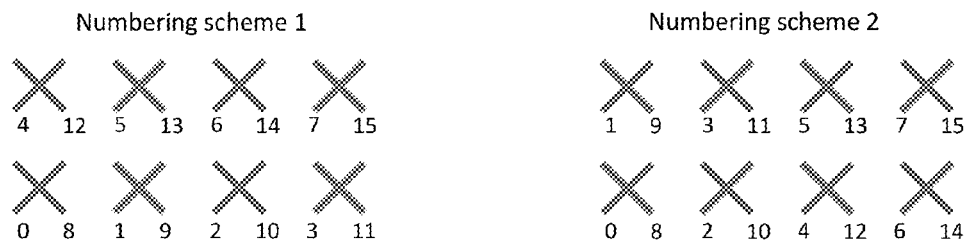
FIG. 5A 16 PORT Config A
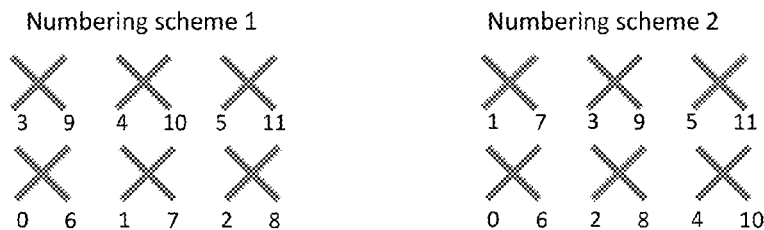
FIG. 5C 12 PORT Config A
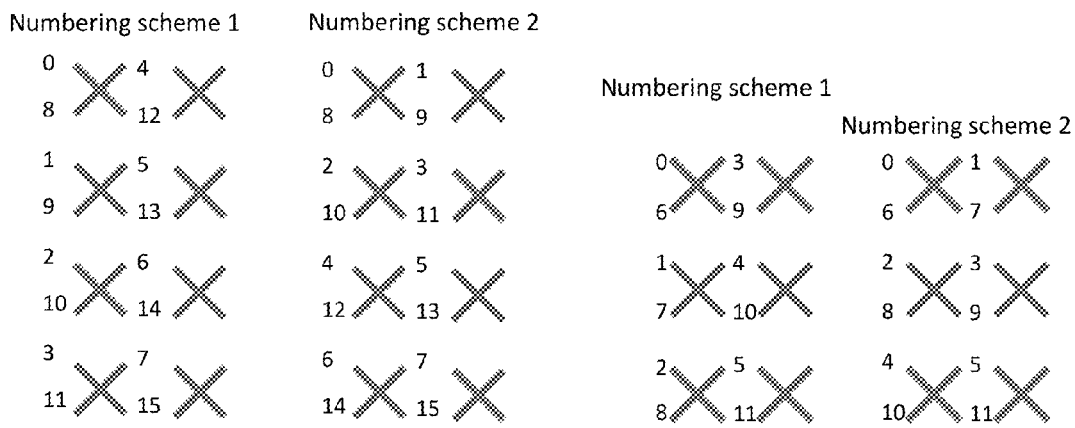
FIG. 5B 16 PORT Config B
FIG. 5D 12 PORT Config B

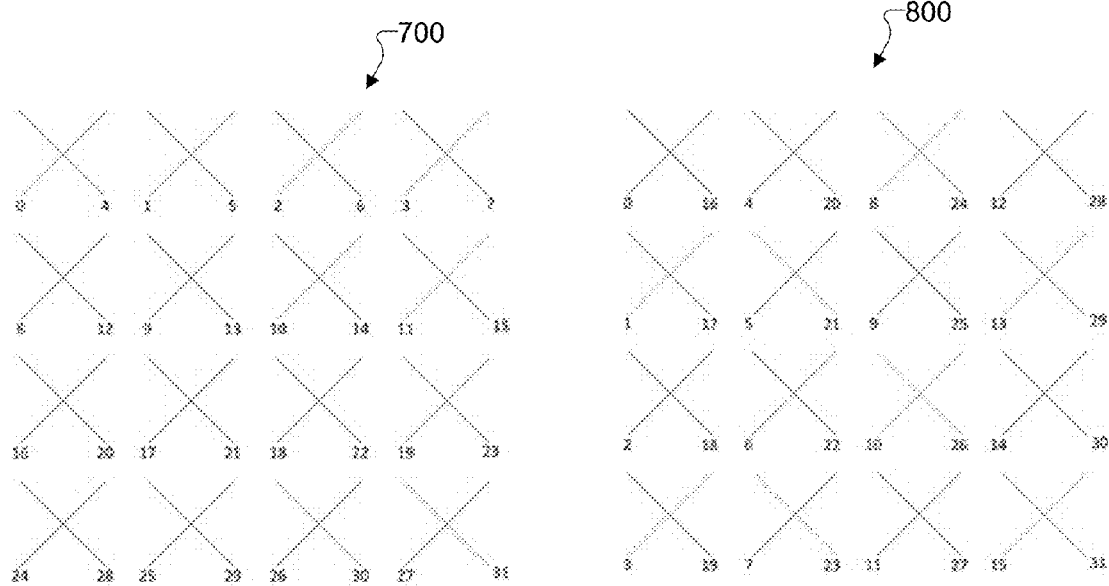
FIG. 7
FIG. 8
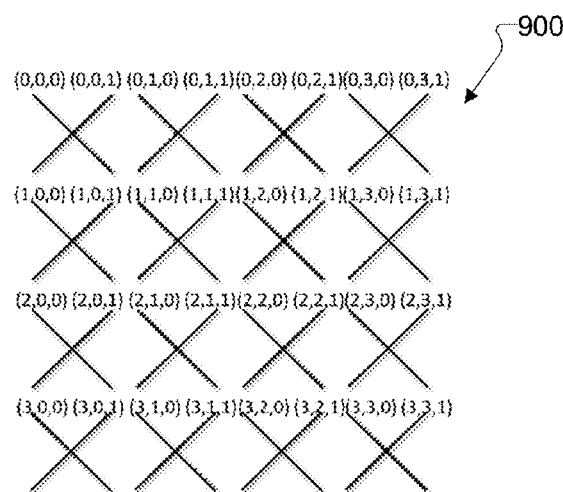
FIG. 9

Orthogonal beam pairs: (0,8),(2,10),(4,12),(6,14)

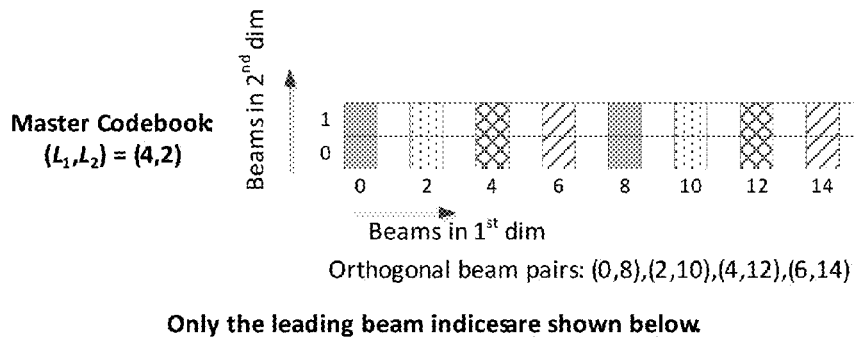
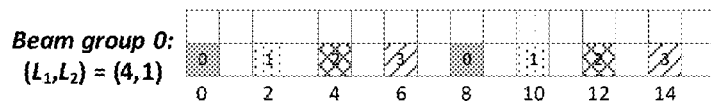
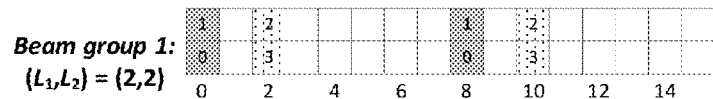
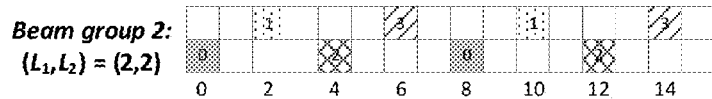
FIG. 48
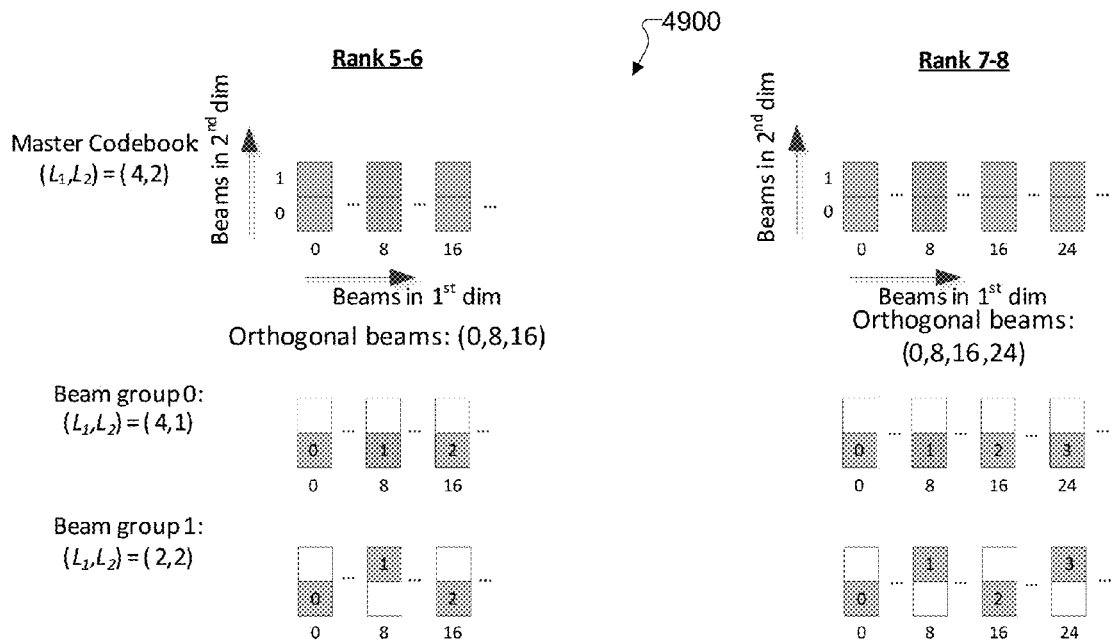
FIG. 49

FIG. 52

CODEBOOK DESIGN AND STRUCTURE FOR ADVANCED WIRELESS COMMUNICATION SYSTEMS

CROSS-REFERENCE TO RELATED APPLICATION AND CLAIMS OF PRIORITY

This application claims priority under 35 U.S.C. §119(e) to:
U.S. Provisional Patent Application No. 62/154,525 filed on Apr. 29, 2015,
U.S. Provisional Patent Application No. 62/187,585 filed on Jul. 1, 2015,
U.S. Provisional Patent Application No. 62/194,404 filed on Jul. 20, 2015,
U.S. Provisional Patent Application No. 62/198,408 filed on Jul. 29, 2015,
U.S. Provisional Patent Application No. 62/199,637 filed on Jul. 31, 2015,
U.S. Provisional Patent Application No. 62/201,926 filed on Aug. 6, 2015,
U.S. Provisional Patent Application No. 62/213,988 filed on Sep. 3, 2015,
U.S. Provisional Patent Application No. 62/216,610 filed on Sep. 10, 2015,
U.S. Provisional Patent Application No. 62/222,102 filed on Sep. 22, 2015,
U.S. Provisional Patent Application No. 62/239,587 filed on Oct. 9, 2015, and
U.S. Provisional Patent Application No. 62/241,512 filed on Oct. 14, 2015.
The above-identified provisional patent applications are hereby incorporated by reference in their entirety.

TECHNICAL FIELD

The present disclosure relates generally to a codebook design and structure associated with a two dimensional transmit antenna array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In a first embodiment, a user equipment (UE) capable of communicating with a base station includes a transceiver configured to receive downlink signals indicating precoder codebook parameters, the downlink signal including first and second quantities of antenna ports indicating respective quantities of antenna ports in first and second dimensions, first and second oversampling factors indicating respective oversampling factors for DFT beams in the first and second dimensions, either at least one beam group configuration among a plurality of beam group configurations or first and second quantities of beams indicating respective quantities of beams in the first and second dimensions forming a beam group, and first and second beam skip numbers indicating respective differences of leading beam indices of two adjacent beam groups in the first and second dimensions, and a controller configured to determine a precoder, using the received precoder codebook configuration, determine a plurality of precoding matrix indicators (PMIs) based on the received downlink signals, and cause the transceiver to transmit uplink signals containing the plurality of PMIs to the base station.

In a second embodiment, a base station capable of communicating with a user equipment (UE) includes a transmitter configured to transmit downlink signals indicating precoder codebook parameters including first and second quantities of antenna ports indicating respective quantities of antenna ports in the first and second dimensions, first and second oversampling factors indicating respective oversampling factors for DFT beams in the first and second dimension, either at least one beam group configuration among a plurality of beam group configurations or first and second quantities of beams indicating respective quantities of beams in the first and second dimensions forming a beam group, and first and second beam skip numbers indicating respective differences of leading beam indices of two adjacent beam groups in the first and second dimensions, and a receiver configured to receive uplink signals containing a plurality of precoding matrix indicators (PMIs) from the UE.

In a third embodiment, a method of operating a base station capable of communicating with a user equipment (UE) includes transmitting downlink signals indicating precoder codebook parameters, the downlink signal including first and second quantities of antenna ports indicating respective quantities of antenna ports in the first and second dimensions, first and second oversampling factors indicating respective oversampling factors for DFT beams in the first and second dimensions, either at least one beam group configuration among a plurality of beam group configurations or first and second quantities of beams indicating respective quantities of beams in the first and second dimensions forming a beam group, and first and second beam skip numbers indicating respective differences of leading beam indices of two adjacent beam groups in the first and second dimensions, receiving uplink signals containing a plurality of precoding matrix indicators (PMIs) from the UE.

In a fourth embodiment, a method for user equipment (UE) capable of communicating with a base station includes receiving downlink signals containing a precoder configuration set comprising first and second antenna numbers, first and second oversampling factors indicating respective oversampling rates in first and second dimensions for each beam group, first and second quantities of beams indicating respective quantities of beams in the first and second dimensions for each beam group, and first and second beam skip numbers indicating respective differences of leading beam indices of two adjacent beam groups in the first and second dimensions, and determining a precoder according to the received precoder configuration, determining a plurality of precoding matrix indicators (PMIs) based on the received downlink signals, and transmitting uplink signals containing the plurality of PMIs to the base station.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A to 5D illustrate antenna configurations and antenna numberings according to some embodiments of the present disclosure;

FIG. 7 illustrates a 4×4 dual-polarized antenna array 700 with antenna port (AP) indexing 1;

FIG. 8 is a 4×4 dual-polarized antenna array 800 with antenna port indexing (AP) indexing 2;

FIG. 9 illustrates another numbering of TX antenna elements 900 (or TXRU) according to embodiments of the present disclosure;

FIG. 48 illustrates rank 3 and rank 4 beam grouping schemes according to embodiments of the present disclosure;

FIG. 49 illustrates ranks 5 to 8 beam grouping schemes according to the present disclosure;

FIG. 52 illustrates beam grouping options for Config 1, Config 2, Config 3, and Config 4 according to the present disclosure.

DETAILED DESCRIPTION

Figure 1:
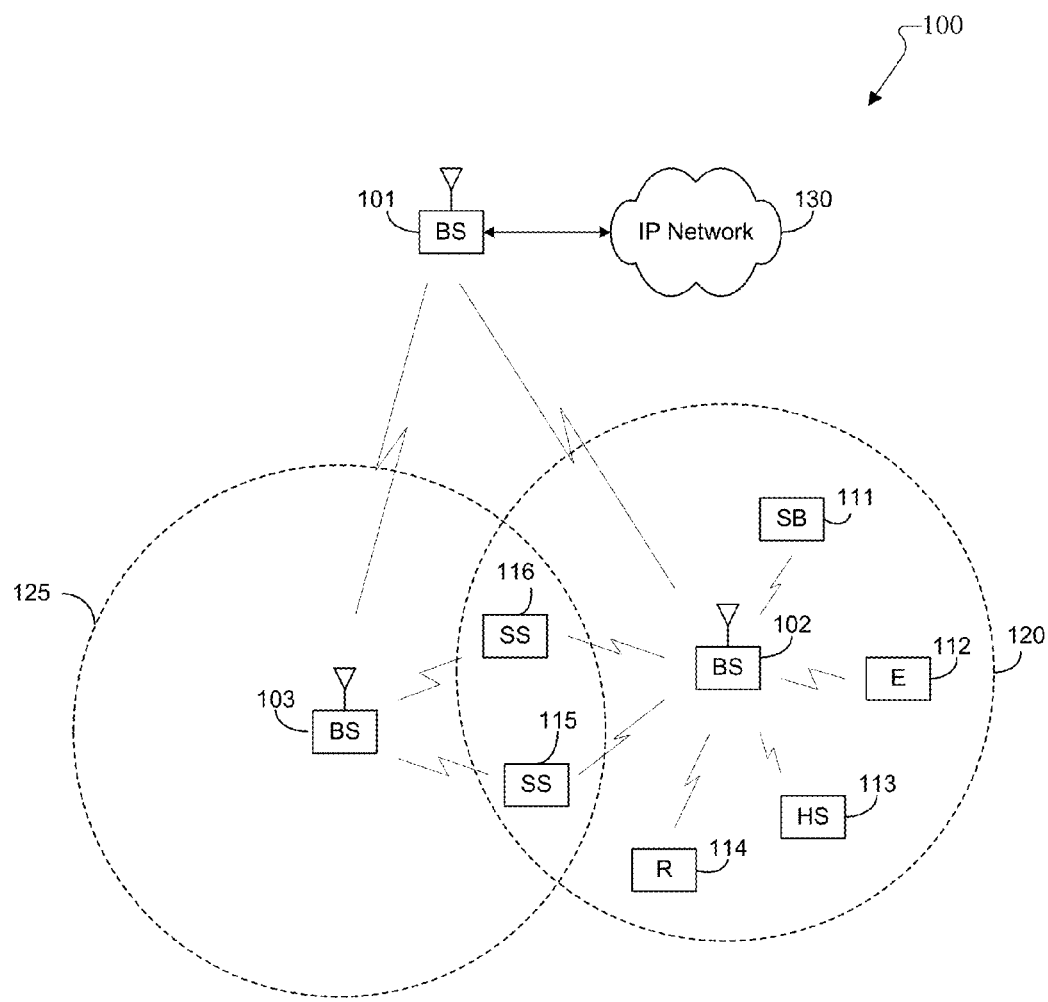
FIG. 1 illustrates an example wireless network according to this disclosure.
Figure 53:
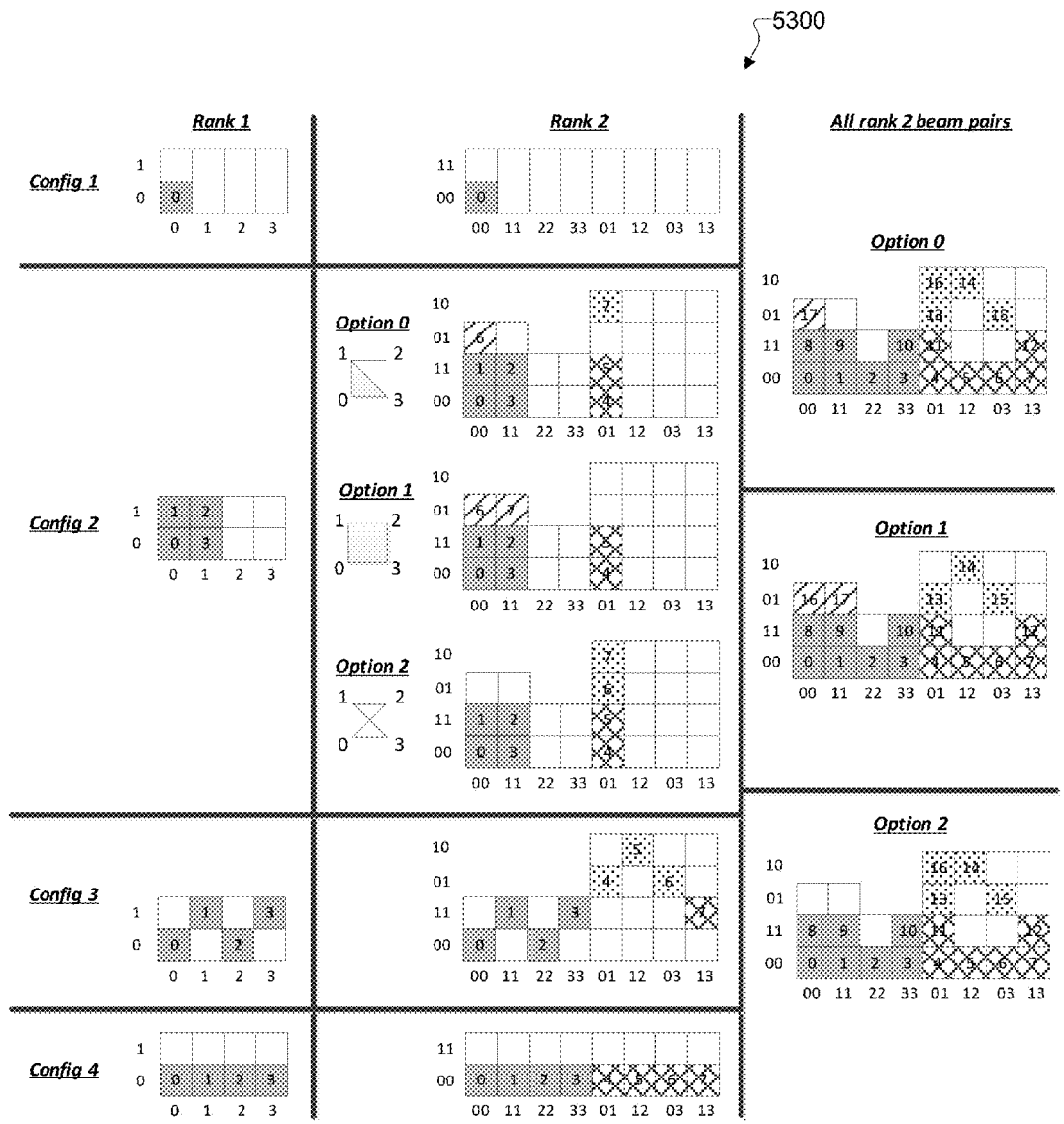
FIG. 53 illustrates rank 2 beam pairs based on nested property with rank 1 beam according to embodiments of the present disclosure.

FIGS. 1 through 53, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: (1) 3rd generation partnership project (3GPP) TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
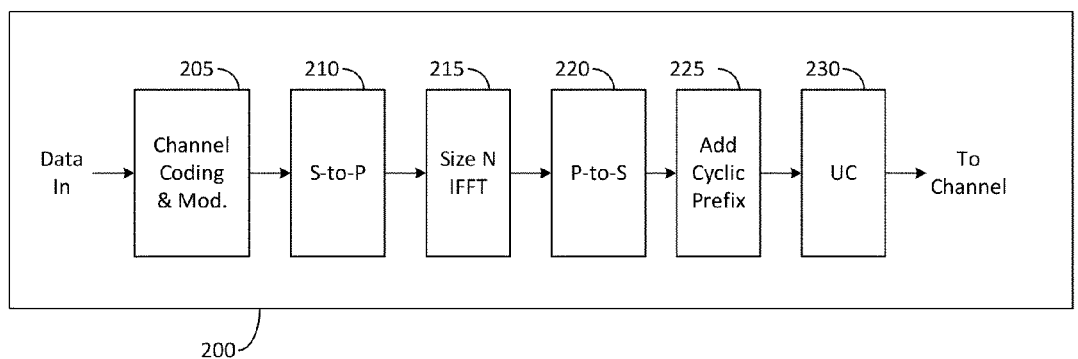
FIGS. 2A and 2B illustrate example wireless transmit and receive paths according to this disclosure.
Figure 2B:
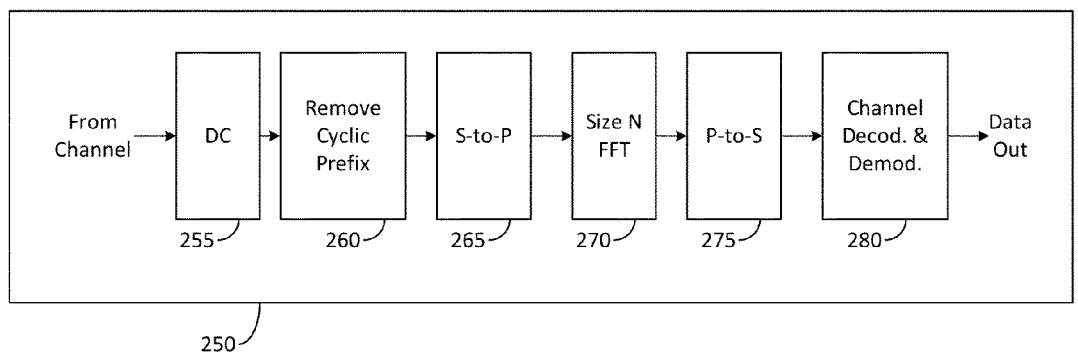

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
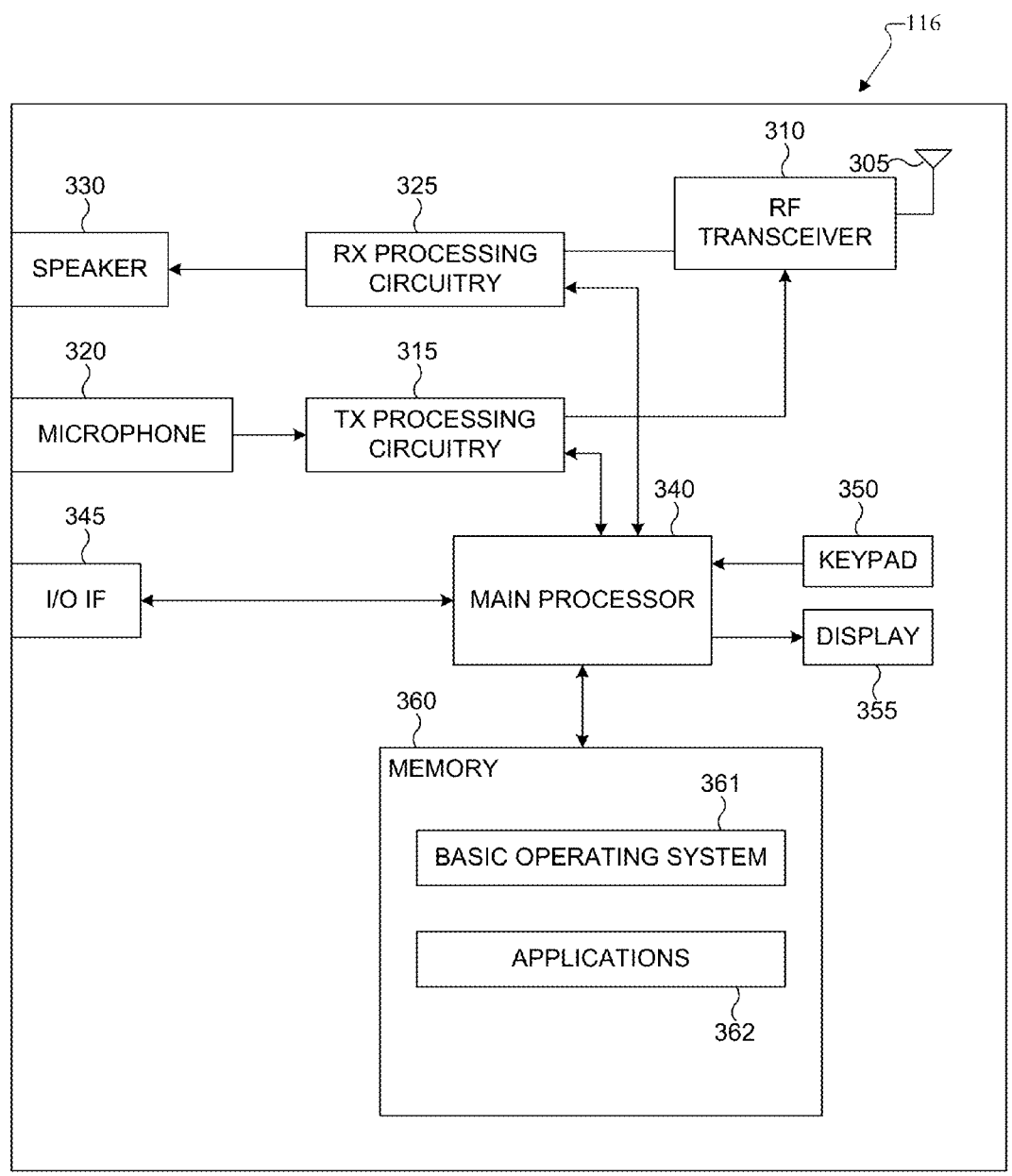
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
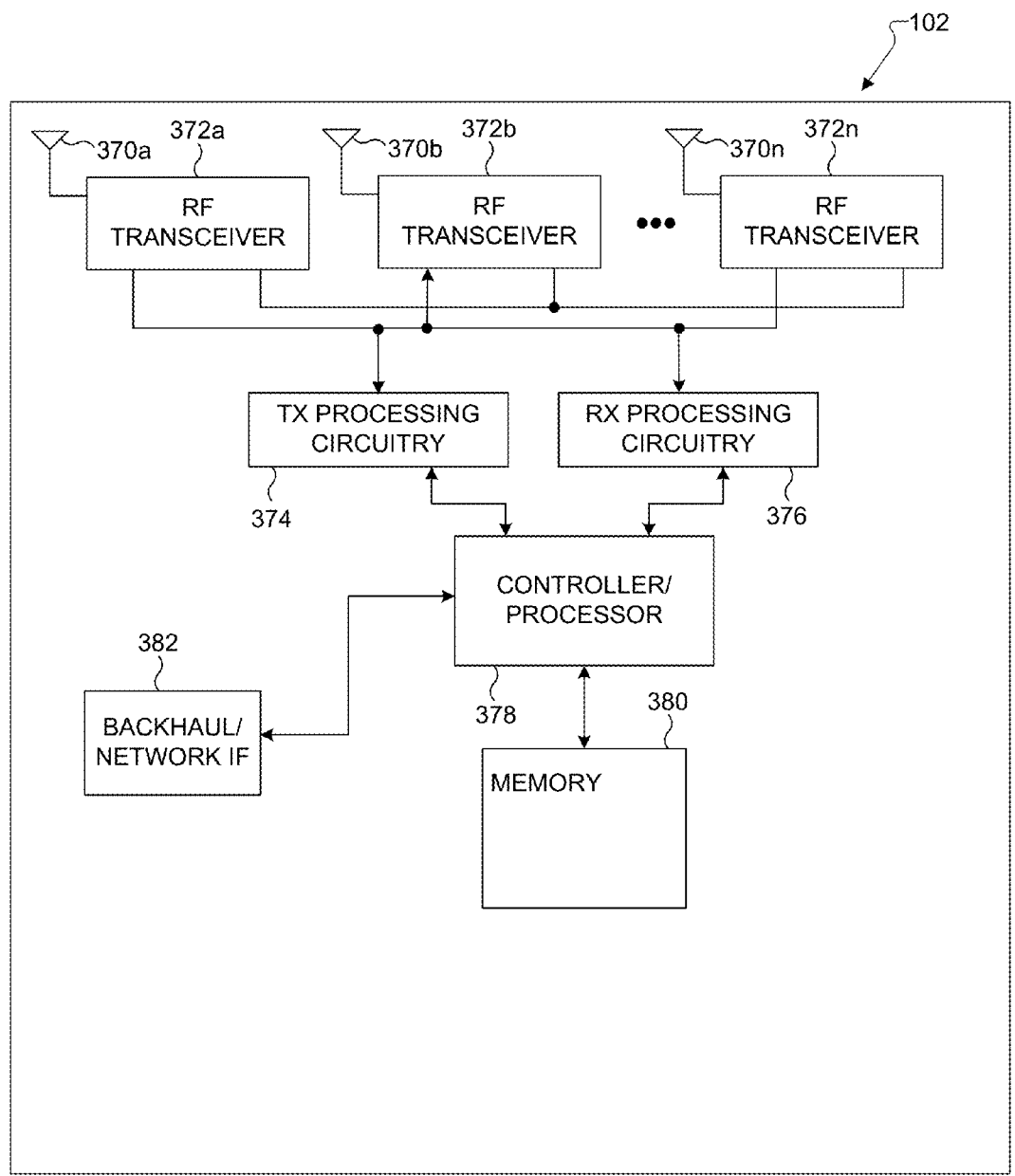
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Logical Port to Antenna Port Mapping

Figure 4:
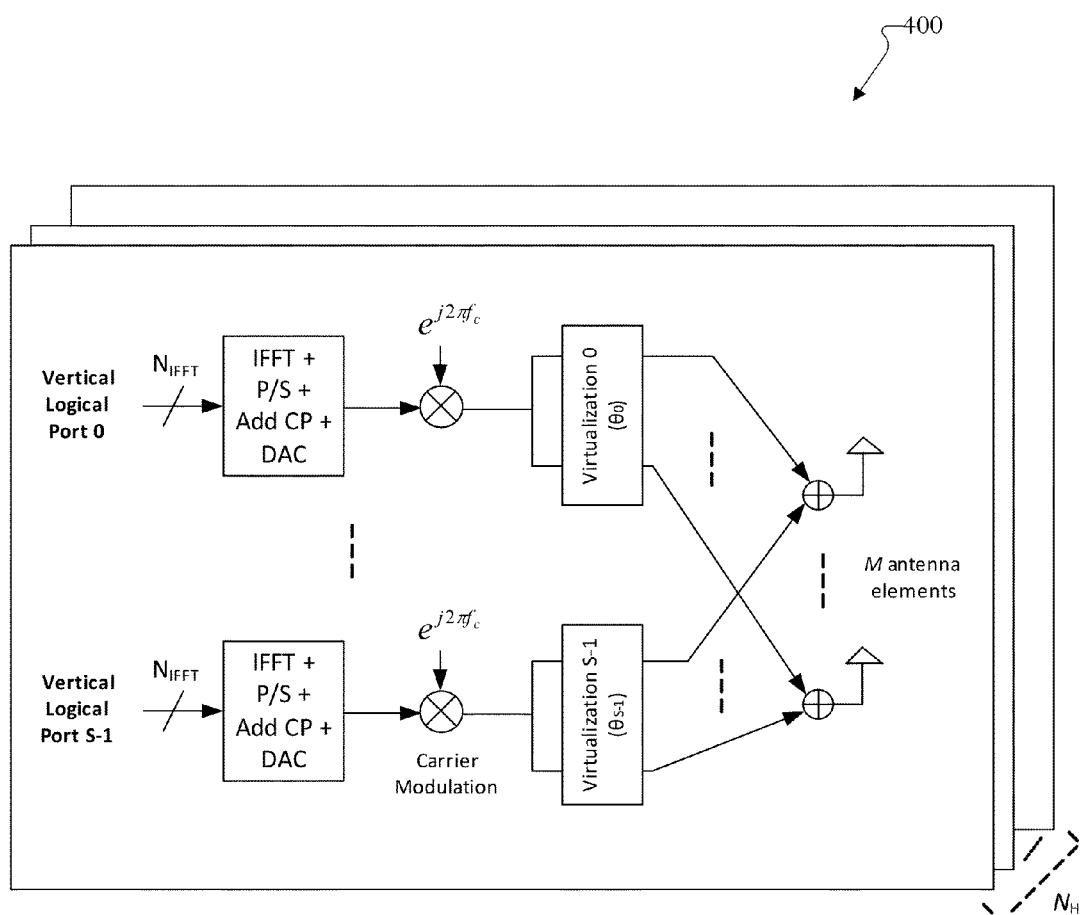
FIG. 4 illustrates logical port to antenna port mapping 400 that may be employed within the wireless communication system according to some embodiments of the current disclosure.

FIG. 4 illustrates logical port to antenna port mapping 400 that may be employed within the wireless communication system according to some embodiments of the current disclosure. The embodiment of the port mapping illustrated in FIG. 4 is for illustration only. However, port mappings come in a wide variety of configurations, and FIG. 4 does not limit the scope of this disclosure to any particular implementation of a port mapping.

FIG. 4 illustrates logical port to antenna port mapping, according to some embodiments of the current disclosure. In the figure, Tx signals on each logical port is fed into an antenna virtualization matrix (e.g., of a size M×1), output signals of which are fed into a set of M physical antenna ports. In some embodiments, M corresponds to a total number or quantity of antenna elements on a substantially vertical axis. In some embodiments, M corresponds to a ratio of a total number or quantity of antenna elements to S, on a substantially vertical axis, wherein M and S are chosen to be a positive integer.

Antenna Configurations and Antenna Numbering

FIGS. 5A to 5D illustrate antenna configurations and antenna numberings according to one embodiments of the present disclosure. The embodiments shown in FIGS. 5A to 5D are for illustration only. Other embodiments could be used without departing from the scope of the present disclosure.

In all the four antenna configurations of FIGS. 5A to 5D, a cross pol (or X-pol) antenna array is considered, in which a pair of antenna elements in a same physical location are polarized in two distinct angles, e.g., +45 degrees and −45 degrees.

FIGS. 5A and 5B are antenna configurations with 16 CSI-RS ports, comprising 8 pairs of x-pol antenna elements placed in a 2D antenna panel. The 8 pairs can be placed in 2×4 (FIG. 5A) or 4×2 manner (FIG. 5B) on horizontal and vertical dimensions.

FIGS. 5C and 5D are antenna configurations with 12 CSI-RS ports, comprising 6 pairs of x-pol antenna elements placed in a 2D antenna panel. The 6 pairs can be placed in 2×3 (FIG. 5C) or 3×2 manner (FIG. 5D) on horizontal and vertical dimensions.

Antenna Number Assignment

In FIGS. 5A to 5D, antennas are indexed with integer numbers, 0, 1, . . . , 15 for 16-port configurations (FIGS. 5A and 5B), and 0, . . . , 11 for 12-port configurations (FIGS. 5C and 5D).

In wide arrays (such as 12-port config A and 16-port config A), antenna numbers are assigned as follows. Consecutive numbers are assigned for all the antenna elements for a first polarization, and proceed to a second polarization. And, for a given polarization, Numbering scheme 1: consecutive numbers are assigned for a first row with progressing one edge to another edge, and proceed to a second row; and Numbering scheme 2: consecutive numbers are assigned for a first column with progressing one edge to another edge, and proceed to a second column.

For example, in FIG. 5A, antenna numbers 0-7 are assigned for a first polarization, and 8-15 are assigned for a second polarization; and antenna numbers 0-3 are assigned for a first row and 4-7 are assigned for a second row.

Antenna numbers in tall arrays (such as 12-port config B and 16-port config B) are obtained by simply rotating the wide antenna arrays (such as 12-port config A and 16-port config A) by 90 degrees.

PMI Feedback Precoder Generation according to the Antenna Numbering

In some embodiments, when a UE is configure with 12 or 16 port CSI-RS for a CSI-RS resource, the UE is configured to report a PMI feedback precoder according to the antenna numbers in FIGS. 5A to 5D. A rank-1 precoder, $W_{m,n,p}$, which is an $N_{CSIRS} \times 1$ vector, to be reported by the UE has the following form:

$$W_{m,n,p} = [w_0 \ w_1 \ \ldots \ w_{N_{CSIRS}-1}]^t = \frac{1}{\sqrt{N_{CSIRS}}} \begin{bmatrix} v_m \otimes u_n \\ \varphi_p(v_{m'} \otimes u_{n'}) \end{bmatrix},$$

wherein:

$N_{CSIRS}$=number of configured CSI-RS ports in the CSI-RS resource, e.g., 12, 16, etc;

$u_n$ is a N×1 oversampled DFT vector for a second dimension, whose oversampling factor is $S_N$;

$v_m$ is a M×1 oversampled DFT vector for a first dimension, whose oversampling factor is $S_M$;

The dimension assignment can be done with N≥M according to numbering scheme 1 in FIGS. 4A to 4D, with (N,M) ∈ {(4,2), (4,3), (2,2)}; alternatively, the dimension assignment can be done with N≤M with swapping the role of columns and rows, with (N,M) ∈ {(2,4), (3,4), (2,2)} according to numbering scheme 2 in FIGS. 4A to 4C; and $\phi_p$ is a co-phase, e.g., in a form of $$e^{j\frac{2\pi p}{4}},$$

p=0,1,2,3.

Here, example set of oversampling factors that can be configured for $S_N$ and $S_M$ are {2,4,8}; and m, m' ∈ {0,1, . . . , $S_M M$}, and n, n' ∈ {0,1, . . . , $S_N N$}. In a special case, m=m' and n=n'.

Figure 6:
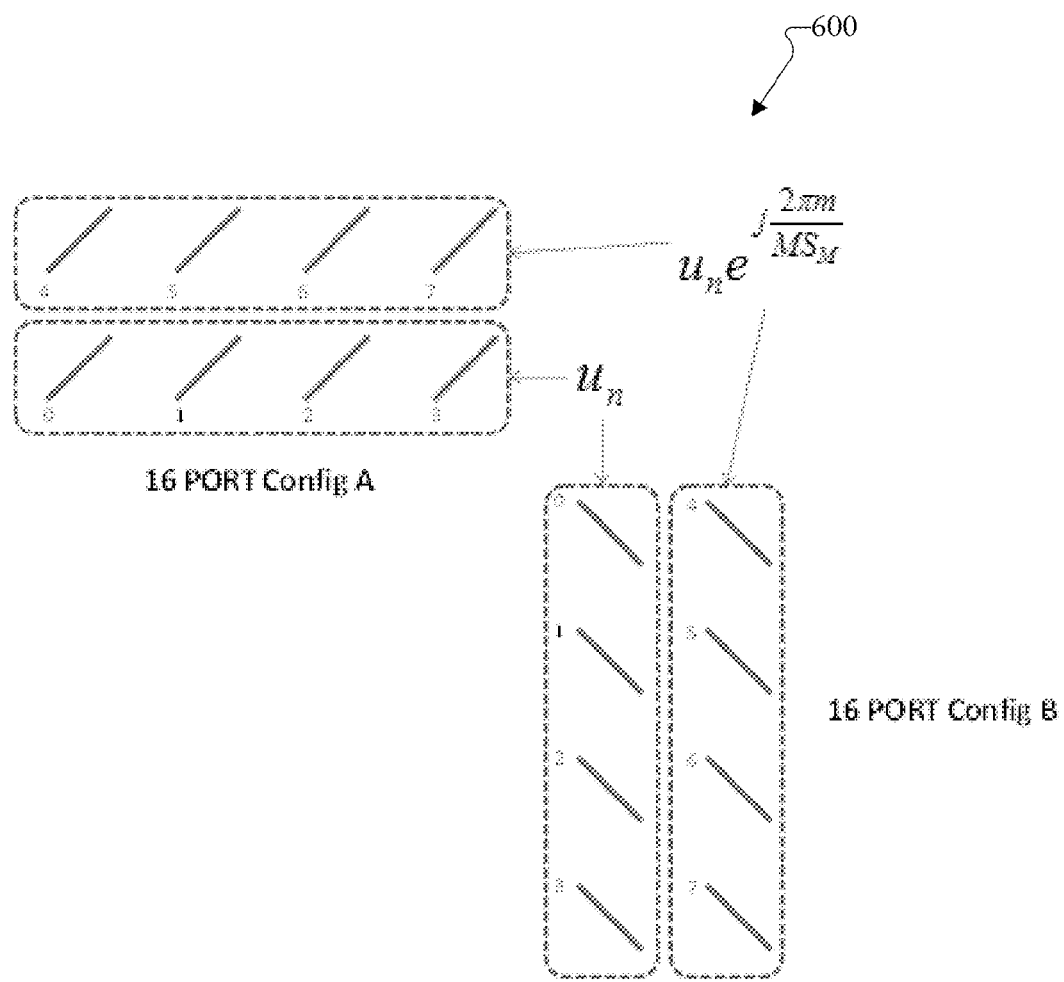
FIG. 6 illustrates a precoding weight application to antenna configurations of FIGS. 5A to 5D for Numbering scheme 1.

FIG. 6 illustrates a precoding weight application to antenna configurations of FIGS. 5A to 5D for numbering scheme 1.

When any of 16-port config A and B for Numbering scheme 1 is used at the eNB with configuring $N_{CSIRS}$=16 to the UE, a submatrix $v_m \otimes u_n$ of $W_{m,n,p}$ corresponds to a precoder applied on 8 co-pol elements, whose antenna numbers are 0 through 7. Given the antenna configuration, M=2 and N=4 should be configured for $v_m$ and $u_n$.

If 16-port config A is used, $u_n$ is a 4×1 vector representing a horizontal DFT beam and $v_m$ is a 2×1 vector representing a vertical DFT beam. If 16-port config B is used, $u_n$ is a 4×1 vector representing a vertical DFT beam and $v_m$ is a 2×1 vector representing a horizontal DFT beam.

With 12 or 16-port configurations, $v_m$ can be written as $$v_m = \begin{bmatrix} 1 & e^{j\frac{2\pi m}{M'}} \end{bmatrix}^t = \begin{bmatrix} 1 & e^{j\frac{2\pi m}{MS_M}} \end{bmatrix}^t.$$

With 16-port configurations, $u_n$ can be written as:

$$u_n = \begin{bmatrix} 1 & e^{j\frac{2\pi n}{N'}} & e^{j\frac{4\pi n}{N'}} & e^{j\frac{6\pi n}{N'}} \end{bmatrix}^t$$

$$= \begin{bmatrix} 1 & e^{j\frac{2\pi n}{NS_N}} & e^{j\frac{4\pi n}{NS_N}} & e^{j\frac{6\pi n}{NS_N}} \end{bmatrix}^t.$$

With 12-port configurations, $u_n$ can be written as:

$$u_n = \begin{bmatrix} 1 & e^{j\frac{2\pi n}{N'}} & e^{j\frac{4\pi n}{N'}} \end{bmatrix}^t$$

$$= \begin{bmatrix} 1 & e^{j\frac{2\pi n}{NS_N}} & e^{j\frac{4\pi n}{NS_N}} \end{bmatrix}^t.$$

Precoding weights to be applied to antenna port numbers 0 through 3 are $u_n$, and the precoding weights to be applied to antenna ports 4 through 7 are $$u_n e^{j\frac{2\pi n}{MS_M}}$$

with an appropriate power normalization factor. Similarly, precoding weights to be applied to antenna port numbers 8 through 11 are $u_{n'}$, and the precoding weights to be applied to antenna ports 12 through 15 are $$u_{n'} e^{j\frac{2\pi m'}{MS_M}}$$

with an appropriate power normalization factor. This method of precoding weight application for Numbering scheme 1 is illustrated in FIGS. 5A to 5D. Note that the method is also applicable to Numbering scheme 2.

FIG. 7 illustrates a 4×4 dual-polarized antenna array 700 with antenna port (AP) indexing 1 and FIG. 8 is the same 4×4 dual-polarized antenna array 800 with antenna port indexing (AP) indexing 2.

In certain embodiments, each labelled antenna element is logically mapped onto a single antenna port. In general, one antenna port can correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel.12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

FIG. 9 illustrates another numbering of TX antenna elements 900 (or TXRU) according to embodiments of the present disclosure. The embodiment shown in FIG. 9 is for illustration only. Other embodiments could be used without departing from the scope of the present disclosure.

In certain embodiments, eNB is equipped with 2D rectangular antenna array (or TXRUs), comprising M rows and N columns with P=2 polarized, wherein each element (or TXRU) is indexed with (m, n, p), and m=0, . . . , M-1, n=0, . . . , N-1, p=0, . . . , P-1, as illustrated in FIG. 9 with M=N=4. When the example shown in FIG. 7 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 9. In later embodiments, (M,N) is sometimes denoted as ($N_H$, $N_V$) or ($N_1$, $N_2$).

In some embodiments, a UE is configured with a CSI-RS resource comprising Q=MNP number of CSI-RS ports, wherein the CSI-RS resource is associated with MNP number of resource elements (REs) in a pair of PRBs in a subframe.

CSI-RS and CSI Feedback Configuration

In some embodiments, a UE is configured with a CSI-RS configuration via higher layer, configuring Q antenna ports—antenna ports A(1) through A(Q). The UE is further configured with CSI reporting configuration via higher layer in association with the CSI-RS configuration.

The CSI reporting configuration includes information element (IE) indicating the CSI-RS decomposition information (or component PMI port configuration). The information element may comprise at least two integers, say $N_1$ and $N_2$, which respectively indicates a first number of antenna ports for a first dimension, and a second number of antenna ports for a second dimension, wherein $Q=N_1 \cdot N_2$.

One example method of indicating the CSI-RS decomposition (or component PMI port configuration) is described below.

| | |
|---|---|
| CSIRS decomposition information or Component PMI port configuration | When Q = 8, ($N_1$, $N_2$) ∈ {(2, 4), (4, 2)}. When Q = 16, ($N_1$, $N_2$) ∈ {(2, 8), (4, 4), (8, 2)}. When Q = 32, ($N_1$, $N_2$) ∈ {(8, 4), (4, 8)}. |

Another example method of indicating the PMI reporting decomposition is to explicitly configure Q and $N_1$, and implicitly configure $N_2$.

| | |
|---|---|
| Component PMI port configuration | Q . . . positive even number, e.g., selected from {1, 2, 4, . . . , 32} $N_1$ . . . positive even number, e.g., selected from {1, 2, 4, . . . , 16} $N_2 = Q/N_1$ . . . implicitly derived out of explicitly configured N and $N_1$. |

Another example method of indicating the PMI reporting decomposition is to explicitly configure $N_1$ and $N_2$, and implicitly configure Q.

| | |
|---|---|
| Component PMI port configuration | $N_1$ . . . positive even number, e.g., selected from {1, 2, 4, . . . , 16} $N_2$ . . . positive even number, e.g., selected from {1, 2, 4, . . . , 16} $Q = N_1 \cdot N_2$ . . . implicitly derived out of explicitly configured $N_1$ and $N_2$. |

Another example method of indicating the PMI reporting decomposition is to explicitly configure M, N, and P, and implicitly configure Q.

| | |
|---|---|
| Component PMI port configuration | M . . . positive even number, e.g., selected from {1, 2, 4, . . . , 16} N . . . positive even number, e.g., selected from {1, 2, 4, . . . , 16} P . . . either 1 or 2 $Q = M \cdot N \cdot P$ . . . implicitly derived out of explicitly configured M, N, and P. |

When the UE is configured with ($N_1$, $N_2$), the UE calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank)) is the (column-wise) Kronecker product of the two, $W=W_1 \otimes W_2$. If PMI reporting is configured, the UE will report at least two component PMI corresponding to selected pair of $W_1$ and $W_2$.

In one method, either $W_1$ or $W_2$ is further decomposed according to the double codebook structure. For example, $W_1$ is further decomposed into:

$$W_1(n, m) = \frac{1}{p_1} \begin{bmatrix} v_m \\ \varphi_n v_m \end{bmatrix}$$

if rank 1; and $$W_1(n, m, m') = \frac{1}{p_2} \begin{bmatrix} v_m & v_{m'} \\ \varphi_n v_m & -\varphi_n v_{m'} \end{bmatrix}$$

if rank 2,
wherein $p_1$ and $p_2$ are normalization factors to make total transmission power 1, $v_m$ is an m-th DFT vector out of a $(N_1/2)$-Tx DFT codebook with oversampling factor $o_1$, and $\varphi_n$ is a co-phase. Furthermore, the index m, m', n determines the precoder $W_1$.

If the transmission rank is one (or number of transmission layers is one), then CQI will be derived with $$W = W_1 \otimes W_2 = \frac{1}{p_1} \begin{bmatrix} v_m \otimes W_2 \\ \varphi_n v_m \otimes W_2 \end{bmatrix};$$

and if the transmission rank is two, then CQI will be derived with $$W = W_1 \otimes W_2 |_{columnwiseKP} = \frac{1}{p_2} \begin{bmatrix} v_m \otimes W_2 & v_{m'} \otimes W_2 \\ \varphi_n v_m \otimes W_2 & -\varphi_n v_{m'} \otimes W_2 \end{bmatrix}.$$

In one example of this method, $N_1=8$ and $N_2=4$, and the TXRUs (or the antenna ports) are numbered according to FIG. 8. In this case, $W_1$ is further decomposed into:

$$W_1(n, m) = \frac{1}{p_1} \begin{bmatrix} v_m \\ \varphi_n v_m \end{bmatrix}$$

if rank 1; and $$W_1(n, m, m') = \frac{1}{p_2} \begin{bmatrix} v_m & v_{m'} \\ \varphi_n v_m & -\varphi_n v_{m'} \end{bmatrix}$$

if rank 2,
wherein $v_m$ is an m-th DFT vector out of a 4-Tx DFT codebook with oversampling factor 8; and $$\varphi_n = e^{j\frac{2\pi n}{4}}.$$

Furthermore, with one transmission layer, CQI will be derived with precoder $$W = W_1 \otimes W_2 = \frac{1}{\sqrt{8}} \begin{bmatrix} v_m \otimes W_2 \\ \varphi_n v_m \otimes W_2 \end{bmatrix};$$

and with two transmission layer, CQI will be derived with precoder $$W = W_1 \otimes W_2 |_{columnwiseKP} = \frac{1}{4} \begin{bmatrix} v_m \otimes W_2 & v_{m'} \otimes W_2 \\ \varphi_n v_m \otimes W_2 & -\varphi_n v_{m'} \otimes W_2 \end{bmatrix}.$$

In another method, both $W_1$ and $W_2$ are further decomposed according to the double codebook structure with two stages. The first stage codebook is used to represent WB and long-term channel, and the second stage codebook is used to represent SB and short-term channel. For example, $W_1$ and $W_2$ can be decomposed as $W_1 = W_1^{(1)} W_1^{(2)}$ and $W_2 = W_2^{(1)} W_2^{(2)}$, respectively, where:
  $W_1^{(1)}$ and $W_2^{(1)}$ are the first stage codebooks; $W_1^{(2)}$ and $W_2^{(2)}$ are the second stage codebooks;
  $W_1$ comprises of DFT vectors out of a $(N_1/2)$-Tx DFT codebook with oversampling factor $o_1$, where the first stage codebook $W_1^{(1)}$ corresponds to a set of fixed number $L_1$ of uniformly-spaced beams, and the second stage codebook $W_2^{(2)}$ corresponds to selecting one beam out of $L_1$ beams and applying a x-pol co-phase $\varphi_n$; and
  $W_2$ comprises of DFT vectors out of a $(N_2)$-Tx DFT codebook with oversampling factor $o_2$, where the first stage codebook $W_2^{(1)}$ corresponds to a set of fixed number $L_2$ of uniformly-spaced beams, and the second stage codebook $W_2^{(2)}$ corresponds to selecting one beam out of $L_2$ beams;

In a special case, uniformly-spaced beams are consecutively-spaced beams.

A beam grouping scheme is defined in terms of two groups of parameters, one group per dimension. A group of parameters for dimension d comprises at least one of the following parameters: a number of antenna ports $N_d$; an oversampling factor $o_d$; a skip number $s_d$; a beam offset number $f_d$; and a number of beams $L_d$.

In some embodiments, a beam group indicated by a first PMI $i_{1,d}$ of dimension d (corresponding to $W_d^{(1)}$), is determined based upon these five parameters.

The total number of beams is $N_d \cdot o_d$; and the beams are indexed by an integer $m_d$, wherein beam $m_d$, $v_{m_d}$, corresponds to a precoding vector $$v_{m_d} = \begin{bmatrix} 1 & e^{j\frac{2\pi m_d}{o_d N_d}} & \cdots & e^{j\frac{2\pi m_d(N_d-1)}{o_d N_d}} \end{bmatrix}^t,$$

$m_d = 0, \ldots, N_d \cdot o_d - 1$.

The first PMI of the dimension d, $i_{1,d}$, $i_{1,d} = 0, \ldots, N_d \cdot o_d / s_d - 1$, can indicate any of $L_d$ beams indexed by: $m_d = f_d + s_d \cdot i_{1,d}, f_d + s_d \cdot i_{1,d} + 1, \ldots, f_d + s_d \cdot i_{1,d} + L_d - 1$. These $L_d$ beams are referred to as a beam group in dimension d.

In some embodiments, a UE may be configured via higher layers (e.g., RRC) with at least one of these five parameters, wherein a subset of parameters not configured in the same configuration may have been pre-configured at the UE.

In one example, a UE is configured via higher layers with an oversampling factor $o_2$ for the second dimension in an RRC configuration, who is also pre-configured with all the other parameters: For the first dimension: $N_1=8$, $o_1=8$, $s_1=2$, $f_1=0$, and $L_1=4$; and For the second dimension: $N_2=4$, $s_2=2$, $f_1=0$, and $L_1=4$;

| | |
|---|---|
| Oversampling factor $o_2$ for the second dimension | Eumerated {1, 2, 4} |

In this case, the beams in the beam group indicated by the first PMI of the first dimension, $i_{1,1}$, is:

$$v_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t,$$

$m_1 = 2i_{1,1}, 2i_{1,1}+1, 2i_{1,1}+2, 2i_{1,1}+3$; and the beams in the beam group indicated by the first PMI of the second dimension, $i_{1,2}$, is:

$$v_{m_2} = \begin{bmatrix} 1 & e^{j\frac{2\pi m_2}{4o_2}} & e^{j\frac{4\pi m_2}{4o_2}} & e^{j\frac{6\pi m_2}{4o_2}} \end{bmatrix}^t,$$

$m_2 = 2i_{1,2}, 2i_{1,2}+1, 2i_{1,2}+2, 2i_{1,2}+3$.

In a special case of $o_2=1$, there is only one group of size $L_2=4$, which is:

$$v_{m_2} = \begin{bmatrix} 1 & e^{j\frac{2\pi m_2}{4}} & e^{j\frac{4\pi m_2}{4}} & e^{j\frac{6\pi m_2}{4}} \end{bmatrix}^t,$$

$m_2 = 0, 1, 2, 3$. In this special case, the UE does not (need to) report $i_{1,2}$.

In another example, a UE is configured via higher layers with two numbers of beams, $L_1$ and $L_2$ respectively for the first and the second dimension in an RRC configuration, who is also pre-configured with all the other parameters. For the first dimension: $N_1=8$, $o_1=8$, $s_1=2$, $f_1=0$; and for the second dimension: $N_2=4$, $o_2=4$, $s_2=2$, $f_1=0$.

| Number of beams for the first dimension $L_1$ | Enumerated {1, 2, 4} |
| Number of beams for the second dimension $L_1$ | Enumerated {1, 2, 4} |

In this case, the beams in the beam group indicated by the first PMI of the first dimension, $i_{1,1}$, is:

$$v_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t,$$

$m_1 = 2i_{1,1}, \ldots, 2i_{1,1}+L_1-1$; and the beams in the beam group indicated by the first PMI of the second dimension, $i_{1,2}$, is:

$$v_{m_2} = \begin{bmatrix} 1 & e^{j\frac{2\pi m_2}{16}} & e^{j\frac{4\pi m_2}{16}} & e^{j\frac{6\pi m_2}{16}} \end{bmatrix}^t,$$

$m_2 = 2i_{1,2}, \ldots, 2i_{1,2}i_{1,2}+L_2-1$.

Figure 10:
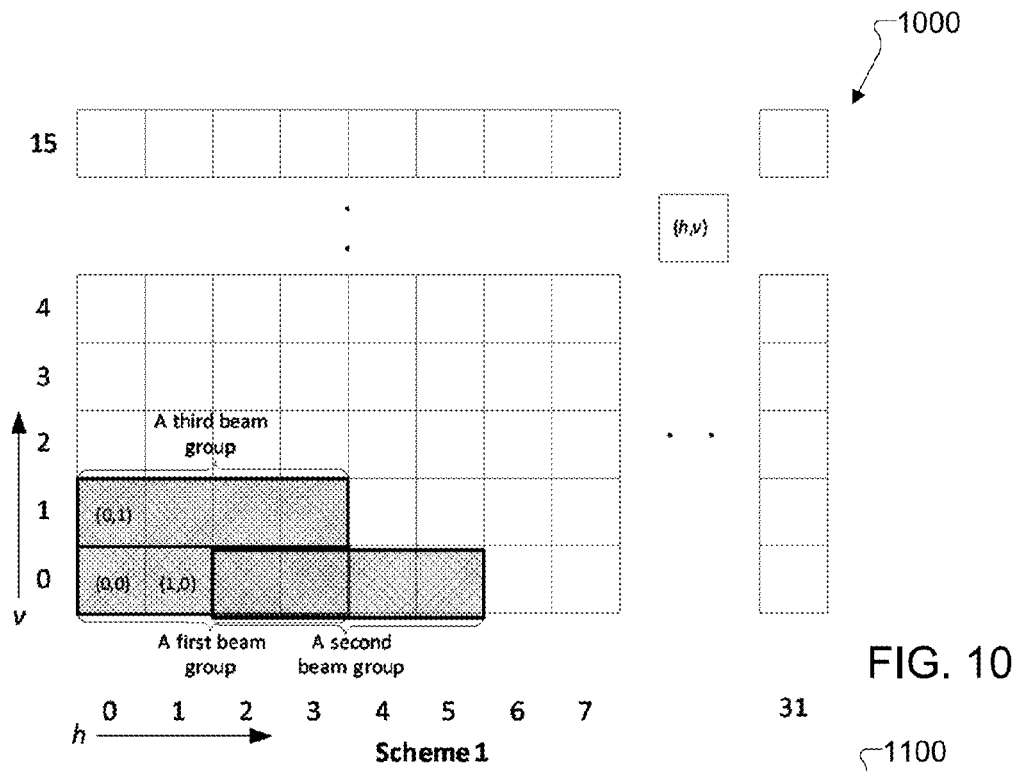
FIG. 10 illustrates a beam grouping scheme corresponding to Scheme 1 in TABLE 1 according to embodiment of the present disclosure.
Figure 11:
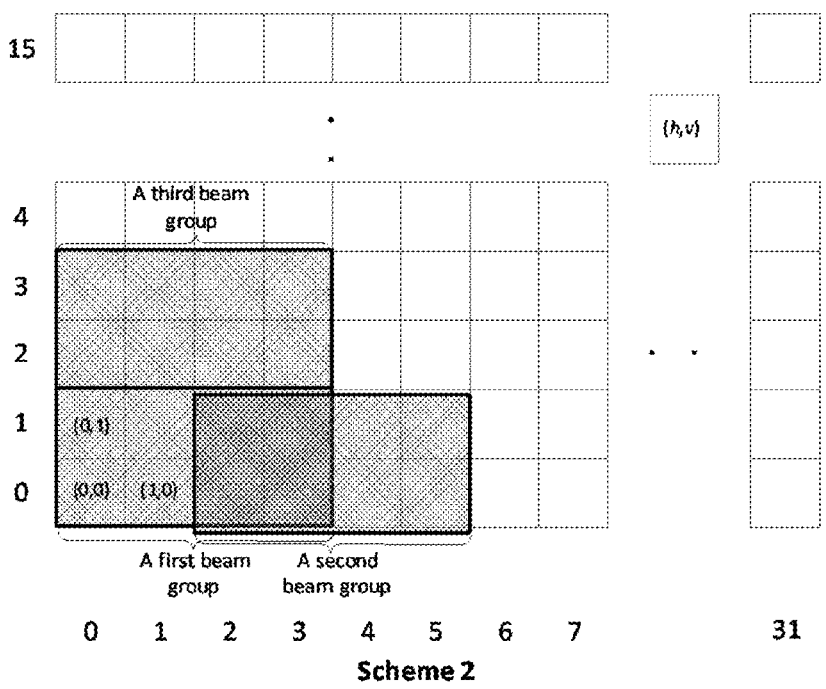
FIG. 11 illustrates a beam grouping scheme corresponding to Scheme 2 in TABLE 1 according to the embodiments of the present disclosure.
Figure 12:
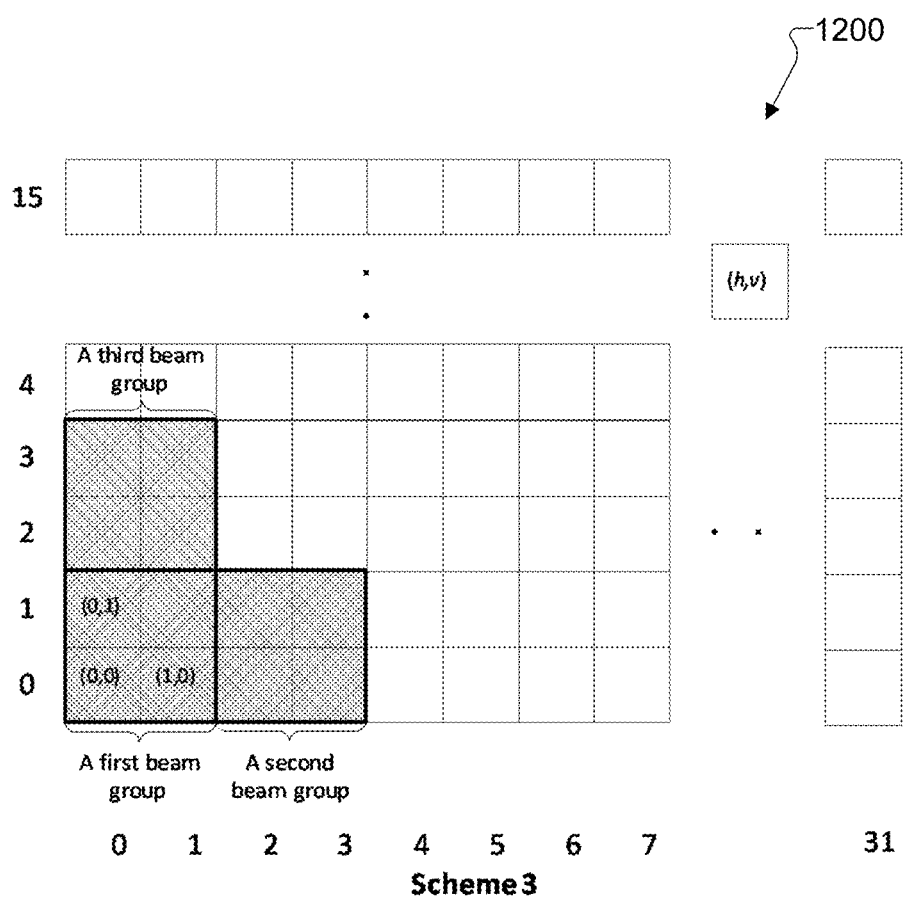
FIG. 12 illustrates a beam grouping scheme 1200 corresponding to Scheme 3 in TABLE 1 according to embodiments of the present disclosure.

In some embodiments, $N_1=8$ and $N_2=4$, and the TXRUs (or the antenna ports) are numbered according to FIG. 8. Three illustrative beam grouping schemes, referred to as Scheme 1, Scheme 2, and Scheme 3, according to the double codebook structure are shown in FIGS. 10, 11 and 12, and the related parameters are listed in TABLE 1.

TABLE 1

Parameters for three example beam grouping schemes

| | A first oversampling factor $o_1$ for the first dimension | A first number of beams $L_1$ for the first dimension | A second oversampling factor $o_2$ for the second dimension | A second number of beams $L_2$ for the second dimension |
|---|---|---|---|---|
| Scheme 1 | 8 | 4 | 4 | 1 |
| Scheme 2 | 8 | 4 | 4 | 2 |
| Scheme 3 | 8 | 2 | 4 | 2 |

In these schemes, a horizontal oversampling factor $o_1=8$ is considered for $W_1^{(1)}$ codebook and a vertical oversampling factor $o_2=4$ is considered for $W_2^{(1)}$ codebook. Hence, total number of beams for $W_1^{(1)}$ codebook is $$\frac{N_1 o_1}{P} = 32,$$

and total number of beams for $W_2^{(1)}$ codebook is $N_2 o_2=16$. FIGS. 10 to 12 illustrate these 16×32 3D beams constructed by Kronecker product of each beam vector in $W_1^{(1)}$ codebook and each beam vector in $W_2^{(1)}$ codebook as a 16×32 grid, wherein each square correspond to a beam.

FIG. 10 illustrates a beam grouping scheme corresponding to Scheme 1 in TABLE 1 according to embodiment of the present disclosure. The embodiment shown in FIG. 10 is for illustration only. Other embodiments could be used without departing from the scope of the present disclosure.

In Scheme 1, $W_1^{(1)}$ codebook is a set of uniformly-spaced 4 DFT beams ($L_1=4$). In the figure, a first, a second, and a third beam groups are illustrated. The first group comprises beams corresponding to beam grids (h,v)=(0,0), (1,0), (2,0), and (3,0), where h and v refer to horizontal and vertical grid indices, respectively. The second group comprises beams corresponding to beam grids (h,v)=(2,0), (3,0), (4,0), and (5,0). The beam groups with v=0 can be similarly constructed, and total number of beam groups with v=0 is 16. The third group comprises beams corresponding to beam grids (h,v)=(0,1), (1,1), (2,1), and (3,1). Continuing similarly through horizontal and vertical beam directions, 16×16=256 beam groups are constructed. A beam group can be indicated by a log 2(256)=8 bit field. Note that in Scheme 1, $W_1^{(1)}$ corresponds to the first stage codebook in Rel. 10 8-Tx double codebook, and $W_2^{(1)}$ codebook is the set of single DFT beams ($L_2=1$).

FIG. 11 illustrates a beam grouping scheme 1100 corresponding to Scheme 2 in TABLE 1 according to the embodiments of the present disclosure. The embodiment shown in FIG. 11 is for illustration only. Other embodiments could be used without departing from the scope of the present disclosure.

In Scheme 2, $W_1^{(1)}$ codebook is a set of uniformly-spaced 4 DFT beams ($L_1=4$) and $W_2^{(1)}$ codebook is a set of uniformly-spaced 2 DFT beams ($L_1=2$). In the figure, a first, a second, and a third beam groups are illustrated. The first group comprises beams corresponding to beam grids (h,v)= (0,0), (1,0), (2,0), (3,0), (0,1), (1,1), (2,1), and (3,1). The second group comprises beams corresponding to beam grids (h,v)=(2,0), (3,0), (4,0), (5,0), (2,1), (3,1), (4,1), and (5,1). The beam groups with v=0 and 1 can be similarly constructed, and total number of beam groups with v=0 and 1 is 16. The third group comprises beams corresponding to beam grids (h,v)=(0,2), (1,2), (2,2), (3,2), (0,3), (1,3), (2,3), and (3,3). Continuing similarly through horizontal and vertical beam directions, 16×8=128 beam groups are constructed. A beam group can be indicated by a log 2(128)=7 bit field. Note that in Scheme 2, $W_1^{(1)}$ corresponds to the first stage codebook in Rel. 10 8-Tx double codebook.

FIG. 12 illustrates a beam grouping scheme 1200 corresponding to Scheme 3 in TABLE 1 according to embodiments of the present disclosure. The embodiment shown in FIG. 12 is for illustration only. Other embodiments could be used without departing from the scope of the present disclosure.

In Scheme 3, both $W_1^{(1)}$ and $W_2^{(1)}$ are sets of uniformly-spaced 2 DFT beams ($L_1=L_2=2$). In the figure, a first, a second, and a third beam groups are illustrated. The first group comprises beams corresponding to beam grids (h,v)=(0,0), (1,0), (0,1), and (1,1). The second group comprises beams corresponding to beam grids (h,v)=(2,0), (3,0), (2,1), and (3,1). The beam groups with v=0 and 1 can be similarly constructed, and total number of beam groups with v=0 and 1 is 16. The third group comprises beams corresponding to beam grids (h,v)=(0,2), (1,2), (0,3), and (1,3). Continuing similarly through horizontal and vertical beam directions, 16×8=128 beam groups are constructed. A beam group can be indicated by a log 2(128)=7 bit field.

It should be noted that these codebooks are for illustration only. The method is applicable to other kinds of double codebooks.

In some embodiments, PMI indices corresponding to $W_1^{(1)}$ and $W_2^{(1)}$ are WB and long-term and that corresponding to $W_1^{(2)}$ and $W_2^{(2)}$ are SB and short-term. The PMI feedback payload to indicate PMI indices for the three schemes is shown in below TABLE 2. Both WB and SB components of the feedback overhead can be decomposed into two, one for azimuth and the other for elevation.

WB components: in all three schemes, a 4-bit feedback is needed to report azimuth component of the PMI index (H-PMI) corresponding to $W_1^{(1)}$. In Scheme 1, if V-PMI is configured as a WB component, then V-PMI is reported as a 4 bit information, which corresponds to $W_2^{(1)}$. Otherwise no WB V-PMI is reported (i.e., 0 bits for $W_2^{(1)}$). In both Schemes 2 and 3, V-PMI is reported as a 3-bit information, which corresponds to $W_2^{(1)}$.

SB components: in all three schemes, a 2-bit feedback is needed to report the co-phase value. To report azimuth component of the PMI index (H-PMI) corresponding to $W_1^{(2)}$, a 2-bit indication is used in Schemes 1 and 2, and a 1-bit indication is used in Scheme 3. For elevation component of the PMI index (V-PMI) corresponding to $W_2^{(2)}$, a 4-bit indication is used in Scheme 1 if SB V-PMI is configured, and a 1-bit feedback is used in Schemes 2 and 3.

TABLE 2

Feedback overhead of different beam grouping schemes

| | WB components | | SB components | | |
|---|---|---|---|---|---|
| | Azimuth (bits) | Elevation (bits) | Azimuth (bits) | Elevation (bits) | Co-phasing (bits) |
| Scheme 1 | 4 | 4 if WB V-PMI is configured; 0 otherwise | 2 | 4 if SB V-PMI is configured; 0 otherwise | 2 |
| Scheme 2 | 4 | 3 | 2 | 1 | 2 |
| Scheme 3 | 4 | 3 | 1 | 1 | 2 |

In some embodiments, the UE is configured with one first-stage codebook selected from multiple candidate first-stage codebooks, in which each first stage codebook is associated with a set of parameters defining a single beam grouping scheme such as Schemes 1, 2, and 3 in TABLE 1. In one example, a beam grouping scheme may be configured via higher-layers (e.g, RRC) according to the below; or a preferred beam grouping scheme may be reported by the UE.

| Beam grouping scheme for the first stage codebook | Enumerated {Scheme 1, Scheme 2, Scheme 3} . . . related to schemes in TABLE 1 |
|---|---|

In some embodiments, the UE is configured with one first-stage codebook selected from multiple candidate first-stage codebooks where each first stage codebook is associated with multiple beam grouping schemes wherein example beam grouping schemes are shown in TABLE 1. In this case, the UE can more flexibly select SB PMI. For example, a UE may be configured to report a first PMI based upon the first-stage codebook, comprising beam groups constructed by Schemes 1 and 2. For this configuration, a new information element (IE) that can be configured in the higher-layer (e.g., RRC) can be designed as shown below, which indicates which of schemes 1, 2 and 3 are used for constructing beam groups for first stage codebook construction.

| Selected beam grouping schemes for the first stage codebook | Enumerated {Schemes 1&2, Schemes 1&3, Schemes 2&3} . . . related to schemes in TABLE 1 |
|---|---|

In this case, the total number of beam groups indicated by $W_1^{(1)}$ and $W_2^{(1)}$ is determined as sum of numbers of beam groups indicated by the two schemes. For example, when schemes 1 and 3 are chosen, the total number of beam groups is 256+128=384. A UE may report a one-bit selected beam group index information, as well as the first PMI $i_{1,1}$ and $i_{1,2}$ for the two dimensions; in this case, the first PMI is interpreted differently according to the reported beam group index.

In some embodiments, a UE is configured with a CSI-RS configuration via higher layer, configuring two resources, wherein a first resource is used for CSI-RS transmissions of $N_1$ antenna ports—antenna ports A(1) through A($N_1$), and a second resource is used for CSI-RS transmissions of $N_2$ antenna ports—antenna ports B(1) through B($N_2$).

When the UE is configured with ($N_1$, $N_2$), the UE calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank), wherein $P=N_1 \cdot N_2$) is the Kronecker product of the two, $W=W_1 \otimes W_2$. If PMI reporting is configured, the UE will report two component PMI corresponding to selected pair of $W_1$ and $W_2$. The signals formed with the composite precoder is assumed to be transmitted on antenna ports $C(1), \ldots, C(P)$ for the purpose of deriving CQI index. The UE may also assume that reference signals on antenna ports $C(1), \ldots, C(P)$ are constructed by a Kronecker product of reference signals on $A(1), \ldots, A(N_1)$ and reference signals on $B(1), \ldots, B(N_2)$. In other words: $[C(1), \ldots, C(P)]^t = [A(1), \ldots, A(N_1)]^t \otimes [B(1), \ldots, B(N_2)]^t$.

Relation of Composite Precoder to Antenna Ports

In some embodiments, for the purpose of deriving CQI index, and PMI and RI (if configured), the UE may assume the following:

The PDSCH signals on antenna ports $\{7, \ldots, 6+v\}$ would result in signals equivalent to corresponding symbols transmitted on antenna ports $\{15, \ldots, 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i) = [x^{(0)}(i) \ldots x^{(v-1)}(i)]^T$ is a vector of symbols from the layer mapping in subclause 6.3.3.2 of 3GPP TS 36.211, P is the number of antenna ports of the associated CSI-RS resource, and if $P=1$, $W(i)$ is 1, otherwise $W(i)$, of size P×v, is the precoding matrix corresponding to the reported PMI applicable to $x(i)$. The corresponding PDSCH signals transmitted on antenna ports $\{15 \ldots 14+P\}$ would have a ratio of EPRE to CSI-RS EPRE equal to the ratio given in subclause 3GPP TS 36.213.

8-Tx Double Codebook

TABLE 3 and TABLE 4 are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these precoder expressions, the following two variables are used:

$$\varphi_n = e^{j\pi n/2}$$

$$v_m = [1 \ e^{j2\pi m/32} \ e^{j4\pi m/32} \ e^{j6\pi m/32}]^T.$$

TABLE 3

Codebook for 1-layer CSI reporting using antenna ports 15 to 22

| $i_1$ | $i_2$ | | | | | | | |
|---|---|---|---|---|---|---|---|---|
|  | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
|  | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$, If the most recently reported RI=1, m and n are derived with the two indices $i_1$ and $i_2$ according to TABLE 3, resulting in a rank-1 precoder, $$W_{m,n}^{(1)} = \frac{1}{\sqrt{8}} \begin{bmatrix} v_m \\ \varphi_n v_m \end{bmatrix}.$$

TABLE 4

Codebook for 2-layer CSI reporting using antenna ports 15 to 22

| $i_1$ | $i_2$ | | | |
|---|---|---|---|---|
|  | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
|  | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

TABLE 4-continued

Codebook for 2-layer CSI reporting using antenna ports 15 to 22

| | $i_2$ | | | |
|---|---|---|---|---|
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(1)}$ | where $W_{m,m',n}^{(2)} = \frac{1}{4}\begin{bmatrix} v_m & v_{m'} \\ \varphi_n v_m & -\varphi_n v_{m'} \end{bmatrix}$ If the most recently reported RI=2, m, m' and n are derived with the two indices $i_1$ and $i_2$ according to TABLE 4, resulting in a rank-2 precoder, $$W_{m,m',n}^{(2)} = \frac{1}{4}\begin{bmatrix} v_m & v_{m'} \\ \varphi_n v_m & -\varphi_n v_{m'} \end{bmatrix}.$$

It is noted that $W_{m,m',n}^{(2)}$ is constructed such that it can be used for two different types of channel conditions that facilitate a rank-2 transmission.

One subset of the codebook associated with $i_2 = \{0, 1, \ldots, 7\}$ comprises codewords with m=m', or the same beams ($v_m$) are used for constructing the rank-2 precoder:

$$W_{m,m,n}^{(2)} = \frac{1}{4}\begin{bmatrix} v_m & v_m \\ \varphi_n v_m & -\varphi_n v_m \end{bmatrix}.$$

In this case, the two columns in the 2-layer precoder are orthogonal (i.e., $[v_m \ \varphi_n v_m]^H \cdot [v_m \ -\varphi_n v_m]=0$), owing to the different signs applied to $\varphi_n$ for the two columns. These rank-2 precoders are likely to be used for those UEs that can receive strong signals along two orthogonal channels generated by the two differently polarized antennas.

Figure 13:
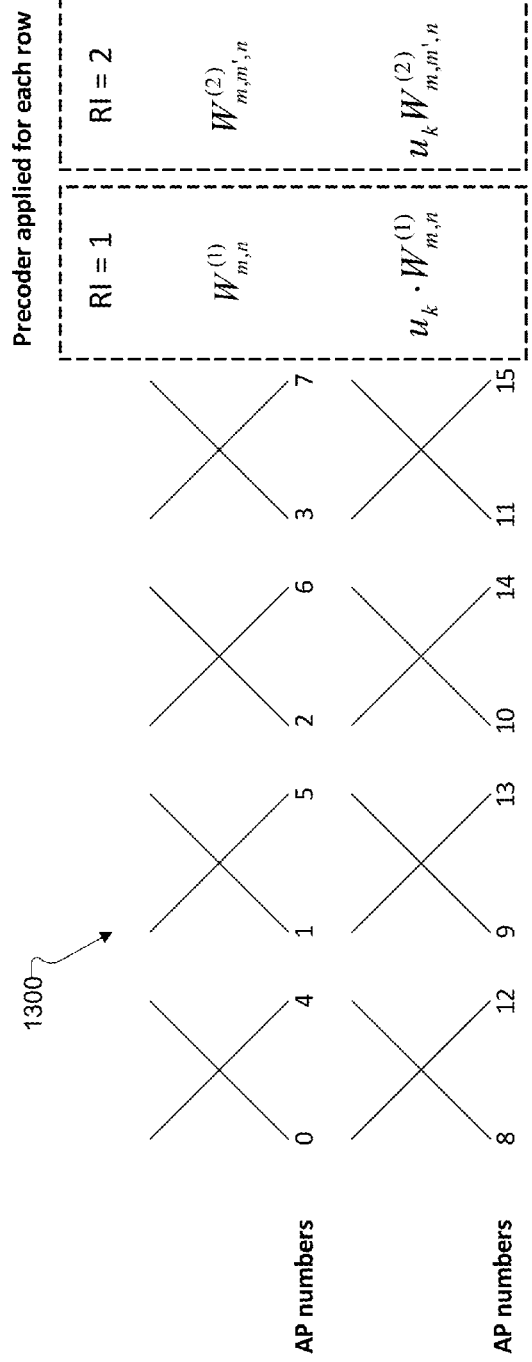
FIG. 13 illustrates a new codebook construction 1300 according to embodiments of the present disclosure.

FIG. 13 illustrates a new codebook construction 1300 according to embodiments of the present disclosure. The embodiment shown in FIG. 13 is for illustration only. Other embodiments could be used without departing from the scope of the present disclosure.

In the embodiment, the new codebook construction is constructed for P=16 antenna ports comprising $N_1=8$ and $N_2=2$. For each group of APs corresponding to each row (i.e., $\{0, 1, \ldots 7\}$ and $\{8, 9, \ldots, 15\}$), the channels are quantized with two indices $i_{1,1}$ and $i_{2,1}$, according to the 8-Tx double codebook. It is noted that the antenna (TXRU) numbering system in this example is aligned with FIG. 4A.

A co-phasing vector to apply for the two rows is constructed with a new index k, and is equal to $$V_k^{(1)} = \begin{bmatrix} 1 \\ u_k \end{bmatrix}.$$

The resulting precoders $W_{m,n,k}^{(1)}$ and $W_{m,m',n,k}^{(2)}$ when the most recently reported RI is 1 and 2 are:

$$W_{m,n,k}^{(1)} = \frac{1}{\sqrt{2}}\begin{bmatrix} W_{m,n}^{(1)} \\ u_k W_{m,n}^{(1)} \end{bmatrix}$$

if RI=1;

$$W_{m,m',n,k}^{(2)} = \frac{1}{\sqrt{2}}\begin{bmatrix} W_{m,m',n}^{(2)} \\ u_k W_{m,m',n}^{(2)} \end{bmatrix}$$

if RI=2.

It is noted that the precoders when the most recently reported RI is >2 can also be similarly constructed with applying a co-phasing vector.

Case 1. (RI=1) Substituting $$W_{m,n}^{(1)} = \frac{1}{\sqrt{8}}\begin{bmatrix} v_m \\ \varphi_n v_m \end{bmatrix}$$

to $$W_{m,n,k}^{(1)} = \frac{1}{\sqrt{2}}\begin{bmatrix} W_{m,n}^{(1)} \\ u_k W_{m,n}^{(1)} \end{bmatrix},$$

we obtain:

$$W_{m,n,k}^{(1)}(=V_k^{(1)} \otimes W_{m,n}^{(1)}) = \frac{1}{\sqrt{2}}\begin{bmatrix} W_{m,n}^{(1)} \\ u_k W_{m,n}^{(1)} \end{bmatrix} = \frac{1}{4}\begin{bmatrix} v_m \\ \varphi_n v_m \\ u_k v_m \\ \varphi_n u_k v_m \end{bmatrix}.$$

Case 2. (RI=2) Substituting $$W_{m,m',n}^{(2)} = \frac{1}{4}\begin{bmatrix} v_m & v_{m'} \\ \varphi_n v_m & -\varphi_n v_{m'} \end{bmatrix}$$

to $$W^{(2)}_{m,m',n,k} = \frac{1}{\sqrt{2}} \begin{bmatrix} W^{(2)}_{m,m',n} \\ u_k W^{(2)}_{m,m',n} \end{bmatrix},$$

we obtain:

$$W^{(2)}_{m,m',n,k}\left(=V^{(1)}_k \otimes W^{(2)}_{m,m',n}\right) =$$

$$\frac{1}{\sqrt{2}} \begin{bmatrix} W^{(2)}_{m,m',n} \\ u_k W^{(2)}_{m,m',n} \end{bmatrix} = \frac{1}{\sqrt{32}} \begin{bmatrix} v_m & v_{m'} \\ \varphi_n v_m & -\varphi_n v_{m'} \\ u_k v_m & u_k v_{m'} \\ \varphi_n u_k v_m & -\varphi_n u_k v_{m'} \end{bmatrix},$$

where it is clarified that $W^{(2)}_{m,m',n,k}$ is indeed a Kronecker product of $V^{(1)}_k$ and $W^{(2)}_{m,m',n}$.

In one method, $u_k = e^{j\pi k/2}$, k=0,1,2,3, which is uniformly sampling the range of $[0, 2\pi]$. In this case, the rank-1 and rank-2 precoders are constructed as:

$$W^{(1)}_{m,n,k} = \frac{1}{4} \begin{bmatrix} v_m \\ e^{\frac{j\pi n}{2}} v_m \\ e^{\frac{j\pi k}{2}} v_m \\ e^{\frac{j\pi(n+k)}{2}} v_m \end{bmatrix} \text{ and}$$

$$W^{(2)}_{m,m',n,k} = \frac{1}{\sqrt{32}} \begin{bmatrix} v_m & v_{m'} \\ e^{\frac{j\pi n}{2}} v_m & -e^{\frac{j\pi n}{2}} v_{m'} \\ e^{\frac{j\pi k}{2}} v_m & e^{\frac{j\pi k}{2}} v_{m'} \\ e^{\frac{j\pi(n+k)}{2}} v_m & -e^{\frac{j\pi(n+k)}{2}} v_{m'} \end{bmatrix}.$$

In another method, $u_k = e^{j\pi k/4}$, k=0,1,2,3, which is uniformly sampling the range of $[0, \pi]$. This method is motivated by the fact that it would be sufficient to consider the range of $[0, \pi]$ for quantizing the elevation (or zenith) angle, when azimuth angle spans $[0, 2\pi]$ In this case, the rank-1 and rank-2 precoders are constructed as:

$$W^{(1)}_{m,n,k} = \frac{1}{4} \begin{bmatrix} v_m \\ e^{\frac{j\pi n}{2}} v_m \\ e^{\frac{j\pi k}{4}} v_m \\ e^{\frac{j\pi(2n+k)}{4}} v_m \end{bmatrix} \text{ and}$$

$$W^{(2)}_{m,m',n,k} = \frac{1}{\sqrt{32}} \begin{bmatrix} v_m & v_{m'} \\ e^{\frac{j\pi n}{2}} v_m & -e^{\frac{j\pi n}{2}} v_{m'} \\ e^{\frac{j\pi k}{4}} v_m & e^{\frac{j\pi k}{4}} v_{m'} \\ e^{\frac{j\pi(2n+k)}{4}} v_m & -e^{\frac{j\pi(2n+k)}{4}} v_{m'} \end{bmatrix}.$$

Figure 14:
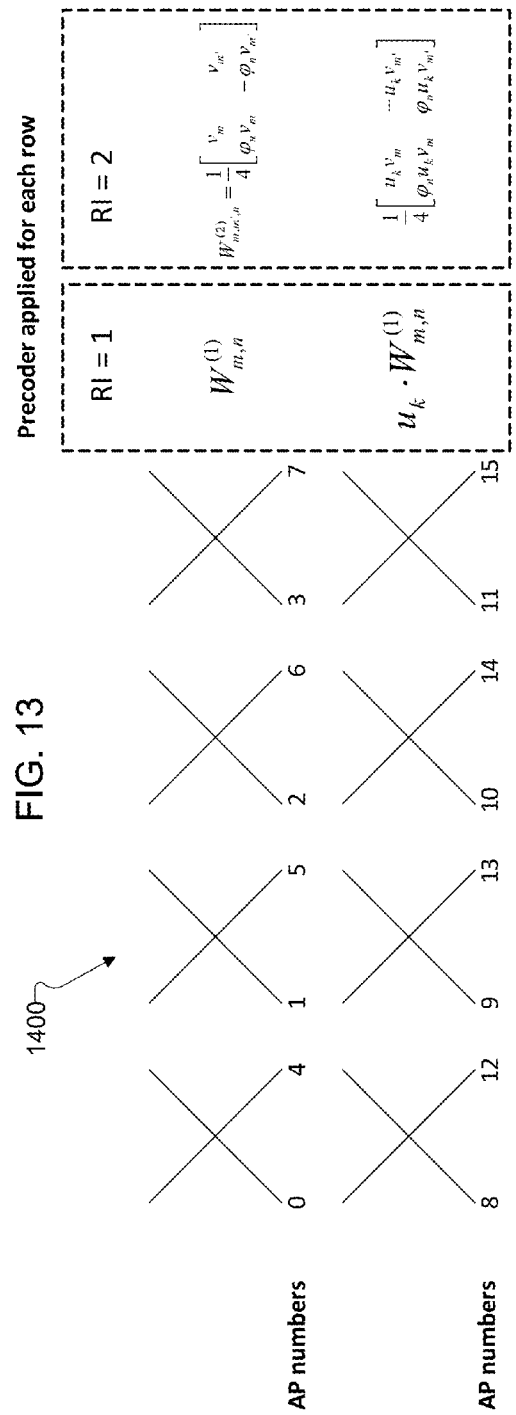
FIG. 14 illustrates another new codebook construction according to embodiments of the present disclosure.

FIG. 14 illustrates another new codebook construction according to embodiments of the present disclosure. The embodiment shown in FIG. 14 is for illustration only. Other embodiments could be used without departing from the scope of the present disclosure.

The codebook construction is the same as FIG. 13, except for the second column of the composite 16-Tx rank-2 precoder. According to this construction, the rank-2 precoder matrix is:

$$W^{(2)}_{m,m',n,k} = \frac{1}{\sqrt{2}} \begin{bmatrix} \frac{1}{4}\begin{bmatrix} v_m & v_{m'} \\ \varphi_n v_m & -\varphi_n v_{m'} \end{bmatrix} \\ \frac{1}{4}\begin{bmatrix} u_k v_m & -u_k v_{m'} \\ \varphi_n u_k v_m & \varphi_n u_k v_{m'} \end{bmatrix} \end{bmatrix} = \frac{1}{\sqrt{32}} \begin{bmatrix} v_m & v_{m'} \\ \varphi_n v_m & -\varphi_n v_{m'} \\ u_k v_m & -u_k v_{m'} \\ \varphi_n u_k v_m & \varphi_n u_k v_{m'} \end{bmatrix},$$

where $u_k = e^{j\pi k/2}$, k=0,1,2,3 or $u_k = e^{j\pi k/4}$, k=0,1,2,3.

Figure 15:
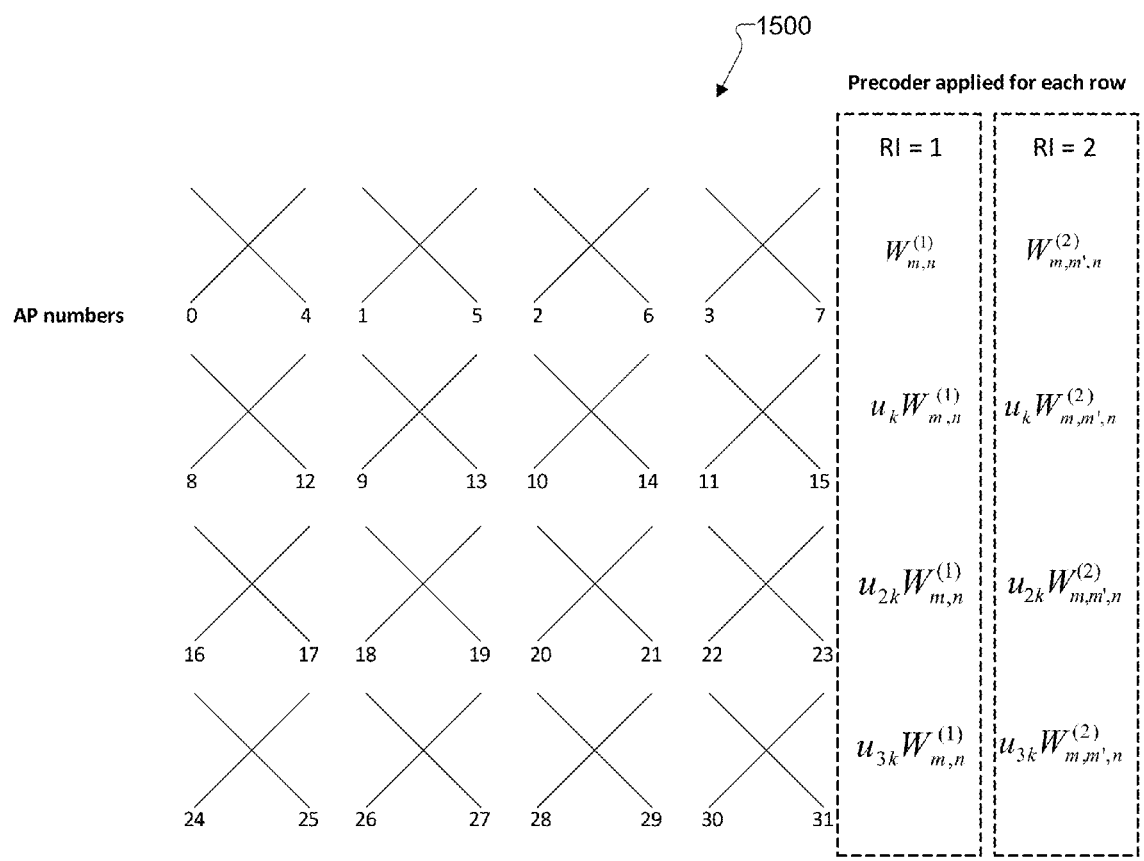
FIG. 15 illustrates a new codebook construction for P=32 antenna ports according to embodiments of the present disclosure.

FIG. 15 illustrates a new codebook construction for P=32 antenna ports comprising $N_1=8$ and $N_2=4$, according to embodiments of the present disclosure. The embodiment shown in FIG. 15 is for illustration only. Other embodiments could be used without departing from the scope of the present disclosure.

The codebook is constructed under the same principle as FIG. 13. In this case, the co-phasing to be applied to the four rows is a 4×1 vector, $V^{(1)}_k = [1 \ u_k \ u_{2k} \ u_{3k}]^t$, where $u_k = e^{j\pi k/2}$, k=0,1,2,3 or $u_k = e^{j\pi k/4}$, k=0,1,2,3. In this case, the rank-1 and rank-2 precoder is constructed as:

$$W^{(1)}_{m,n,k}\left(=V^{(1)}_k \otimes W^{(1)}_{m,n}\right) = \frac{1}{\sqrt{2}} \begin{bmatrix} W^{(1)}_{m,n} \\ u_k W^{(1)}_{m,n} \\ u_{2k} W^{(1)}_{m,n} \\ u_{3k} W^{(1)}_{m,n} \end{bmatrix};$$

$$W^{(2)}_{m,m',n,k}\left(=V^{(1)}_k \otimes W^{(2)}_{m,m',n}\right) = \frac{1}{\sqrt{2}} \begin{bmatrix} W^{(2)}_{m,m',n} \\ u_k W^{(2)}_{m,m',n} \\ u_{2k} W^{(2)}_{m,m',n} \\ u_{3k} W^{(2)}_{m,m',n} \end{bmatrix}.$$

Similarly, a new codebook can be constructed according to the same principle as in FIG. 13 and FIG. 15, for arbitrary numbers of $N_1$ and $N_2$; $W^{(1)}_{m,n,k}$ and $W^{(2)}_{m,m',n,k}$ will comprise ($N_2$×1) block matrices where each block corresponds to $u_k W^{(1)}_{m,n}$, k=0,1,2, . . . , $N_2$; and $u_k = e^{j\pi k/N_2}$.

Figure 16:
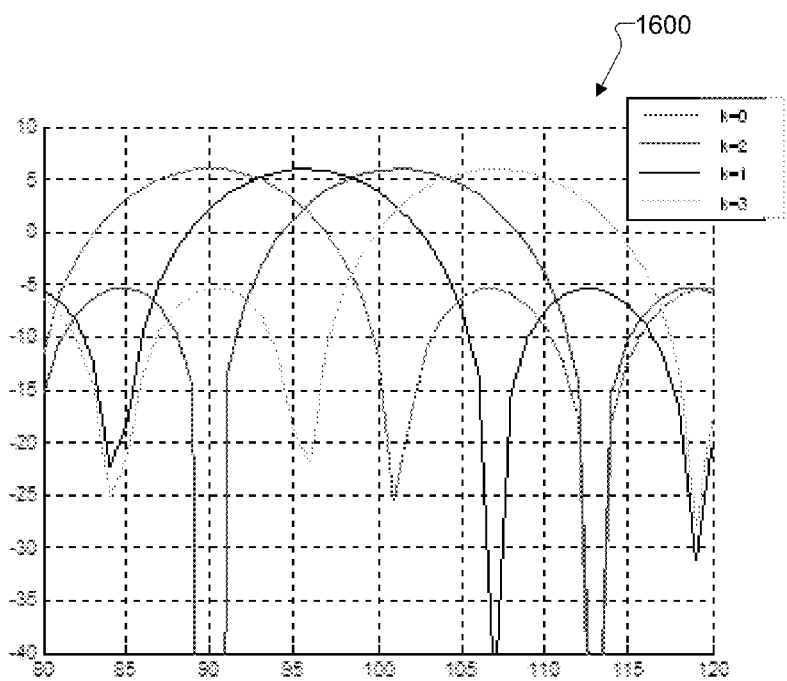
FIG. 16 shows example beam patterns according to embodiments of the present disclosure.

FIG. 16 shows example beam patterns constructed with [1 $u_k \ u_{2k} \ u_{3k}]^t$ and $u_k = e^{j\pi k/4}$, k=0,1,2,3, where antennas are spaced apart by 1.28λ, in the vertical domain. The figure shows that the elevation angle range of 90° to 115° are well-covered, the range of which corresponds to typical user elevation angle distribution.

Polarization-Specific V Beams

Figure 17:
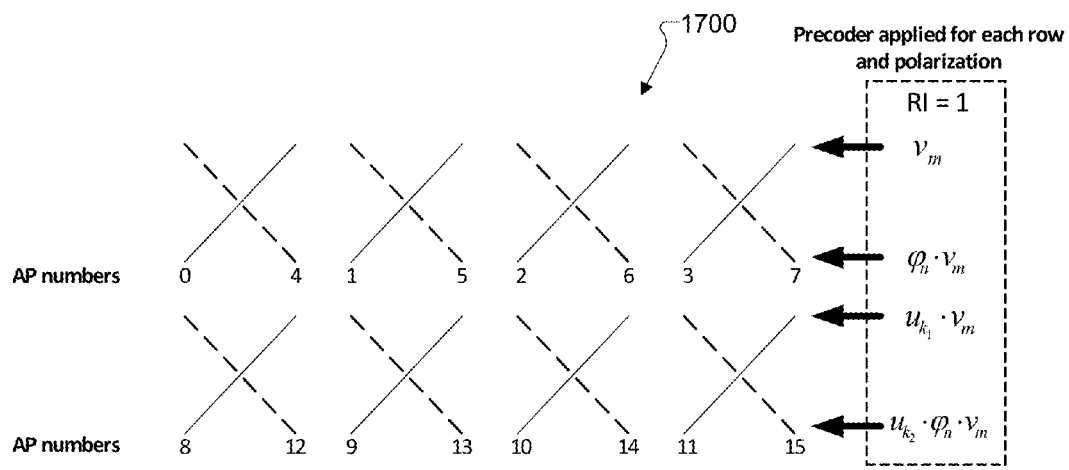
FIG. 17 illustrates an alternate codebook construction in which two different vertical beams may be applied for the two polarizations according to the present disclosure.

FIG. 17 illustrates an alternate codebook construction 1700 in which two different vertical beams may be applied for the two polarizations according to the present disclosure. The embodiment shown in FIG. 17 is for illustration only. Other embodiments could be used without departing from the scope of the present disclosure.

In this exemplary figure, we have P=16 antenna ports comprising $N_1=8$ and $N_2=2$. For each group of APs corresponding to each row (i.e., {0, 1, . . . 7} and {8, 9, . . . , 15}, the channels are quantized with two indices $i_1$ and $i_2$, according to the 8-Tx double codebook. It is noted that the antenna (TXRU) numbering system in this example is aligned with FIG. 4A.

Two co-phasing vectors or vertical beams to apply for the two rows are constructed with two new indices $k_1$ and $k_2$, and are equal to $$V_{k_1}^{(1)} = \begin{bmatrix} 1 \\ u_{k_1} \end{bmatrix} \text{ and } V_{k_2}^{(1)} = \begin{bmatrix} 1 \\ u_{k_2} \end{bmatrix}.$$

The first vertical beam $V_{k_1}^{(1)}$ is applied to antenna ports with one polarization, shown as solid lines, and the second vertical beam $V_{k_2}^{(1)}$ is applied to antenna ports with other polarization, shown as dashed lines. Note that the proposed idea is applicable to rank 2 (RI=2). The resulting precoders $W_{m,n,k_1,k_2}^{(1)}$ and $W_{m,m',n,k_1,k_2}^{(2)}$ when the most recently reported RI is 1 and 2 are:

Case 1. (RI=1):

$$W_{m,n,k_1,k_2}^{(1)} = \frac{1}{4} \begin{bmatrix} v_m \\ \varphi_n v_m \\ u_{k_1} v_m \\ \varphi_n u_{k_2} v_m \end{bmatrix}.$$

Case 2. (RI=2):

$$W_{m,m',n,k_1,k_2}^{(2)} = \frac{1}{\sqrt{32}} \begin{bmatrix} v_m & v_{m'} \\ \varphi_n v_m & -\varphi_n v_{m'} \\ u_{k_1} v_m & u_{k_1} v_{m'} \\ \varphi_n u_{k_2} v_m & -\varphi_n u_{k_2} v_{m'} \end{bmatrix},$$

where it is clarified that $W_{m,n,k_1,k_2}^{(1)}$ is indeed a concatenation of two Kronecker product, one for each polarization, i.e. KP $(V_{k_1}^{(1)}, v_m)$ and KP $(V_{k_2}^{(1)}, \phi_n v_m)$, It is noted that the precoders when the most recently reported RI is >2 can also be similarly constructed with applying two vertical co-phasing vectors.

In one method, for both l=1,2, $u_{k_1}=e^{j\pi k_1/2}$, $k_1=0,1,2,3$, which is uniformly sampling the range of $[0, 2\pi c]$. In this case, the rank-1 and rank-2 precoders are constructed as:

$$W_{m,n,k_1,k_2}^{(1)} = \frac{1}{4} \begin{bmatrix} v_m \\ e^{\frac{j\pi n}{2}} v_m \\ e^{\frac{j\pi k_1}{2}} v_m \\ e^{\frac{j\pi(n+k_2)}{2}} v_m \end{bmatrix} \text{ and }$$

$$W_{m,m',n,k_1,k_2}^{(2)} = \frac{1}{\sqrt{32}} \begin{bmatrix} v_m & v_{m'} \\ e^{\frac{j\pi n}{2}} v_m & -e^{\frac{j\pi n}{2}} v_{m'} \\ e^{\frac{j\pi k_1}{2}} v_m & e^{\frac{j\pi k_1}{2}} v_{m'} \\ e^{\frac{j\pi(n+k_2)}{2}} v_m & -e^{\frac{j\pi(n+k_2)}{2}} v_{m'} \end{bmatrix}.$$

In another method, for both l=1,2, $u_{k_1}=e^{j\pi k_1/4}$, $k_1=0,1,2,3$, which is uniformly sampling the range of $[0, \pi]$. This method is motivated by the fact that it would be sufficient to consider the range of $[0, \pi]$ for quantizing the elevation (or zenith) angle, when azimuth angle spans $[0, 2\pi]$ In this case, the rank-1 and rank-2 precoders are constructed as:

$$W_{m,n,k_1,k_2}^{(1)} = \frac{1}{4} \begin{bmatrix} v_m \\ e^{\frac{j\pi n}{2}} v_m \\ e^{\frac{j\pi k_1}{4}} v_m \\ e^{\frac{j\pi(2n+k_2)}{4}} v_m \end{bmatrix} \text{ and }$$

$$W_{m,m',n,k_1,k_2}^{(2)} = \frac{1}{\sqrt{32}} \begin{bmatrix} v_m & v_{m'} \\ e^{\frac{j\pi n}{2}} v_m & -e^{\frac{j\pi n}{2}} v_{m'} \\ e^{\frac{j\pi k_1}{4}} v_m & e^{\frac{j\pi k_1}{4}} v_{m'} \\ e^{\frac{j\pi(2n+k_2)}{4}} v_m & -e^{\frac{j\pi(2n+k_2)}{4}} v_{m'} \end{bmatrix}.$$

In another method, the configuration for two vertical beams allows them to be either identical or adjacent. For example, for both l=1,2 with either $u_{k_1}=e^{j\pi k_1/2}$ or $e^{j\pi k_1/4}$, $(k_1,k_2)$ values are jointly selected from TABLE 5. Note that compared to the previous two methods where 4-bit indication is needed $(k_1,k_2)$ feedback, a 3-bit indication is needed in this method.

TABLE 5

Two vertical beam index table

| Index | $(k_1, k_2)$ |
|---|---|
| 0 | (0, 0) |
| 1 | (1, 1) |
| 2 | (2, 2) |
| 3 | (3, 3) |
| 4 | (0, 1) |
| 5 | (1, 2) |
| 6 | (2, 3) |
| 7 | (3, 0) |

In another method, when $N_2=4$ and we have a double vertical codebook with oversampling factor $o_2=4$ and four beams in a group represented by the first stage vertical codebook ($L_2=4$), then $(k_1,k_2)$ is derived based on TABLE 6, which is similar to indices m and m' in rank 2 8-Tx codebook (TABLE 4). Note that here $(k_1,k_2)$ corresponds to indices of two 4-Tx DFT beams from the first stage vertical codebook.

TABLE 6

Two vertical beam index TABLE for double vertical codebook

| $i_3$ | $i_4$ | $(k_1, k_2)$ |
|---|---|---|
| 0-15 | 0 | $2i_1, 2i_1$ |
| | 1 | $2i_1 + 1, 2i_1 + 1$ |
| | 2 | $2i_1 + 2, 2i_1 + 2$ |
| | 3 | $2i_1 + 3, 2i_1 + 3$ |
| | 4 | $2i_1, 2i_1 + 1$ |
| | 5 | $2i_1 + 1, 2i_1 + 2$ |
| | 6 | $2i_1, 2i_1 + 3$ |
| | 7 | $2i_1 + 1, 2i_1 + 3$ |

Note that the two vertical beam idea is general and hence is applicable to other antenna port configurations such as the ones shown in FIG. 12 and FIG. 13.

PMI Feedback Indices: WB V-PMI

A UE can be configured to report three PMI indices, $i_1, i_2$, and $i_3$, for informing eNB of m, m', n, k, used for constructing a precoder according to a codebook construction associated with FIG. 11 or FIG. 12 or FIG. 13. In one method, $i_1, i_2$ correspond to precoders $W_{m,n,k}^{(1)}$ and $W_{m,m',n}^{(2)}$ according to the relation in TABLE 3 and TABLE 4 respectively for the cases of RI=1 and RI=2; and $i_3$ is mapped to k according to relation of $k=i_3$.

As $k=i_3$ is essentially a vertical beam index, which may not change quickly over time and frequency. Hence, it is proposed to jointly feedback $i_1$ and $i_3$ in PUCCH feedback modes.

Figure 18:
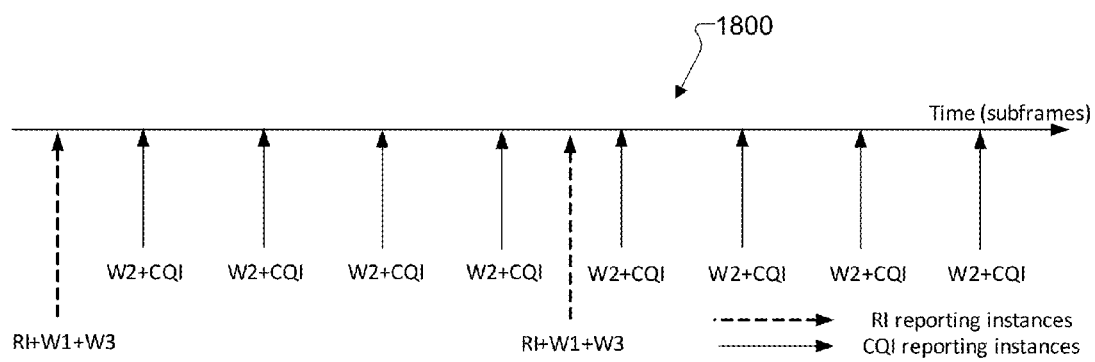
FIG. 18 illustrates PUCCH mode 1-1 submode 1 according to embodiments of the present disclosure.

FIG. 18 illustrates PUCCH mode 1-1 submode 1 according to embodiments of the present disclosure. The embodiment shown in FIG. 18 is for illustration only. Other embodiments could be used without departing from the scope of the present disclosure.

In the embodiment, a UE is configured with PUCCH feedback mode 1-1 submode 1. Then, the UE reports RI, $i_1$ and $i_3$ in RI reporting instances, and the UE reports $i_2$ and corresponding CQI in PMI/CQI reporting instances. This is illustrated in FIG. 18, where $i_1$, $i_2$ and $i_3$ are denoted as W1, W2 and W3.

For the joint encoding of RI, $i_1$ and $i_3$, two methods are designed in TABLE 7 and TABLE 8. In one method illustrated in TABLE 7, the numbers of states for RI=1 and RI=2 case are both 8, the same as Rel-10 8-Tx codebook. To jointly encode $i_1$ and $i_3$, it is proposed to uniformly subsample $i_1$ with sampling factor 4, and uniformly subsample $i_3$ with subsampling factor 2. In this case, the joint coding index 0, 1, . . . and 7 for RI/PMI 1/PMI 3 that is for RI=1, would correspond to $(i_1, i_3)$=(0, 0), (0, 1), (4, 0), (4, 1), (8, 0), (8, 1), (12, 0) and (12, 1).

Figure 19:
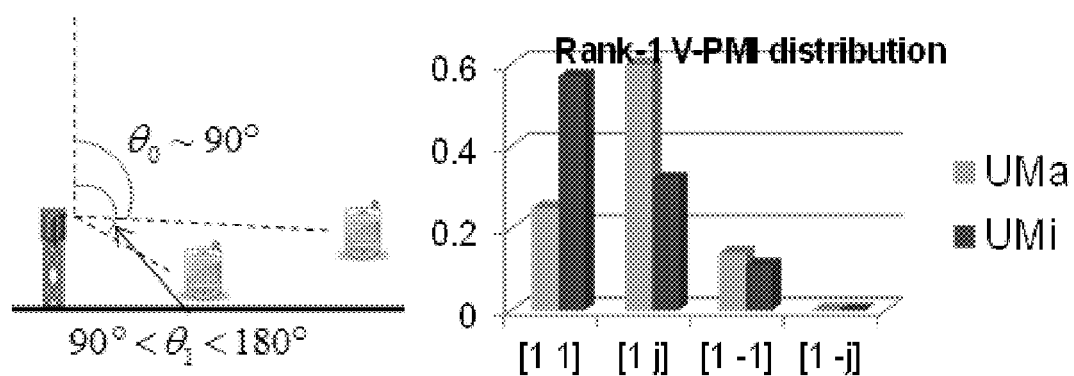
FIG. 19 illustrates an example UE elevation angle distribution in cellular wireless systems, in urban macro (UMa) and urban micro (UMi) cases.

FIG. 19 illustrates an UE elevation angle distribution in cellular wireless systems, in urban macro (UMa) and urban micro (UMi) cases. The elevation angle (θ) is defined in such a way that to the zenith is zero degree, and to the horizon is 90 degrees. In most cases, base station serves UEs below the base station antennas, in which case the elevation angle is 90 degrees or larger. This intuition is verified by simulation results, as shown on the right side of FIG. 19. As for $V_k^{(1)}$ precoders, [1 1] and [1 j] are most frequently chosen, each of which respectively corresponds to an elevation angle of 90 degrees and an angle between 90 degrees and 180 degrees. In some embodiments, the $V_k^{(1)}$ codebook comprises two precoders:

$$\left\{ \frac{1}{\sqrt{2}} \begin{bmatrix} 1 \\ 1 \end{bmatrix}, \frac{1}{\sqrt{2}} \begin{bmatrix} 1 \\ j \end{bmatrix} \right\},$$

so that UE can recommend one of the two elevation steering angles of θ=90° and 90°<θ<180°.

In some embodiments, $V_k^{(1)}$ codebook comprises four precoders as in other embodiments of the current disclosure, and a UE can report a codebook index out of k=0, 1, 2, 3 when the PMI is reported on PUSCH. When the PMI is reported on PUCCH and when a certain feedback mode is configured, a UE reports a codebook index out of a subsampled set.

TABLE 7

Joint encoding of RI, $i_1$ and $i_3$ for PUCCH mode 1-1 submode 1

| Value of joint encoding of RI and the first and the third PMI RI/PMI 1/PMI 3 | RI | Codebook index $i_1$ | Codebook index $i_3$ |
|---|---|---|---|
| 0-7 | 1 | $4\left\lfloor \frac{I_{RI/PMI1/PMI3}}{2} \right\rfloor$ | $I_{RI/PMI\ 1/PMI\ 3} \bmod 2$ |
| 8-15 | 2 | $4\left\lfloor \frac{(I_{RI/PMI1/PMI3} - 8)}{2} \right\rfloor$ | $I_{RI/PMI\ 1/PMI\ 3} \bmod 2$ |

In another method illustrated in TABLE 8, the numbers of states for RI=1 and RI=2 case are both 16, double the corresponding number of states in Rel-10 8-Tx codebook. To jointly encode $i_4$ and $i_3$, it is proposed to uniformly subsample $i_1$ with sampling factor 4, but not to subsample $i_3$, in order to maintain the elevation beamforming gain. In this case, the joint coding index 0, 1, . . . and 15 for RI/PMI 1/PMI 3 that is for RI=1, would correspond to $(i_1, i_3)$=(0, 0), (0, 1), (0, 2), (0, 3), (4, 0), (4, 1), (4, 2), (4, 3), (8, 0), (8, 1), (8, 2), (8, 3), (12, 0), (12, 1), (12, 2) and (12, 3).

In one method, the subsampled set corresponds to $$\left\{ \frac{1}{\sqrt{2}} \begin{bmatrix} 1 \\ 1 \end{bmatrix}, \frac{1}{\sqrt{2}} \begin{bmatrix} 1 \\ j \end{bmatrix} \right\},$$

so that UE can recommend one of the two elevation steering angles of θ=90° and 90°<θ<180°.

TABLE 8

Joint encoding of RI, $i_1$ and $i_3$ for PUCCH mode 1-1 submode 1

| Value of joint encoding of RI and the first and the third PMI RI/PMI 1/PMI 3 | RI | Codebook index $i_1$ | Codebook index $i_3$ |
|---|---|---|---|
| 0-15 | 1 | $4\left\lfloor \frac{I_{RI/PMI1/PMI3}}{4} \right\rfloor$ | $I_{RI/PMI\ 1/PMI\ 3} \bmod 4$ |
| 15-31 | 2 | $4\left\lfloor \frac{(I_{RI/PMI1/PMI3} - 16)}{4} \right\rfloor$ | $I_{RI/PMI\ 1/PMI\ 3} \bmod 4$ |

In another method, the subsampled set corresponds to $$\left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix} \right\},$$

so that UE can recommend one of the two precoders separated farthest in the angular domain. This method can improve MU-MIMO throughput, when eNB receives PMI constructed according to this method and applies the recommended precoders in the MU-MIMO transmissions.

In another method, the subsampled set is higher-layer configured, e.g., between $$\left\{ \frac{1}{\sqrt{2}} \begin{bmatrix} 1 \\ 1 \end{bmatrix}, \frac{1}{\sqrt{2}} \begin{bmatrix} 1 \\ j \end{bmatrix} \right\} \text{ and } \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix} \right\},$$

PMI Feedback Indices: SB V-PMI

A UE can be configured to report three PMI indices, $i_1$, $i_2$, and $i_3$, for informing eNB of m, m', n, k, used for constructing a precoder according to a codebook construction associated with FIG. 13 or FIG. 14 or FIG. 15. In one method, $i_1$, $i_2$ correspond to precoders $W_{m,n,k}^{(1)}$ and $W_{m,m',n}^{(2)}$ according to the relation in TABLE 3 and TABLE 4 respectively for the cases of RI=1 and RI=2; and $i_3$ is mapped to k according to relation of $k=i_3$.

To adapt to the fast variation in the vertical channel directions, the vertical beam index $k=i_3$ may need to reported per SB. It is therefore proposed to jointly feedback $i_2$ and $i_3$ in PUCCH feedback modes.

Figure 20:
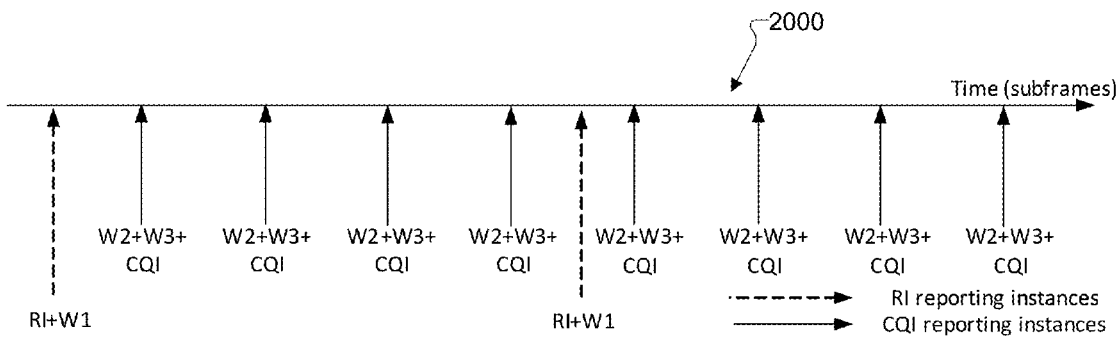
FIGS. 20 to 22 illustrate three examples of PUCCH mode 1-1 submode 1 according to embodiments of the present disclosure.
Figure 21:
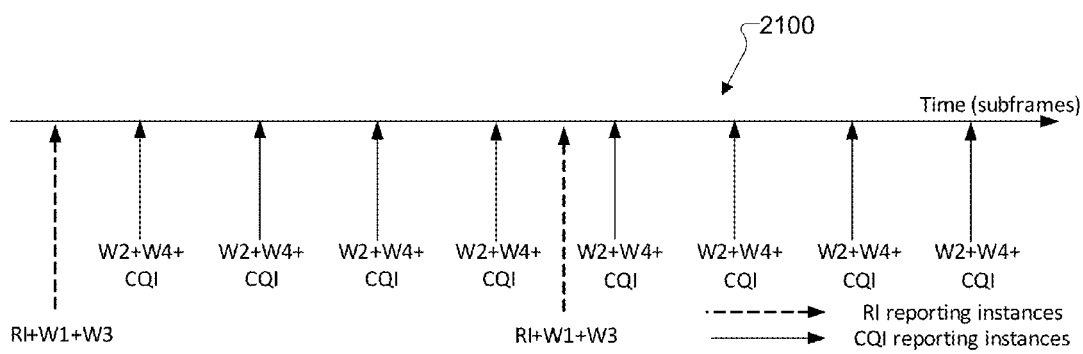
Figure 22:
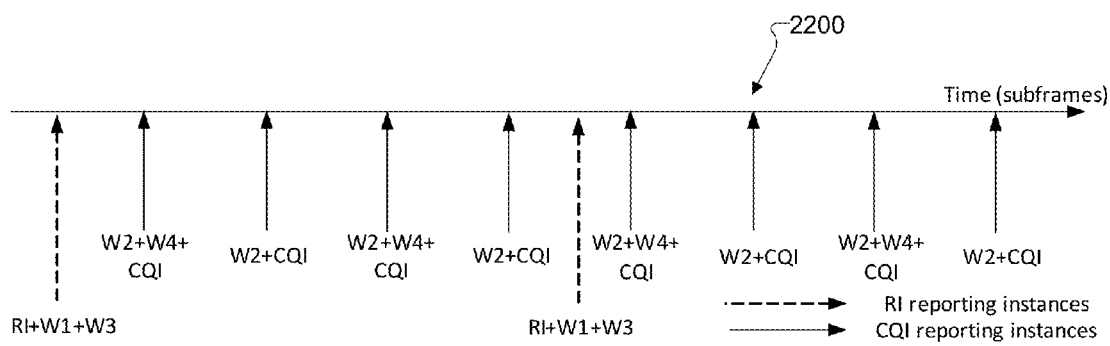

FIGS. 20 to 22 illustrate three examples of PUCCH mode 1-1 submode 1 2000, 2100, and 2200 according to embodiments of the present disclosure. The embodiments shown in FIGS. 20 to 22 are for illustration only. Other embodiments could be used without departing from the scope of the present disclosure.

In the embodiments, a UE is configured with PUCCH feedback mode 1-1 submode 1. Then, the UE reports RI and $i_1$ in RI reporting instances, and the UE reports $i_2$, $i_3$, and corresponding CQI in PMI/CQI reporting instances. This is illustrated in FIG. 20, where $i_1$, $i_2$ and $i_3$ are denoted as W1, W2 and W3.

PMI Feedback Indices: Double Structure

A UE can be configured to report four PMI indices, $i_{1,1}$, $i_{2,1}$, $i_{1,2}$, and $i_{2,2}$ corresponding to codebooks $W_1^{(1)}$, $W_2^{(1)}$, $W_1^{(2)}$, and $W_2^{(2)}$, respectively according to some embodiments of this disclosure. The eNB uses them for constructing a precoder according to a codebook construction associated with FIG. 13 or FIG. 14 or FIG. 15, where index k is derived from $i_{1,2}$ and $i_{2,2}$. In one method, $i_{1,1}$, $i_{2,1}$ correspond to precoders $W_{m,m,k}^{(1)}$ and $W_{m,m',n}^{(2)}$ according to the relation in TABLE 3 and TABLE 4 respectively for the cases of RI=1 and RI=2; and $i_{1,2}$ and $i_{2,2}$ are mapped to k according to relation of $k=s_2 i_{1,2}+i_{2,2}$, wherein $s_2$ (e.g., $s_2=2$) is a skipping number for the second dimension, and $i_{2,2}=0, 1, \ldots, L_2-1$.

According to the double codebook structure, it is proposed to jointly feedback ($i_1$, $i_3$) and ($i_2$, $i_4$) in PUCCH feedback modes.

In one embodiment, a UE is configured with PUCCH feedback mode 1-1 submode 1. Then, the UE reports RI and ($i_1$, $i_3$) in RI reporting instances, and the UE reports ($i_2$, $i_4$), and corresponding CQI in PMI/CQI reporting instances. This is illustrated in FIG. 21, where $i_1$, $i_2$, $i_3$, and $i_4$ are denoted as W1, W2, W3 and W4.

In another embodiment, a UE is configured with PUCCH feedback mode 1-1 submode 1. Then, the UE reports RI and ($i_{1,1}$, $i_{1,2}$) in RI reporting instances, and the UE reports ($i_{2,1}$, $i_{2,2}$), and $i_{2,1}$ alternatively together with the corresponding CQI in PMI/CQI reporting instances. Note that in this mode, if the number of feedback bits in PMI/CQI reporting instances is fixed, then the UE can report a course and a fine PMI feedback for W2: W2 reported together with W4 is a course feedback and W2 reported alone is a refined feedback. This is illustrated in FIG. 22, where $i_{1,1}$, $i_{2,1}$, $i_{1,2}$, and $i_{2,2}$ are denoted as W1, W2, W3 and W4.

In one example, $i_{2,1}$ indicates one out of 4 horizontal beams and $i_{2,2}$ indicates one out of 2 vertical beams (for example Scheme 2 in).

In some embodiments, total number of feedback bits in PMI/CQI reporting instances is 4, of which 2 bits are used for co-phase selection and the remaining two bits are used for selecting a composite beam, constructed by Kronecker product of a horizontal beam vector and a vertical beam vector.

In PMI/CQI reporting instances in which W2+CQI are reported, these remaining 2 bits are used to indicate one horizontal beam out of the 4 horizontal beams. This is referred to as a fine PMI because all 4 beams are considered in the PMI selection.

On the other hand, in PMI/CQI reporting instances in which W2+W4+CQI are reported, 1 bit is used to select one vertical beam out of 2 beams and 1 bit is used to select a horizontal PMI from a subsampled set of 4 horizontal beams. This is referred to as a coarse PMI because a subset of 4 beams are considered in the PMI selection. In one method (Method 1), the subsampled set corresponds to beam indices {1,2} out of four horizontal beam indices {1,2,3,4} indicated by $i_1$. In another method (Method 2), the subsampled set corresponds to beam indices {1,3} out of four horizontal beam indices {1,2,3,4} indicated by $i_1$.

A subsampling method may be indicated according to TABLE 9. In one method, eNB may configure the UE a subsampling method for deriving $i_2$. In another method, the UE may feedback a selected subsampling method using a 1-bit filed. Such feedback may be WB and long-term.

TABLE 9

| Horizontal beam index subsample method | |
| --- | --- |
| Method | Subsampled horizontal beam index set |
| 1 | {1, 2} |
| 2 | {1, 3} |

Figure 23:
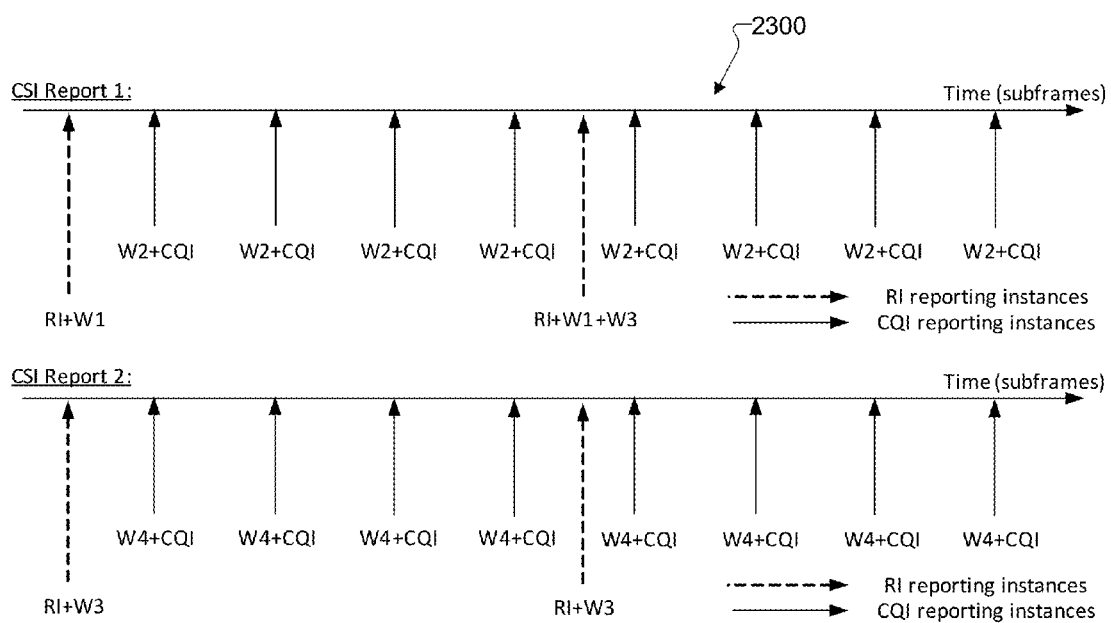
FIG. 23 illustrates an example of PUCCH mode 1-1 submode x according to embodiments of the present disclosure.

In another embodiment, a UE is configured with PUCCH feedback mode 1-1 submode x, as shown in FIG. 23, for reporting $i_{1,1}$, $i_{2,1}$, $i_{1,2}$, and $i_{2,2}$ using two CSI processes: CSI processes 1 and 2. According to CSI processes 1, the UE reports RI and $i_{1,1}$ in RI reporting instances, and it reports $i_{2,1}$ and the corresponding CQI in PMI/CQI reporting instances. Similarly, according to CSI processes 2, the UE reports RI and $i_{1,2}$ in RI reporting instances, and it reports $i_{2,2}$ and the corresponding CQI in PMI/CQI reporting instances.

In one method, the two RIs and CQIs in the CSI reports correspond to the joint RI and joint CQI. In another method, one of them, for example CSI report 1 includes joint RI and joint CQI, and the other report includes V-RI and V-CQI, for example. In yet another method, both or one of RI and CQI are reported only once in one of the CSI reports.

The parametrized KP double codebook described above is summarized as follows.

In some embodiments, a UE is configured with a CSI-RS configuration via higher layer, configuring Q antenna ports—antenna ports A(1) through A(Q). The UE is further configured with CSI reporting configuration via higher layer in association with the CSI-RS configuration. The CSI reporting configuration includes information element (IE) indicating the CSI-RS decomposition information (or component PMI port configuration). The information element may comprise at least two integers, say $N_1$ and $N_2$, which respectively indicates a first number or quantity of antenna ports per pol for a first dimension, and a second number of antenna ports per pol for a second dimension, wherein $Q=P\cdot N_1\cdot N_2$.

In some embodiments of the disclosure, the first dimension may correspond to the horizontal direction or columns, and the second dimension may correspond to the vertical direction or rows, i.e., $(N_1,N_2)=(N,M)$.

In some embodiments of the disclosure, the first dimension may correspond to the vertical direction or rows, and the second dimension may correspond to the horizontal direction or columns, i.e., $(N_1,N_2)=(M,N)$.

In various embodiments, downlink signaling may indicate first and second quantities of antenna ports. These first and second quantities of antenna ports indicate respective quantities of antenna ports in first and second dimensions. For example, the first quantity of antenna ports is a number or value for antenna ports in a first dimension. For example, the first dimension may be a vertical direction or rows or may be the horizontal direction or columns. In another example, the second quantity of antenna ports is a number or value for antenna ports in a second dimension. For example, the second dimension may be a vertical direction or rows or may be the horizontal direction or columns. Also, the first and second quantities of subset beams indicates respective quantities of subset beams in first and second dimensions. For example, the first quantity of subset beams is a number or value for subset beams in a first dimension.

In the rest of the disclosure, we will use notation $(N_1,N_2)$ in place of $(M,N)$ or $(N,M)$. Similarly, we will use $(O_1,O_2)$ for the oversampling factors in the two dimensions in place of $(S_N, S_M)$ or $(S_M, S_N)$.

In one embodiment, for each of [8], 12 and 16 Tx ports, a precoding matrix W in the codebook is represented as:

$$W=W_1W_2$$

where:

$$W_1 = \begin{pmatrix} X_1 \otimes X_2 & 0 \\ 0 & X_1 \otimes X_2 \end{pmatrix},$$

$W_2$ FFS;

$X_1$ is a $Ar_1 \times L_1$ matrix with $L_1$ column vectors being an $O_1x$ oversampled DFT vector of length $N_1$:

$$v_l = \begin{bmatrix} 1 & e^{\frac{j2\pi l}{N_1 O_1}} & \ldots & e^{\frac{j2\pi(N_1-1)l}{N_1 O_1}} \end{bmatrix}^t;$$

$X_2$ is a $N_2 \times L_2$ matrix with $L_2$ column vectors being an $O_2x$ oversampled DFT vector of length $N_2$:

$$v_l = \begin{bmatrix} 1 & e^{\frac{j2\pi l}{N_2 O_2}} & \ldots & e^{\frac{j2\pi(N_2-1)l}{N_2 O_2}} \end{bmatrix}^t;$$

$N_1$ and $N_2$ are the numbers of antenna ports per pol in $1^{st}$ and $2^{nd}$ dimensions;

FFS whether to select different beams (e.g. different X1 or X2) for the two pols;

FFS column selection from KP applied to $W_1$.

A first alternative to construct such a codebook is as follows. Tall, [square] and wide arrays are supported with a single codebook for each of [8], 12 and 16 CSI-RS ports: For PUSCH and PUCCH reporting, a codebook subset can be separately selected via RRC signaling of codebook subset selection parameters or a bitmap; FFS beam subset selection/restriction and related mechanism; and FFS which and how the parameters (in TABLE 1) are related/configured.

A second alternative to construct such a codebook is as follows. Tall, square and wide port layouts are supported with parameters $N_1$, $N_2$. Values of $N_1$ and $N_2$ are RRC signaled. The parameters (in TABLE 10) define the codebook: Configurable oversampling factors, RRC signaled, values FFS; Other parameters are to be determined; FFS beam subset selection/restriction and related mechanism.

TABLE 10

| 1: Codebook parameters | |
|---|---|
| Parameter per dimension | Remark |
| Oversampling factors $O_d$ | Determines total number of beams $Q_d = O_d \cdot N_d$, d = 1, 2 in the codebook. |
| Beam group spacing | Difference of the leading beam indices of two adjacent beam groups |
| Number of beams in each beam group | May depend on rank and/or W1 |
| Beam spacing | Difference of two adjacent beam indices in each beam group |

A beam grouping scheme and a codebook can be defined in terms of two groups of parameters, one group per dimension. A group of parameters for dimension d comprises at least one of the following parameters: a number of antenna ports per pol $N_d$; an oversampling factor $O_d$; a skip number (or beam group spacing) $s_d$ (for W1); a beam offset number $f_d$; a beam spacing number $p_d$ (for W2); and a number of beams (in each beam group) $L_d$.

A beam group indicated by a first PMI $i_{1,d}$ of dimension d (corresponding to $W_d^{(1)}$), is determined based upon these six parameters. The total number of beams is $N_d \cdot O_d$; and the beams are indexed by an integer $m_d$, wherein beam $m_d$, $v_{m_d}$, corresponds to a precoding vector $$v_{m_d} = \begin{bmatrix} 1 & e^{j\frac{2\pi m_d}{O_d N_d}} & \ldots & e^{j\frac{2\pi m_d(N_d-1)}{O_d N_d}} \end{bmatrix}^t,$$

$m_d=0,\ldots,N_d \cdot O_d-1$. The first PMI of the first dimension $i_{1,d}$, $i_{1,d}=0,\ldots,N_d \cdot O_d/s_d-1$, can indicate any of $L_d$ beams indexed by: $m_d=f_d+s_d\cdot i_{1,d}, f_d+s_d\cdot i_{1,d}+p_d, \ldots, f_d+s_d\cdot i_{1,d}+(L_d-1)p_d$, where these $L_d$ beams are referred to as a beam group.

In one example, $N_1=4$ and $N_2=4$. Three illustrative beam grouping schemes, referred to as Scheme 1, Scheme 2, and Scheme 3, according to the double codebook structure are shown in FIG. 4, FIG. 5 and FIG. 6, and the parameters are listed in TABLE 11.

TABLE 11

Parameters for three example beam grouping schemes

| | A 1st over-sampling factor $O_1$ for the 1st dimension | A 1st beam spacing $p_1$ for the 1st dimension | A 1st number of beams $L_1$ for the $1^{st}$ dimension | A 2nd overs-ampling factor $O_2$ for the 2nd dimension | A $2^{nd}$ beam spacing $p_2$ for the $2^{nd}$ dimension | A $2^{nd}$ number of beams $L_2$ for the $2^{nd}$ dimension |
|---|---|---|---|---|---|---|
| Scheme 1 | 8 | 1 | 4 | 4 | 1 | 1 |
| Scheme 2 | 8 | 1 | 1 | 4 | 1 | 4 |
| Scheme 3 | 8 | 1 | 2 | 4 | 1 | 2 |

Figure 24:
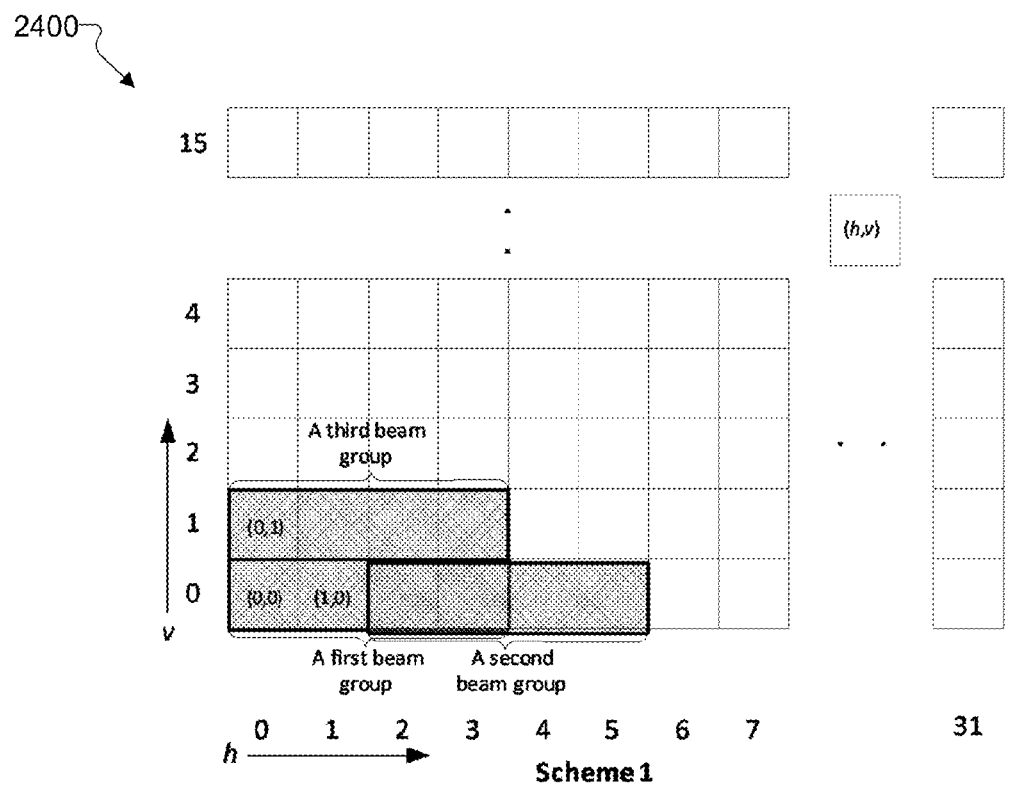
FIGS. 24 to 26 illustrates respective beam grouping schemes 1, 2 and 3 according to embodiments of the present disclosure.
Figure 25:
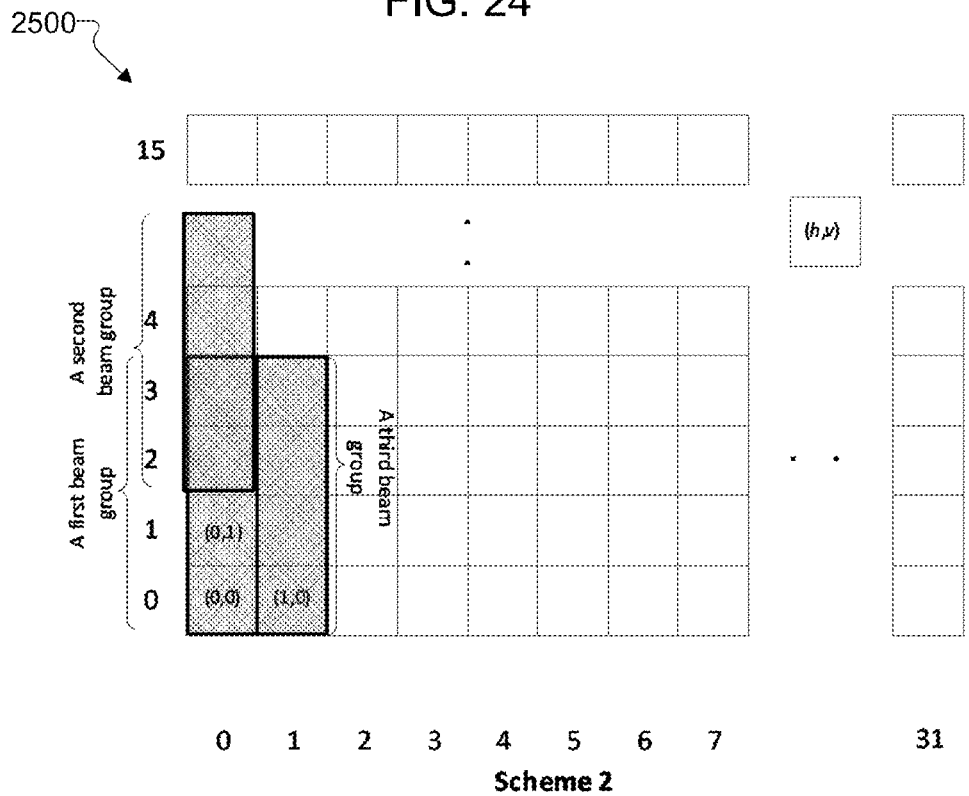
Figure 26:
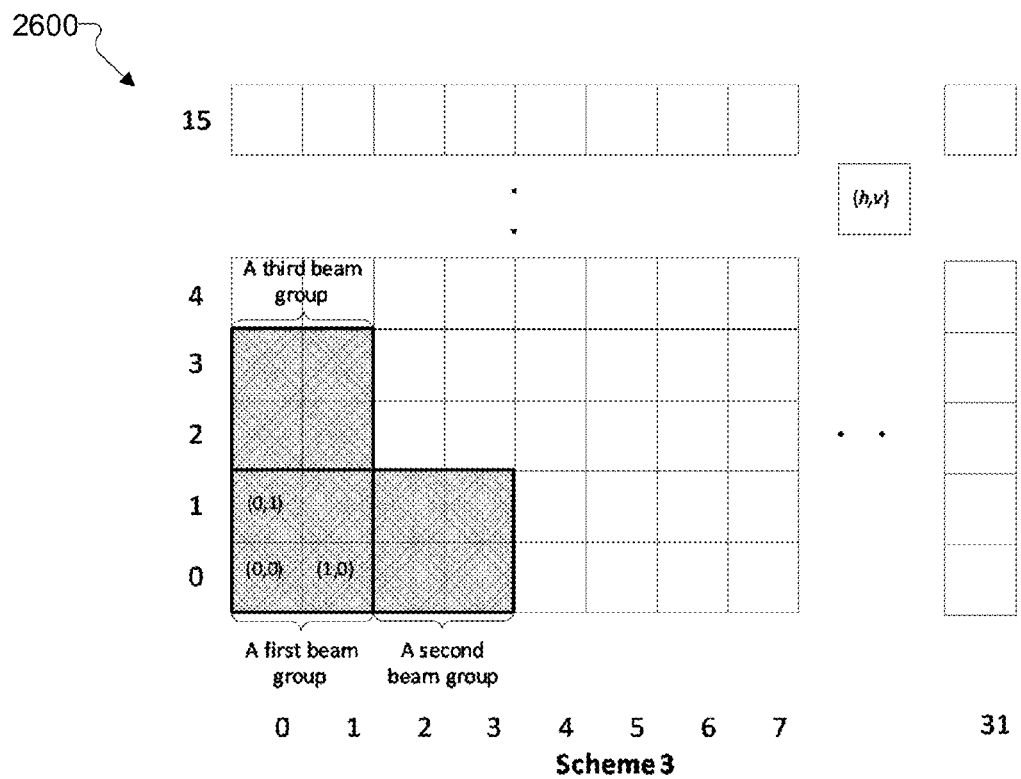

FIGS. 24 to 26 illustrates respective beam grouping schemes 1, 2 and 3 according to embodiments of the present disclosure. The embodiments shown in FIGS. 24 to 26 are for illustration only. Other embodiments could be used without departing from the scope of the present disclosure.

In some embodiments, the scheme is determined according to antenna (port) dimension parameters ($N_1$, $N_2$), where $N_1$ and $N_1$ are configured by the higher layer (RRC). In one example, if a UE is configured with ($N_1$, $N_2$)=(8,1), scheme 1 is configured; if the UE is configured (4,2), on the other hand, scheme 2 is configured.

In these schemes, a horizontal oversampling factor $O_1$=8 is considered for $W_1^{(1)}$ codebook and a vertical oversampling factor $O_2$=4 is considered for $W_2^{(1)}$ codebook. Hence, total number of beams for $W_1^{(1)}$ codebook is $N_1 O_1$=32, and total number of beams for $W_2^{(1)}$ codebook is $N_2 O_2$=16. FIGS. 24 to 26 illustrate these 16×32 3D beams constructed by Kronecker product of each beam vector in $W_1^{(1)}$ codebook and each beam vector in $W_2^{(1)}$ codebook as a 16×32 grid, wherein each square correspond to a beam.

The focus of this disclosure is on the details of configuring KP codebook based on the codebook parameters: ($N_d$, $O_d$, $s_d$, $f_d$, $p_d$, $L_d$) where d=1,2.

In some embodiments: the UE is configured with a parameterized KP codebook corresponding to the codebook parameters ($N_d$, $O_d$, $s_d$, $f_d$, $p_d$, $L_d$) where d=1,2 from a master codebook by applying codebook subset selection. The master codebook is a large codebook with default codebook parameters.

In one method, the master codebook may be unique. In another method, there may be multiple master codebooks and the UE may be configured with at least one master codebook from the multiple master codebooks. An example of multiple master codebooks may be based on beam offset numbers $f_1$ and $f_2$ as shown in the table below. In this example, a 1-bit indication may be used to indicate the master codebook via higher layer such as RRC.

TABLE 12

| | $f_1$ | $f_2$ |
|---|---|---|
| Master codebook 0 | 0 | 0 |
| Master codebook 1 | 0, 1, . . . , $s_1$ − 1 | 0, 1, . . . , $s_2$ − 1 |

For simplicity, it is assumed that $f_1$=$f_1$=0 (Mater codebook 0) in the rest of the disclosure. However, the disclosure is applicable to other values of $f_1$ and $f_2$.

An example of master codebook parameters for Q=8, 12, 16, and 32 antenna ports ($L_1$,$L_2$)=(4,4) are tabulated in TABLE 3. It is noted that Q=MNP in TABLE 13.

TABLE 13

Master codebook parameters for Q = 12, 16, and 32 antenna ports and ($L_1$, $L_2$) = (4, 4)

| Q | $N_1$ | $N_2$ | P | $O_1$ | $O_2$ | $L_1$ | $L_2$ | $p_1$ | $p_2$ | $s_1$ | $s_2$ |
|---|---|---|---|---|---|---|---|---|---|---|---|
| 8 | 4 | 1 | 2 | 8 | 1 | 4 | 1 | 1 | 1 | 1 | 1, 2, 4 |
| 8 | 2 | 2 | 2 | 2, 4, 8 | 2, 4, 8 | 4 | 4 | 1, 2 | 1, 2 | 1, 2, 4 | 1, 2, 4 |
| 12 | 3 | 2 | 2 | 2, 4, 8 | 2, 4, 8 | 4 | 4 | 1, 2 | 1, 2 | 1, 2, 4 | 1, 2, 4 |
| 12 | 2 | 3 | 2 | 2, 4, 8 | 2, 4, 8 | 4 | 4 | 1, 2 | 1, 2 | 1, 2, 4 | 1, 2, 4 |
| 16 | 4 | 2 | 2 | 2, 4, 8 | 2, 4, 8 | 4 | 4 | 1, 2 | 1, 2 | 1, 2, 4 | 1, 2, 4 |
| 16 | 2 | 4 | 2 | 2, 4, 8 | 2, 4, 8 | 4 | 4 | 1, 2 | 1, 2 | 1, 2, 4 | 1, 2, 4 |
| 32 | 4 | 4 | 2 | 2, 4, 8 | 2, 4, 8 | 4 | 4 | 1, 2 | 1, 2 | 1, 2, 4 | 1, 2, 4 |
| 32 | 8 | 2 | 2 | 2, 4, 8 | 2, 4, 8 | 4 | 4 | 1, 2 | 1, 2 | 1, 2, 4 | 1, 2, 4 |

In some embodiments, the beam grouping and beam skipping parameters ($s_1$, $s_2$, $p_1$, and $p_2$) of the master codebook are fixed and hence are not configured. For example, they are fixed to $s_1$=$s_2$=2, and $p_1$=$p_2$=1.

In some embodiments, the master codebook parameters for Q=8, 12, 16, and 32 antenna ports and ($L_1$,$L_2$)=(4,2) are according to TABLE 14, where multiple oversampling factors in two dimension are supported. The remaining codebook parameters may be fixed, for example, $s_1$=$s_2$=2, and $p_1$=$p_2$=1.

TABLE 14

Master codebook parameters for Q = 12, 16, and 32 antenna ports and ($L_1$, $L_2$) = (4, 2)

| Q | $N_1$ | $N_2$ | P | $O_1$ | $O_2$ | $L_1$ | $L_2$ |
|---|---|---|---|---|---|---|---|
| 8 | 2 | 2 | 2 | 2, 4, 8 | 2, 4, 8 | 4 | 2 |
| 12 | 3 | 2 | 2 | 2, 4, 8 | 2, 4, 8 | 4 | 2 |
| 12 | 2 | 3 | 2 | 2, 4, 8 | 2, 4, 8 | 4 | 2 |
| 16 | 4 | 2 | 2 | 2, 4, 8 | 2, 4, 8 | 4 | 2 |
| 16 | 2 | 4 | 2 | 2, 4, 8 | 2, 4, 8 | 4 | 2 |
| 32 | 4 | 4 | 2 | 2, 4, 8 | 2, 4, 8 | 4 | 2 |
| 32 | 8 | 2 | 2 | 2, 4, 8 | 2, 4, 8 | 4 | 2 |

The oversampling factor in one or both dimensions is configurable according to the below table.

| Oversampling factor $O_d$ in dimension d where d = 1, 2 | 2, 4, 8 |
|---|---|

In some embodiments, the master codebook parameters for Q=8, 12, 16, and 32 antenna ports and $(L_1,L_2)=(4,2)$ are according to TABLE 15, where single oversampling factors in two dimension are supported. The remaining codebook parameters may be fixed, for example, $s_1=s_2=2$, and $p_1=p_2=1$.

TABLE 15

Master codebook parameters for Q = 12, 16, and 32 antenna ports and $(L_1, L_2) = (4, 2)$

| Q | $N_1$ | $N_2$ | P | $O_1$ | $O_2$ | $L_1$ | $L_2$ |
|---|---|---|---|---|---|---|---|
| 8 | 2 | 2 | 2 | 8 | 8 | 4 | 2 |
| 12 | 3 | 2 | 2 | 8 | 8 | 4 | 2 |
| 12 | 2 | 3 | 2 | 8 | 8 | 4 | 2 |
| 16 | 4 | 2 | 2 | 8 | 8 | 4 | 2 |
| 16 | 2 | 4 | 2 | 8 | 8 | 4 | 2 |
| 32 | 4 | 4 | 2 | 8 | 8 | 4 | 2 |
| 32 | 8 | 2 | 2 | 8 | 8 | 4 | 2 |

In some embodiments, the UE may be configured with one of multiple beam grouping schemes or $(L_1,L_2)$ value. Depending on the configured $(L_1,L_2)$, the other codebook parameters such as beam skipping parameters $(s_1,s_2)$ are determined by the UE. For example, when the UE is configured with $(L_1,L_2)=(4,2)$, then UE determines $s_1=s_2=2$, and when the UE is configured with $(L_1,L_2)=(1,1)$, then UE determines $s_1=s_2=1$. The number of W1 bits for the former, i.e., $(L_1,L_2)=(4,2)$, is $\log 2(O_1N_1/2)+\log 2(O_2N_2/2)$, whereas it is $\log 2(O_1N_1)+\log 2(O_2N_2)$ for the later (i.e., $(L_1,L_2)=(1,1)$), which is correspond to 2 more bits than the former.

Figure 27:
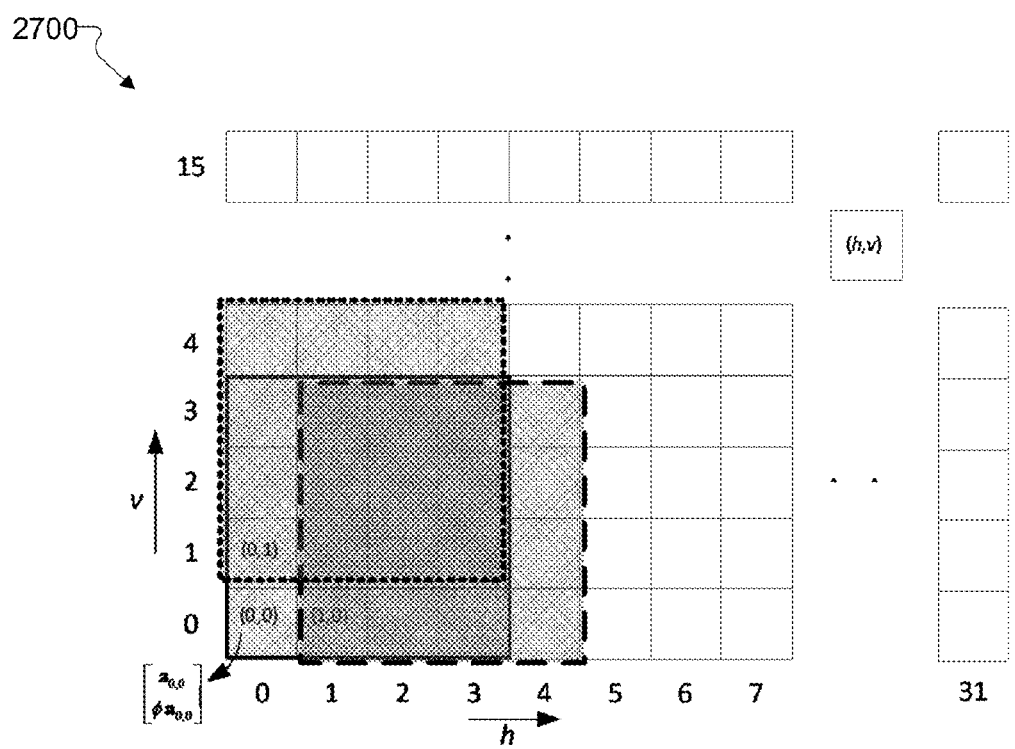
FIG. 27 illustrates a master codebook with example beam groups for N1=4 and N2=4 according to embodiments of the present disclosure.

FIG. 27 illustrates a master codebook 2700 with example beam groups for $N_1=4$ and $N_2=4$ according to embodiments of the present disclosure. The embodiment shown in FIG. 27 is for illustration only. Other embodiments could be used without departing from the scope of the present disclosure.

An example of the master codebook is a fine DFT codebook that is obtained by performing the KP of azimuth ($1^{st}$ dimension) and elevation ($2^{nd}$ dimension) DFT codebooks with large oversampling factors. For example, as shown in the figure, the oversampling factor may be 8 in azimuth dimension, i.e., $O_1=8$ and it may be 4 in elevation dimension, i.e., $O_2=4$. An example of the master codebook for $N_1=4$ azimuth antenna ports and $N_2=4$ elevation antenna ports is shown in FIG. 27. As shown, there are $N_1O_1=32$ azimuth DFT beams indexed by h=0,1,2, . . . , 31 and $N_2O_2=16$ elevation DFT beams indexed by v=0,1,2, . . . , 15. So, the total number of 2D DFT beams that are obtained by the KP of the azimuth and elevation DFT codebooks is 32×16=512.

From this 2D grid of DFT beams, beam groups of a default size are formed. An example of default size of beam groups is $(L_1, L_2)=(4, 4)$ as in FIG. 27. The beam groups are formed based on all possible values of $s_1$ and $s_2$. The set of all beam groups constitutes the master W1 codebook. A few example beam group for $s_1=1$ and $s_2=1$ are shown in FIG. 27 as shaded squares.

From these beam groups of default size, the beam selection and co-phasing are performed to construct pre-coding matrices corresponding to different number of layers v=1, 2, 3 . . . 8. For example, for v=1, one beam is selected from the 16 beams in a beam group and a co-phasing $\phi$ is applied from the QPSK co-phasing codebook=$\{1,j,-1,-j\}$ to form a pre-coding vector (as shown in FIG. 27 for beam $a_{0,0}$). The set of pre-coding matrices that are constructed in this manner constitute the master W2 codebook.

In some embodiments, the master codebook is represented as a set of master sub-codebooks where each master sub-codebook corresponds to a unique set of codebook parameters $(N_d, o_d, s_d, p_d)$ where d=1,2. For example, for the master codebooks in TABLE 13, the master sub-codebooks may map to the codebook parameters according to the following TABLE 16. For simplicity, in the table, parameters $(N_d, o_d)$ where d=1,2, are not shown since they take single values according to TABLE 13.

TABLE 16

Sub-codebook to codebook parameter mapping

| Sub-codebook Index | $p_1$ (for W2) | $p_2$ (for W2) | $s_1$ (for W1) | $s_2$ (for W1) |
|---|---|---|---|---|
| 0 | 1 | 1 | 1 | 1 |
| 1 |   |   | 1 | 2 |
| 2 |   |   | 1 | 4 |
| 3 |   |   | 2 | 1 |
| 4 |   |   | 2 | 2 |
| 5 |   |   | 2 | 4 |
| 6 |   |   | 4 | 1 |
| 7 |   |   | 4 | 2 |
| 8 |   |   | 4 | 4 |
| 9 | 1 | 2 | 1 | 1 |
| ... |   |   | ... | ... |
| 17 |   |   | 4 | 4 |
| 18 | 2 | 1 | 1 | 1 |
| ... |   |   | ... | ... |
| 26 |   |   | 4 | 4 |
| 27 | 2 | 2 | 1 | 1 |
| ... |   |   | ... | ... |
| 35 |   |   | 4 | 4 |

In some embodiments, TABLE 17 is used as a rank-1 (1 layer) master codebook that can be used for any of Q=12, 16 and 32 antenna configurations, wherein the corresponding rank 1 precoder is $$W^{(1)}_{m_1,m_2,n} = \frac{1}{\sqrt{Q}}\begin{bmatrix} v_{m_1} \otimes u_{m_2} \\ \varphi_n v_{m_1} \otimes u_{m_2} \end{bmatrix}.$$

In this table, the $2^{nd}$ dimension beam index $m_2$ increases first as $i_2$ increases.

TABLE 17

Master codebook for 1 layer CSI reporting for $L_1 = L_2 = 4$

| $i_2$ | 0 | 1 | 2 | 3 |
|---|---|---|---|---|
| Precoder | $W^{(1)}_{s_1i_{1,1},s_2i_{1,2},0}$ | $W^{(1)}_{s_1i_{1,1},s_2i_{1,2},1}$ | $W^{(1)}_{s_1i_{1,1},s_2i_{1,2},2}$ | $W^{(1)}_{s_1i_{1,1},s_2i_{1,2},3}$ |
| $i_2$ | 4 | 5 | 6 | 7 |

TABLE 17-continued

| Master codebook for 1 layer CSI reporting for $L_1 = L_2 = 4$ | | | | |
|---|---|---|---|---|
| Precoder | $W^{(1)}_{s_1 i_{1,1}, s_2 i_{1,2}+p_2, 0}$ | $W^{(1)}_{s_1 i_{1,1}, s_2 i_{1,2}+p_2, 1}$ | $W^{(1)}_{s_1 i_{1,1}, s_2 i_{1,2}+p_2, 2}$ | $W^{(1)}_{s_1 i_{1,1}, s_2 i_{1,2}+p_2, 3}$ |
| $i_2$ | 8 | 9 | 10 | 11 |
| Precoder | $W^{(1)}_{s_1 i_{1,1}, s_2 i_{1,2}+2p_2, 0}$ | $W^{(1)}_{s_1 i_{1,1}, s_2 i_{1,2}+2p_2, 1}$ | $W^{(1)}_{s_1 i_{1,1}, s_2 i_{1,2}+2p_2, 2}$ | $W^{(1)}_{s_1 i_{1,1}, s_2 i_{1,2}+2p_2, 3}$ |
| $i_2$ | 12 | 13 | 14 | 15 |
| Precoder | $W^{(1)}_{s_1 i_{1,1}, s_2 i_{1,2}+3p_2, 0}$ | $W^{(1)}_{s_1 i_{1,1}, s_2 i_{1,2}+3p_2, 1}$ | $W^{(1)}_{s_1 i_{1,1}, s_2 i_{1,2}+3p_2, 2}$ | $W^{(1)}_{s_1 i_{1,1}, s_2 i_{1,2}+3p_2, 3}$ |
| $i_2$ | 16-31 | | | |
| Precoder | Entries 16-31 constructed with replacing the second subscript $s_1 i_{1,1}$ with $s_1 i_{1,1} + p_1$ in entries 0-15. | | | |
| $i_2$ | 32-47 | | | |
| Precoder | Entries 32-47 constructed with replacing the second subscript $s_1 i_{1,1}$ with $s_1 i_{1,1} + 2p_1$ in entries 0-15. | | | |
| $i_2$ | 48-63 | | | |
| Precoder | Entries 48-63 constructed with replacing the second subscript $s_1 i_{1,1}$ with $s_1 i_{1,1} + 3p_1$ in entries 0-15. | | | |

In some embodiments, TABLE 18 is used as a rank-1 (1 layer) master codebook that can be used for any of Q=12, 16 and 32 antenna configurations, wherein the corresponding rank 1 precoder is $$W^{(1)}_{m_1, m_2, n} = \frac{1}{\sqrt{Q}} \begin{bmatrix} v_{m_1} \otimes u_{m_2} \\ \varphi_n v_{m_1} \otimes u_{m_2} \end{bmatrix}.$$

In this table, the $1^{st}$ dimension beam index $m_1$ increases first as $i_2$ increases.

In some embodiments, the UE reports $i_{2,1}$, $i_{2,2}$ and n in place of $i_2$, in which case $m_1$ and $m_2$ are determined as: $m_1 = s_1 i_{1,1} + i_{2,1}$ and $m_1 = s_2 i_{1,2} + i_{2,2}$.

In those embodiments related to TABLE 17 and TABLE 18, and other related embodiments, the parameters $s_1$, $s_2$, $p_1$, and $p_2$ in this table can be selected, e.g., according to TABLE 13, and it is assumed that $L_1 = L_2 = 4$. Also $i_{1,1} = 0, 1, \ldots,$ $$\frac{N_1 o_1}{Ps_1} - 1$$

and $i_{1,2} = 0, 1, \ldots,$

TABLE 18

| Master codebook for 1 layer CSI reporting for $L_1 = L_2 = 4$ | | | | |
|---|---|---|---|---|
| $i_2$ | 0 | 1 | 2 | 3 |
| Precoder | $W^{(1)}_{s_1 i_{1,1}, s_2 i_{1,2}, 0}$ | $W^{(1)}_{s_1 i_{1,1}, s_2 i_{1,2}, 1}$ | $W^{(1)}_{s_1 i_{1,1}, s_2 i_{1,2}, 2}$ | $W^{(1)}_{s_1 i_{1,1}, s_2 i_{1,2}, 3}$ |
| $i_2$ | 4 | 5 | 6 | 7 |
| Precoder | $W^{(1)}_{s_1 i_{1,1}+p_1, s_2 i_{1,2}, 0}$ | $W^{(1)}_{s_1 i_{1,1}+p_1, s_2 i_{1,2}, 1}$ | $W^{(1)}_{s_1 i_{1,1}+p_1, s_2 i_{1,2}, 2}$ | $W^{(1)}_{s_1 i_{1,1}+p_1, s_2 i_{1,2}, 3}$ |
| $i_2$ | 8 | 9 | 10 | 11 |
| Precoder | $W^{(1)}_{s_1 i_{1,1}+2p_1, s_2 i_{1,2}, 0}$ | $W^{(1)}_{s_1 i_{1,1}+2p_1, s_2 i_{1,2}, 1}$ | $W^{(1)}_{s_1 i_{1,1}+2p_1, s_2 i_{1,2}, 2}$ | $W^{(1)}_{s_1 i_{1,1}+2p_1, s_2 i_{1,2}, 3}$ |
| $i_2$ | 12 | 13 | 14 | 15 |
| Precoder | $W^{(1)}_{s_1 i_{1,1}+3p_1, s_2 i_{1,2}, 0}$ | $W^{(1)}_{s_1 i_{1,1}+3p_1, s_2 i_{1,2}, 1}$ | $W^{(1)}_{s_1 i_{1,1}+3p_1, s_2 i_{1,2}, 2}$ | $W^{(1)}_{s_1 i_{1,1}+3p_1, s_2 i_{1,2}, 3}$ |
| $i_2$ | 16-31 | | | |
| Precoder | Entries 16-31 constructed with replacing the second subscript $s_2 i_{1,2}$ with $s_2 i_{1,2} + p_2$ in entries 0-15. | | | |
| $i_2$ | 32-47 | | | |
| Precoder | Entries 32-47 constructed with replacing the second subscript $s_2 i_{1,2}$ with $s_2 i_{1,2} + 2p_2$ in entries 0-15. | | | |
| $i_2$ | 48-63 | | | |
| Precoder | Entries 48-63 constructed with replacing the second subscript $s_2 i_{1,2}$ with $s_2 i_{1,2} + 3p_2$ in entries 0-15. | | | |

$$\frac{N_2 o_2}{s_2} - 1.$$

The master codebook for other parameters and for more than 1 layer can be similarly constructed.

Unified Codebook for Beamformed and Non-Precoded CSI-RS

In some embodiments, $v_{m_1}$ and $u_{m_2}$ to comprise a precoder $$W^{(1)}_{m_1,m_2,n} = \frac{1}{\sqrt{Q}}\begin{bmatrix} v_{m_1} \otimes u_{m_2} \\ \varphi_n v_{m_1} \otimes u_{m_2} \end{bmatrix},$$

are differently configured depending on whether beamformed CSI-RS, or non-precoded CSI-RS or both are configured.

In one such example with Q=16 and $N_1$=8 and $N_2$=2:

When the UE is configured with only non-precoded CSI-RS or both types of CSI-RS, the UE is further configured to use:

Either (Alt 1) $v_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t$ and $u_{m_2} = \begin{bmatrix} 1 & e^{j\frac{2\pi m_2}{32}} \end{bmatrix}^t$; or (Alt 2) $v_{m_1} = \begin{bmatrix} 1 & e^{j\frac{2\pi m_2}{32}} \end{bmatrix}^t$ and $u_{m_2} = \begin{bmatrix} 1 & e^{j\frac{2\pi m_1}{32}} & e^{j\frac{4\pi m_1}{32}} & e^{j\frac{6\pi m_1}{32}} \end{bmatrix}^t$.

When the UE is configured with only beamformed CSI-RS, the UE is further configured to use:

$v_{m_1} = e_{m_1}^{(4\times1)}$ and $u_{m_2} = e_{m_2}^{(2\times1)}$ (if Alt 1 is used)

$v_{m_1} = e_{m_1}^{(2\times1)}$ and $u_{m_2} = e_{m_2}^{(4\times1)}$ (if Alt 2 is used)

Herein $e_m^{(N\times1)}$, m=0, 1, ..., N−1, is an N×1 column vector comprising with (N−1) elements with zero value and one element with value of one. The one element with value of one is on (m+1)-th row. For example, $e_1^{(4\times1)} = [0\ 1\ 0\ 0]^t$; and $e_2^{(4\times1)} = [0\ 0\ 1\ 0]^t$. In this case, the UE is further configured to use $i_{1,1} = i_{1,2} = 0$ in the table entries, and the UE is configured to report only $i_2$ as PMI, and not to report $i_{1,1}$ and $i_{1,2}$.

The precoding vector obtained with Alt 2 can be applied on the antenna ports numbered according to FIGS. 7 and 8. In these embodiments, the first dimension corresponds to a longer dimension of the array; and the second dimension corresponds to a shorter dimension of the array. On the contrary, the precoding vector obtained with Alt 1 can be applied on the antenna ports numbered in such a way that the first dimension corresponds to a shorter dimension of the array; and the second dimension corresponds to a longer dimension of the array.

In some embodiments, the UE can identify that a configured CSI-RS resource is beamformed or non-precoded by:

Alt 1. Explicit RRC indication: The UE is configured with a higher-layer parameter for the configured CSI-RS resource, indicating whether the configured CSI-RS resource is beamformed or non-precoded.

Alt 2. Implicit indication: The UE is configured with a different set of CSI-RS port numbers for beamformed CSI-RS than the non-precoded CSI-RS. In one example, the beamformed CSI-RS takes antenna port numbers 200-207, while the non-precoded CSI-RS takes antenna port numbers 15-30.

Embodiments on Codebook Subset Restriction

Figure 28:
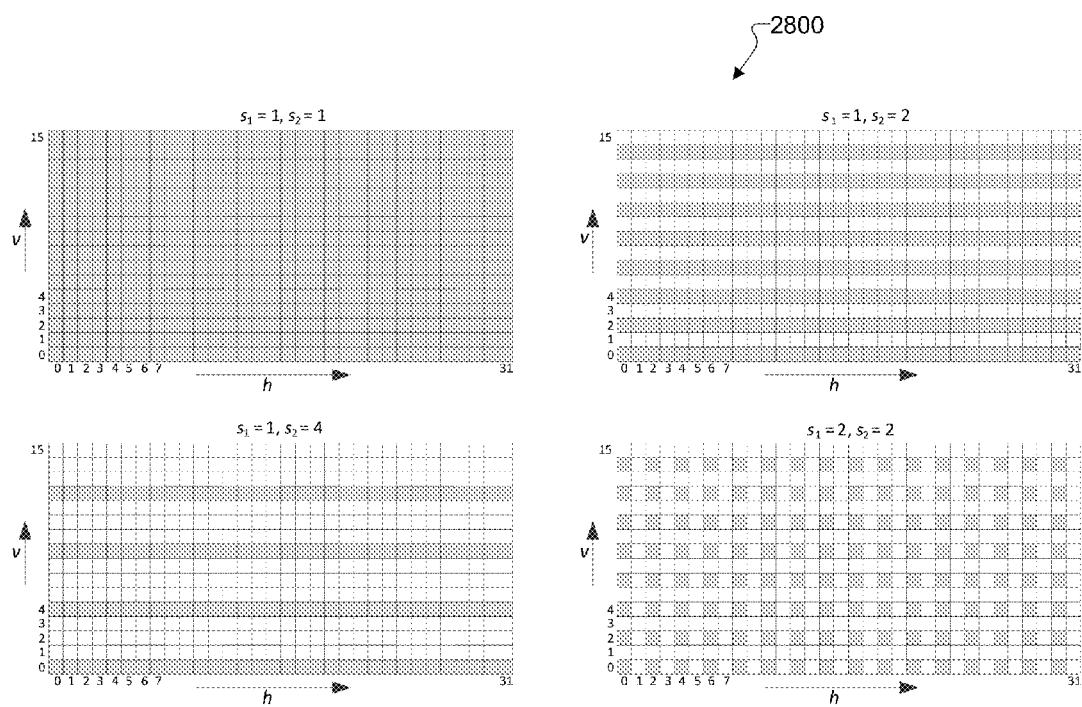
FIG. 28 illustrates the subset restriction on rank-1 i1 according to embodiments of the present disclosure.

FIG. 28 illustrates the subset restriction on rank-1 $i_{1,H}$ and $i_{1,V}$ (or $i_{1,1}$ and $i_{1,2}$) for $N_1$=8, $N_2$=4, $o_1$=8 and $o_2$=4, according to embodiments of the present disclosure. The embodiment shown in FIG. 28 is for illustration only. Other embodiments could be used without departing from the scope of the present disclosure.

In some embodiments, the configured values of parameters ($N_d$, $o_d$, $s_d$) where d=1,2 are used to apply codebook subset restriction on of the set of $i_{1,1}$ and $i_{1,2}$ indices from the master codebook. An illustration of subset restriction on rank-1 $i_{1,1}$ and $i_{1,2}$ indices in terms of parameters $s_1$ and $s_2$ is shown in FIG. 28. In the figure, the shaded squares represent the rank-1 $i_{1,1}$ and $i_{1,2}$ indices that are obtained after subset restriction and the white squares represent the indices that are not included.

In some embodiments, the codebook subset restriction on $i_{1,1}$ and $i_{1,2}$ indices may be applied according to a table such as TABLE 19. Depending on the values of $s_d$ where d=1,2, the subsets of $i_{1,1}$ and $i_{1,2}$ indices can be obtained from the table. Note that $s_1=s_2=1$ corresponds to no subset restriction. In these embodiments it is assumed that $(i_{1,1}, i_{1,2})=(i_{1,H}, i_{1,V})$, but the same design can apply even if $(i_{1,1}, i_{1,2})=(i_{1,V}, i_{1,H})$

TABLE 19

Subset restriction on rank-1 $i_{1,H}$ and $i_{1,V}$ (TABLE 17)

| $s_1$ | $i_{1,H}$ after subset restriction | $s_2$ | $i_{1,V}$ after subset restriction |
| --- | --- | --- | --- |
| 1 | 0, 1, 2, ..., $N_1 o_1$/P-1 | 1 | 0, 1, 2, ..., $N_2 o_2$-1 |
| 2 | 0, 2, 4, ..., $N_1 o_1$/P-2 | 2 | 0, 2, 4, ..., $N_2 o_2$-2 |
| 4 | 0, 4, 8, ..., $N_1 o_1$/P-4 | 4 | 0, 4, 8, ..., $N_2 o_2$-4 |

An example of such a table for $N_1$=8, $N_2$=4, $o_1$=8 and $o_2$=4 is shown in TABLE 20.

TABLE 20

Subset restriction on rank-1 $i_{1,H}$ and $i_{1,V}$ for $N_1$ = 8, $N_2$ = 4, $o_1$ = 8 and $o_2$ = 4

| $s_1$ | $i_{1,H}$ after subset restriction | Number of $i_{1,H}$ indices | $s_2$ | $i_{1,V}$ after subset restriction | Number of $i_{1,V}$ indices |
| --- | --- | --- | --- | --- | --- |
| 1 | 0, 1, 2, ..., 31 | 32 | 1 | 0, 1, 2, ..., 15 | 16 |
| 2 | 0, 2, 4, ..., 30 | 16 | 2 | 0, 2, 4, ..., 14 | 8 |
| 4 | 0, 4, 8, ..., 28 | 8 | 4 | 0, 4, 8, 12 | 4 |

In some embodiments, the configured values of parameters ($N_d$, $o_d$, $s_d$, $p_d$, $L_d$) where d=1,2 are used to apply codebook subset restriction on the set of rank-1 $i_2$ indices from the master codebook. The codebook subset restriction may be applied from a table such as TABLE 21. Depending on the values of $L_1$ and $L_2$, the subset of rank-1 $i_2$ indices can be obtained from a row of the table.

Note that $L_1=L_2=4$ corresponds to no subset restriction. In these embodiments it is assumed that $(i_{1,1}, i_{1,2})=(i_{1,H}, i_{1,V})$, but the same design can apply even if $(i_{1,1}, i_{1,2})=(i_{1,V}, i_{1,H})$.

TABLE 21

An illustration of subset restriction on rank-1 $i_2$ (TABLE 17)

Figure 39:
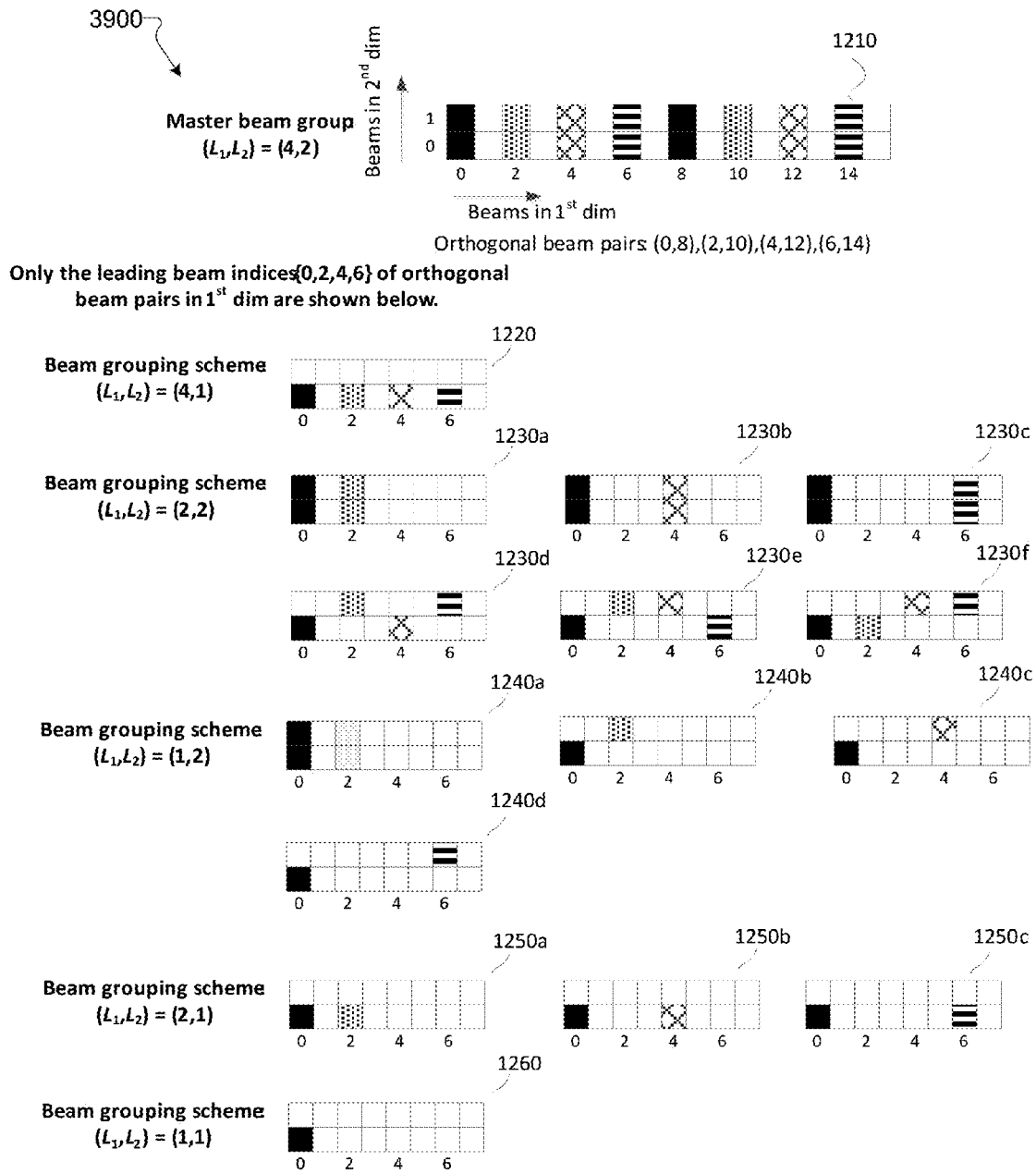
FIG. 39 illustrates grouping schemes for rank-3 and rank-4 i2 according to some embodiments of the present disclosure.

| Beam grouping configuration | $(L_1, L_2)$ | Corresponding case in FIG. 39 | $i_2$ after subset restriction | Number of $i_2$ indices |
|---|---|---|---|---|
| 0 | (4, 1) | 1250 | 0-3, 16-19, 32-35, 48-51 | 16 |
| 1 | (1, 4) | 1240 | 0-15 | 16 |
| 2 | (2, 2) | 1260 | 0-7, 16-23 | 16 |
| 3 | (4, 2) | 1230 | 0-7, 16-23, 32-39, 48-55 | 32 |
| 4 | (2, 4) | 1220 | 0-31 | 32 |
| 5 | (4, 4) | 1210 | 0-63 | 64 |

Figure 29:
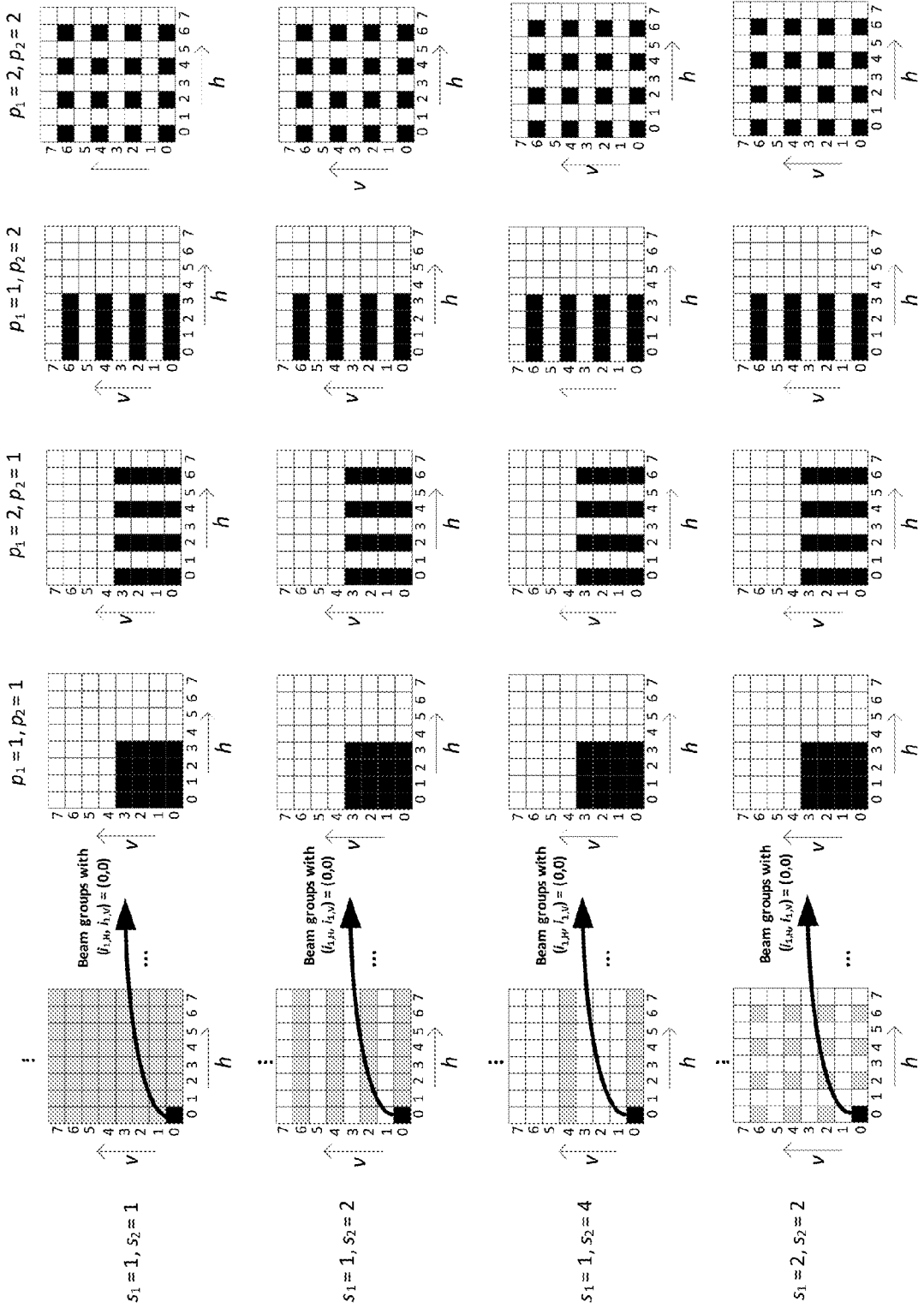
FIG. 29 illustrates the example beam groups in the master codebook after subset restriction according to the present disclosure.

FIG. 29 illustrates the example beam groups in the master codebook according to the present disclosure. The embodiment shown in FIG. 29 is for illustration only. Other embodiments could be used without departing from the scope of the present disclosure.

The beam groups is in a size $L_1=L_2=4$ with $(i_{1,1}, i_{1,2})=(i_{1,H}, i_{1,V})=(0,0)$ in the master codebook. In the FIG. 29, the four rows correspond to four different values for $s_1$ and $s_2$. The first column shows the corresponding 2D index map of $i_{1,H}$ and $i_{1,V}$ indices. The rest of the four columns show the beam groups with $(i_{1,1}, i_{1,2})=(i_{1,H}, i_{1,V})=(0,0)$ and four different values for $p_1$ and $p_2$.

Figure 30:
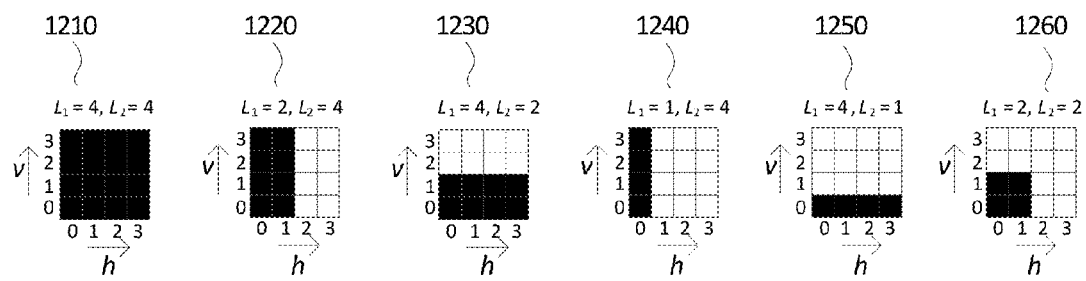
FIG. 30 illustrates the subset restriction 300 on rank-1 i2 according to the embodiments of the present disclosure.

FIG. 30 illustrates the subset restriction 300 on rank-1 $i_2$ according to the embodiments of the present disclosure. The embodiment shown in FIG. 30 is for illustration only. Other embodiments could be used without departing from the scope of the present disclosure.

Depending on the values of parameters $L_1$ and $L_2$, subset restriction on rank-1 $i_2$ indices can be differently applied. The codebook subset restriction on rank-1 $i_2$ indices is illustrated in terms of parameters $L_1$ and $L_2$, with an assumption that the master codebook has rank-1 $i_2$ indices corresponding to beam grid 1210: $(L_1, L_2)=(4,4)$.

In this case, the master codebook for $i_2$ comprises 16 beams, spanned by 4×4 beams in the first and the second dimension s. In some embodiments, the index h and v in the figure corresponds to $i_{2,1}$ and $i_{2,2}$. The shaded squares represent the rank-1 $i_2$ (or $i_{2,1}$ and $i_{2,2}$) indices that are obtained after subset restriction and the white squares represent the indices that are not included. In the figure, 1210, 1220, 1230, 1240, 1250 and 1260 respectively correspond to a codebook subset when $(L_1,L_2)=(4,4), (2,4), (4,2), (1,4), (4,1)$ and $(2,2)$ are configured. For example, 1050 shows that the beam group selected after the codebook subset restriction comprises four beams in the h dimension: ($v=i_{2,2}=0$ and $h=i_{2,1}=0, 1, 2, 3$).

In one method, for each dimension, a UE is configured with beam skipping (i.e., $s_d$), as illustrated in TABLE 22.

TABLE 22

Beam skipping configuration table

| Parameters | Candidate values |
|---|---|
| Beam skipping (i.e., $s_d$) | 1, 2 |

In one method, for each dimension, a UE is configured with beam spacing (i.e., $s_d$), as illustrated in TABLE 23.

TABLE 23

Beam spacing configuration table

| Parameters | Candidate values |
|---|---|
| Beam spacing (i.e., $p_d$) | 1, 2 |

In one method, for both dimensions, a UE can be configured with pair of numbers of beams in a beam group (i.e., $(L_1, L_2)$), so that the UE can restrict the beam groups as illustrated in FIG. 39. In one example, the UE is configured with a beam group (i.e., $(L_1, L_2)$) in the higher-layer according to TABLE 24.

TABLE 24

Beam group configuration table

| Parameters | Candidate values |
|---|---|
| Number of beams $(L_1, L_2)$ | (4, 1), (2, 2), (1, 4) (Respectively corresponding to 1240, 1250 and 1260) |

The motivation for these methods is to support various antenna configurations at the eNB with minimal signaling overhead. This configuration may be applied based on the codebook subset restriction in the form of a bit sequence. The bit sequence may consist of at least two bitmaps, one for $i_{1,H}$ and $i_{1,V}$ and the other for $i_2$.

Modification of the Legacy 8-Tx and 4-Tx Codebooks to Construct FD-MIMO Master Codebook and CSR In some embodiments, the antenna ports are numbered according to FIGS. 5A to 5D, in which it is assumed that the first dimension for the PMI corresponds to a longer dimension of the array and the second dimension corresponds to a shorter dimension of the array. When Q=16, the oversampled DFT vectors for the first dimension, $u_n$, are of length 4, and the oversampled DFT vectors for the second dimension, $v_m$, are of length 2. When Q=12, the DFT vectors for the first dimension are of length 3, and the DFT vectors for the second dimension are of length 2.

In such a case, with config A in FIG. 5A to 5D, the first dimension is for the horizontal dimension and the second dimension is for the vertical dimension. The beam spacing $p_1$ for the first dimension is selected such that a narrowly spaced beams in the first dimension comprise a beam group, and the beam spacing $p_2$ for the second dimension is selected such that a widely spaced beams in the second dimension comprise the beam group. For example, for this operation, $p_1$ and $p_2$ can be chosen as: $p_1=1, p_2=8$. In addition, the total number of beams for the first and the second dimension are made the same: by selecting M'=32 and N'=32 for the two oversampled DFT vectors $v_m$ and $u_n$. This way, the first dimension comprising 4-Tx ULA has closely spaced beams, and the second dimension comprising 2-Tx ULA has widely spaced beams.

When the legacy parameters of $s_1=2$ and $s_2=1$ are chosen, the number of bits for the first PMI ($i_{1,1}$ and $i_{1,2}$) can be correspondingly determined. The range of $i_{1,1}=0,1,\ldots,15$ and hence 4 bits are necessary to quantize the information when no codebook subset restriction is applied to this PMI. The range of $i_{1,2}$ can be chosen to be $i_{1,2}=0,1,\ldots,31$, and hence 5 bits are necessary to quantize the information when no codebook subset restriction is applied to this PMI.

In order to reduce the master codebook size, new parameters can be chosen. For example, $s_1=2$ and $s_2=2$ are used, the range of both $i_{1,1}$ and $i_{1,2}$ are 0-15, and hence 4 bits are necessary to quantize each information when no codebook subset restriction is applied to this PMI.

The configuration of ($p_1=1$, $p_2=8$) configures W1 beam group comprising closely spaced beams for the first dimension, and widely spaced beams for the second dimension. This configuration is likely to be useful for configuration B (tall array), especially when the column spacing is large, e.g., 4λ or even 10λ. In configuration B, the first dimension corresponds to azimuth, and the second dimension corresponds to elevation. Because the beam angle variation over time and frequency is wide in the azimuth domain and the TXRU HPBW in the azimuth domain is also wide (60 degrees), and hence it is likely that widely spaced azimuth beams will provide performance gain.

The configuration of ($p_1=1$, $p_2=1$) that configures W1 beam group comprising closely spaced beams for the both dimensions is useful for configuration A (wide array). Because the TXRU elevation beam width is narrow, so the beam groups with narrowly spaced beams are likely to provide performance gain.

Hence, in these embodiments, a UE may get configured with ($p_1=1$, $p_2=1$) if the serving eNB has wide array, and ($p_1=1$, $p_2=8$) if the serving eNB has tall array in the higher layer (i.e., RRC), as illustrated in TABLE 25.

TABLE 25

Beam spacing configuration

| Value for an information element (RRC) to configure $p_1$ and $p_2$ | Beam spacing for the $1^{st}$ and $2^{nd}$ dim | ($p_1$, $p_2$) |
|---|---|---|
| A first value ... "wide array" or "config A" | (close, close) | (1, 1) |
| A second value ... "tall array" or "config B" | (close, wide) | (1, 8) if M' = 32; or (1, 4) if M' = 16 |

In one method, the information element in TABLE 25 is defined in terms of (M, N, P) in FIG. 9, the first value may correspond to a configuration with N>M, and the second value may correspond to a configuration with N<M. When Q=16, (M,N)=(2,4) corresponds to the first value; and (4,2) corresponds to the second value.

Codebook Subset Restriction Bitmap Construction for W1

In some embodiments, the beam skipping $s_d$ is used for determining the bitmap $\{b_n^d, n=0, \ldots, 31\}$ for codebook subset restriction on rank-1 $i_{1,H}$ and $i_{1,V}$: If $b_n^d=1$, UE is configured to be able to select $i_{1,d}=n$ for the PMI reporting; and If $b_n^d=0$, UE is configured such that the PMI and RI reporting is not allowed to correspond to precoder(s) associated with $i_{1,d}=n$.

In these embodiments it is assumed that $(i_{1,1}, i_{1,2})=(i_{1,H}, i_{1,V})$, but the same design can apply even if $(i_{1,1}, i_{1,2})=(i_{1,V}, i_{1,H})$.

In one method, the UE is configured in the higher layer (RRC), which beam skipping the UE has to use to construct for each of $i_{1,d}$. In one such example, the UE can be configured with either $s_d=2$ or $s_d=4$ for each of $i_{1,d}$. Accordingly, the CSR bitmap can be constructed as in TABLE 26. It is noted that similar CSR bitmap tables can be straightforwardly constructed if other values such as 1 or 8 are also allowed to be configured for $s_d$.

In some embodiment, the number of bits to be reported for $i_{1,d}$ changes dependent upon the configured value of $s_d$. In one example, when $s_d=2$, 4 bit information is reported for $i_{1,d}$; on the other hand when $s_d=4$, 3 bit information is reported for $i_{1,d}$. With reducing number of bits to feedback, the CSI decoding reliability at the eNB can be improved.

TABLE 26

Codebook subset restriction on rank-1 $i_{1,H}$ and $i_{1,V}$ for $N_1 = 8$, $N_2 = 4$, $o_1 = o_2 = 8$

| $s_1$ (or $s_2$) | $i_{1,H}$ (or $i_{1,V}$) after subset restriction | Bitmap $b_n^d$, n = 0, ..., 31 | Number of $i_{1,H}$ (or $i_{1,V}$) indices | Number of bits assigned for $i_{1,H}$ (or $i_{1,V}$) reporting |
|---|---|---|---|---|
| 2 | 0, 2, 4, ..., 30 | $b_n^d = 1$, nmod2 = 0<br>$b_n^d = 0$, nmod2 = 1 | 16 | 4 |
| 4 | 0, 4, 8, ..., 28 | $b_n^d = 1$, nmod4 = 0<br>$b_n^d = 0$, nmod4 ≠ 1 | 8 | Alt 1: 4<br>Alt 2: 3 |

Codebook Subset Restriction Bitmap Construction for W2

In some embodiments, the beam spacing $p_d$ is used for determining the bitmap $\{g_n^d, n=0,1, \ldots, 7\}$ to indicate indices in a W2 beam group for rank-1 $i_2$: if $g_n^d=1$, UE is configured to be able to select $s_d i_{1,d}+n$ for the PMI reporting; and if $g_n^d=0$, UE is configured such that the PMI and RI reporting is not allowed to correspond to precoder(s) associated with $s_d i_{1,d}+n$.

In one method, the UE is configured in the higher layer (RRC), which beam spacing the UE has to use to construct for $i_2$ (or each of $i_{2,1}$ and $i_{2,2}$). In one such example, the UE can be configured with either $p_d=1$ or $p_d=2$ for each of $i_{1,d}$. Accordingly, the CSR bitmap can be constructed as in TABLE 26. It is noted that similar CSR bitmap tables can be straightforwardly constructed if other values are also allowed to be configured for $p_d$.

TABLE 27

Codebook subset restriction on W2 beam group for rank-1 $i_2$

| $p_1$ (or $p_2$) | Beam Indices (I) | Bitmap $g_n^d$, n = 0, 1, ..., 7 |
|---|---|---|
| 1 | 0, 1, 2, 3 | $g_n^d = 1$, n ∈ I<br>$g_n^d = 0$, n ∉ I |
| 2 | 0, 2, 4, 6 | $g_n^d = 1$, n ∈ I<br>$g_n^d = 0$, n ∉ I |

For W2, i.e., for beam selection within the selected beam group and co-phase selection, four alternatives (Alt 1 through Alt 4) are considered for codebook subset restriction bitmap construction.

In some embodiments (Alt 1), the number of beams in the first dimension ($L_1$), the number of beams in the second dimension ($L_2$), and the co-phase (c) are used for determining a bitmap $\{c_n, n=0,1,2, \ldots, 63\}$ for codebook subset restriction on rank-1 $i_2$ (as in TABLE 18): If $c_n=1$, UE is configured to be able to select $i_2=n$ for the PMI reporting; and if $c_n=0$, UE is configured such that the PMI and RI reporting is not allowed to correspond to precoder(s) associated with $i_2=n$.

When either TABLE 18 or TABLE 19 is configured as a master codebook, the CSR bitmap is can be constructed as in TABLE 28. The CSR ($L_1,L_2$)=(1,4), (4,1) and (2,2) are respectively corresponding to beam grids 1240, 1250 and 1260 in FIG. 30.

TABLE 28

Codebook subset restriction on rank-1 $i_2$ for $N_1 = 8$, $N_2 = 4$, $o_1 = o_2 = 8$

| $(L_1, L_2)$ | $i_2$ after subset restriction (I) ... according to the mater codebook in TABLE 18 | $i_2$ after subset restriction (I) ... according to the mater codebook in TABLE 19 | Bitmap $c_n$, n = 0, 1, 2, ..., 63 | Number of $i_2$ indices | Number of bits assigned for $i_2$ reporting |
|---|---|---|---|---|---|
| (4, 1) | 0-3, 16-19, 32-35, 48-51 | 0-15 | $\begin{cases} c_n = 1, & n \in I \\ c_n = 0, & n \notin I \end{cases}$ | 16 | 4 |
| (1, 4) | 0-15 | 0-3, 16-19, 32-35, 48-51 | $\begin{cases} c_n = 1, & n \in I \\ c_n = 0, & n \notin I \end{cases}$ | 16 | 4 |
| (2, 2) | 0-7, 16-23 | 0-7, 16-23 | $\begin{cases} c_n = 1, & n \in I \\ c_n = 0, & n \notin I \end{cases}$ | 16 | 4 |

When the UE reports $i_{2,1}$, $i_{2,2}$ and n in place of $i_2$, the values that can be reported by the UE for $i_{2,1}$ and $i_{2,2}$ are configured to be restricted according to the table for 1240, 1250 and 1260.

| $(L_1, L_2)$ | $i_{2,1}$ | $i_{2,2}$ |
|---|---|---|
| (4, 1) | 0, 1, 2, 3 | 0 |
| (1, 4) | 0 | 0, 1, 2, 3 |
| (2, 2) | 0, 1 | 0, 1 |

Observing TABLE 28, we realize that with only these three choices for $(L_1, L_2)$, the total number of $i_2$'s used with the subset restriction is only 32. This implies that some codewords in TABLE 18 and TABLE 19 can never be selected. Hence, we alternatively propose to reduce the size of master codebook and define the codebook subset restriction in terms of $(L_1, L_2)$ accordingly.

In these embodiments, master codebooks are alternatively defined as in TABLE 29 and TABLE 30, with fewer elements (32) than its counterparts (64) in TABLE 18 and TABLE 19. In this case, the codebook subset restriction can be constructed as in TABLE 31 for 1240, 1250 and 1260.

TABLE 29

Master codebook for 1 layer CSI reporting for $L_1 = L_2 = 4$

| $i_2$ | 0 | 1 | 2 | 3 |
|---|---|---|---|---|
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2$ | 4 | 5 | 6 | 7 |
| Precoder | $W_{s_1 i_{1,1}, s_2 i_{1,2}+p_2, 0}^{(1)}$ | $W_{s_1 i_{1,1}, s_2 i_{1,2}+p_2, 1}^{(1)}$ | $W_{s_1 i_{1,1}, s_2 i_{1,2}+p_2, 2}^{(1)}$ | $W_{s_1 i_{1,1}, s_2 i_{1,2}+p_2, 3}^{(1)}$ |
| $i_2$ | 8 | 9 | 10 | 11 |
| Precoder | $W_{s_1 i_{1,1}, s_2 i_{1,2}+2p_2, 0}^{(1)}$ | $W_{s_1 i_{1,1}, s_2 i_{1,2}+2p_2, 1}^{(1)}$ | $W_{s_1 i_{1,1}, s_2 i_{1,2}+2p_2, 2}^{(1)}$ | $W_{s_1 i_{1,1}, s_2 i_{1,2}+2p_2, 3}^{(1)}$ |
| $i_2$ | 12 | 13 | 14 | 15 |
| Precoder | $W_{s_1 i_{1,1}, s_2 i_{1,2}+3p_2, 0}^{(1)}$ | $W_{s_1 i_{1,1}, s_2 i_{1,2}+3p_2, 1}^{(1)}$ | $W_{s_1 i_{1,1}, s_2 i_{1,2}+3p_2, 2}^{(1)}$ | $W_{s_1 i_{1,1}, s_2 i_{1,2}+3p_2, 3}^{(1)}$ |
| $i_2$ | 16 | 17 | 18 | 19 |
| Precoder | $W_{s_1 i_{1,1}+p_1, s_2 i_{1,2}, 0}^{(1)}$ | $W_{s_1 i_{1,1}+p_1, s_2 i_{1,2}, 1}^{(1)}$ | $W_{s_1 i_{1,1}+p_1, s_2 i_{1,2}, 2}^{(1)}$ | $W_{s_1 i_{1,1}+p_1, s_2 i_{1,2}, 3}^{(1)}$ |
| $i_2$ | 20 | 21 | 22 | 23 |
| Precoder | $W_{s_1 i_{1,1}+p_1, s_2 i_{1,2}+p_2, 0}^{(1)}$ | $W_{s_1 i_{1,1}+p_1, s_2 i_{1,2}+p_2, 1}^{(1)}$ | $W_{s_1 i_{1,1}+p_1, s_2 i_{1,2}+p_2, 2}^{(1)}$ | $W_{s_1 i_{1,1}+p_1, s_2 i_{1,2}+p_2, 3}^{(1)}$ |
| $i_2$ | 24 | 25 | 26 | 27 |
| Precoder | $W_{s_1 i_{1,1}+2p_1, s_2 i_{1,2}, 0}^{(1)}$ | $W_{s_1 i_{1,1}+2p_1, s_2 i_{1,2}, 1}^{(1)}$ | $W_{s_1 i_{1,1}+2p_1, s_2 i_{1,2}, 2}^{(1)}$ | $W_{s_1 i_{1,1}+2p_1, s_2 i_{1,2}, 3}^{(1)}$ |
| $i_2$ | 28 | 29 | 30 | 31 |
| Precoder | $W_{s_1 i_{1,1}+3p_1, s_2 i_{1,2}, 0}^{(1)}$ | $W_{s_1 i_{1,1}+3p_1, s_2 i_{1,2}, 1}^{(1)}$ | $W_{s_1 i_{1,1}+3p_1, s_2 i_{1,2}, 2}^{(1)}$ | $W_{s_1 i_{1,1}+3p_1, s_2 i_{1,2}, 3}^{(1)}$ |

TABLE 30

Master codebook for 1 layer CSI reporting for $L_1 = L_2 = 4$

| $i_2$ | 0 | 1 | 2 | 3 |
|---|---|---|---|---|
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2$ | 4 | 5 | 6 | 7 |
| Precoder | $W_{s_1 i_{1,1}+p_1, s_2 i_{1,2}, 0}^{(1)}$ | $W_{s_1 i_{1,1}+p_1, s_2 i_{1,2}, 1}^{(1)}$ | $W_{s_1 i_{1,1}+p_1, s_2 i_{1,2}, 2}^{(1)}$ | $W_{s_1 i_{1,1}+p_1, s_2 i_{1,2}, 3}^{(1)}$ |
| $i_2$ | 8 | 9 | 10 | 11 |
| Precoder | $W_{s_1 i_{1,1}+2p_1, s_2 i_{1,2}, 0}^{(1)}$ | $W_{s_1 i_{1,1}+2p_1, s_2 i_{1,2}, 1}^{(1)}$ | $W_{s_1 i_{1,1}+2p_1, s_2 i_{1,2}, 2}^{(1)}$ | $W_{s_1 i_{1,1}+2p_1, s_2 i_{1,2}, 3}^{(1)}$ |
| $i_2$ | 12 | 13 | 14 | 15 |
| Precoder | $W_{s_1 i_{1,1}+3p_1, s_2 i_{1,2}, 0}^{(1)}$ | $W_{s_1 i_{1,1}+3p_1, s_2 i_{1,2}, 1}^{(1)}$ | $W_{s_1 i_{1,1}+3p_1, s_2 i_{1,2}, 2}^{(1)}$ | $W_{s_1 i_{1,1}+3p_1, s_2 i_{1,2}, 3}^{(1)}$ |
| $i_2$ | 16 | 17 | 18 | 19 |
| Precoder | $W_{s_1 i_{1,1}, s_2 i_{1,2}+p_2, 0}^{(1)}$ | $W_{s_1 i_{1,1}, s_2 i_{1,2}+p_2, 1}^{(1)}$ | $W_{s_1 i_{1,1}, s_2 i_{1,2}+p_2, 2}^{(1)}$ | $W_{s_1 i_{1,1}, s_2 i_{1,2}+p_2, 3}^{(1)}$ |
| $i_2$ | 20 | 21 | 22 | 23 |
| Precoder | $W_{s_1 i_{1,1}+p_1, s_2 i_{1,2}+p_2, 0}^{(1)}$ | $W_{s_1 i_{1,1}+p_1, s_2 i_{1,2}+p_2, 1}^{(1)}$ | $W_{s_1 i_{1,1}+p_1, s_2 i_{1,2}+p_2, 2}^{(1)}$ | $W_{s_1 i_{1,1}+p_1, s_2 i_{1,2}+p_2, 3}^{(1)}$ |
| $i_2$ | 24 | 25 | 26 | 27 |
| Precoder | $W_{s_1 i_{1,1}, s_2 i_{1,2}+2p_2, 0}^{(1)}$ | $W_{s_1 i_{1,1}, s_2 i_{1,2}+2p_2, 1}^{(1)}$ | $W_{s_1 i_{1,1}, s_2 i_{1,2}+2p_2, 2}^{(1)}$ | $W_{s_1 i_{1,1}, s_2 i_{1,2}+2p_2, 3}^{(1)}$ |
| $i_2$ | 28 | 29 | 30 | 31 |
| Precoder | $W_{s_1 i_{1,1}, s_2 i_{1,2}+3p_2, 0}^{(1)}$ | $W_{s_1 i_{1,1}, s_2 i_{1,2}+3p_2, 1}^{(1)}$ | $W_{s_1 i_{1,1}, s_2 i_{1,2}+3p_2, 2}^{(1)}$ | $W_{s_1 i_{1,1}, s_2 i_{1,2}+3p_2, 3}^{(1)}$ |

TABLE 31

Codebook subset restriction on rank-1 $i_2$ for $N_1 = 8$, $N_2 = 4$, $o_1 = o_2 = 8$

| $(L_1, L_2)$ | $i_2$ after subset restriction (I) ... according to the mater codebook in TABLE 29 | $i_2$ after subset restriction (I) ... according to the mater codebook in TABLE 19 | Bitmap $c_n$, n = 0, 1, 2, ..., 63 | Number of $i_2$ indices | Number of bits assigned for $i_2$ reporting |
|---|---|---|---|---|---|
| (4, 1) | 0-3, 16-19, 24-31 | 0-15 | $\begin{cases} c_n = 1, & n \in I \\ c_n = 0, & n \notin I \end{cases}$ | 16 | 4 |
| (1, 4) | 0-15 | 0-3, 16-19, 24-31 | $\begin{cases} c_n = 1, & n \in I \\ c_n = 0, & n \notin I \end{cases}$ | 16 | 4 |
| (2, 2) | 0-7, 16-23 | 0-7, 16-23 | $\begin{cases} c_n = 1, & n \in I \\ c_n = 0, & n \notin I \end{cases}$ | 16 | 4 |

In some embodiments (Alt 2), the number of beams in the first dimension ($L_1$), the number of beams in the second dimension ($L_2$), and the co-phase ($\phi$) are used for determining the bitmap $\{c_n, n=0,1,2, \ldots, 15\}$ for codebook subset restriction on rank-1 $i_2$, where the bitmap $\{c_n\}$ is a joint bitmap for ($L_1$, $L_2$): if $c_n=1$, UE is configured to be able to select $i_2=4n+m$, for all m=0,1,2,3 such that $d_m=1$, for the PMI reporting; and if $c_n=0$, UE is configured such that the PMI and RI reporting is not allowed to correspond to precoder(s) associated with $i_2=4n+m$, for all m=0,1,2,3. Note that there is no subset restriction (or bitmap) for the co-phase $\phi$. The UE may assume all four co-phase values $\{1,j,-1,-j\}$ to derive rank-1 $i_2$:

An example of the bitmap is shown below in TABLE 32.

TABLE 32

Codebook subset restriction on rank-1 $i_2$ for $N_1 = 8$, $N_2 = 4$, $o_1 = o_2 = 8$

| $(L_1, L_2)$ | I | Bitmap $c_n$, n = 0, 1, 2, ..., 15 | Number of $i_2$ indices | Number of bits assigned for $i_2$ reporting |
|---|---|---|---|---|
| (4, 1) | 0, 4, 8, 12 | $\begin{cases} c_n = 1, & n \in I \\ c_n = 0, & n \notin I \end{cases}$ | 16 (4 possible values for co-phase per selected beam pair) | 4 |
| (1, 4) | 0-3 | $\begin{cases} c_n = 1, & n \in I \\ c_n = 0, & n \notin I \end{cases}$ | 16 (4 possible values for co-phase per selected beam pair) | 4 |
| (2, 2) | 0, 1, 4, 5 | $\begin{cases} c_n = 1, & n \in I \\ c_n = 0, & n \notin I \end{cases}$ | 16 (4 possible values for co-phase per selected beam pair) | 4 |

In some embodiments (Alt 3), the number of beams in the first dimension ($L_1$), the number of beams in the second dimension ($L_2$), and the co-phase ($\phi$) are used for determining the separate bitmaps $\{c_n, n=0,1,2,\ldots,15\}$ and $\{d_m, m=0,1,2,3\}$ for codebook subset restriction on rank-1 $i_2$, where the bitmap $\{c_n\}$ is a joint bitmap for ($L_1$, $\phi$) and the bitmap $\{d_m\}$ is for $L_2$:

If $c_n=1$, UE is configured to be able to select $i_2=16\lfloor n/4 \rfloor + (n \bmod 4)+4m$, for all m=0,1,2,3 such that $d_m=1$, for the PMI reporting;

If $c_n=0$, UE is configured such that the PMI and RI reporting is not allowed to correspond to precoder(s) associated with bit $i_2=16\lfloor n/4 \rfloor + (n \bmod 4)+4m$, for all m=0,1,2,3 such that $d_m=1$; and If $d_m=1$, UE is configured to be able to select $i_2=16\lfloor n/4 \rfloor + (n \bmod 4)+4m$, for all n=0,1,2,...,15 such that $c_n=1$, for the PMI reporting; and If $d_m=0$, UE is configured such that the PMI and RI reporting is not allowed to correspond to precoder(s) associated with bit $i_2=16\lfloor n/4 \rfloor + (n \bmod 4)+4m$, for all n=0,1,2,...,15 such that $c_n=1$.

An example of the bitmap is shown below in TABLE 33.

TABLE 33

Codebook subset restriction on rank-1 $i_2$ for $N_1 = 8$, $N_2 = 4$, $o_1 = o_2 = 8$

| $(L_1, L_2)$ | I | J | Bitmap $c_n$, n = 0, 1, 2, ..., 15 | Bitmap $d_m$, m = 0, 1, 2, 3 | Number of $i_2$ indices | Number of bits assigned for $i_2$ reporting |
|---|---|---|---|---|---|---|
| (4, 1) | 0-15 | 0 | $\begin{cases} c_n = 1, & n \in I \\ c_n = 0, & n \notin I \end{cases}$ | $\begin{cases} d_m = 1, & m \in J \\ d_m = 0, & m \notin J \end{cases}$ | 16 | 4 |
| (1, 4) | 0-3 | 0-3 | $\begin{cases} c_n = 1, & n \in I \\ c_n = 0, & n \notin I \end{cases}$ | $\begin{cases} d_m = 1, & m \in J \\ d_m = 0, & m \notin J \end{cases}$ | 16 | 4 |
| (2, 2) | 0-3, 8-11 | 0, 1 | $\begin{cases} c_n = 1, & n \in I \\ c_n = 0, & n \notin I \end{cases}$ | $\begin{cases} d_m = 1, & m \in J \\ d_m = 0, & m \notin J \end{cases}$ | 16 | 4 |

Note that the case in which UE is configured with a joint bitmap for ($L_2$, $\phi$) and a bitmap for $L_1$ can be similarly constructed.

In some embodiments (Alt 4), the number of beams in the first dimension ($L_1$), the number of beams in the second dimension ($L_2$), and the co-phase ($\phi$) are used for determining the separate bitmaps $\{c_n, n=0,1,2,3\}$ and $\{d_m, m=0,1,2,3\}$, and $\{e_k, k=0,1,2,3\}$ for codebook subset restriction on rank-1 $i_2$, where the bitmap $\{c_n\}$ is for $L_1$, the bitmap $\{d_m\}$ is for $L_2$, and the bitmap $\{e_k\}$ is for $\phi$:

If $c_n=1$, UE is configured to be able to select $i_2=16n+4m+k$, for all m,k=0,1,2,3 such that $d_m=1$ and $e_k=1$, for the PMI reporting;

If $c_n=0$, UE is configured such that the PMI and RI reporting is not allowed to correspond to precoder(s) associated with bit $i_2=16n+4m+k$, for all m,k=0,1,2,3 such that $d_m=1$ and $e_k=1$; and If $d_m=1$, UE is configured to be able to select $i_2=16n+4m+k$, for all n,k=0,1,2,3 such that $c_n=1$ and $e_k=1$, for the PMI reporting;

If $d_m=0$, UE is configured such that the PMI and RI reporting is not allowed to correspond to precoder(s) associated with bit $i_2=16n+4m+k$, for all n,k=0,1,2,3 such that $c_n=1$ and $e_k=1$.

If $e_k=1$, UE is configured to be able to select $i_2=16n+4m+k$, for all n,m=0,1,2,3 such that $c_n=1$ and $d_m=1$, for the PMI reporting;

If $e_k=0$, UE is configured such that the PMI and RI reporting is not allowed to correspond to precoder(s) associated with bit $i_2=16n+4m+k$, for all n,m=0,1,2,3 such that $c_n=1$ and $d_m=1$.

An example of the bitmap is shown below in TABLE 34.

TABLE 34

Codebook subset restriction on rank-1 $i_2$ for $N_1 = 8$, $N_2 = 4$, $o_1 = o_2 = 8$

| $(L_1, L_2)$ | I | J | K | Bitmap $c_n$, n = 0, 1, 2, ..., 15 | Bitmap $d_m$, m = 0, 1, 2, 3 | Bitmap $e_k$, k = 0, 1, 2, 3 | Number of $i_2$ indices | Number of bits assigned for $i_2$ reporting |
|---|---|---|---|---|---|---|---|---|
| (4, 1) | 0-3 | 0 | 0-3 | $\begin{cases} c_n = 1, & n \in I \\ c_n = 0, & n \notin I \end{cases}$ | $\begin{cases} d_m = 1, & m \in J \\ d_m = 0, & m \notin J \end{cases}$ | $\begin{cases} e_k = 1, & k \in K \\ e_k = 0, & k \notin K \end{cases}$ | 16 | 4 |
| (1, 4) | 0 | 0-3 | 0-3 | $\begin{cases} c_n = 1, & n \in I \\ c_n = 0, & n \notin I \end{cases}$ | $\begin{cases} d_m = 1, & m \in J \\ d_m = 0, & m \notin J \end{cases}$ | $\begin{cases} e_k = 1, & k \in K \\ e_k = 0, & k \notin K \end{cases}$ | 16 | 4 |
| (2, 2) | 0, 2 | 0, 1 | 0-3 | $\begin{cases} c_n = 1, & n \in I \\ c_n = 0, & n \notin I \end{cases}$ | $\begin{cases} d_m = 1, & m \in J \\ d_m = 0, & m \notin J \end{cases}$ | $\begin{cases} e_k = 1, & k \in K \\ e_k = 0, & k \notin K \end{cases}$ | 16 | 4 |

In some embodiments, the UE is further configured to restrict to report PMI, RI and PTI within a precoder codebook subset specified by:

the bitmap $b_n^d$ for each dimension d (TABLE 26); (for W1)

the bitmap $g_n^d$ for each dimension d (TABLE 27); (for W2 beam group selection)

For W2, i.e., for beam selection within the selected beam group and co-phase selection, four alternatives are considered in these embodiments:

Alt 1 and Alt 2: the bitmap $c_n$ (Alt 1: TABLE 28 or Alt 2: TABLE 32)

Alt 3: bitmaps $c_n$ and $d_m$ (TABLE 33)

Alt 4: bitmaps $c_n$, $d_m$, and $e_k$ (TABLE 34).

For a UE configured in transmission mode X, the bitmap is configured for each CSI process and each subframe sets (if subframe sets $C_{CSI,0}$ and $C_{CSI,1}$ are configured by higher layers) by higher layer signaling. For a specific precoder codebook and associated transmission mode, the bitmap can specify all possible precoder codebook subsets from which the UE can assume the eNB may be using when the UE is configured in the relevant transmission mode X.

The composite bitmap $(b_n^1, b_n^2, g_n^1, g_n^2, c_n)$ (or $(b_n^1, b_n^2, g_n^1, g_n^2, c_n, d_m)$ or $(b_n^1, b_n^2, g_n^1, g_n^2, c_n, d_m, e_k)$) forms the bit sequence $a_{A_c-1}, \ldots, a_3, a_2, a_1, a_0$ where $a_0$ is the LSB and $a_{A_c-1}$ is the MSB and where a bit value of zero indicates that the PMI and RI reporting is not allowed to correspond to precoder(s) associated with the bit.

The association of bits to precoders for the transmission mode X for $N_1=8$, $N_2=4$, $o_1=8$ and $o_2=8$ is given as follows:

W1 codebook subset restriction:

Bit $a_n=b_n^1$, where n=0,1,2, ..., 31, is associated with the precoder for horizontal beam skipping $s_1$ (e.g., $s_1 \in \{1,2\}$) and codebook index $i_{1,H}$;

Bit $a_{32+n}=b_n^2$, where n=0,1,2, ..., 31, is associated with the precoder for vertical beam skipping $s_2$ (e.g., $s_2 \in \{1,2\}$) and codebook index $i_{1,V}$;

W2 beam grouping:

Bit $a_{64+n}=b_n^1$, where n=0,1,2, ..., 31, is associated with the precoder for horizontal beam spacing $p_1$ (e.g., $p_1 \in \{1,2\}$) and codebook index $i_2$;

Bit $a_{72+n}=b_n^2$, where n=0,1,2, ..., 31, is associated with the precoder for vertical beam spacing $p_2$ (e.g., $p_2 \in \{1,2\}$) and codebook index $i_2$; and Four alternatives can be considered for the indexing of bits for W2 (for beam selection and co-phasing) codebook subset restriction:

Alt 1

Bit $a_{80+n}=c_n$, where n=0,1,2, ..., 63, is associated with the beam grouping and co-phase configuration ($L_1$, $L_2$, $\phi$) and codebook index $i_2$;

Alt 2 bit $a_{80+n}=c_n$, where n=0,1,2, ..., 15, is associated with the beam grouping configuration ($L_1$,$L_2$) and codebook index $i_2$ (4 possible values $\{1,j,-1,-j\}$ for co-phase per selected beam pair);

Alt 3 bit $a_{80+n}=c_n$, where n=0,1,2, ..., 15, is associated with the first dimension beam grouping and co-phase configuration ($L_1$, $\phi$) and codebook index $i_2$; and bit $a_{96+n}=d_m$, where m=0,1,2,3, is associated with the second dimension beam grouping configuration ($L_2$) and codebook index $i_2$;

Alt 4 bit $a_{80+n}=c_n$, where n=0,1,2,3, is associated with the first dimension beam grouping configuration ($L_1$) and codebook index $i_2$;

bit $a_{84+n}=d_m$, where m=0,1,2,3, is associated with the second dimension beam grouping configuration ($L_2$) and codebook index $i_2$; and bit $a_{88+n}=e_k$, where k=0,1,2,3, is associated with the co-phase configuration ($\phi$) and codebook index $i_2$.

Figure 31:
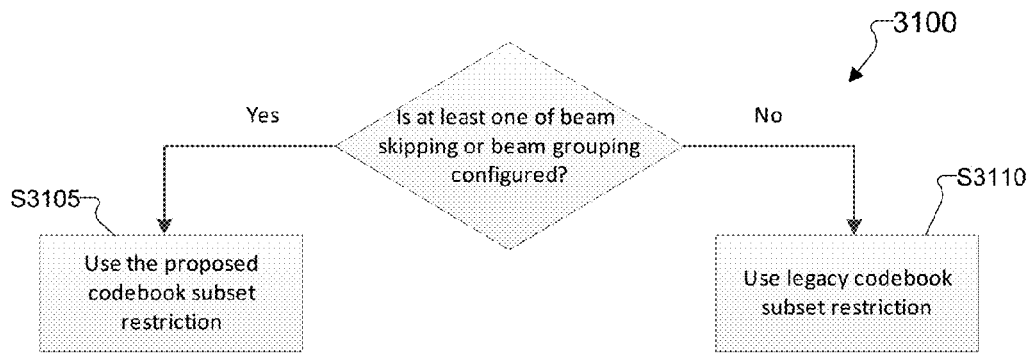
FIG. 31 illustrates a flowchart 3100 for UE operation for configuring parametrized codebook 3100 according to embodiments of the present disclosure.

FIG. 31 illustrates a flowchart 3100 for UE operation for configuring parametrized codebook according to embodiments of the present disclosure. The embodiment shown in FIG. 31 is for illustration only. Other embodiments could be used without departing from the scope of the present disclosure.

In some embodiments, if the UE is configured with at least one of beam skipping or beam grouping parameters, according to some embodiments on this disclosure, then it uses S3105 the proposed codebook B subset restriction according to some embodiments of this disclosure otherwise the UE uses S3110 the legacy codebook subset restriction.

Figure 32:
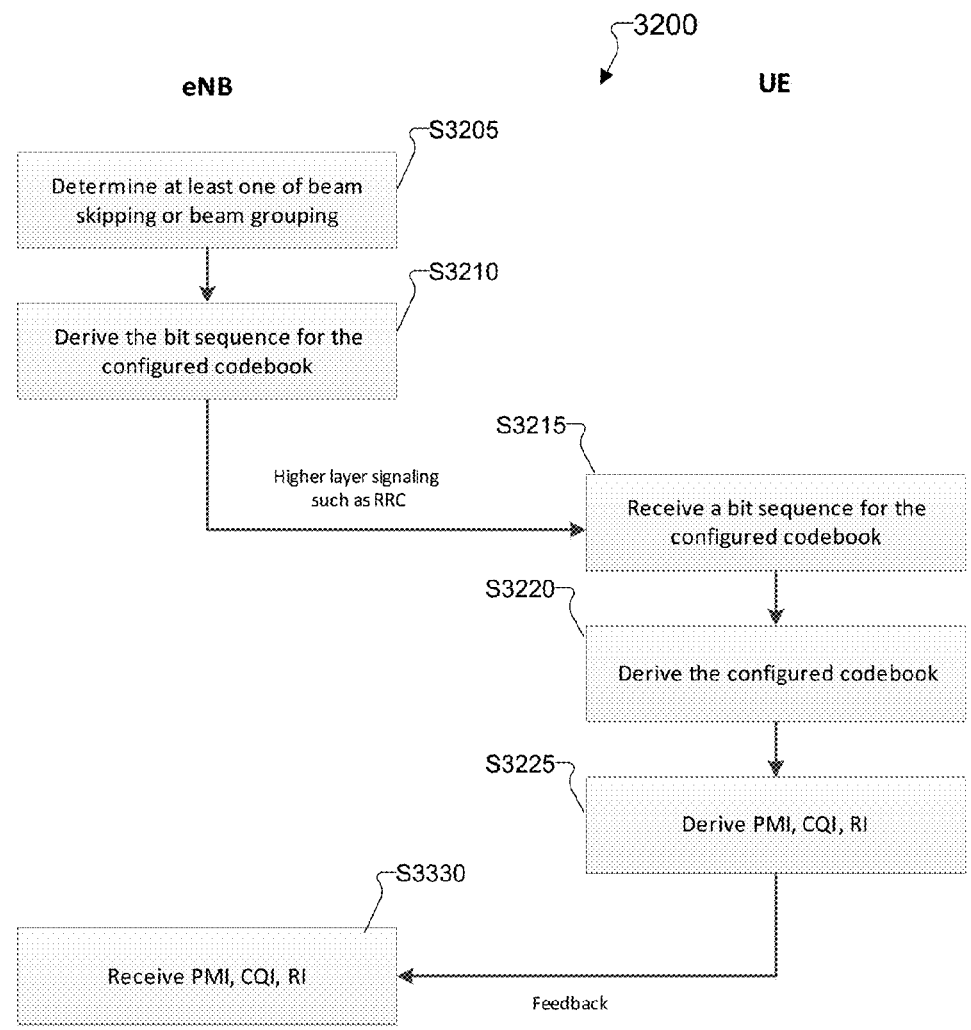
FIG. 32 illustrates a flowchart of the overall eNB and UE operation according to the parameterized codebook according to the present disclosure.

FIG. 32 illustrates a flowchart 3200 of the overall eNB and UE operation according to the parameterized codebook according to the present disclosure. The embodiment shown in FIG. 32 is for illustration only. Other embodiments could be used without departing from the scope of the present disclosure.

As shown in FIG. 32, the overall operation for configuring parameterized codebook and PMI, RI, CQI calculation starts with eNB determining S3205 at least one of beam skipping or beam grouping parameters for the UE, followed by the corresponding bit sequence determination S3210 at the eNB. The derived bit sequence is communicated to the UE via higher layer signaling such as RRC. UE receives S3215 the bit sequence and derives S3220 the corresponding codebook. UE then uses 3225 the derived codebook for PMI, RI, and CQI calculation, and feeds S3330 them back to the eNB.

In some embodiments, UE is configured with another codebook parameter $b_d$ where d=1,2 for the beam group type in the first stage codebook (W1). For example: if $b_d$=0, the beam groups consist of closely spaced or adjacent beams in dimension d; and if $b_d$=1, the beam groups consist of widely spaced or orthogonal beam pairs in dimension d.

Figure 33:
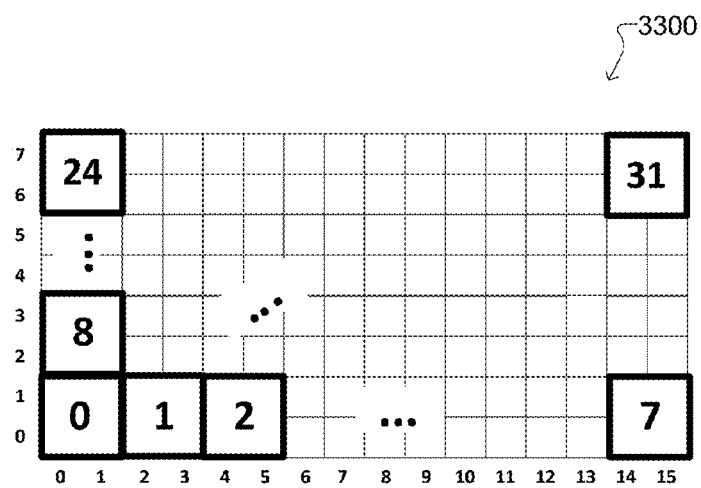
FIG. 33 illustrates an example beam group type in which beams are adjacent in both dimensions according to the present disclosure.

FIG. 33 illustrates an example beam group type 3300 in which beams are adjacent in both dimensions according to the present disclosure. The embodiment shown in FIG. 29 is for illustration only. Other embodiments could be used without departing from the scope of the present disclosure.

For example, beam groups are adjacent in both dimensions, i.e., $b_1$=$b_2$=0. The beam groups 0, 1, 2, . . . , 31 represent beam groups with 2 adjacent beams in horizontal and 2 adjacent beams in vertical dimensions. For example, beam group 0 consists of beams {0,1} in horizontal and beams {0,1} in vertical.

Figures 34A, 34B:
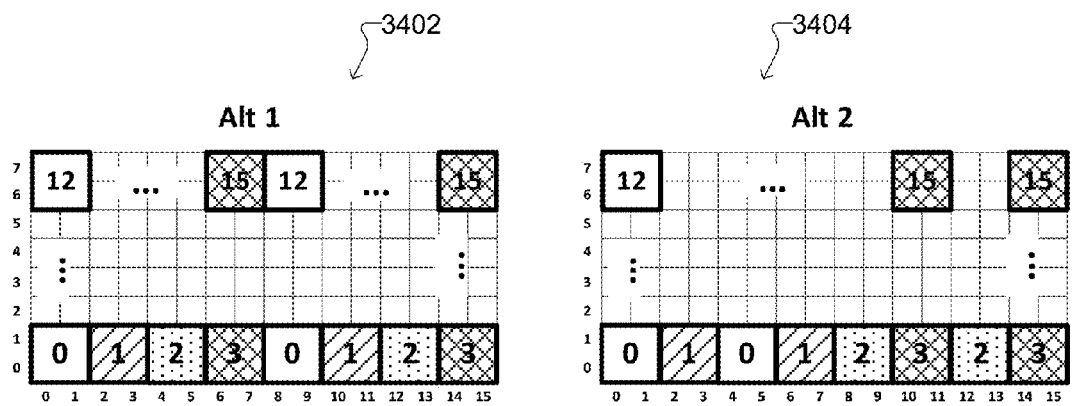
FIGS. 34A and 34B illustrate another example beam group types in which a beam group consists of orthogonal beam pairs in the first (horizontal) dimension, and adjacent beams in the second (vertical) dimension.

FIGS. 34A and 34B illustrate another example beam group types 3402, 3404 in which a beam group consists of orthogonal beam pairs in the first (horizontal) dimension, i.e., $b_1$=1, and adjacent beams in the second (vertical) dimension, i.e., $b_2$=1. The embodiments shown in FIGS. 34A and 34B are for illustration only. Other embodiments could be used without departing from the scope of the present disclosure.

Two alternatives for the orthogonal beams can be considered: Alt 1 3402 as illustrated for the farthest orthogonal beams and Alt 2 2404 for the closest orthogonal beams. In Alt 1 3402, the beam groups 0, 1, 2, . . . , 15 represent beam groups with 2 orthogonal beam pairs in horizontal and 2 adjacent beams in vertical dimensions. For example, beam group 0 consists of beams {0,1,8, 9} in horizontal and beams {0,1} in vertical. Note that two orthogonal beam pairs are shown as two separated groups.

In some embodiments, UE is configured with the parameterized KP codebook in which at least one of the codebook parameters ($N_d$, $o_d$, $s_d$, $p_d$, $L_d$, $b_d$), according to some embodiments of this disclosure, is specific to the number of transmission layers (or rank).

In one method, rank 1 and rank 2 codebooks are such that the beam groups consist of closely spaced or adjacent beams in both horizontal and vertical dimensions for both rank 1 and rank 2 codebooks ($b_1$=0, $b_2$=0 for both rank 1 and rank 2). In this method, a first set of codebook parameters may be the same for both codebooks, and a second set of parameters may be different. The first set of common parameters for rank 1 and 2 codebooks may be ($N_d$, $o_d$, $L_d$, $b_d$) and the second set of different parameters may be ($s_d$, $p_d$). For instance, $s_d$ and $p_d$ can be both 1 and 2 for rank 1 codebook, but they are 2 for rank 2 codebook. An example of the two sets is shown below.

| | First set (common) | | | | | | | | Second set (different) | | | |
|---|---|---|---|---|---|---|---|---|---|---|---|---|
| Rank | $N_1$ | $N_2$ | $o_1$ | $o_2$ | $L_1$ | $L_2$ | $b_1$ | $b_2$ | $p_1$ | $p_2$ | $s_1$ | $s_2$ |
| 1 | 8 | 4 | 8 | 4 | 2 | 2 | 0 | 0 | 1, 2 | 1, 2 | 1, 2 | 1, 2 |
| 2 | | | | | | | | | 2 | 2 | 2 | 2 |

In another method, rank 1 and rank 2 codebooks are such that the beam groups consist of adjacent beams in both horizontal and vertical dimensions for rank 1 codebook ($b_1$=0 and $b_2$=0 for rank 1), and both adjacent and orthogonal beams in horizontal dimension and only adjacent beams in vertical dimension for rank 2 codebooks ($b_1$=0,1 and $b_2$=0,1 for rank 2). In this method, a first set of codebook parameters may be the same for both codebooks, and a second set of parameters may be different. The first set of common parameters for rank 1 and 2 codebooks may be ($N_d$, $o_d$, $L_d$, $b_2$) and the second set of different parameters may be ($b_1$, $s_d$, $p_d$). For instance, $s_d$ and $p_d$ can be both 1 and 2 for rank 1 codebook, but they are 2 for rank 2 codebook. An example of the two sets is shown below.

| | First set (common) | | | | | | | Second set (different) | | | | |
|---|---|---|---|---|---|---|---|---|---|---|---|---|
| Rank | $N_1$ | $N_2$ | $o_1$ | $o_2$ | $L_1$ | $L_2$ | $b_2$ | $b_2$ | $p_1$ | $p_2$ | $s_1$ | $s_2$ |
| 1 | 8 | 4 | 8 | 4 | 2 | 2 | 0 | 0 | 1, 2 | 1, 2 | 1, 2 | 1, 2 |
| 2 | | | | | | | | 0, 1 | 2 | 2 | 2 | 2 |

In some embodiments, parameters related to both first stage and second stage codebooks are rank-specific. For example, both $s_1$ and $s_2$ (W1 parameters), and $p_1$ and $p_2$ (W2 parameters) may be rank-specific.

In some embodiments, parameters related to one of the first and second stage codebooks are rank-specific. For example, $s_1$ and $s_2$ (first stage or W1 codebook) are the common, and $p_1$ and $p_2$ (second stage or W2 codebook) are rank-specific.

Codebook Design for Rank 1

TABLE 35

Master codebook for 1 layer CSI reporting for ($L_1$, $L_2$) = (4, 2)

| $i_2'$ | 0 | 1 | 2 | 3 |
|---|---|---|---|---|
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2'$ | 4 | 5 | 6 | 7 |
| Precoder | $W_{s_1 i_{1,1}+p1, s_2 i_{1,2}, 0}^{(1)}$ | $W_{s_1 i_{1,1}+p1, s_2 i_{1,2}, 1}^{(1)}$ | $W_{s_1 i_{1,1}+p1, s_2 i_{1,2}, 2}^{(1)}$ | $W_{s_1 i_{1,1}+p1, s_2 i_{1,2}, 3}^{(1)}$ |
| $i_2'$ | 8 | 9 | 10 | 11 |
| Precoder | $W_{s_1 i_{1,1}+2p1, s_2 i_{1,2}, 0}^{(1)}$ | $W_{s_1 i_{1,1}+2p1, s_2 i_{1,2}, 1}^{(1)}$ | $W_{s_1 i_{1,1}+2p1, s_2 i_{1,2}, 2}^{(1)}$ | $W_{s_1 i_{1,1}+2p1, s_2 i_{1,2}, 3}^{(1)}$ |
| $i_2'$ | 12 | 13 | 14 | 15 |
| Precoder | $W_{s_1 i_{1,1}+3p1, s_2 i_{1,2}, 0}^{(1)}$ | $W_{s_1 i_{1,1}+3p1, s_2 i_{1,2}, 1}^{(1)}$ | $W_{s_1 i_{1,1}+3p1, s_2 i_{1,2}, 2}^{(1)}$ | $W_{s_1 i_{1,1}+3p1, s_2 i_{1,2}, 3}^{(1)}$ |

TABLE 35-continued

Master codebook for 1 layer CSI reporting for $(L_1, L_2) = (4, 2)$

| $i_{2'}$ | 16-31 |
|---|---|
| Precoder | Entries 16-31 constructed with replacing the second subscript $s_2 i_{1,2}$ with $s_2 i_{1,2} + p_2$ in entries 0-15. |

In some embodiments, TABLE 35 is used as a rank-1 (1 layer) master codebook that can be used for any of Q=12, 16 and 32 antenna configurations, wherein the corresponding rank 1 precoder is $$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix}.$$

Note that in this table, the numbering scheme 2 in is assumed. The table for numbering scheme 1 can be constructed similarly. In this table, the $1^{st}$ dimension beam index $m_1$ increases first as $i_2$ increases. In an alternate table, the $2^{nd}$ dimension beam index $m_2$ may increase first as $i_2$ increases.

In some embodiments, Q is equal to $2N_1*N_2$.

In some embodiments, the UE reports $i_{2,1}$, $i_{2,2}$ and n in place of $i_2$, in which case $m_1$ and $m_2$ are determined as:

$$m_1 = s_1 i_{1,1} + p_1 i_{2,1} \text{ and } m_1 = s_2 i_{1,2} + p_2 i_{2,2}.$$

In those embodiments related to T6, and other related embodiments, the parameters $s_1$, $s_2$, $p_1$, and $p_2$ in this table can be selected, e.g., according to T3, and it is assumed that $(L_1, L_2) = (4, 2)$. Also $i_{1,1} = 0, 1, \ldots,$ $$\frac{N_1 O_1}{s_1} - 1$$

and $i_{1,2} = 0, 1, \ldots,$ $$\frac{N_2 O_2}{s_2} - 1.$$

The number of rank-1 $i_2$ indices in the master codebook in TABLE 6 is 32, so 5 bits are needed to report $i_2$ based on this master codebook.

The master codebook for other parameters and for more than 1 layer can be similarly constructed.

Unified Codebook for Beamformed and Non-Precoded CSI-RS

In some embodiments, $v_{m_1}$ and $u_{m_2}$ to comprise a precoder $$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix}.$$

are differently configured depending on whether beamformed CSI-RS, or non-precoded CSI-RS or both are configured.

In one such example with Q=16 and $N_1=4$ and $N_2=2$: When the UE is configured with only non-precoded CSI-RS or both types of CSI-RS, the UE is further configured to use:

Either (Numbering scheme 2)

$$v_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t$$

and $u_{m_2} = \begin{bmatrix} 1 & e^{j\frac{2\pi m_2}{32}} \end{bmatrix}^t$; or (Numbering scheme 1)

$$v_{m_1} = \begin{bmatrix} 1 & e^{j\frac{2\pi m_1}{32}} \end{bmatrix}^t$$

and $u_{m_2} = \begin{bmatrix} 1 & e^{j\frac{2\pi m_2}{32}} & e^{j\frac{4\pi m_2}{32}} & e^{j\frac{6\pi m_2}{32}} \end{bmatrix}^t$;

and
When the UE is configured with only beamformed CSI-RS, the UE is further configured to use:
$v_{m_1} = e_{m_1}^{(4\times1)}$ and $u_{m_2} = e_{m_2}^{(2\times1)}$ (if Numbering scheme 2 is used); or
$v_{m_1} = e_{m_1}^{(2\times1)}$ and $u_{m_2} = e_{m_2}^{(4\times1)}$ (if Numbering scheme 1 is used),
wherein $e_m^{(N\times1)}$, m=0, 1, ..., N−1, is an N×1 column vector comprising with (N−1) elements with zero value and one element with value of one. The one element with value of one is on (m+1)-th row. For example, $e_1^{(4\times1)} = [0\ 1\ 0\ 0]^t$; and $e_2^{(4\times1)} = [0\ 0\ 1\ 0]^t$. In this case, the UE is further configured to use $i_{1,1} = i_{1,2} = 0$ in the table entries, and the UE is configured to report only $i_2$ as PMI, and not to report $i_{1,1}$ and $i_{1,2}$.

The precoding vector obtained with numbering scheme 2 can be applied on the antenna ports. In these embodiments, the first dimension corresponds to a longer dimension of the array; and the second dimension corresponds to a shorter dimension of the array. On the contrary, the precoding vector obtained with numbering scheme 1 can be applied on the antenna ports numbered in such a way that the first dimension corresponds to a shorter dimension of the array; and the second dimension corresponds to a longer dimension of the array.

In some embodiments, the UE can identify that a configured CSI-RS resource is beamformed or non-precoded by:

Alt 1. Explicit RRC indication: The UE is configured with a higher-layer parameter for the configured CSI-RS resource, indicating whether the configured CSI-RS resource is beamformed or non-precoded; and Alt 2. Implicit indication: The UE is configured with a different set of CSI-RS port numbers for beamformed CSI-RS than the non-precoded CSI-RS. In one example, the beamformed CSI-RS takes antenna port numbers 200-207, while the non-precoded CSI-RS takes antenna port numbers 15-30.

Rank-1 Beam Grouping

Figure 35:
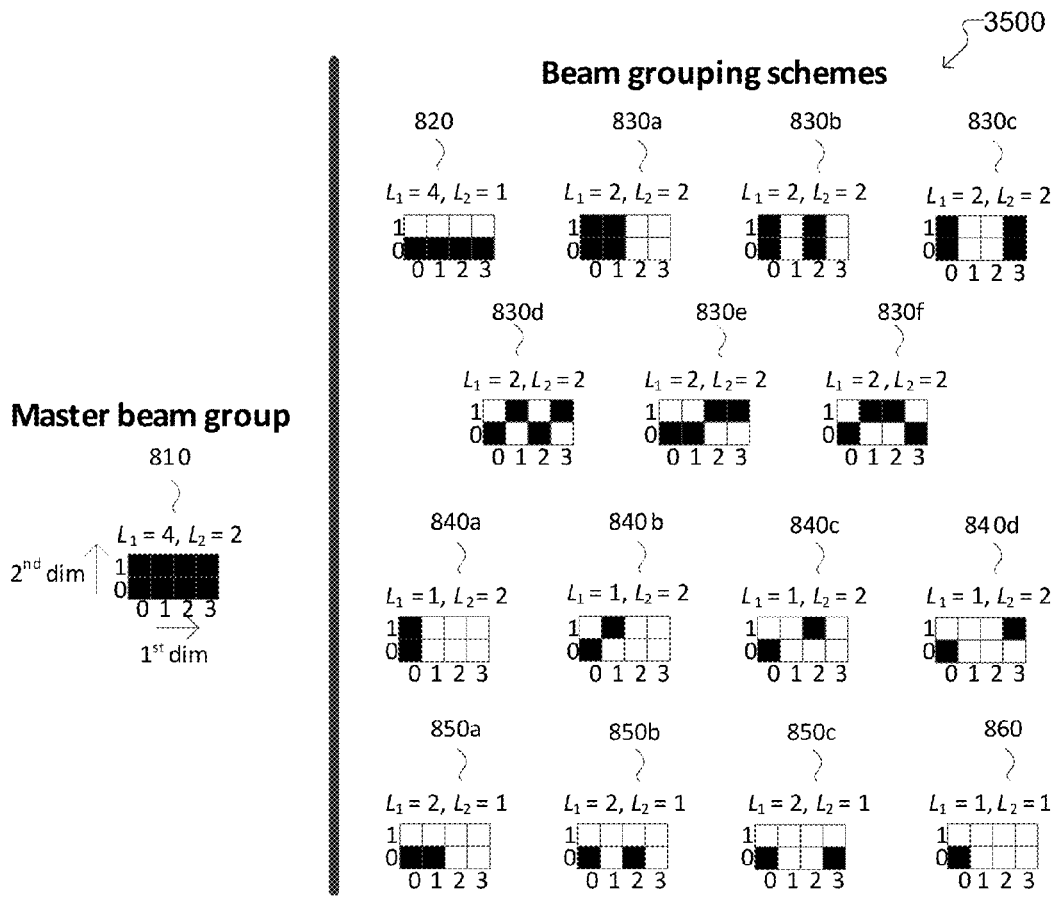
FIG. 35 illustrates alternative rank-1 beam grouping schemes according to some embodiments of the present disclosure.

FIG. 35 illustrates alternative rank-1 beam grouping schemes 3500 according to some embodiments of the present disclosure. The embodiments shown in FIG. 35 are for illustration only. Other embodiments could be used without departing from the scope of the present disclosure.

In the embodiments, depending on the values of parameters $L_1$ and $L_2$, subset restriction on rank-1 $i_2$ indices can be differently applied.

A beam grouping scheme can be configured by means of codebook subset selection (or codebook subsampling) on rank-1 $i_2$ indices e.g., in terms of parameters $L_1$ and $L_2$, with an assumption that the master codebook has rank-1 $i_2$ indices corresponding to 810: $(L_1, L_2)=(4,2)$. In this case, the master codebook for $i_2$ comprises 8 beams, spanned by 4×2 beams in the first and the second dimensions.

In some embodiments, the $1^{st}$ dim and the $2^{nd}$ dim in the figure correspond to $i_{2,1}$ and $i_{2,2}$. The shaded (black) squares represent the rank-1 $i_2$ (or $i_{2,1}$ and $i_{2,2}$) indices that form a beam group and are obtained after subset restriction and the white squares represent the indices that are not included in the beam group.

In the FIG. 35, 820 corresponds to a codebook subset (or a beam group) when $(L_1,L_2)=(4,1)$ is configured and the selected beam group comprises of 4 beams located at $\{(0,0), (1,0), (2,0), (3,0)\}$.

beam grouping schemes 830a-830f correspond to a codebook subset (or a beam group) when $(L_1,L_2)=(2,2)$ is configured and different beam grouping schemes for the 4 selected beams are applied. For instance:

in beam grouping scheme 830a, the 4 beams are located at $\{(0,0), (0,1), (1,0), (1,1)\}$;

in beam grouping scheme 830b, the 4 beams are located at $\{(0,0), (0,2), (1,0), (1,2)\}$;

in beam grouping scheme 830c, the 4 beams are located at $\{(0,0), (0,3), (1,0), (1,3)\}$;

in beam grouping scheme 830d, the 4 beams are located at $\{(0,0), (0,2), (1,1), (1,3)\}$;

in beam grouping scheme 830e, the 4 beams are located at $\{(0,0), (0,1), (1,2), (1,3)\}$; and in beam grouping scheme 830f, the 4 beams are located at $\{(0,0), (0,3), (1,1), (1,2)\}$.

Subset beam grouping schemes 840a-840d correspond to a codebook subset (or a beam group) when $(L_1,L_2)=(1,2)$ is configured and different beam grouping schemes for the 2 selected beams are applied. For instance:

in beam grouping scheme 840a, the 2 beams are located at $\{(0,0), (0,1)\}$;

In beam grouping scheme 840b, the 2 beams are located at $\{(0,0), (1,1)\}$;

In beam grouping scheme 840c, the 2 beams are located at $\{(0,0), (2,1)\}$; and In beam grouping scheme 840d, the 2 beams are located at $\{(0,0), (3,1)\}$.

Subset beam grouping schemes 850a-850c correspond to a codebook subset (or a beam group) when $(L_1,L_2)=(2,1)$ is configured and different beam grouping schemes for the 2 selected beams are applied. For instance:

In beam grouping scheme 850a, the 2 beams are located at $\{(0,0), (1,0)\}$;

In beam grouping scheme 850b, the 2 beams are located at $\{(0,0), (2,0)\}$; and In beam grouping scheme 850c, the 2 beams are located at $\{(0,0), (3,0)\}$.

Beam grouping scheme 860 corresponds to a codebook subset (or a beam group) when $(L_1,L_2)=(1,1)$ is configured and the selected beam is located at (0,0).

The number of rank-1 $i_2$ indices with the subset restriction depends on the beam grouping schemes. For the beam grouping schemes 820-830, it is 16 (4×4, 4 for the beams and 4 for the co-phase), so 4 bits are needed to report $i_2$, for the configured beam grouping scheme from 820-830. For the beam grouping schemes 840-850, it is 8 (2×4, 2 for the beams and 4 for the co-phase), so 3 bits are needed to report $i_2$, for the configured beam grouping scheme from 840-850. For the beam grouping scheme 860, it is 4 (1×4, 1 for the beam and 4 for the co-phase), so 2 bits are needed to report $i_2$, for the configured beam grouping scheme 860.

In one method, for both dimensions, a UE can be configured with pair of numbers of beams in a beam group (i.e., $(L_1, L_2)$), so that the UE can restrict the beam groups as illustrated in FIG. 35. In one example, the UE is configured a beam group (i.e., $(L_1, L_2)$) in the higher-layer according to TABLE 36. For each of $(L_1, L_2)=(2,2), (1,2),$ and $(2,1)$, there are multiple beam grouping schemes as shown in FIG. 35. In one option, one beam grouping scheme out of multiple beam grouping schemes 830-850 is explicitly configured. In another option, it is fixed to default schemes 830a, 840a, and 850a, for example.

TABLE 36

Rank-1 beam group configuration table

| Parameters | Candidate values |
|---|---|
| Number of beams $(L_1, L_2)$ | (4, 1), (2, 2), (1, 2), (2, 1), (1, 1) (Respectively corresponding to 820, 830a, 840a, 850a, 860) |

In another method, a UE can be configured in the higher-layer (RRC) with a beam grouping scheme, selected among a subset of beam grouping schemes 820-860 in FIG. 35. For example, the subset of beam grouping schemes is {820, 830a, 830d, 860} in FIG. 35, and the UE is configured with one beam grouping scheme out of this subset.

In another method, a UE can report a beam grouping scheme, selected among a subset of beam grouping schemes 820-860 in FIG. 35. For example, the subset of beam grouping schemes is {820, 830a, 830d, 860} in FIG. 35, and the UE reports one beam grouping scheme out of this subset.

The motivation for these methods is to support various antenna configurations at the eNB with minimal signaling overhead. This configuration may be applied based on the codebook subset selection in the form of a bit sequence. The bit sequence may consist of at least two bitmaps, one for $i_{1,H}$ and $i_{1,V}$ and the other for $i_2$. The details of the bitmap are provided later in the disclosure.

Codebook Design for Rank 2

In the legacy rank-2 codebook design, dual-pol propagation and azimuth angle spread have been taken into account. In the Rel12 8-Tx rank-2 codebook, rank-2 precoder codebook comprises two types of rank-2 precoding matrices:

Type 1. Same-beam: the two beams for the two layers are the same; and

Type 2. Different-beam: the two beams for the two layers are different.

For each selected beam pair for the two layers, two precoders can be constructed with applying two co-phase matrices of $$\begin{bmatrix} 1 & 1 \\ 1 & -1 \end{bmatrix} \text{ and } \begin{bmatrix} 1 & 1 \\ j & -j \end{bmatrix}$$

Relying on the Kronecker structure, a rank-2 master codebook can be constructed with these two types of rank-2 precoding matrices. For the 2D antenna configurations, the type 2 precoding matrices are further classified into:

Type 2-1. Different-beam in horizontal only: the two beams for the two layers are different for the horizontal component;

Type 2-2. Different-beam in vertical only: the two beams for the two layers are different for the vertical component; and Type 2-2. Different-beam in both horizontal & vertical: the two beams for the two layers are different for both horizontal and vertical components.

TABLE 37

Legacy (Rel12 8-Tx) rank-2 beam index mapping for longer dimension (4 beams)

| | Beam pair index | | | | | | | |
|---|---|---|---|---|---|---|---|---|
| | 0 | 1 | 2 | 3 | 4 | 5 | 6 | 7 |
| (first layer, second layer) | (0, 0) | (1, 1) | (2, 2) | (3, 3) | (0, 1) | (1, 2) | (0, 3) | (1, 3) | table can be selected, e.g., according to T3 and it is assumed that $(L_1, L_2) = (4, 2)$. Also $i_{1,1} = 0, 1, \ldots,$ $$\frac{N_1 O_1}{s_1} - 1$$

and $i_{1,2} = 0, 1, \ldots,$ $$\frac{N_2 O_2}{s_2} - 1.$$

The number of rank-2 $i_2$ indices in the master codebook in TABLE 38 is 32, so 5 bits are needed to report $i_2$ based on this master codebook.

TABLE 38

Master codebook for 2 layer CSI reporting for $(L_1, L_2) = (4, 2)$

| $i_2'$ | 0 | 1 | 2 | 3 |
|---|---|---|---|---|
| Precoder | $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ | $W^{(2)}_{s_1 i_{1,1} + p_1, s_2 i_{1,2}, s_1 i_{1,1} + p_1, s_2 i_{1,2}, 0}$ | $W^{(2)}_{s_1 i_{1,1} + p_1, s_2 i_{1,2}, s_1 i_{1,1} + p_1, s_2 i_{1,2}, 1}$ |
| $i_2'$ | 4 | 5 | 6 | 7 |
| Precoder | $W^{(2)}_{s_1 i_{1,1} + 2p_1, s_2 i_{1,2}, s_1 i_{1,1} + 2p}$ | $W^{(2)}_{s_1 i_{1,1} + 2p_1, s_2 i_{1,2}, s_1 i_{1,1} + 2p_1, s_2 i_{1,2}, 1}$ | $W^{(2)}_{s_1 i_{1,1} + 3p_1, s_2 i_{1,2}, s_1 i_{1,1} + 3p_1, s_2 i_{1,2}, 0}$ | $W^{(2)}_{s_1 i_{1,1} + 3p_1, s_2 i_{1,2}, s_1 i_{1,1} + 3p_1, s_2 i_{1,2}, 1}$ |
| $i_2'$ | 8 | 9 | 10 | 11 |
| Precoder | $W^{(2)}_{s_1 i_{1,1}, s_2 i_{1,2}, s_1 i_{1,1} + p_1, s_2 i_{1,2}}$ | $W^{(2)}_{s_1 i_{1,1}, s_2 i_{1,2}, s_1 i_{1,1} + p_1, s_2 i_{1,2}, 1}$ | $W^{(2)}_{s_1 i_{1,1} + p_1, s_2 i_{1,2}, s_1 i_{1,1} + 2p_1, s_2 i_{1,2}, 0}$ | $W^{(2)}_{s_1 i_{1,1} + p_1, s_2 i_{1,2}, s_1 i_{1,1} + 2p_1, s_2 i_{1,2}, 1}$ |
| $i_2'$ | 12 | 13 | 14 | 15 |
| Precoder | $W^{(2)}_{s_1 i_{1,1}, s_2 i_{1,2}, s_1 i_{1,1} + 3p_1, s_2 i_1}$ | $W^{(2)}_{s_1 i_{1,1}, s_2 i_{1,2}, s_1 i_{1,1} + 3p_1, s_2 i_{1,2}, 1}$ | $W^{(2)}_{s_1 i_{1,1} + p_1, s_2 i_{1,2}, s_1 i_{1,1} + 3p_1, s_2 i_{1,2}, 0}$ | $W^{(2)}_{s_1 i_{1,1} + p_1, s_2 i_{1,2}, s_1 i_{1,1} + 3p_1, s_2 i_{1,2}, 1}$ |
| $i_2'$ | | 16-31 | | |
| Precoder | | Entries 16-31 constructed with replacing the second subscript $s_2 i_{1,2}$ with $s_2 i_{1,2} + p_2$ in entries 0-15. | | |

In some embodiments, TABLE 38 is used as a rank-2 (2 layer) master codebook that can be used for any of Q=12, 16 and 32 antenna configurations, wherein the corresponding rank 2 precoder is $$W^{(2)}_{m_1, m_2, m_1', m_2', n} = \frac{1}{\sqrt{2Q}} \begin{bmatrix} v_{m_1} \otimes u_{m_2} & v_{m_1'} \otimes u_{m_2'} \\ \varphi_n v_{m_1} \otimes u_{m_2} & -\varphi_n v_{m_1'} \otimes u_{m_2'} \end{bmatrix}.$$

Note that in this table, the numbering scheme 2 in FIG. 5 is assumed. The table for numbering scheme 1 can be constructed similarly. In this table, the $1^{st}$ dimension beam index $m_1$ increases first as $i_2$ increases. In an alternate table, the $2^{nd}$ dimension beam index $m_2$ may increase first as $i_2$ increases. Note that the master rank-2 codebook table is constructed based on the legacy (Rel12) rank 2 beam pairs (T8) for the longer dimension ($L_1$=4) for each of the beams in the shorter dimension ($L_2$=2).

In those embodiments related to TABLE 38, and other related embodiments, the parameters $s_1$, $s_2$, $p_1$, and $p_2$ in this In some embodiments, $v_{m_1}$, $v_{m_1'}$, $u_{m_2}$, and $u_{m_2'}$ to comprise a rank-2 precoder $$W^{(2)}_{m_1, m_2, m_1', m_2', n} = \frac{1}{\sqrt{2Q}} \begin{bmatrix} v_{m_1} \otimes u_{m_2} & v_{m_1'} \otimes u_{m_2'} \\ \varphi_n v_{m_1} \otimes u_{m_2} & -\varphi_n v_{m_1'} \otimes u_{m_2'} \end{bmatrix},$$

are differently configured depending on whether beamformed CSI-RS, or non-precoded CSI-RS or both are configured. When the UE is configured with only non-precoded CSI-RS or both types of CSI-RS, then $v_{m_1}$, $v_{m_1'}$, $u_{m_2}$, and $u_{m_2'}$ are DFT vectors of appropriate lengths (depending on numbering scheme 1 or 2) as in rank-1 codebook case, and when the UE is configured with only beamformed CSI-RS, then they are unit vectors of appropriate lengths.

Figure 36:
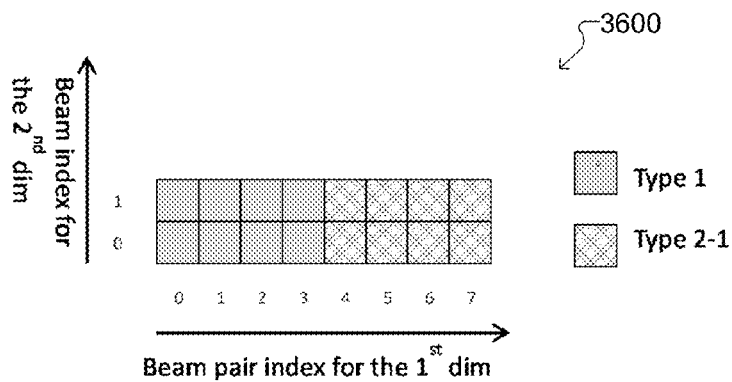
FIG. 36 illustrate a beam combination to construct rank-2 master codebook according to some embodiments of the present disclosure.

FIG. 36 illustrate a beam combination 3600 to construct rank-2 master codebook based on TABLE 37 according to some embodiments of the present disclosure. The embodiment shown in FIG. 36 is for illustration only. Other embodiments could be used without departing from the scope of the present disclosure.

Utilizing the 8 beam pairs in TABLE 37 for the longer dimension ($L_1=4$) and for each beam in the shorter dimension ($L_2=2$), an 8×2 grid can be considered for the two dimensions as shown in FIG. 36. When beam pair indices (x, y) is selected for the $1^{st}$ and $2^{nd}$ dimensions, corresponding beam pairs are selected for the longer dimension, according to TABLE 37. For the shorter dimension, the beam index corresponds to the index y.

For example, applying TABLE 37 to x, with x=1 the selected beam pair for the first dimension is (1,1) and with y=1, the selected beam for the second dimension is 1. Then, the corresponding rank-2 precoding matrix is:

$$W^{(2)}_{m_1,m_2,m'_1,m'_2,n} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix},$$

where $m_1=m_{1'}=s_1 \cdot i_{1,1}+p_1$, and $m_2=m_{2'}=s_2 \cdot i_{1,2}+p_2$.

In general, when the selected beam pair for the first dimension is $(a_0,a_1)$ and the selected beam for the second dimension is $b_0$, the beam indices $m_1$, $m_{1'}$, $m_2$, $m_{2'}$ are selected as:

$m_1=s_1 \cdot i_{1,1}+a_0 \cdot p_1;$ $m_{1'}=s_1 \cdot i_{1,1}+a_1 \cdot p_1;$ and $m_2=m_{2'}=s_2 \cdot i_{1,2}+b_0 \cdot p_2.$ As total number of pairs for (x,y) in FIG. 36 is 16, with applying the two co-phases of {1,j} for $\phi_n$, the total number of codewords becomes 32.

Embodiments on Rank-2 Beam Groupings

Figure 37:
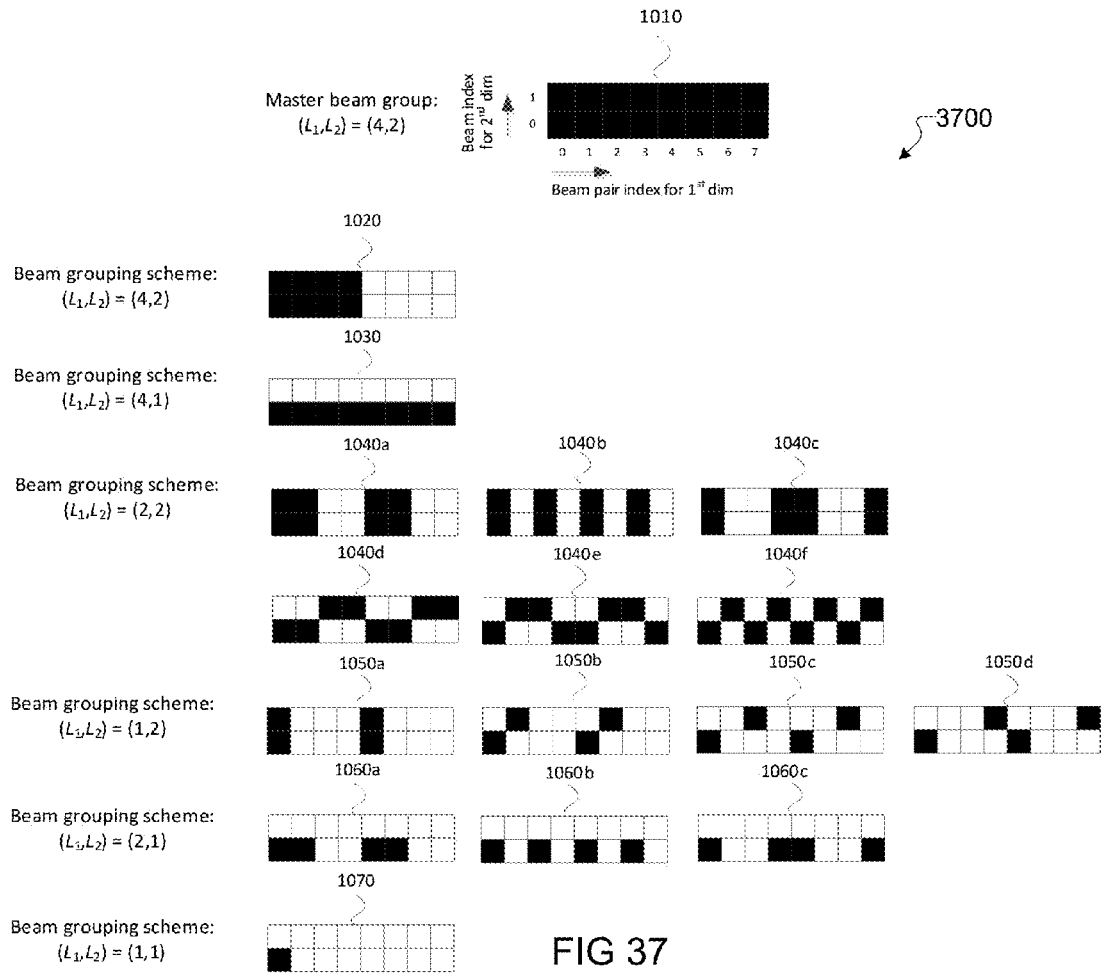
FIG. 37 illustrates rank-2 beam grouping schemes for rank-2 i2 according to some embodiments of the present disclosure.

FIG. 37 illustrates rank-2 beam grouping schemes for rank-2 $i_2$ 3700 according to some embodiments of the present disclosure. The embodiment shown in FIG. 37 is for illustration only. Other embodiments could be used without departing from the scope of the present disclosure.

Depending on the values of parameters $L_1$ and $L_2$, subset restriction on rank-2 $i_2$ indices can be differently applied. In the embodiments, a beam grouping scheme is configured by means of codebook subset selection or codebook subsampling on rank-2 $i_2$ indices e.g., in terms of parameters $L_1$ and $L_2$, with an assumption that the master codebook has rank-2 $i_2$ indices corresponding to 1010: ($L_1$, $L_2$)=(4,2). In this case, the master codebook for $i_2$ comprises 16 rank-2 beam combinations, as shown in FIG. 36 also, which are shown as a 8×2 beam combination grid where 8 corresponds to the number of legacy rank-2 beam pairs for the first dimension ($L_1=4$, see TABLE 37) and 2 corresponds to the 2 beams for the second dimension ($L_2=2$).

In some embodiments, the $1^{st}$ dim and the $2^{nd}$ dim in the figure correspond to $i_{2,1}$ and $i_{2,2}$. The shaded (black) squares represent the rank-2 $i_2$ (or $i_{2,1}$ and $i_{2,2}$) indices that form a beam group and are obtained after subset restriction and the white squares represent the indices that are not included in the beam group.

In the FIG. 37, beam grouping scheme 1020 corresponds to a codebook subset (or a beam group) when ($L_1$,$L_2$)=(4,2) is configured and the selected beam combination comprises of 4 combinations located at{(x,y)} where x={0,1,2,3} and y={0,1}. Note that this corresponds to the case in which the subset restriction is such that in the first dimension, only same beams are allowed to be used for both layers.

Beam grouping scheme 1030 corresponds to a codebook subset (or a beam group) when ($L_1$,$L_2$)=(4,1) is configured and the selected beam combination comprises of 8 combinations located at{(x,0)} where x is according to TABLE 37; and beam grouping schemes 1040a-1040f correspond to a codebook subset (or a beam group) when ($L_1$,$L_2$)=(2,2) is configured and six different beam combinations are applied. For instance:

in beam grouping scheme 1040a, the 8 beam combinations are {(x,y)} where x={0,1,4,5} and y={0,1};

in beam grouping scheme 1040b, the 8 beam combinations are {(x,y)} where x={0,2,4,6} and y={0,1};

in beam grouping scheme 1040c, the 8 beam combinations are {(x,y)} where x={0,3,4,7} and y={0,1};

in beam grouping scheme 1040d, the 8 beam combinations are {(x,0)} where x={0,1,4,5} and {(x,1)} where x={2,3,6,7};

in beam grouping scheme 1040e, the 8 beam combinations are {(x,0)} where x={0,3,4,7} and {(x,1)} where x={1,2,5,6}; and in beam grouping scheme 1040f, the 8 beam combinations are {(x,0)} where x={0,2,4,6} and {(x,1)} where x={1,3,5,7}.

Beam grouping schemes 1050a-1050d correspond to a codebook subset (or a beam group) when ($L_1$,$L_2$)=(1,2) is configured and four different beam combinations are applied. For instance:

in beam grouping scheme 1050a, the 4 beam combinations are {(x,0)} where x={0,4} and {(x,1)} where x={0,4};

in beam grouping scheme 1050b, the 4 beam combinations are {(x,0)} where x={0,4} and {(x,1)} where x={1,5};

in beam grouping scheme 1050c, the 4 beam combinations are {(x,0)} where x={0,4} and {(x,1)} where x={2,6}; and in beam grouping scheme 1050d, the 4 beam combinations are {(x,0)} where x={0,4} and {(x,1)} where x={3,7}.

Beam grouping schemes 1060a-1060c correspond to a codebook subset (or a beam group) when ($L_1$,$L_2$)=(2,1) is configured and four different beam combinations are applied. For instance:

in beam grouping scheme 1060a, the 4 beam combinations are {(x,0)} where x={0,1,4,5};

in beam grouping scheme 1060b, the 4 beam combinations are {(x,0)} where x={0,2,4,6}; and in beam grouping scheme 1060c, the 4 beam combinations are {(x,0)} where x={0,3,4,7}.

Beam grouping scheme 1070 corresponds to a codebook subset (or a beam group) when ($L_1$,$L_2$)=(1,1) is configured and the one beam is located at (0,0).

The number of rank-2 $i_2$ indices with the subset restriction depends on the beam grouping schemes. For the beam grouping schemes 1020-1040, it is 16 (8×2, 4 for the beam combinations and 2 for the co-phase), so 4 bits are needed to report $i_2$, for the configured beam grouping scheme from 1020-1040. For the beam grouping schemes 1050-1060, it is 8 (4×2, 4 for the beam combinations and 2 for the co-phase), so 3 bits are needed to report $i_2$, for the configured beam grouping scheme from 1050-1060. For the beam grouping scheme 1070, it is 2 (1×2, 1 for the beam and 2 for the co-phase), so 1 bit is needed to report $i_2$, for the configured beam grouping scheme 1070.

In one method, for both dimensions, a UE can be configured with pair of numbers of beams in a beam group (i.e., ($L_1$, $L_2$)), so that the UE can restrict the rank-2 beam combinations as illustrated in FIG. 37. In one example, the UE is configured a beam group (i.e., ($L_1$, $L_2$)) in the higher-layer according to TABLE 39. For ($L_1$, $L_2$)=(2,2), (1,2), and (2,1), there are multiple beam grouping schemes. In one option, one beam grouping scheme out of multiple beam grouping schemes is explicitly configured. In another option, it is fixed to default beam grouping schemes 1040a, 1050a, and 1060a, for example.

TABLE 39

Rank-2 beam group configuration table

| Parameters | Candidate values |
|---|---|
| Number of beams ($L_1$, $L_2$) | (4, 2), (4, 1), (2, 2), (1, 2), (2, 1), (1, 1) (Respectively corresponding to 1020, 1030, 1040a, 1050a, 1060a, and 1070) |

In another method, a UE can be configured in the higher-layer (RRC) with a beam grouping scheme, selected among a subset of beam grouping schemes 1020-1070 in FIG. 37. For example, the subset of beam grouping schemes is {1020, 1030, 1040a, 1070} in FIG. 37, and the UE is configured with one beam grouping scheme out of this subset.

In another method, a UE can report a beam grouping scheme, selected among a subset of beam grouping schemes 1020-1070 in FIG. 37. For example, the subset of beam grouping schemes is {1020, 1030, 1040a, 1070} in FIG. 37, and the UE reports one beam grouping scheme out of this subset.

As in rank-1 and rank-2 codebook cases, for the description of rank 3-8 codebooks, numbering scheme 2 is assumed; the method can be straightforwardly modified if numbering scheme 1 is assumed, with placing different u beams on the MIMO layers instead of different v beams in the Kronecker products.

Codebook Design for Rank 3 and Rank 4

In the Rel-12 8-Tx rank-3 codebook, rank-3 precoder codebook comprises beam groups with four pairs of orthogonal beams: (0,8), (2,10), (4,12), and (6,14). One orthogonal beam pair ($b_0$, $b_1$) is selected for the three layers and three precoders can be constructed with applying the co-phase matrix of $$\begin{bmatrix} 1 & 1 & 1 \\ 1 & -1 & -1 \end{bmatrix}$$

on the tuple ($b_0$, $b_0$, $b_1$) and ($b_0$, $b_0$, $b_1$), and the co-phase matrix of $$\begin{bmatrix} 1 & 1 & 1 \\ 1 & 1 & -1 \end{bmatrix}$$

on the tuple ($b_0$, $b_1$, $b_1$) and ($b_0$, $b_1$, $b_0$).

In some embodiments, TABLE 40 is used as a rank-3 (3 layer) master codebook that can be used for any of Q=12, 16 and 32 antenna configurations, wherein the corresponding rank 3 precoder is either $$W^{(3)}_{m_1,m'_1,m''_1,m_2} = \frac{1}{\sqrt{3Q}} \begin{bmatrix} v_{m_1} \otimes u_{m_2} & v_{m'_1} \otimes u_{m_2} & v_{m''_1} \otimes u_{m_2} \\ v_{m_1} \otimes u_{m_2} & -v_{m'_1} \otimes u_{m_2} & -v_{m''_1} \otimes u_{m_2} \end{bmatrix}$$

or $$\tilde{W}^{(3)}_{m_1,m'_1,m''_1,m_2} = \frac{1}{\sqrt{3Q}} \begin{bmatrix} v_{m_1} \otimes u_{m_2} & v_{m'_1} \otimes u_{m_2} & v_{m''_1} \otimes u_{m_2} \\ v_{m_1} \otimes u_{m_2} & v_{m'_1} \otimes u_{m_2} & -v_{m''_1} \otimes u_{m_2} \end{bmatrix}.$$

Note that the master rank-3 codebook table is constructed based on the legacy (Rel12 8-Tx) rank-3 orthogonal beam pairs for the longer dimension ($L_1$=4) for each of the beams in the shorter dimension ($L_1$=2).

The number of rank-2 $i_2$ indices in the master codebook in TABLE 40 is 32, so 5 bits are needed to report $i_2$ based on this master codebook.

In one method, the codebook parameters in the first dimension are legacy parameters, i.e., $s_1$=8, $p_1$=1, and $i_{1,1}$=0-3. In another method, they are non-legacy parameters. The parameters for the second dimension, $s_2$ and $p_2$, in this table can be selected, e.g., according to TABLE 13, and it is assumed that ($L_1$, $L_2$)=(4, 2). Also, $i_{1,2}$=0,1, ... , $$\frac{N_2 O_2}{s_2} - 1.$$

TABLE 40

Master codebook for 3 layer CSI reporting for ($L_1$, $L_2$) = (4, 2)

| $i_2'$ | 0 | 1 | 2 | 3 |
|---|---|---|---|---|
| Precoder | $W^{(3)}_{s_1 i_{1,1}, s_1 i_{1,1}, s_1 i_{1,1}+8, s_2 i_{1,2}}$ | $W^{(3)}_{s_1 i_{1,1}+8, s_1 i_{1,1}, s_1 i_{1,1}+8, s_2 i_{1,2}}$ | $\tilde{W}^{(3)}_{s_1 i_{1,1}, s_1 i_{1,1}+8, s_1 i_{1,1}, s_2 i_{1,2}}$ | $\tilde{W}^{(3)}_{s_1 i_{1,1}, s_1 i_{1,1}+8, s_1 i_{1,1}+8, s_2 i_{1,2}}$ |
| $i_2'$ | 4 | 5 | 6 | 7 |
| Precoder | $W^{(3)}_{s_1 i_{1,1}+2, s_1 i_{1,1}+2, s_1 i_{1,1}+10, s_2 i_{1,2}}$ | $W^{(3)}_{s_1 i_{1,1}+10, s_1 i_{1,1}+2, s_1 i_{1,1}+10, s_2 i_{1,2}}$ | $\tilde{W}^{(3)}_{s_1 i_{1,1}+2, s_1 i_{1,1}+10, s_1 i_{1,1}+2, s_2 i_{1,2}}$ | $\tilde{W}^{(3)}_{s_1 i_{1,1}+2, s_1 i_{1,1}+10, s_1 i_{1,1}+10, s_2 i_{1,2}}$ |
| $i_2'$ | 8 | 9 | 10 | 11 |
| Precoder | $W^{(3)}_{s_1 i_{1,1}+4, s_1 i_{1,1}+4, s_1 i_{1,1}+12, s_2 i_{1,2}}$ | $W^{(3)}_{s_1 i_{1,1}+12, s_1 i_{1,1}+4, s_1 i_{1,1}+12, s_2 i_{1,2}}$ | $\tilde{W}^{(3)}_{s_1 i_{1,1}+4, s_1 i_{1,1}+12, s_1 i_{1,1}+4, s_2 i_{1,2}}$ | $\tilde{W}^{(3)}_{s_1 i_{1,1}+4, s_1 i_{1,1}+12, s_1 i_{1,1}+12, s_2 i_{1,2}}$ |
| $i_2'$ | 12 | 13 | 14 | 15 |
| Precoder | $W^{(3)}_{s_1 i_{1,1}+6, s_1 i_{1,1}+6, s_1 i_{1,1}+14, s_2 i_{1,2}}$ | $W^{(3)}_{s_1 i_{1,1}+14, s_1 i_{1,1}+6, s_1 i_{1,1}+14, s_2 i_{1,2}}$ | $\tilde{W}^{(3)}_{s_1 i_{1,1}+6, s_1 i_{1,1}+14, s_1 i_{1,1}+6, s_2 i_{1,2}}$ | $\tilde{W}^{(3)}_{s_1 i_{1,1}+6, s_1 i_{1,1}+14, s_1 i_{1,1}+14, s_2 i_{1,2}}$ |
| $i_2'$ | 16-31 | | | |
| Precoder | Entries 16-31 constructed with replacing the fourth subscript $s_2 i_{1,2}$ with $s_2 i_{1,2} + p_2$ in entries 0-15. | | | |

In the Rel-10 8-Tx rank-4 codebook, rank-4 precoder codebook comprises beam groups with four pairs of orthogonal beams: (0,8), (2,10), (4,12), and (6,14). One orthogonal beam pair $(b_0,b_1)$ is selected for the four layers and four precoders can be constructed with applying two co-phase matrices of $$\begin{bmatrix} 1 & 1 & 1 & 1 \\ 1 & 1 & -1 & -1 \end{bmatrix} \text{ and } \begin{bmatrix} 1 & 1 & 1 & 1 \\ j & j & -j & -j \end{bmatrix}$$

on the tuple $(b_0,b_1, b_0,b_1)$.

In some embodiments, TABLE 41 is used as a rank-4 (4 layer) master codebook that can be used for any of Q=12, 16 and 32 antenna configurations, wherein the corresponding rank 4 precoder is $$W^{(4)}_{m_1,m'_1,m_2,n} = \frac{1}{\sqrt{4Q}} \begin{bmatrix} v_{m_1} \otimes u_{m_2} & v_{m'_1} \otimes u_{m_2} & v_{m_1} \otimes u_{m_2} & v_{m'_1} \otimes u_{m_2} \\ \varphi_n v_{m_1} \otimes u_{m_2} & \varphi_n v_{m'_1} \otimes u_{m_2} & -\varphi_n v_{m_1} \otimes u_{m_2} & -\varphi_n v_{m'_1} \otimes u_{m_2} \end{bmatrix}.$$

Note that the master rank-4 codebook table is constructed based on the legacy (Rel12 8-Tx) rank-4 orthogonal beam pairs for the longer dimension ($L_1$=4) for each of the beams in the shorter dimension ($L_1$=2).

The number of rank-4 $i_2$ indices in the master codebook in TABLE 41 is 16, so 4 bits are needed to report $i_2$ based on this master codebook.

In one method, the codebook parameters in the first dimension are legacy parameters, i.e., $s_1$=8, $p_1$=1, and $i_{1,1}$=0-3. In another method, they are non-legacy parameters. The parameters for the second dimension, $s_2$ and $p_2$, in this table can be selected, e.g., according to TABLE 13, and it is assumed that $(L_1, L_2)$=(4, 2). Also, $i_{1,2}$=0,1, ... , $$\frac{N_2 O_2}{s_2} - 1.$$

Figure 38:
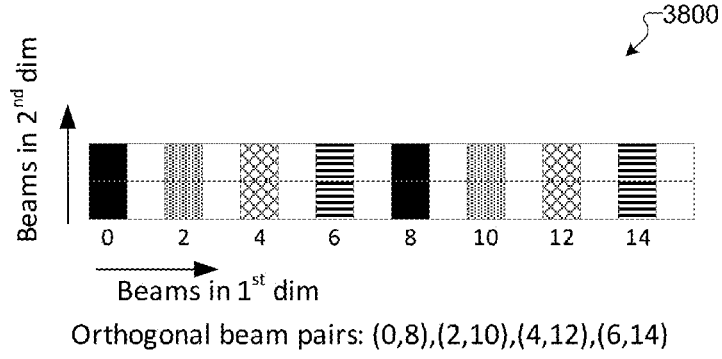
FIG. 38 illustrates a beam combination to construct rank-3 and rank-4 master codebooks according to some embodiments of the present disclosure.

Utilizing the legacy 4 (Rel12 8-Tx) orthogonal beam pairs for the longer dimension ($L_1$=4) and for each beam in the shorter dimension ($L_2$=2), an 8×2 grid can be considered for the two dimensions as shown (shaded and pattern squares) in FIG. 38. There are four types of shaded and pattern squares corresponding to the four orthogonal beam pairs in the first dimension. In the rest of the disclosure, we indicate the four orthogonal beam pairs in a beam group by their leading beams {0,2,4,6}. When the beam combination indices (x, y) where x={0,2,4,6} and y={0,1} is selected for the $1^{st}$ and $2^{nd}$ dimensions, the orthogonal beam pair with the leading beam x is selected for the longer dimension and the beam index y is selected for the shorter dimension.

FIG. 39 illustrates grouping schemes 3900 for rank-3 and rank-4 $i_2$ according to some embodiments of the present disclosure. The embodiment shown in FIG. 39 is for illustration only. Other embodiments could be used without departing from the scope of the present disclosure.

Depending on the values of parameters $L_1$ and $L_2$, subset restriction on rank-3 and rank-4 $i_2$ indices can be differently applied. In some embodiments, a beam grouping scheme is configured by means of codebook subset selection or codebook subsampling on rank-3 and rank-4 $i_2$ e.g., indices in terms of parameters $L_1$ and $L_2$, with an assumption that the master codebook has rank-3 and rank-4 $i_2$ indices corresponding to 1210: $(L_1, L_2)$=(4,2). In this case, the master codebook for $i_2$ comprises 16 rank-3 and 8 rank-4 beam combinations, which are constructed from the 8×2 (shaded and pattern squares) beam combination grid where 8 corresponds to the four orthogonal beam pairs for the first dimension ($L_1$=4) and 2 corresponds to the 2 beams for the second dimension ($L_2$=2).

In some embodiments, the $1^{st}$ dim and the $2^{nd}$ dim in the figure corresponds to $i_{2,1}$ and $i_{2,2}$. The shaded or pattern squares represent the rank-3 and rank-4 $i_2$ (or $i_{2,1}$ and $i_{2,2}$) indices that form a beam group and are obtained after subset restriction and the white squares represent the indices that are not included in the beam group. In the figure, only one half (i.e., leading beam indices {0,2,4,6} of the four orthogonal beam pairs) are shown. The second half is identical to the first half.

As shown in FIG. 39, element 1220 corresponds to a codebook subset (or a beam group) when $(L_1,L_2)$=(4,1) is configured and the selected beam combination comprises of 4 beam combinations located at {(x,0)} where x={0,2,4,6} is the leading beam indices of the four orthogonal beam pairs.

Beam grouping schemes 1230a-1230f correspond to a codebook subset (or a beam group) when $(L_1,L_2)$=(2,2) is configured and six different beam combinations are applied. For instance:

Embodiments on Rank-3 and Rank-4 Beam Grouping

FIG. 38 illustrates beam pairs 3800 to construct rank-3 and rank-4 master codebooks according to some embodiments of the present disclosure. The embodiment shown in FIG. 387 is for illustration only. Other embodiments could be used without departing from the scope of the present disclosure.

TABLE 41

Master codebook for 4 layer CSI reporting for $(L_1, L_2)$ = (4, 2)

| $i_2'$ | 0 | 1 | 2 | 3 |
|---|---|---|---|---|
| Precoder | $W^{(4)}_{s_1 i_{1,1}, s_1 i_{1,1}+8, s_2 i_{1,2}, 0}$ | $W^{(4)}_{s_1 i_{1,1}, s_1 i_{1,1}+8, s_2 i_{1,2}, 1}$ | $W^{(4)}_{s_1 i_{1,1}+2, s_1 i_{1,1}+10, s_2 i_{1,2}, 0}$ | $W^{(4)}_{s_1 i_{1,1}+2, s_1 i_{1,1}+10, s_2 i_{1,2}, 1}$ |
| $i_2'$ | 4 | 5 | 6 | 7 |
| Precoder | $W^{(4)}_{s_1 i_{1,1}+4, s_1 i_{1,1}+12, s_2 i_{1,2}, 0}$ | $W^{(4)}_{s_1 i_{1,1}+4, s_1 i_{1,1}+12, s_2 i_{1,2}, 1}$ | $W^{(4)}_{s_1 i_{1,1}+6, s_1 i_{1,1}+14, s_2 i_{1,2}, 0}$ | $W^{(4)}_{s_1 i_{1,1}+6, s_1 i_{1,1}+14, s_2 i_{1,2}, 1}$ |
| $i_2'$ | 8-15 | | | |
| Precoder | Entries 8-15 constructed with replacing the second subscript $s_2 i_{1,2}$ with $s_2 i_{1,2} + p_2$ in entries 0-7. | | | | in beam grouping scheme 1230a, the 4 beam combinations are {(x,y)} where x={0,2} and y={0,1};

in beam grouping scheme 1230b, the 4 beam combinations are {(x,y)} where x={0,4} and y={0,1};

in beam grouping scheme 1230c, the 4 beam combinations are {(x,y)} where x={0,6} and y={0,1};

in beam grouping scheme 1230d, the 4 beam combinations are {(x,0)} where x={0,4} and {(x,1)} where x={2,6};

in beam grouping scheme 1230e, the 4 beam combinations are {(x,0)} where x={0,6} and {(x,1)} where x={2,4}; and in 1280f, the 4 beam combinations are {(x,0)} where x={0,2} and {(x,1)} where x={4,6}.

Beam grouping schemes 1240a-1240d correspond to a codebook subset (or a beam group) when $(L_1, L_2) = (1,2)$ is configured and four different beam combinations are applied. For instance: in beam grouping scheme 1240a, the 2 beam combinations {(0,0), (0,1)};

in beam grouping scheme 1240b, the 2 beam combinations are {(0,0), (2,1)};

in beam grouping scheme 1240c, the 2 beam combinations are {(0,0), (4,1)}; and in beam grouping scheme 1240d, the 2 beam combinations are {(0,0), (6,1)}.

Beam grouping schemes 1250a-1250c correspond to a codebook subset (or a beam group) when $(L_1, L_2) = (2,1)$ is configured and three different beam combinations are applied. For instance, in beam grouping scheme 1250a, the 2 beam combinations are {(x,0)} where x={0,2};

in beam grouping scheme 1250b, the 2 beam combinations are {(x,0)} where x={0,4}; and in beam grouping scheme 1250c, the 2 beam combinations are {(x,0)} where x={0,6}.

Beam grouping scheme 1260 corresponds to a codebook subset (or a beam group) when $(L_1, L_2) = (1,1)$ is configured and the one beam combination is located at (0,0).

The number of rank 3-4 $i_2$ indices with the subset restriction depends on the beam grouping schemes. For the beam grouping schemes 1220-1230, it is 16 and 8, respectively for rank 3 and 4. So, 4 bits and 3 bits are needed to report $i_2$ for each configured beam grouping scheme from 1220-1230 for rank-3 and rank-4, respectively. For the beam grouping schemes 1240-1250, it is 8 and 4, respectively for rank 3 and 4. So, 3 bits and 2 bits are needed to report $i_2$ for each configured beam grouping scheme from 1240-1240 for rank-3 and rank-4, respectively. For the beam grouping scheme 1260, it is 2 and 1, respectively for rank 3 and 4. So, 1 bits and 0 bit are needed to report $i_2$ for the configured beam grouping scheme 1260 for rank-3 and rank-4, respectively.

In one method, for both dimensions, a UE can be configured with pair of numbers of beams in a beam group (i.e., $(L_1, L_2)$), so that the UE can restrict the rank-3 and rank-4 beam combinations as illustrated in FIG. 39. In one example, the UE is configured a beam group (i.e., $(L_1, L_2)$) in the higher-layer according to TABLE 42. For $(L_1, L_2) = (2,2)$, (1,2), and (2,1), there are multiple grouping schemes. In one option, one beam grouping scheme out of multiple beam grouping schemes is explicitly configured. In another option, it is fixed to default beam grouping schemes 1230a, 1240a, and 1250a, for example.

TABLE 42

Rank-3 and rank-4 beam group configuration table

| Parameters | Candidate values |
| --- | --- |
| Number of beams $(L_1, L_2)$ | (4, 1), (2, 2), (1, 2), (2, 1), (1, 1) (Respectively corresponding to 1220, 1230a, 1240a, 1250a. and 1260) |

In another method, a UE can be configured in the higher-layer (RRC) with a beam grouping scheme, selected among a subset of beam grouping schemes 1220-1260 in FIG. 39. For example, the subset of beam grouping schemes is {1220, 1230a, 1260} in FIG. 39, and the UE is configured with one beam grouping scheme out of this subset.

In another method, a UE can report a beam grouping scheme, selected among a subset of beam grouping schemes 1220-1260 in FIG. 39. For example, the subset of beam grouping schemes is {{1220, 1230a, 1260} in FIG. 39, and the UE reports one beam grouping scheme out of this subset.

Codebook Design for Ranks 5-8

In the Rel-12 8-Tx rank-5 codebook, the precoder codebook comprises beam groups with an orthogonal beams $(b_0, b_1, b_2) = (0,8,16)$ for rank 5 and 6 and $(b_0, b_1, b_2, b_3) = (0,8,16,24)$ for rank 7 and 8. The rank-5 and rank-6 precoders can be constructed with applying the co-phase matrix of $$\begin{bmatrix} 1 & 1 & 1 & 1 & 1 \\ 1 & -1 & 1 & -1 & 1 \end{bmatrix} \text{ and } \begin{bmatrix} 1 & 1 & 1 & 1 & 1 & 1 \\ 1 & -1 & 1 & -1 & 1 & -1 \end{bmatrix}$$

on the tuple $(b_0, b_0, b_1, b_1, b_2)$ and $(b_0, b_0, b_1, b_1, b_2, b_2)$, respectively. The rank 7 and rank 8 pre-coders are similarly constructed by including the fourth orthogonal beam 24.

In some embodiments, TABLE 43 is used as a rank-r (r layer) where r={5,6,7,8} master codebook that can be used for any of Q=12, 16 and 32 antenna configurations, wherein the corresponding rank-5 precoder is:

$$W_{m_1,m_2}^{(5)} = \frac{1}{\sqrt{5Q}} \begin{bmatrix} v_{m_1} \otimes u_{m_2} & v_{m_1} \otimes u_{m_2} & v_{m_1+8} \otimes u_{m_2} & v_{m_1+8} \otimes u_{m_2} & v_{m_1+16} \otimes u_{m_2} \\ v_{m_1} \otimes u_{m_2} & -v_{m_1} \otimes u_{m_2} & v_{m_1+8} \otimes u_{m_2} & -v_{m_1+8} \otimes u_{m_2} & v_{m_1+16} \otimes u_{m_2} \end{bmatrix},$$

the corresponding rank-6 precoder is:

$$W_{m_1,m_2}^{(6)} = \frac{1}{\sqrt{6Q}} \begin{bmatrix} v_{m_1} \otimes u_{m_2} & v_{m_1} \otimes u_{m_2} & v_{m_1+8} \otimes u_{m_2} & v_{m_1+8} \otimes u_{m_2} & v_{m_1+16} \otimes u_{m_2} & v_{m_1+16} \otimes u_{m_2} \\ v_{m_1} \otimes u_{m_2} & -v_{m_1} \otimes u_{m_2} & v_{m_1+8} \otimes u_{m_2} & -v_{m_1+8} \otimes u_{m_2} & v_{m_1+16} \otimes u_{m_2} & -v_{m_1+16} \otimes u_{m_2} \end{bmatrix},$$

the corresponding rank-7 precoder is:

$$W^{(7)}_{m_1,m_2} = \frac{1}{\sqrt{7Q}} \begin{bmatrix} v_{m_1} \otimes u_{m_2} & v_{m_1} \otimes u_{m_2} & v_{m_1+8} \otimes u_{m_2} & v_{m_1+8} \otimes u_{m_2} & v_{m_1+16} \otimes u_{m_2} & v_{m_1+16} \otimes u_{m_2} & v_{m_1+24} \otimes u_{m_2} \\ v_{m_1} \otimes u_{m_2} & -v_{m_1} \otimes u_{m_2} & v_{m_1+8} \otimes u_{m_2} & -v_{m_1+8} \otimes u_{m_2} & v_{m_1+16} \otimes u_{m_2} & -v_{m_1+16} \otimes u_{m_2} & v_{m_1+24} \otimes u_{m_2} \end{bmatrix},$$

and the corresponding rank-8 precoder is:

$$W^{(8)}_{m_1,m_2} =$$

$$\frac{1}{\sqrt{8Q}} \begin{bmatrix} v_{m_1} \otimes u_{m_2} & v_{m_1} \otimes u_{m_2} & v_{m_1+8} \otimes u_{m_2} & v_{m_1+8} \otimes u_{m_2} & v_{m_1+16} \otimes u_{m_2} & v_{m_1+16} \otimes u_{m_2} & v_{m_1+24} \otimes u_{m_2} & v_{m_1+24} \otimes u_{m_2} \\ v_{m_1} \otimes u_{m_2} & -v_{m_1} \otimes u_{m_2} & v_{m_1+8} \otimes u_{m_2} & -v_{m_1+8} \otimes u_{m_2} & v_{m_1+16} \otimes u_{m_2} & -v_{m_1+16} \otimes u_{m_2} & v_{m_1+24} \otimes u_{m_2} & -v_{m_1+24} \otimes u_{m_2} \end{bmatrix}.$$

TABLE 43

Master codebook for r = {5, 6, 7, 8} layer CSI reporting for $(L_1, L_2) = (4, 2)$

| $i_2'$ | 0 | 1 |
|---|---|---|
| Precoder | $W^{(r)}_{s_1 i_{1,1}, s_2 i_{1,2}}$ | $W^{(r)}_{s_1 i_{1,1}, s_2 i_{1,2}+p_2}$ |

Note that the master rank 5-8 codebook tables are constructed based on the legacy (Rel12 8-Tx) rank 5-8 orthogonal beams for the longer dimension ($L_1$=4) for each of the beams in the shorter dimension ($L_1$=2). In one method, the codebook parameters in the first dimension are legacy parameters, i.e., $s_1$=2, $p_1$=1, and $i_{1,1}$=0-3 for rank 5-7 and $i_{1,1}$=0 for rank 8. In another method, they are non-legacy parameters. The parameters for the second dimension, $s_2$ and $p_2$, in this table can be selected, e.g., according to TABLE 13, and it is assumed that $(L_1, L_2) = (4, 2)$. Also, $i_{1,2} = 0, 1, \ldots,$ $$\frac{N_2 O_2}{s_2} - 1.$$

The number of rank 5-8 $i_2$ indices in the master codebook in TABLE 43 is 2, so 1 bit is needed to report $i_2$ based on this master codebook.

Ranks 5-8 Beam Grouping

Figure 40:
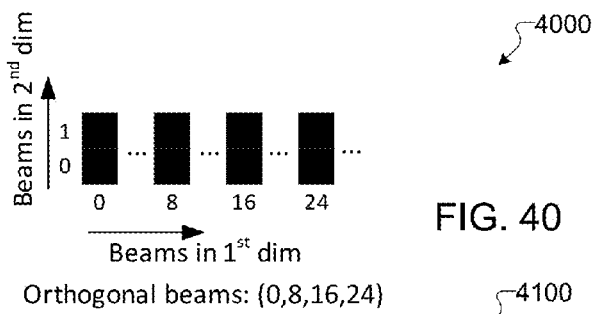
FIG. 40 illustrates a beam combination to construct rank 5-8 beam combination master codebooks according to some embodiments of the present disclosure.

FIG. 40 illustrates beam pairs 4000 to construct rank 5-8 beam combination master codebooks according to some embodiments of the present disclosure. The embodiment shown in FIG. 40 is for illustration only. Other embodiments could be used without departing from the scope of the present disclosure.

Utilizing the legacy 3 (4) orthogonal beams (0,8,16) ((0,8,16,24)) for rank 5-6 (rank 7-8) for the longer dimension ($L_1$=4) and for each beam in the shorter dimension ($L_2$=2), an 3×2 (4×2) grid can be considered for the two dimensions as shown (shaded squares) in FIG. 40.

Figure 41:
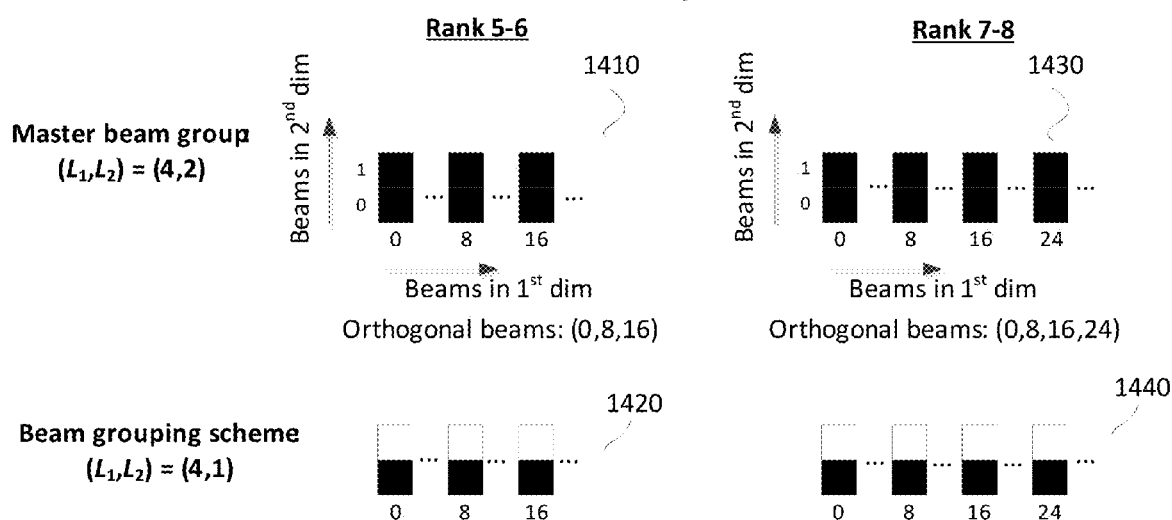
FIG. 41 illustrates grouping schemes for rank 5-8 i2 according to some embodiments of the present disclosure.

FIG. 41 illustrates grouping schemes 4100 for rank 5-8 $i_2$ according to some embodiments of the present disclosure. The embodiment shown in FIG. 41 is for illustration only. Other embodiments could be used without departing from the scope of the present disclosure.

Depending on the values of parameters $L_1$ and $L_2$, subset restriction on rank 5-8 $i_2$ indices can be applied. In the embodiments, a beam grouping scheme is configured by means of codebook subset selection or codebook subsampling on rank 5-8 $i_2$ e.g., indices in terms of parameters $L_1$ and $L_2$, with an assumption that the master codebook has rank 5-8 $i_2$ indices corresponding to 1410 (rank 5-6) and 1430 (rank 7-8): $(L_1, L_2) = (4,2)$. The shaded (black) squares represent the rank 5-8 $i_2$ (or $i_{2,1}$ and $i_{2,2}$) indices that form a beam group and are obtained after subset restriction and the white squares represent the indices that are not included in the beam group. As shown, 1420 and 1440 correspond to a codebook subset (or a beam group) when $(L_1, L_2) = (4,1)$ is configured. Note that no $i_2$ indication is needed whenever subset restriction is configured.

In some embodiments, the number of $i_2$ indices (W2 codebook size) of the master codebook and the codebooks that are obtained according to the W2 beam grouping schemes (or after codebook subset selection (CSS)) according to some embodiments of this disclosure can be summarized as in TABLE 44. It can be observed that a reduction of 1 bit in W2 feedback can be achieved with the proposed W2 beam grouping scheme (or CSS) compared to the master codebook.

TABLE 44

Summary of the number of $i_2$ indices (W$_2$ codebook size) and number of bits to report $i_2$

| Number of layers (rank) | Number of $i_2$ indices in master W2 codebook (number of bits) $(L_1, L_2) = (4, 2)$ | Number of $i_2$ indices according to the proposed beam grouping schemes (or after CSS) (number of bits) | | |
|---|---|---|---|---|
| | | $(L_1, L_2) = (4, 1),$ or $(2, 2)$ | $(L_1, L_2) = (1, 2)$ or $(2, 1)$ | $(L_1, L_2) = (1, 1)$ |
| 1 | 32 (5 bits) | 16 (4 bits) | 8 (3 bits) | 4 (2 bits) |
| 2 | 32 (5 bits) | 16 (4 bits) | 8 (3 bits) | 2 (1 bit) |
| 3 | 32 (5 bits) | 16 (4 bits) | 8 (3 bits) | 2 (1 bit) |
| 4 | 16 (4 bits) | 8 (3 bits) | 4 (2 bits) | 1 (0 bit) |
| 5-8 | 2 (1 bit) | 1 (0 bit) | 1 (0 bit) | 1 (0 bit) |

Embodiments on Different Beams in One or Both of the Longer and Shorter Dimensions In some embodiments, TABLE 44 is used to construct the beam pairs in the shorter dimension ($L_2$=2) for the rank-2 master codebook.

TABLE 45

Legacy 2-Tx rank-2 beam pairs for shorter dimension ($L_2$ = 2)

| | Beam pair index | | |
|---|---|---|---|
| | 0 | 1 | 2 |
| (first layer, second layer) | (0, 0) | (1, 1) | (0, 1) |

Rank-2 Codebook

In some embodiments, TABLE 46 is used as a rank-2 (2 layer) master codebook that can be used for any of Q=12, 16 and 32 antenna configurations, wherein TABLE 37 and TABLE 45, respectively are used for the beam pairs in the longer and the shorter dimensions to construct the master rank-2 codebook. The $i_2$ indices 0-31 are identical to those in TABLE 38 (i.e., rank-2 beam pair Type 1, and Type 2-1). In addition to those, $i_2$ indices 32-47 are corresponding to rank-2 beam pair Type 2-2 and 2-3.

It is noted that the number of rank-2 $i_2$ indices in the master codebook in TABLE 46 is 48.

Rank-2 Beam Groupings

Figure 43:
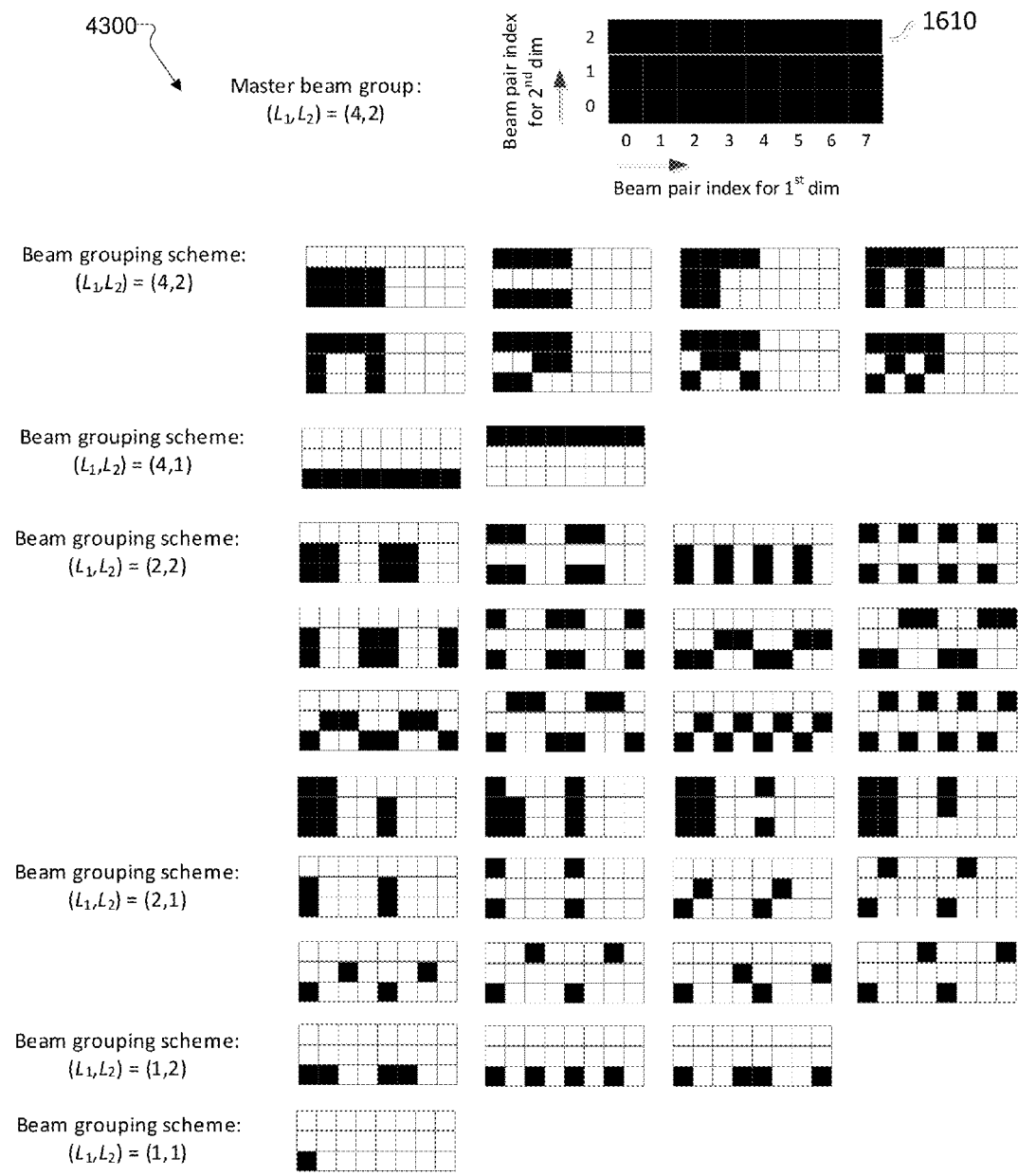
FIG. 43 illustrates rank-2 beam grouping schemes according to some embodiments of the present disclosure.

FIG. 43 illustrates rank-2 beam grouping schemes 4300 according to some embodiments of the present disclosure. The embodiment shown in FIG. 43 is for illustration only. Other embodiments could be used without departing from the scope of the present disclosure.

Depending on the values of parameters $L_1$ and $L_2$, subset restriction on rank-2 $i_2$ indices can be differently applied. In the embodiments, a beam grouping scheme is configured by means of codebook subset selection or codebook subsampling on rank-2 $i_2$ e.g., indices in terms of parameters $L_1$ and $L_2$, with an assumption that the master codebook has rank-2

TABLE 46

Master codebook for 2 layer CSI reporting for $(L_1, L_2) = (4, 2)$

| $i_2'$ | 0-31 |
|---|---|
| | Entries 0-31 are identical to those in TABLE 38. |

| $i_2'$ | 32 | 33 | 34 | 35 |
|---|---|---|---|---|
| | $W^{(2)}_{s_1 i_{1,1}, s_2 i_{1,2}, s_1 i_{1,1}, s_2 i_{1,2}+p_2, 0}$ | $W^{(2)}_{s_1 i_{1,1}, s_2 i_{1,2}, s_1 i_{1,1}, s_2 i_{1,2}+p_2, 1}$ | $W^{(2)}_{s_1 i_{1,1}+p_1, s_2 i_{1,2}, s_1 i_{1,1}+p_1, s_2 i_{1,2}+p_2, 0}$ | $W^{(2)}_{s_1 i_{1,1}+p_1, s_2 i_{1,2}, s_1 i_{1,1}+p_1, s_2 i_{1,2}+p_2, 1}$ |

| $i_2'$ | 36 | 37 | 38 | 39 |
|---|---|---|---|---|
| | $W^{(2)}_{s_1 i_{1,1}+2p_1, s_2 i_{1,2}, s_1 i_{1,1}+2p_1, s_2 i_{1,2}+p_2, 0}$ | $W^{(2)}_{s_1 i_{1,1}+2p_1, s_2 i_{1,2}, s_1 i_{1,1}+2p_1, s_2 i_{1,2}+p_2, 1}$ | $W^{(2)}_{s_1 i_{1,1}+3p_1, s_2 i_{1,2}, s_1 i_{1,1}+3p_1, s_2 i_{1,2}+p_2, 0}$ | $W^{(2)}_{s_1 i_{1,1}+3p_1, s_2 i_{1,2}, s_1 i_{1,1}+3p_1, s_2 i_{1,2}+p_2, 1}$ |

| $i_2'$ | 40 | 41 | 42 | 43 |
|---|---|---|---|---|
| | $W^{(2)}_{s_1 i_{1,1}, s_2 i_{1,2}, s_1 i_{1,1}+p_1, s_2 i_{1,2}+p_2, 0}$ | $W^{(2)}_{s_1 i_{1,1}, s_2 i_{1,2}, s_1 i_{1,1}+p_1, s_2 i_{1,2}+p_2, 1}$ | $W^{(2)}_{s_1 i_{1,1}+p_1, s_2 i_{1,2}, s_1 i_{1,1}+2p_1, s_2 i_{1,2}+p_2, 0}$ | $W^{(2)}_{s_1 i_{1,1}+p_1, s_2 i_{1,2}, s_1 i_{1,1}+2p_1, s_2 i_{1,2}+p_2, 1}$ |

| $i_2'$ | 44 | 45 | 46 | 47 |
|---|---|---|---|---|
| | $W^{(2)}_{s_1 i_{1,1}, s_2 i_{1,2}, s_1 i_{1,1}+p_3, s_2 i_{1,2}+p_2, 0}$ | $W^{(2)}_{s_1 i_{1,1}, s_2 i_{1,2}, s_1 i_{1,1}+p_3, s_2 i_{1,2}+p_2, 1}$ | $W^{(2)}_{s_1 i_{1,1}+p_1, s_2 i_{1,2}, s_1 i_{1,1}+3p_1, s_2 i_{1,2}+p_2, 0}$ | $W^{(2)}_{s_1 i_{1,1}+p_1, s_2 i_{1,2}, s_1 i_{1,1}+3p_1, s_2 i_{1,2}+p_2, 1}$ |

Figure 42:
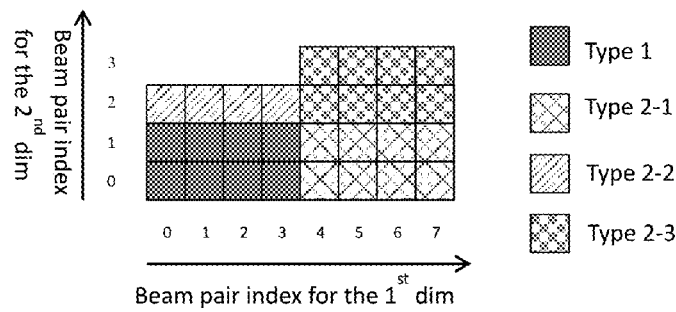
FIG. 42 illustrate a beam combination to construct a master codebook for rank-2 beam combinations according to embodiments of the present disclosure.

FIG. 42 illustrate a beam combination 4200 to construct a master codebook for rank-2 beam combinations according to TABLE 37 and TABLE 45 according to embodiments of the present disclosure. The embodiment shown in FIG. 42 is for illustration only. Other embodiments could be used without departing from the scope of the present disclosure.

Utilizing the 8 beam pairs in TABLE 37 for the longer dimension ($L_1$=4) and the 3 beam pairs in TABLE 45 for the shorter dimension ($L_2$=2), an 8×3 grid can be considered for the two dimensions as shown in FIG. 42. When beam pair indices (x, y) is selected for the $1^{st}$ and $2^{nd}$ dimensions, corresponding beam pairs are selected for the longer and the shorter dimension, according to TABLE 37 and TABLE 45, respectively.

For example, applying TABLE 37 to x and TABLE 45 to y, with x=1 the selected beam pair for the first dimension is (1,1) and with y=2, the selected beam pair for the second dimension is (0,1). Then, the corresponding rank-2 precoding matrix is:

$$W^{(2)}_{m_1, m_2, m_1', m_2', n} = \frac{1}{\sqrt{2Q}} \begin{bmatrix} v_{m_1} \otimes u_{m_2} & v_{m_1'} \otimes u_{m_2'} \\ \varphi_n v_{m_1} \otimes u_{m_2} & -\varphi_n v_{m_1'} \otimes u_{m_2'} \end{bmatrix},$$

where: $m_1 = m_1' = s_1 \cdot s_1 \cdot i_{1,1} + p_1$; $m_2 = s_2 \cdot i_{1,2}$; and $m_2' = s_2 \cdot i_{1,2} + p_2$.

In general, when the selected beam pair for the first dimension is $(a_0, a_1)$ and the selected beam pair for the second dimension is $(b_0, b_1)$, the beam indices $m_1$, $m_1'$, $m_2$, $m_2'$ are selected as: $m_1 = s_1 \cdot i_{1,1} + a_0 \cdot p_1$; $m_1' = s_1 \cdot i_{1,1} + a_1 \cdot p_1$; $m_2 = s_2 \cdot i_{1,2} + b_0 \cdot p_2$; and $m_2' = s_2 \cdot i_{1,2} + a_1 \cdot p_2$.

As total number of pairs for (x,y) in FIG. 42 is 24, with applying the two co-phases of $\{1, j\}$ for $\phi_n$, total number of codewords becomes 48.

$i_2$ indices corresponding to 1610: $(L_1, L_2) = (4,2)$. In this case, the master codebook for $i_2$ comprises 24 rank-2 beam combinations, as shown in FIG. 43 also, which are shown as a 8×3 beam combination grid where 8 corresponds to the number of legacy rank-2 beam pairs for the first dimension ($L_1$=4, see TABLE 37) and 3 corresponds to the rank-2 beam pairs for the second dimension ($L_2$=2, see TABLE 45).

In some embodiments, the $1^{st}$ dim and the $2^{nd}$ dim in the figure correspond to $i_{2,1}$ and $i_{2,2}$. The shaded (black) squares represent the rank-2 $i_2$ (or $i_{2,1}$ and $i_{2,2}$) indices that form a beam group and are obtained after subset restriction and the white squares represent the indices that are not included in the beam group.

The number of rank-2 $i_2$ indices with the subset restriction depends on the beam grouping schemes. For example, for the beam grouping schemes with $(L_1, L_2)=(4,1)$ and $(2,2)$, it is 16, so 4 bits are needed to report $i_2$, for each configured beam grouping scheme.

In one method, for both dimensions, a UE can be configured with pair of numbers of beams in a beam group (i.e., $(L_1, L_2)$), so that the UE can restrict the rank-2 beam combinations as illustrated in FIG. 43 16 In one example, the UE is configured a beam group (i.e., $(L_1, L_2)$) in the higher-layer according to a configuration table. For $(L_1, L_2)=(2,2)$, $(2,1)$, and $(1,2)$, there are multiple beam groups. In one option, one beam group out of multiple beam groups is explicitly configured. In another option, it is fixed to a default beam group.

In another method, a UE can be configured in the higher-layer (RRC) with a beam grouping scheme, selected among a subset of beam grouping schemes in FIG. 43.

In another method, a UE can report a beam grouping scheme, selected among a subset of beam grouping schemes in FIG. 43.

In some embodiments, the beam grouping (or subset restriction) is applied based on the configured rank-2 beam pair type. For instance, the UE may be configured by the higher layer signaling about the rank-2 beam pair type according to TABLE 47.

TABLE 47

Rank-2 beam pair type configuration table

| Configuration | Rank-2 beam pair type |
|---|---|
| 0-4 | Type 1, (Type 1, Type 2-1), (Type 1, Type 2-2), (Type 1, Type 2-1,Type 2-2), (Type 1, Type 2-1, Type 2-2, Type 2-3), |

In some embodiments, the beam grouping (or subset restriction) is applied based on the dimension indicator I for different beams for the two layers. For instance, the UE is configured by the higher layer signaling about the dimension indicator I for different beams for the two layers according to TABLE 48, where I={0} indicates the same beam for the two layers is configured in both dimensions.

TABLE 48

Dimension for different beam configuration table

| Configuration | Dimension indicator for different beam I |
|---|---|
| 0-3 | {0}, {1}, {2}, {1, 2} |

Rank 3-4 Codebook

TABLE 49 and TABLE 50 are used as a rank-3 and rank-4 master codebook that can be used for any of Q=12, 16 and 32 antenna configurations, wherein TABLE 45 is used for the beam pairs in the shorter dimension to construct the master codebook. In rank-3 codebook, the $i_2$ indices 0-31 are identical to those in TABLE 40. In addition to those, $i_2$ indices 32-47 are corresponding to the different beam pair (0,1) in the shorter dimension ($L_2=2$). The rank-4 table is constructed similarly.

Note that the number of $i_2$ indices in the rank-3 master codebook in TABLE 49 is 48, and that in the rank-4 master codebook is 24.

TABLE 49

Master codebook for 3 layer CSI reporting for $(L_1, L_2) = (4, 2)$

| $i_2'$ | 0-31 |
|---|---|
| Precoder | Entries 0-31 are identical to those in TABLE 40. |
| $i_2'$ | 32-47 |
| Precoder | Entries 32-47 constructed with replacing the second subscript $s_2 i_{1,2}$ with $s_2 i_{1,2} + p_2$ in entries 0-15. |

TABLE 50

Master codebook for 4 layer CSI reporting for $(L_1, L_2) = (4, 2)$

| $i_2'$ | 0-15 |
|---|---|
| Precoder | Entries 0-15 are identical to those in TABLE 41. |
| $i_2'$ | 16-23 |
| Precoder | Entries 16-23 constructed with replacing the second subscript $s_2 i_{1,2}$ with $s_2 i_{1,2} + p_2$ in entries 0-7. |

Rank-3 and Rank-4 Beam Groupings

Figure 44:
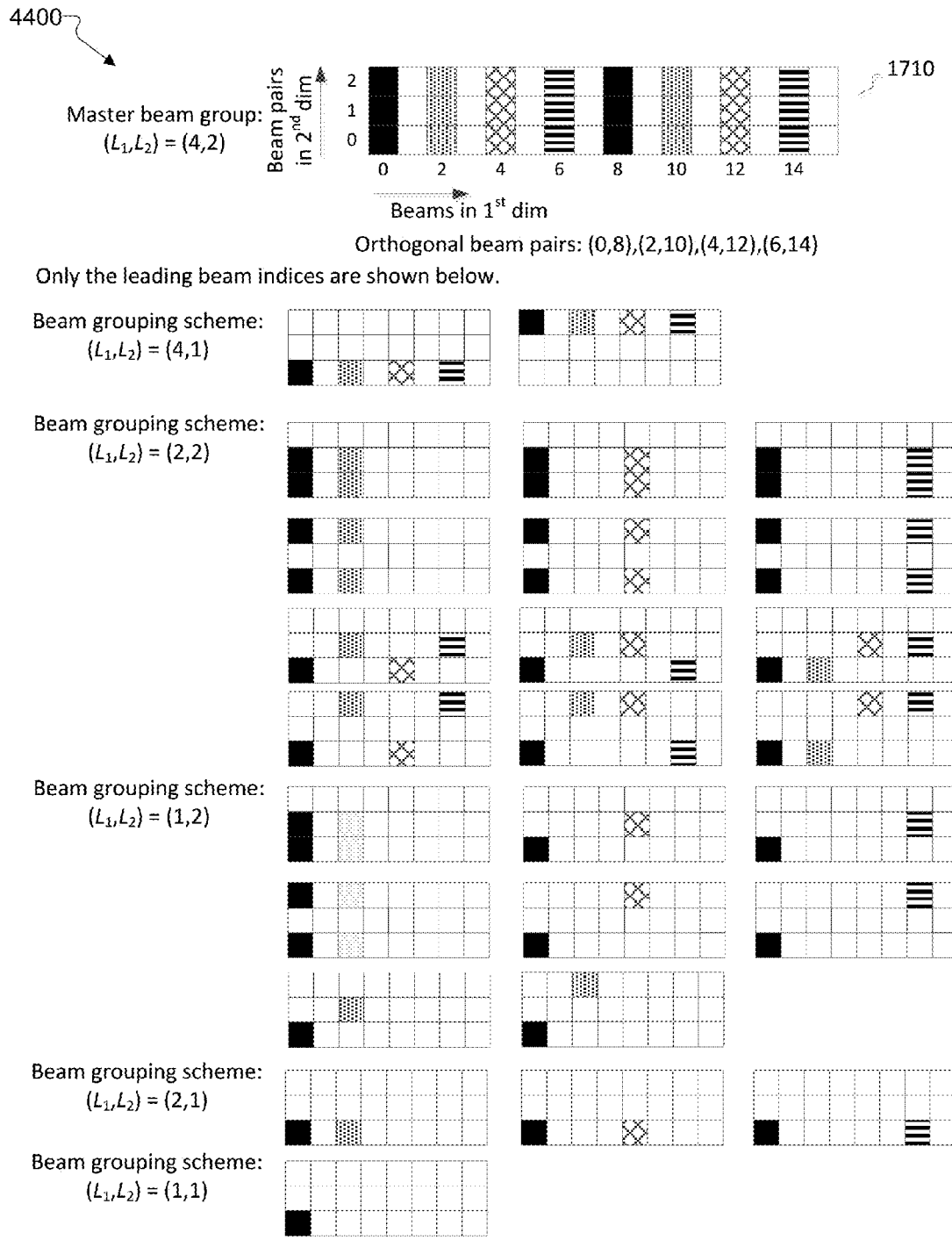
FIG. 44 illustrates beam grouping schemes for rank-3 and rank-4 i2 according to the present disclosure.

FIG. 44 illustrates beam grouping schemes 4400 for rank-3 and rank-4 $i_2$ according to embodiments of the present disclosure. The embodiments shown in FIG. 44 are for illustration only. Other embodiments could be used without departing from the scope of the present disclosure.

Depending on the values of parameters $L_1$ and $L_2$, subset restriction on rank-3 and rank-4 $i_2$ indices can be differently applied. In the embodiments, a beam grouping scheme is configured by means of illustrates codebook subset selection or codebook subsampling on rank-3 and rank-4 $i_2$ e.g., indices in terms of parameters $L_1$ and $L_2$, with an assumption that the master codebook has rank-3 and rank-4 $i_2$ indices corresponding to 1710: $(L_1, L_2)=(4,2)$. The shaded and pattern squares represent the $i_2$ (or $i_{2,1}$ and $i_{2,2}$) indices that form a beam group and are obtained after subset restriction and the white squares represent the indices that are not included in the beam group.

The number of rank 3-4 $i_2$ indices with the subset restriction depends on the beam grouping schemes. For example, for the beam grouping schemes with $(L_1, L_2)=(4,1)$ and (2,2), the number of rank-3 (rank-4) $i_2$ indices with the subset restriction is 16 (8), so 4 bits (3 bits) are needed to report $i_2$, for each configured beam grouping scheme.

In one method, for both dimensions, a UE can be configured with pair of numbers of beams in a beam group (i.e., $(L_1, L_2)$), so that the UE can restrict the rank-3 and rank-4 beam combinations as illustrated in FIG. 44. In one example, the UE is configured a beam group (i.e., $(L_1, L_2)$) in the higher-layer according to a configuration table. For $(L_1, L_2)=(2,2)$, (1,2) and (2,1), there are multiple beam combinations. In one option, one beam combination out of multiple beam combinations is explicitly configured. In another option, it is fixed to a default beam combination.

In another method, a UE can be configured in the higher-layer (RRC) with a beam grouping scheme, selected among a subset of beam grouping schemes in FIG. 44 17.

In another method, a UE can report a beam grouping scheme, selected among a subset of beam grouping schemes in FIG. 44.

Rank 5-8 Codebook

In some embodiments, TABLE 51 is used as a rank-r (r layer) where r={5,6,7,8} master codebook that can be used for any of Q=12, 16 and 32 antenna configurations, wherein TABLE 45 is used for the beam pairs in the shorter dimension to construct the master codebook and the corresponding rank 5 precoder is:

$$W^{(5)}_{m_1,m_2,m'_2,m''_2} = $$

$$\frac{1}{\sqrt{5Q}}\begin{bmatrix} v_{m_1}\otimes u_{m_2} & v_{m_1}\otimes u_{m_2} & v_{m_1+8}\otimes u_{m'_2} & v_{m_1+8}\otimes u_{m'_2} & v_{m_1+16}\otimes u_{m_2} \\ v_{m_1}\otimes u_{m_2} & -v_{m_1}\otimes u_{m_2} & v_{m_1+8}\otimes u_{m''_2} & -v_{m_1+8}\otimes u_{m''_2} & v_{m_1+16}\otimes u_{m_2} \end{bmatrix},$$

the corresponding rank 6 precoder is:

$$W^{(6)}_{m_1,m_2,m'_2,m''_2} = $$

$$\frac{1}{\sqrt{6Q}}\begin{bmatrix} v_{m_1}\otimes u_{m_2} & v_{m_1}\otimes u_{m_2} & v_{m_1+8}\otimes u_{m'_2} & v_{m_1+8}\otimes u_{m'_2} & v_{m_1+16}\otimes u_{m_2} & v_{m_1+16}\otimes u_{m_2} \\ v_{m_1}\otimes u_{m_2} & -v_{m_1}\otimes u_{m_2} & v_{m_1+8}\otimes u_{m''_2} & -v_{m_1+8}\otimes u_{m''_2} & v_{m_1+16}\otimes u_{m_2} & -v_{m_1+16}\otimes u_{m_2} \end{bmatrix},$$

the corresponding rank 7 precoder is:

$$W_{m_1,m_2,m'_2,m''_2} = \frac{1}{\sqrt{7Q}}\begin{bmatrix} v_{m_1}\otimes u_{m_2} & v_{m_1}\otimes u_{m_2} & v_{m_1+8}\otimes u_{m'_2} & v_{m_1+8}\otimes u_{m'_2} & v_{m_1+16}\otimes u_{m_2} & v_{m_1+16}\otimes u_{m_2} & v_{m_1+24}\otimes u_{m'_2} \\ v_{m_1}\otimes u_{m_2} & -v_{m_1}\otimes u_{m_2} & v_{m_1+8}\otimes u_{m''_2} & -v_{m_1+8}\otimes u_{m''_2} & v_{m_1+16}\otimes u_{m_2} & -v_{m_1+16}\otimes u_{m_2} & v_{m_1+24}\otimes u_{m''_2} \end{bmatrix},$$

and the corresponding rank 8 precoder is:

$$W^{(8)}_{m_1,m_2,m'_2,m''_2} = \frac{1}{\sqrt{8Q}}$$

$$\begin{bmatrix} v_{m_1}\otimes u_{m_2} & v_{m_1}\otimes u_{m_2} & v_{m_1+8}\otimes u_{m'_2} & v_{m_1+8}\otimes u_{m'_2} & v_{m_1+16}\otimes u_{m_2} & v_{m_1+16}\otimes u_{m_2} & v_{m_1+24}\otimes u_{m'_2} & v_{m_1+24}\otimes u_{m'_2} \\ v_{m_1}\otimes u_{m_2} & -v_{m_1}\otimes u_{m_2} & v_{m_1+8}\otimes u_{m''_2} & -v_{m_1+8}\otimes u_{m''_2} & v_{m_1+16}\otimes u_{m_2} & -v_{m_1+16}\otimes u_{m_2} & v_{m_1+24}\otimes u_{m''_2} & -v_{m_1+24}\otimes u_{m''_2} \end{bmatrix},$$

TABLE 51

Master codebook for r = {5, 6, 7, 8} layer CSI reporting for $(L_1, L_2) = (4, 2)$

| $i_2'$ | 0 | 1 | 2 |
|---|---|---|---|
| Precoder | $W^{(r)}_{s_1 i_{1,1}, s_2 i_{1,2}, s_2 i_{1,2}, s_2 i_{1,2}}$ | $W^{(r)}_{s_1 i_{1,1}, s_2 i_{1,2}, s_2 i_{1,2}+p_2, s_2 i_{1,2}+p_2}$ | $W^{(r)}_{s_1 i_{1,1}, s_2 i_{1,2}, s_2 i_{1,2}+p_2, s_2 i_{1,2}+p_2}$ |

Note that the master rank 5-8 codebook tables are constructed based on the legacy (Rel12 8-Tx) rank 5-8 orthogonal beams for the longer dimension ($L_1$=4). The $i_2$ indices 0-1 are identical to those in TABLE 43. In addition to those, $i_2$=2 corresponds to the different beam pair (0,1) in the shorter dimension ($L_2$=2).

In one method, the codebook parameters in the first dimension are legacy parameters, i.e., $s_1$=2, $p_1$=1, and $i_{1,1}$=0-3 for rank 5-7 and $i_{1,1}$=0 for rank 8. In another method, they are non-legacy parameters. The parameters for the second dimension, $s_2$ and $p_2$, in this table can be selected, e.g., according to TABLE 13, and it is assumed that $(L_1, L_2)$=(4, 2). Also, $i_{1,2}$=0,1, . . . , $$\frac{N_2 O_2}{s_2} - 1.$$

The number of rank 5-8 $i_2$ indices in the master codebook in TABLE 43 is 3, so 2 bit is needed to report $i_2$ based on this master codebook.

Embodiments on Rank 5-8 Beam Groupings

Figure 45:
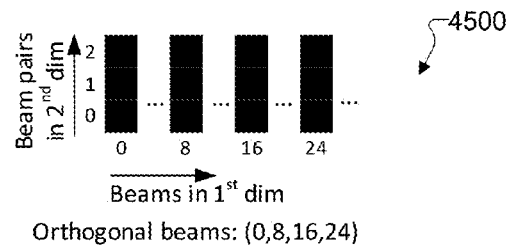
FIG. 45 illustrates a beam combination to construct ranks 5-8 master codebooks according to some embodiments of the present disclosure.

FIG. 45 illustrates a beam combination 4500 to construct ranks 5-8 master codebooks according to some embodiments of the present disclosure. The embodiment shown in FIG. 45 is for illustration only. Other embodiments could be used without departing from the scope of the present disclosure.

Utilizing the legacy 3 (4) orthogonal beams (0,8,16) ((0,8,16,24)) for ranks 5-6 (rank 7-8) for the longer dimension ($L_1$=4) and for each beam pair in TABLE 45 for the shorter dimension ($L_2$=2), an 3×3 (4×3) grid can be considered for the two dimensions as shown (black squares) in FIG. 45.

Figure 46:
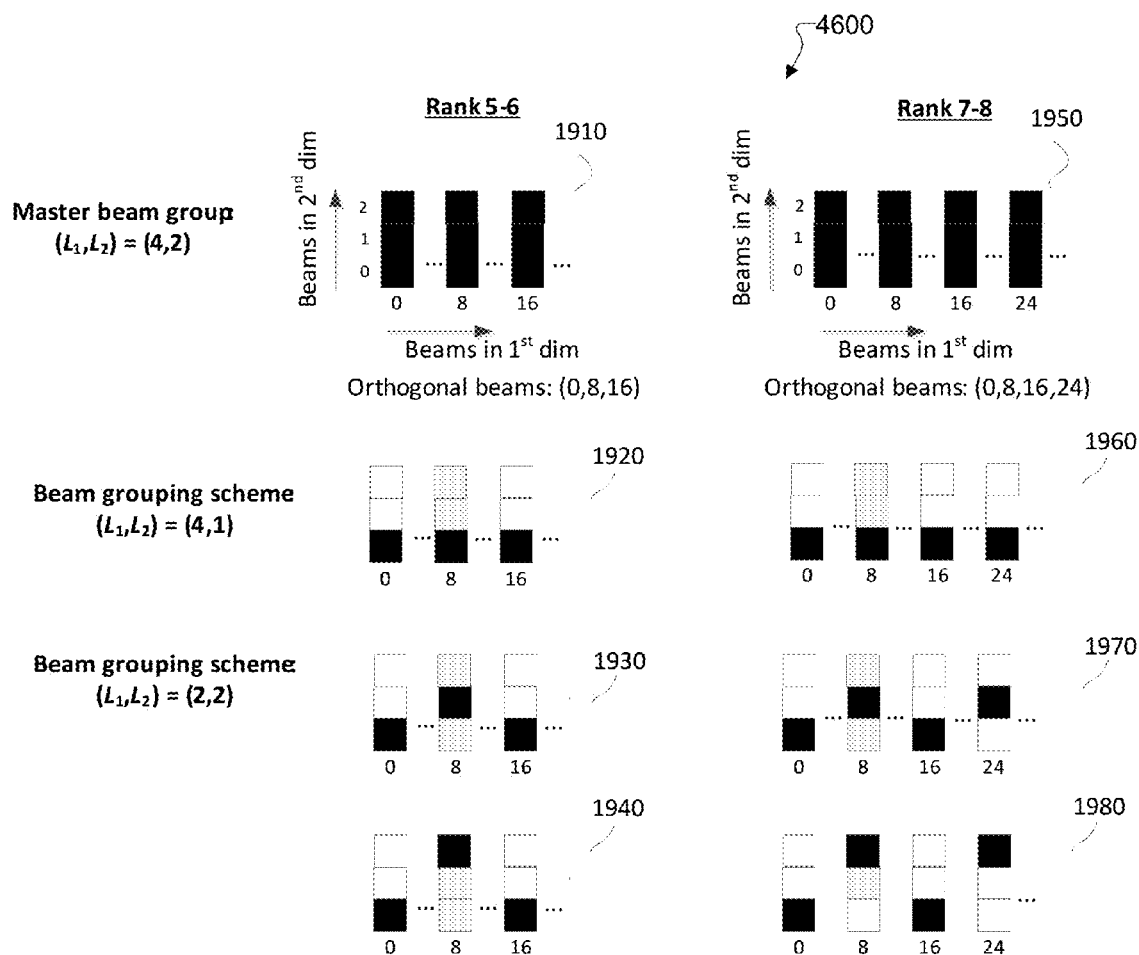
FIG. 46 illustrates beam grouping schemes for ranks 5-8 i2 indices according to the embodiments of the present disclosure.

FIG. 46 illustrates beam grouping schemes for ranks 5-8 $i_2$ indices according to the embodiments of the present disclosure. The embodiment shown in FIG. 46 is for illustration only. Other embodiments could be used without departing from the scope of the present disclosure.

Depending on the values of parameters $L_1$ and $L_2$, subset restriction on rank 5-8 $i_2$ indices can be applied. In the embodiments, a beam grouping scheme is configured by means of codebook subset selection or codebook subsampling on rank 5-8 $i_2$ e.g., indices in terms of parameters $L_1$ and $L_2$, with an assumption that the master codebook has rank 5-8 $i_2$ indices corresponding to 1910 (rank 5-6) and 1950 (rank 7-8): $(L_1, L_2)=(4,2)$. The shaded (black) squares represent the rank 5-8 $i_2$ (or $i_{2,1}$ and $i_{2,2}$) indices that form a beam group and are obtained after subset restriction and the white squares represent the indices that are not included in the beam group. As shown, 1920 and 1960 correspond to a codebook subset (or a beam group) when $(L_1,L_2)=(4,1)$ is configured, 1930 and 1970 correspond to a codebook subset (or a beam group) when $(L_1,L_2)=(2,2)$ is configured and beam pair (0,0) and (1,1) are used alternatively in the shorter dimension, and 1940 and 1980 correspond to a codebook subset (or a beam group) when $(L_1,L_2)=(2,2)$ is configured and beam pair (0,0) and (0,1) are used alternatively in the shorter dimension. Note that no $i_2$ indication is needed whenever subset restriction is configured.

Alternate Codebook Design

In order to keep the size of the master codebook in powers of 2, we propose an alternate codebook design alternative in which: only important beam grouping schemes are considered; and the number of redundant codewords in the master codebook (codewords that are not configured by any of the beam grouping schemes) is minimized.

In this alternate design, the rank-1 codebook is the same as in TABLE 35. So, we focus on rank 2-8 codebook design. Also, in the following, we focus on beam grouping schemes with $(L_1,L_2)=(4,1)$ and (2,2). However, the design is applicable to other beam grouping schemes including $(L_1,L_2)=$ (1,2), (2,1), and (1,1).

Rank 2 Codebook

In some embodiments, TABLE 52 is used to construct the beam pairs in the shorter dimension ($L_2=2$) for the rank-2 codebook.

TABLE 52

Rank-2 beam pairs in shorter dimension (2 beams)

| | Beam pair index | | | |
|---|---|---|---|---|
| | 0 | 1 | 2 | 3 |
| (first layer, second layer) | (0, 0) | (1, 1) | (0, 1) | (1, 0) |

In some embodiments, TABLE 54 is used as a rank-2 (2 layer) master codebook that can be used for any of Q=12, 16 and 32 antenna configurations, wherein TABLE 37 and TABLE 52, respectively are used for the beam pairs in the longer and the shorter dimension to construct the master rank-2 codebook. The details of the $i_2$ indices to beam pair mappings are shown in TABLE 53.

According to the TABLE 53, the $i_2$ indices 0-15 are identical to those in TABLE 38 which correspond to Rel12 8-Tx rank-2 beam pairs for the longer dimension and the beam pair index 0 (TABLE 52) for the shorter dimension. The $i_2$ indices 16-27 correspond to Rel12 8-Tx rank-2 beam pair indices {0,1,3,4,5,7} (TABLE 37) for the longer dimension and the beam pair index 1 (TABLE 52) for the shorter dimension. And there are three options, i.e., Option 1-3, for the $i_2$ indices 28-31, which are shown in the table. The details of the three options are provided below.

TABLE 53

Rank 2 $i_2$ to beam pair mapping two dimensions (according to TABLES 37 and 52)

| $i_2'$ | Rank 2: Option 1 | Rank 2: Option 2 | Rank 2: Option 3 |
|---|---|---|---|
| 0-15 | {(x, 0)} for x = {0-7} | | |
| 16-27 | {(x, 1)} for x = {0, 1, 3, 4, 5, 7} | | |
| 28-29 | (0, 2) | (0, 2) | (4, 2) |
| 30-31 | (4, 3) | (1, 2) | (4, 3) |

Note that the number of rank-2 $i_2$ indices in the master codebook in TABLE 54 is 32.

TABLE 54

Master codebook for 2 layer CSI reporting for $(L_1, L_2) = (4, 2)$

| $i_2'$ | | | 0-15 | | |
|---|---|---|---|---|---|
| | | Entries 0-15 are identical to those in TABLE 38. | | | |
| $i_2'$ | 16 | 17 | 18 | 19 | |
| | $W^{(2)}_{s_1i_1,1,s_2i_1,2+p_2,s_1i_1,1,s_2i_1,2+p_2,0}$ | $W^{(2)}_{s_1i_1,1,s_2i_1,2+p_2,s_1i_1,1,s_2i_1,2+p_2,1}$ | $W^{(2)}_{s_1i_1,1+p_1,s_2i_1,2+p_2,s_1i_1,1+p_1,s_2i_1,2+p_2,0}$ | $W^{(2)}_{s_1i_1,1+p_1,s_2i_1,2+p_2,s_1i_1,1+p_1,s_2i_1,2+p_2,1}$ | |
| $i_2'$ | 20 | 21 | 22 | 23 | |
| | $W^{(2)}_{s_1i_1,1+3p_1,s_2i_1,2+p_2,s_1i_1,1+3p_1,s_2i_1,2+p_2,0}$ | $W^{(2)}_{s_1i_1,1+3p_1,s_2i_1,2+p_2,s_1i_1,1+3p_1,s_2i_1,2+p_2,1}$ | $W^{(2)}_{s_1i_1,1,s_2i_1,2+p_2,s_1i_1,1+p_1,s_2i_1,2+p_2,0}$ | $W^{(2)}_{s_1i_1,1,s_2i_1,2+p_2,s_1i_1,1+p_1,s_2i_1,2+p_2,1}$ | |
| $i_2'$ | 24 | 25 | 26 | 27 | |
| | $W^{(2)}_{s_1i_1,1+p_1,s_2i_1,2+p_2,s_1i_1,1+2p_1,s_2i_1,2+p_2,0}$ | $W^{(2)}_{s_1i_1,1+p_1,s_2i_1,2+p_2,s_1i_1,1+2p_1,s_2i_1,2+p_2,1}$ | $W^{(2)}_{s_1i_1,1+p_1,s_2i_1,2+p_2,s_1i_1,1+3p_1,s_2i_1,2+p_2,0}$ | $W^{(2)}_{s_1i_1,1+p_1,s_2i_1,2+p_2,s_1i_1,1+3p_1,s_2i_1,2+p_2,1}$ | |
| $i_2'$ | 28 | 29 | 30 | 31 | |
| | Option 1 and 2: $W^{(2)}_{s_1i_1,1,s_2i_1,2,s_1i_1,1,s_2i_1,2+p_2,0}$ Option 3: $W^{(2)}_{s_1i_1,1,s_2i_1,2,s_1i_1,1+p_1,s_2i_1,2+p_2,0}$ | Option 1 and 2: $W^{(2)}_{s_1i_1,1,s_2i_1,2,s_1i_1,1,s_2i_1,2+p_2,1}$ Option 3: $W^{(2)}_{s_1i_1,1,s_2i_1,2,s_1i_1,1+p_1,s_2i_1,2+p_2,1}$ | Option 1 and 3: $W^{(2)}_{s_1i_1,1,s_2i_1,2+p_2,s_1i_1,1+p_1,s_2i_1,2,0}$ Option 2: $W^{(2)}_{s_1i_1,1+p_1,s_2i_1,2,s_1i_1,1+p_1,s_2i_1,2+p_2,0}$ | Option 1 and 3: $W^{(2)}_{s_1i_1,1,s_2i_1,2+p_2,s_1i_1,1+p_1,s_2i_1,2,1}$ Option 2: $W^{(2)}_{s_1i_1,1+p_1,s_2i_1,2,s_1i_1,1+p_1,s_2i_1,2+p_2,1}$ | |

Rank-2 Beam Grouping Scheme

Figure 47:
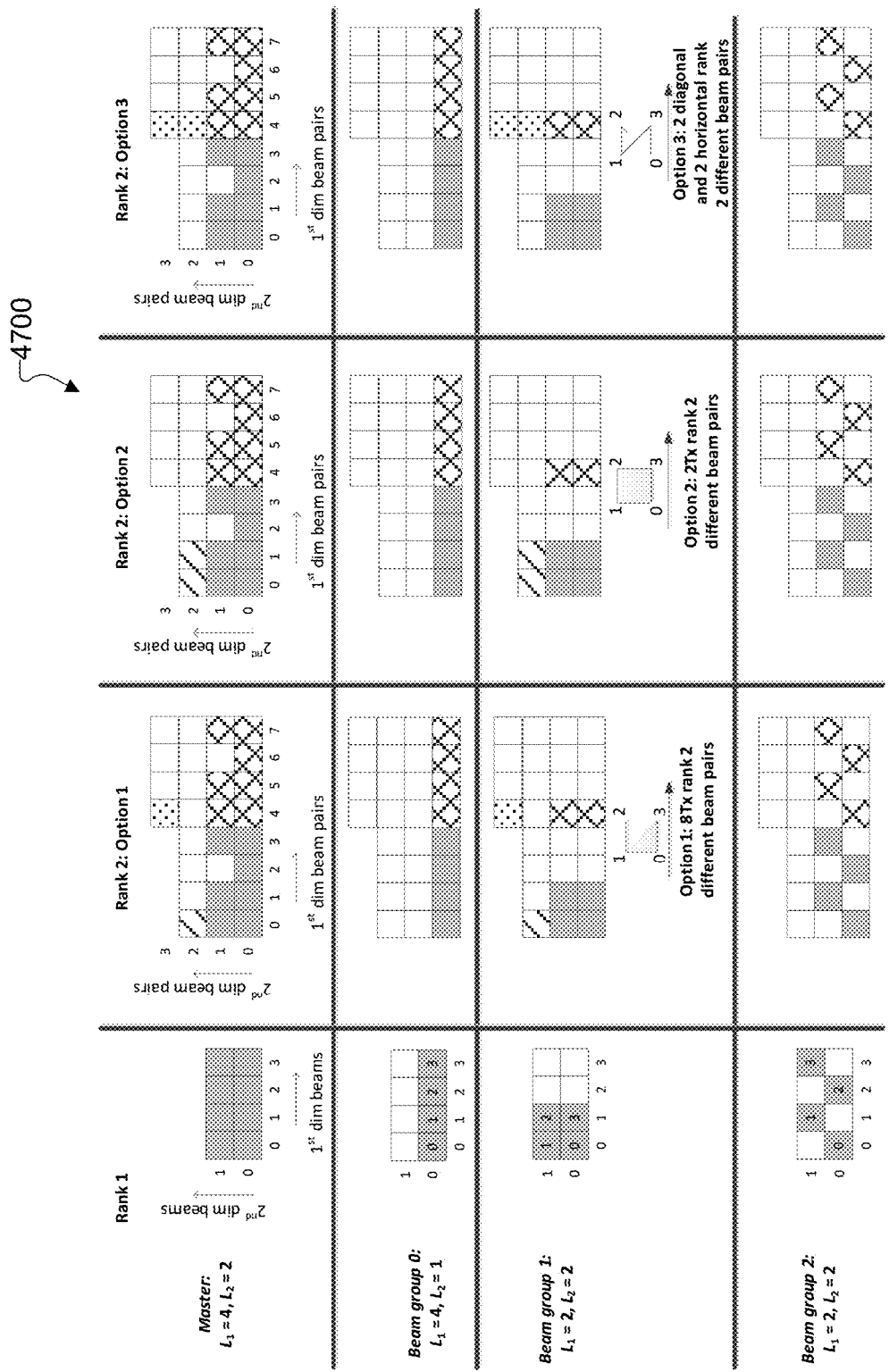
FIG. 47 illustrates beam grouping scheme or codebook subset selection on rank-2 i2 indices in terms of parameters L1 and L2, according to the embodiments of the present disclosure.

FIG. 47 illustrates beam grouping scheme or codebook subset selection 4700 on rank-2 $i_2$ indices in terms of parameters $L_1$ and $L_2$, with an assumption that the master codebook has rank-2 $i_2$ indices corresponding to $(L_1, L_2) = (4,2)$ and TABLE 54, according to the embodiments of the present disclosure.

In this case, the master codebook for $i_2$ comprises 16 rank-2 beam pair combinations, as shown in FIG. 47, which are shown as a shaded and pattern squares in the 2D grid (x,y), where the first component x corresponds to the legacy Rel12 8-Tx based rank-2 beam pairs for the first dimension ($L_1=4$, see TABLE 37) and the second component y corresponds to the beam pairs for the second dimension ($L_2=2$) according to TABLE 52. The shaded and pattern squares represent the rank-2 $i_2$ (or $i_{2,1}$ and $i_{2,2}$) indices that are obtained based on the beam grouping scheme or after subset restriction from the master codebook and the white squares represent the indices that are redundant and are hence not included in the master codebook.

As shown, there are three beam grouping schemes (or CSS methods), namely beam group 0-beam group 2. Beam group 0 corresponds to a codebook subset (or beam group) when $(L_1,L_2)=(4,1)$ is configured and the selected beam combination comprises of 8 combinations located at $\{(x,0)\}$ where x is according to TABLE 37.

Beam group 1 corresponds to a codebook subset (or beam group) when $(L_1,L_2)=(2,2)$ is configured and depending on how rank-2 beam combinations are formed out of the fours beams $\{(x,y)\}$ where x,y=$\{0,1\}$, there are following three options for Beam group 1:

Option 1: In this option, the four beams (0,0), (0,1), (1,1), and (1,0) are first numbered as 0,1,2, and 3 respectively, and then legacy 8-Tx rank-2 beam pairs are formed according to TABLE 37;

Option 2: In this option, the legacy 2-Tx rank-2 beam pairs (0,0), (1,1), and (0,1) are considered in one dimension d=$\{1,2\}$, and the same beam pair (0,0) and (1,1) are considered in the other dimension; and Option 3: In this option, 2 diagonal beam pairs corresponding to $\{(0,0),(1,1)\}$ and $\{(0,1),(1,0)\}$, and 2 horizontal (or first or longer dimension) beam pairs corresponding to $\{(0,0),(0,1)\}$ and $\{(1,0),(1,1)\}$ beam pairs are considered.

FIG. 47 illustrates alternate rank 1 and rank 2 codebook designs (both rank 1 and rank 2 codebook size=32) according to the present disclosure. The embodiment shown in FIG. 47 is for illustration only. Other embodiments could be used without departing from the scope of the present disclosure.

In one method, for both dimensions, a UE can be configured with the beam grouping scheme or CSS method (or a pair of numbers of beams in a beam group, i.e., $(L_1, L_2)$), so that the UE can restrict the rank-2 beam combinations as illustrated in FIG. 47. In one example, the UE is configured a beam grouping scheme or CSS method in the higher-layer according to TABLE 55. For Beam group 1, either one of Option 1, Option 2, and Option 3 is explicitly configured or one of the three is a default option (for example Option 1).

TABLE 55

Rank-2 beam combination configuration table

| RRC Configuration | Candidates |
|---|---|
| $\{0, 1, 2\}$ | $\{$Beam group 0, Beam group 1, Beam group 2$\}$ |

In another method, a UE can be configured in the higher-layer (RRC) with a beam grouping scheme, selected from Beam group 0, Beam group 1 (Option 1), Beam group (Option 2), Beam group 1 (Option 3), and Beam group 2.

In another method, a UE can report a beam grouping scheme, selected from Beam group 0, Beam group 1 (Option 1), Beam group 1 (Option 2), Beam group 1 (Option 3), and Beam group 2.

In some embodiments, the master rank-2 codebook comprises of beam pairs corresponding to all of Beam group 0, Beam group 1 (Option 1), Beam group 1 (Option 2), Beam group 1 (Option 3), and Beam group 2. The corresponding rank-2 table is shown in TABLE 56. Note that in this mater codebook, the number of $i_2$ indices is 36. In one method, one rank-2 beam group out of five beam groups can be configured to a UE using this table.

Similar master rank-2 tables for other beam grouping schemes according to some embodiments of this disclosure can be constructed similarly.

TABLE 56

| Master codebook for 2 layer CSI reporting for $(L_1, L_2) = (4, 2)$ | | | |
|---|---|---|---|
| $i_2{'}$ | 0-27 | | |
| Entries 0-27 are identical to those in TABLE 54. | | | |
| $i_2{'}$ 28 | 29 | 30 | 31 |
| $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ | $W^{(2)}_{s_1 i_{1,1}+p_1, s_2 i_{1,2}, s_1 i_{1,1}+p_1, s_2 i_{1,2}+p_2, 0}$ | $W^{(2)}_{s_1 i_{1,1}+p_1, s_2 i_{1,2}, s_1 i_{1,1}+p_1, s_2 i_{1,2}+p_2, 1}$ |
| $i_2{'}$ 32 | 33 | 34 | 35 |
| $W^{(2)}_{s_1 i_{1,1}, s_2 i_{1,2}, s_1 i_{1,1}+p_1, s_2 i_{1,2}+p_2, 0}$ | $W^{(2)}_{s_1 i_{1,1}, s_2 i_{1,2}, s_1 i_{1,1}+p_1, s_2 i_{1,2}+p_2, 1}$ | $W^{(2)}_{s_1 i_{1,1}, s_2 i_{1,2}+p_2, s_1 i_{1,1}+p_1, s_2 i_{1,2}, 0}$ | $W^{(2)}_{s_1 i_{1,1}, s_2 i_{1,2}+p_2, s_1 i_{1,1}+p_1, s_2 i_{1,2}, 1}$ |

Beam group 2 corresponds to a codebook subset (or beam group) when $(L_1,L_2)=(2,2)$ is configured and the configured beam pairs follow the check (cross) pattern as shown in the figure.

The number of rank-2 $i_2$ indices with the subset restriction according to three beam grouping scheme is 16, so 4 bits are needed to report $i_2$ for the configured beam grouping scheme.

In some embodiments, the master rank-2 codebook comprises of all the beam pairs described in TABLE 56, and it additionally comprises two more codewords with co-phase n=2, 3. The corresponding rank-2 table is shown in TABLE 57. Note that in this mater codebook, the number of $i_2$ indices is 38. In one method, one rank-2 beam group out of five beam groups can be configured to a UE using this table.

TABLE 57

| Master codebook for 2 layer CSI reporting for (L$_1$, L$_2$) = (4, 2) | |
|---|---|
| $i_2'$ | 0-35 |
| Precoder | Entries 0-35 are identical to those in TABLE 56. |
| $i_2'$ | 36 | 37 |
| Precoder | $W_{s_1i_{1,1},s_2i_{1,2},s_1i_{1,1},s_2i_{1,2},0}^{(2)}$ | $W_{s_1i_{1,1},s_2i_{1,2},s_1i_{1,1},s_2i_{1,2},1}^{(2)}$ |

Ranks 3-4 Codebook

FIG. 48 illustrates rank 3 and rank 4 beam grouping schemes 4800 according to embodiments of the present disclosure. The embodiment shown in FIG. 48 is for illustration only. Other embodiments could be used without departing from the scope of the present disclosure.

A beam grouping scheme (or CSS method) is configured from Beam group 0-Beam group 2. And, the master rank 3 and rank 4 codebooks are as in TABLE 40 and TABLE 41, respectively.

Note that four orthogonal beam pairs {(0,8),(2,10),(4,12),(6,14)} in the first dimension are shown as shaded and pattern squares. The four beams in three beam groups are numbered 0-3 as shown in the figure, and the corresponding 2D beam pairs are tabulated TABLE 58.

TABLE 58

| 2D Beam Index Mapping for rank-3 and rank-4 CSS | | | |
|---|---|---|---|
| Index | Beam group 0 (Beam Pairs) | Beam group 1 (Beam Pairs) | Beam group 2 (Beam Pairs) |
| 0 | (0, 0), (8, 0) | (0, 0), (8, 0) | (0, 0), (8, 0) |
| 1 | (2, 0), (10, 0) | (0, 1), (8, 1) | (2, 1), (10, 1) |
| 2 | (4, 0), (12, 0) | (2, 1), (10, 1) | (4, 0), (12, 0) |
| 3 | (6, 0), (14, 0) | (2, 0), (10, 0) | (6, 1), (14, 1) |

Rank 3-4 codebooks corresponding to the case in which we have different beams (0,1) and (1,0) in the shorter dimension, according to TABLE 45 and TABLE 52 can be constructed similarly.

Ranks 5-8 Codebook

FIG. 49 illustrates ranks 5 to 8 beam grouping schemes 4900 according to the present disclosure. The embodiment shown in FIG. 49 is for illustration only. Other embodiments could be used without departing from the scope of the present disclosure.

The beam grouping scheme (or CSS method) is configured from Beam group 0 and Beam group 2.

The master rank 5-8 codebooks are as in TABLE 43, Note that four orthogonal beam pairs {(0,8),(2,10),(4,12),(6,14)} in the first dimension are shown as shaded and pattern squares. The four beams in Beam group 0 and Beam group 2 are numbered 0-3 as shown in the figure, and the corresponding 2D beam pairs are tabulated in TABLE 59.

TABLE 59

| 2D Beam index mapping for rank 5-8 CSS | | |
|---|---|---|
| Index | Beam group 0 (Beam Pairs) | Beam group 2 (Beam Pairs) |
| 0 | (0, 0), (8, 0), (16, 0) | (0, 0), (8, 0), (16, 0), (24, 0) |
| 1 | (0, 0), (8, 1), (16, 0) | (0, 0), (8, 1), (16, 0), (24, 1) |

Rank 5-8 codebooks corresponding to the case in which we have different beams (0,1) and (1,0) in the shorter dimension, according to TABLE 45 and TABLE 52 can be constructed similarly.

Bitmap to Configure a Beam Grouping Scheme or CSS

In some embodiments, the beam grouping scheme for each rank 1-8 codebooks may be configured based on a bitmap, where the length of the bitmap equals to number of beam combinations (for a given rank) in the master codebook.

For example, the beam grouping scheme for rank-1 codebook may be configured based on a bitmap of length $K_1 \times K_2$ (product of number of rank-1 beams in two dimensions), where $K_d$ with d=1,2 corresponds to the number of beams in dimension d of the rank-1 master beam group (L$_1$,L$_{-2}$). For instance, for the master beam group (L$_1$,L$_2$)=(4,2), $K_1$=L$_1$ and $K_2$=L$_2$, so the length of bitmap is 8.

For example, the beam grouping scheme for rank-2 codebook may be configured based on a bitmap of length $K_1 \times K_2$ (product of number of rank-2 beam pairs in two dimensions), where $K_d$ with d=1,2 corresponds to the number of beam pairs in dimension d of the rank-2 master beam group (L$_1$,L$_2$). For instance, for the master beam group (L$_1$,L$_2$)=(4,2), $K_1$=8 (TABLE 35) and $K_2$=4 (TABLE 52), so the length of bitmap is 32.

The length of bitmaps for rank 3-8 codebooks can be determined similarly.

An example of bitmaps for rank-1 and rank-2 beam grouping schemes in FIG. 47 is shown in TABLE 60 and TABLE 61, respectively.

In TABLE 60, the first column corresponds to the beam indices for $1^{st}$ and $2^{nd}$ dimensions in (L$_1$,L$_2$)=(4,2) grid of the master codebook. The bitmaps corresponding to the three beam groups, Beam group 0-Beam group 2 are shown in columns 2-4, where 1 indicates the corresponding beam in the 2D grid is included in the beam group and 0 indicates otherwise.

In TABLE 61, the first column corresponds to the rank-2 beam pair indices for $1^{st}$ and $2^{nd}$ dimensions in (L$_1$,L$_2$)=(4,2) grid of the master codebook. For example, the beam pair indices (1,0) indicates the beam pair 1 from TABLE 37 for the $1^{st}$ dimension, and the beam pair 0 from the TABLE 52 for the $2^{nd}$ dimension. The bitmaps corresponding to the five rank-2 beam groups, Beam group 0, Beam group 1 (Option 1), Beam group 1 (Option 2), Beam group 1 (Option 3), and Beam group 2 are shown in columns 2-6, where 1 indicates the corresponding beam pair indices in the 2D grid is included in the rank-2 beam group and 0 indicates otherwise.

TABLE 60

| Bitmap for rank-1 beam grouping schemes in FIG. 47 | | | |
|---|---|---|---|
| Beam indices | Bitmaps | | |
| ($1^{st}$ sim, $2^{nd}$ dim) | Beam group 0 | Beam group 1 | Beam group 2 |
| (0, 0) | 1 | 1 | 1 |
| (1, 0) | 1 | 1 | 0 |
| (2, 0) | 1 | 0 | 1 |
| (3, 0) | 1 | 0 | 0 |
| (0, 1) | 0 | 1 | 0 |
| (1, 1) | 0 | 1 | 1 |
| (2, 1) | 0 | 0 | 0 |
| (3, 1) | 0 | 0 | 1 |

TABLE 61

Bitmap for rank-2 beam grouping schemes in FIG. 47

| Beam pair indices ($1^{st}$ dim, $2^{nd}$ dim) | Beam group 0 | Bitmaps | | | Beam group 2 |
|---|---|---|---|---|---|
| | | Beam group 1 (Option 1) | Beam group 1 (Option 2) | Beam group 1 (Option 3) | |
| (0, 0) | 1 | 1 | 1 | 1 | 1 |
| (1, 0) | 1 | 1 | 1 | 1 | 0 |
| (2, 0) | 1 | 0 | 0 | 0 | 1 |
| (3, 0) | 1 | 0 | 0 | 0 | 0 |
| (4, 0) | 1 | 1 | 1 | 1 | 1 |
| (5, 0) | 1 | 0 | 0 | 0 | 0 |
| (6, 0) | 1 | 0 | 0 | 0 | 1 |
| (7, 0) | 1 | 0 | 0 | 0 | 0 |
| (0, 1) | 0 | 1 | 1 | 1 | 0 |
| (1, 1) | 0 | 1 | 1 | 1 | 1 |
| (2, 1) | 0 | 0 | 0 | 0 | 0 |
| (3, 1) | 0 | 0 | 0 | 0 | 1 |
| (4, 1) | 0 | 1 | 1 | 1 | 0 |
| (5, 1) | 0 | 0 | 0 | 0 | 1 |
| (6, 1) | 0 | 0 | 0 | 0 | 0 |
| (7, 1) | 0 | 0 | 0 | 0 | 1 |
| (0, 2) | 0 | 1 | 1 | 0 | 0 |
| (1, 2) | 0 | 0 | 1 | 0 | 0 |
| (2, 2) | 0 | 0 | 0 | 0 | 0 |
| (3, 2) | 0 | 0 | 0 | 0 | 0 |
| (4, 2) | 0 | 0 | 0 | 1 | 0 |
| (5, 2) | 0 | 0 | 0 | 0 | 0 |
| (6, 2) | 0 | 0 | 0 | 0 | 0 |
| (7, 2) | 0 | 0 | 0 | 0 | 0 |
| (4, 3) | 0 | 1 | 0 | 1 | 0 |
| (5, 3) | 0 | 0 | 0 | 0 | 0 |
| (6, 3) | 0 | 0 | 0 | 0 | 0 |
| (7, 3) | 0 | 0 | 0 | 0 | 0 |

In one alternative, bitmap for each rank can be configured separately. In another alternative, a composite bitmap obtained by concatenating bitmaps for all ranks are formed and bitmaps for all ranks are configured jointly using the composite bitmap. In yet another alternative, multiple composite bitmaps are formed based on ranks and they are configured separately. For example, rank 1-2 form one composite bitmap, rank 3-4 form another composite bitmap, and rank 5-8 form another composite bitmap, and at least one of the three composite bitmaps is configured.

In one method, the bitmap can be configured using RRC.

In some embodiments, the number of 1's in the bitmap is fixed to a value for each rank 1-8.

For example, the number of 1's may be fixed to 4 for rank-1, and 8 for rank 2-4, and so on. In this example, the configured beam grouping schemes correspond to $(L_1,L_2)=$ (4,1) or (2,2).

In another example, the number of 1's may be fixed to 2 for rank-1, and 4 for rank 2-4, and so on. In this example, the configured beam grouping schemes correspond to $(L_1,L_2)=$ (2,1) or (1,2).

In another example, the number of 1's may be fixed to 1 for rank 1-4. In this example, the configured beam grouping scheme corresponds to $(L_1,L_2)=(1,1)$.

In some embodiments, the number of 1's in the bitmap is fixed to multiple values for each rank 1-8.

For example, the number of 1's may be fixed to {1,4} for rank-1, and {1,8} for rank 2-4. In this example, the configured beam grouping schemes correspond to $(L_1,L_2)=(4,1)$ or (2,2) or (1,1).

In some embodiments, for each rank, a beam grouping scheme can be configured (e.g., based on a bitmap or a beam grouping scheme indicator).

When a bitmap based approach is used, the length of the bitmap equals to the number of $i'_2$ indices in the master codebook.

Examples of beam grouping scheme indication for rank-1 and rank-2 $i'_2$ are shown in TABLE 62 and TABLE 63, respectively based upon TABLE 35 and TABLE 56.

TABLE 62 shows selected rank-1 $i'_2$ indices determined dependent upon a selected beam group. The selected indices can also be represented by a bitmap.

TABLE 62

Selected $i_2'$ for rank-1 CSI reporting (in TABLE 35)

| $i_2'$ indices | Selected $i_2'$ indices | Bitmap for selected i2 indices | | | | | | | |
|---|---|---|---|---|---|---|---|---|---|
| | | Bit 0-3 | Bit 4-7 | Bit 8-11 | Bit 12-15 | Bit 16-19 | Bit 20-23 | Bit 24-27 | Bit 28-31 |
| Beam group 0 | 0-15 | 1 | 1 | 1 | 1 | 0 | 0 | 0 | 0 |
| Beam group 1 | 0-7, 16-23 | 1 | 1 | 0 | 0 | 1 | 1 | 0 | 0 |

TABLE 62-continued

Selected i₂' for rank-1 CSI reporting (in TABLE 35)

| i₂' indices | Selected i₂' indices | Bitmap for selected i2 indices | | | | | | | |
|---|---|---|---|---|---|---|---|---|---|
| | | Bit 0-3 | Bit 4-7 | Bit 8-11 | Bit 12-15 | Bit 16-19 | Bit 20-23 | Bit 24-27 | Bit 28-31 |
| Beam group 2 | 0-3, 8-11, 20-23, 28-31 | 1 | 0 | 1 | 0 | 0 | 1 | 0 | 1 |
| Beam group 3 | 0-3 | 1 | 0 | 0 | 0 | 0 | 0 | 0 | 0 |

TABLE 63 shows selected rank-2 i'$_2$ indices determined dependent upon a selected beam group. Beam group 1 options 1, 2 and 3 are constructed according to FIG. 47.

TABLE 63

Selected i₂' for rank-2 CSI reporting (in TABLE 56 and TALBLE 57)

| i₂' indices | Selected i₂' indices |
|---|---|
| Beam group 0 | 0-15 |
| Beam group 1 (Option 1) | 0-3, 8-9, 16-19, 22-23, 28-29, 34-35 |
| Beam group 1 (Option 2) | 0-3, 8-9, 16-19, 22-23, 28-31 |
| Beam group 1 (Option 3) | 0-3, 8-9, 16-19, 22-23, 32-35 |
| Beam group 2 | 0-1, 4-5, 6-7, 12-13, 18-21, 24-27 |
| Beam group 3 (according to TABLE 56) | 0-1 |
| Beam group 3 (according to TABLE 57) | 0-1, 36-37 |

Mapping i'$_2$ Indices into the Second PMI indices i$_2$

In some embodiments, the reported second PMI i$_2$ by the UE spans 0-A, and are one-to-one mapped sequentially from the selected i'$_2$ indices (e.g., according to TABLE 61 for rank-1). Example values for A=1, 3, 7, 15, 31, 63.

For example, when beam group 1 is selected for rank-1, the selected i'$_2$ indices 0-7 and 16-23 are sequentially one-to-one mapped to i$_2$ indices 0-15.

Fixed Codebooks

In some embodiments, the codebooks for some of or all ranks 1-8 for each of 12, 16 and 32 antenna ports are fixed and no configuration is necessary.

In one example, such fixed codebooks are the master codebooks of rank 1-8 according to some embodiments of this disclosure.

In another example, such fixed codebooks are the codebooks of rank 1-8 corresponding to the beam grouping $(L_1,L_2)=(4,1)$ according to some embodiments of this disclosure.

In another example, such fixed codebooks are the codebooks of rank 1-8 corresponding to the beam grouping $(L_1,L_2)=(2,2)$ according to some embodiments of this disclosure.

In some embodiments, the codebooks for some of or all ranks 1-8 for each of 12, 16 and 32 antenna ports are fixed depending on the antenna port configurations. For example, for 16 ports, codebooks are fixed for depending on $(N_1, N_2)=(1,8)$, (4,2), (2,4), and (8,1). The exact codebook is configured by configuring the antenna port configuration $(N_1, N_2)$.

Note that the embodiments of this disclosure is applicable to other beam group sizes of the master codebook including $(L_1,L_2)=(4,4)$.

Rank Specific Beam Grouping Scheme

In some embodiments, the configured beam grouping scheme is the same for all ranks 1-8. For example, the configured beam grouping scheme corresponds to one of multiple options for $(L_1,L_2)=(2,2)$ for all ranks 1-8, where the beam grouping scheme is according to some embodiments of this disclosure.

In some embodiments, the configured beam grouping scheme is specific to each rank 1-8. For example, for rank-1, the configured beam grouping scheme may correspond to $(L_1,L_2)=(4,1)$, and for rank-2, it may correspond to one of multiple options for $(L_1,L_2)=(2,2)$, and so on, where the beam grouping scheme is according to some embodiments of this disclosure.

In some embodiments, the configured beam grouping scheme is specific to a fixed subset of ranks from 1-8. For example, for rank1-2, the configured beam grouping scheme may correspond to $(L_1,L_2)=(2,2)$, and for rank 3-8, it may correspond to $(L_1,L_2)=(4,1)$, where the beam grouping scheme is according to some embodiments of this disclosure.

In some embodiments, there are multiple different alternatives to decide whether the beam grouping scheme is the same for all ranks, specific to each rank, or specific to a subset of ranks. In one alternative, the beam grouping schemes for different ranks are pre-determined. In another alternative, this decision is made at eNB. In another alternative, UE indicates this to the eNB.

Separate Master Codebook for Config A and B in FIG. 5 (Without Transpose Antenna Port Indexing)

If the antenna port configuration is explicitly configured, and different (master) codebook is configured depending on the configured antenna port, then we may have the following alternatives for codebook design.

Alternative 1: one codebook for both $N_1 \geq N_2$ (config A) and $N_1 < N_2$ (config B) for symmetric antenna port layouts This alternative is applicable to antenna port configurations $(N_1, N_2)$ that are symmetric in the sense that the corresponding antenna port layouts are transpose of one another. For example $(N_1, N_2)=(2,4)$ and (4,2) for 16 port and $(N_1, N_2)=(2,3)$ and (3,2) as shown in FIGS. 5A to 5B. For such antenna port layouts, we may have the same codebook table, representing the different pre-coding vectors and matrices in the two layouts.

In some embodiments, there is one (master) codebook table for both of the symmetric antenna port configurations. In this case, we can represent the two symmetric port configurations as $N_1 \geq N_2$ (config A) and $N_1 < N_2$ (config B), for example config A and B in FIGS. 5A to 5B. However, depending on the configured antenna port configuration, the pre-coder is derived differently.

In one method, the order in which the Kronecker product is performed is dependent on the configuration. For instance, for the configuration in which $N_1 \geq N_2$, the UE derives the rank-1 pre-coder as $$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix},$$

and for the configuration in which $N_1 < N_2$, the UE derives the rank-1 pre-coder as $$W^{(1)}_{m_1,m_2,n} = \frac{1}{\sqrt{Q}} \begin{bmatrix} u_{m_2} \otimes v_{m_1} \\ \varphi_n u_{m_2} \otimes v_{m_1} \end{bmatrix}.$$

Note that the orders in which the Kronecker product is performed in the two expressions are opposite in order to ensure that the dimensions of the two vectors to the left and to the right of Kronecker operator are the same in the two expressions.

Also note that in some embodiments the KP expressions can be swapped for the two configurations: i.e., if $N_1 \geq N_2$ we have $$W^{(1)}_{m_1,m_2,n} = \frac{1}{\sqrt{Q}} \begin{bmatrix} u_{m_2} \otimes v_{m_1} \\ \varphi_n u_{m_2} \otimes v_{m_1} \end{bmatrix};$$

and if $N_1 < N_2$, we have $$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix}.$$

This applies to all the embodiments for other ranks as well.

For example, assuming antenna port numbering 2 for a 16 port configuration, we have:
$(N_1, N_2) = (4,2)$ and, $$v_{m_1} = \begin{bmatrix} 1 & e^{j\frac{2\pi n_1}{O_1 N_1}} & e^{j\frac{4\pi n_1}{O_1 N_1}} & e^{j\frac{6\pi n_1}{O_1 N_1}} \end{bmatrix}^t$$

and $$u_{m_2} = \begin{bmatrix} 1 & e^{j\frac{2\pi n_2}{O_2 N_2}} \end{bmatrix}^t;$$

and
$(N_1, N_2) = (2,4)$ and, $$v_{m_1} = \begin{bmatrix} 1 & e^{j\frac{2\pi m_1}{O_1 N_1}} \end{bmatrix}^t$$

and $$u_{m_2} = \begin{bmatrix} 1 & e^{j\frac{2\pi m_2}{O_2 N_2}} & e^{j\frac{4\pi m_2}{O_2 N_2}} & e^{j\frac{6\pi m_2}{O_2 N_2}} \end{bmatrix}^t.$$

Similarly, for 12 port configuration, we have:
$(N_1, N_2) = (3,2)$ and, $$v_{m_1} = \begin{bmatrix} 1 & e^{j\frac{2\pi m_1}{O_1 N_1}} & e^{j\frac{4\pi m_1}{O_1 N_1}} \end{bmatrix}^t \text{ and } u_{m_2} = \begin{bmatrix} 1 & e^{j\frac{2\pi m_2}{O_2 N_2}} \end{bmatrix}^t;$$

and
$(N_1, N_2) = (2,3)$ and, $$v_{m_1} = \begin{bmatrix} 1 & e^{j\frac{2\pi m_1}{O_1 N_1}} \end{bmatrix}^t \text{ and } u_{m_2} = \begin{bmatrix} 1 & e^{j\frac{2\pi m_2}{O_2 N_2}} & e^{j\frac{4\pi m_2}{O_2 N_2}} \end{bmatrix}^t.$$

The embodiment is applicable to the antenna port numbering 1, where $(N_1,N_2)=(2,4)$ for config A and for $(N_1,N_2)=(4,2)$ for config B.

Note that even though $W^{(1)}_{m_1,m_2,n}$ expression is different in two configurations, the master rank-1 codebook table such as TABLE 35 can be used for both.

For rank-2, the pre-coding matrix is given by $$W^{(2)}_{m_1,m_2,m'_1,m'_2,n} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix}$$

for $N_1 \geq N_2$ (config A), and it is $$W^{(2)}_{m_1,m_2,m'_1,m'_2,n} = \frac{1}{\sqrt{2Q}} \begin{bmatrix} u_{m_2} \otimes v_{m_1} & u_{m'_2} \otimes v_{m'_1} \\ \varphi_n u_{m_2} \otimes v_{m_1} & -\varphi_n u_{m'_2} \otimes v_{m'_1} \end{bmatrix}$$

for $N_1 < N_2$ (config B). The expressions for rank 3-8 for the two configurations can be expression similarly. Similar to rank-1, for rank 2-8 also, the master rank 2-8 codebooks in this case remain the same as mentioned earlier in this disclosure.

In addition, the beam grouping schemes or $(L_1,L_2)$ configurations or codebook subset selection according to some embodiments of this disclosure are applicable straightforwardly to this case once we have the master table for each of antenna port configurations.

In another method, if the oversampling factor in the longer and shorter dimensions of the two symmetric port configurations are the same, then the pre-coder for one of the symmetric port configuration is derived from that for the other symmetric port configuration by applying a fixed mapping on the elements of the pre-coding vector. In one method, for the configuration in which $N_1 \geq N_2$ (config A), the UE derives the rank-1 pre-coder as $$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix},$$

and for the configuration in which $N_1 < N_2$ (config B), the UE derives the rank-1 pre-coder as $$W^{(1)}_{m_1,m_2,n} = \frac{1}{\sqrt{Q}} \begin{bmatrix} \sigma(v_{m_1} \otimes u_{m_2}) \\ \varphi_n \sigma(v_{m_1} \otimes u_{m_2}) \end{bmatrix},$$

$$\sigma \begin{pmatrix} a_0 \\ a_1 \\ \vdots \\ a_{N_2-1} \\ b_0 \\ b_1 \\ \vdots \\ b_{N_2-1} \end{pmatrix} = \begin{pmatrix} a_0 \\ b_0 \\ a_1 \\ b_1 \\ a_2 \\ \vdots \\ a_{N_2-1} \\ b_{N_2-1} \end{pmatrix}.$$

Note that here the assumption is that $O_1$ and $O_2$ in case of $N_1 \geq N_2$ is the same as $O_2$ and $O_1$ in case of $N_1 < N_2$, respectively. In one example, for $(N_1, N_2) = (4,2)$ with $(O_1, O_2) = (8, 16)$, $$v_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t$$

and $$u_{m_2} = \begin{bmatrix} 1 & e^{j\frac{2\pi m_2}{32}} \end{bmatrix}^t,$$

hence $$v_{m_1} \otimes u_{m_2} = \begin{bmatrix} 1 & e^{j\frac{2\pi m_2}{32}} & e^{j\frac{2\pi m_1}{32}} & e^{j2\pi\left(\frac{m_1+m_2}{32}\right)} \\ e^{j\frac{4\pi m_1}{32}} & e^{j2\pi\left(\frac{2m_1+m_2}{32}\right)} & e^{j\frac{6\pi m_1}{32}} & e^{j2\pi\left(\frac{3m_1+m_2}{32}\right)} \end{bmatrix};$$

and for
$(N_1, N_2) = (2,4)$ with $(O_1, O_2) = (16, 8)$, $$v_{m_2} = \begin{bmatrix} 1 & e^{j\frac{2\pi m_2}{32}} \end{bmatrix}^t$$

and $$u_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t,$$

hence $$v_{m_2} \otimes u_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}$$

$$e^{j\frac{2\pi m_2}{32}} \quad e^{j2\pi\left(\frac{m_1+m_2}{32}\right)} \quad e^{j2\pi\left(\frac{2m_1+m_2}{32}\right)} \quad e^{j2\pi\left(\frac{3m_1+m_2}{32}\right)} ],$$

which can be obtained by applying the permutation $\rho(\{1\ 2\ 3\ 4\ 5\ 6\ 7\ 8\}) = \{1\ 3\ 5\ 7\ 2\ 4\ 6\ 8\}$ on the components of $$\begin{bmatrix} 1 & e^{j\frac{2\pi m_2}{32}} & e^{j\frac{2\pi m_1}{32}} & e^{j2\pi\left(\frac{m_1+m_2}{32}\right)} \\ e^{j\frac{4\pi m_1}{32}} & e^{j2\pi\left(\frac{2m_1+m_2}{32}\right)} & e^{j\frac{6\pi m_1}{32}} & e^{j2\pi\left(\frac{3m_1+m_2}{32}\right)} \end{bmatrix}.$$

In an alternate method, the pre-coder for $N_1 \geq N_2$ can be derived by applying a similar fixed mapping on the pre-coder for $N_1 < N_2$ case.

For rank 2-8, the mapping can be constructed similarly.

Alternative 2: different codebooks for different antenna port configurations

In this alternative, we have different codebook for different antenna port configurations. In the following, we assume that the first dimension is for the horizontal and the second dimension is for the vertical. The codebook design below, however, is applicable to the other case in which the first dimension is for the vertical and the second dimension is for the horizontal, or any other form of antenna port layouts including one-dimensional. As before, we continue to assume antenna port numbering 2 in the codebook tables. The codebook tables for antenna port numbering 1 can be constructed similarly.

In some embodiments, a UE is configured with two different rank-1 master codebooks for the two antenna port configurations, $N_1 \geq N_2$ (config A) and $N_1 < N_2$ (config B). If $N_1 \geq N_2$, then the master rank-1 codebook is according to TABLE 35, and $N_1 < N_2$, then the master rank-1 codebook is given by TABLE 64, that the beam grouping in the two codebooks constitute 4 beams in the longer dimension (4 ports) and 2 beams in shorter dimension.

There are multiple alternatives for the rest of codebook parameters for the two codebooks. In one alternative, the codebook parameters are the same in the two codebooks, i.e., $O_1$, $O_2$, $s_1$, $s_2$, $p_1$, and $p_2$ are the same. In another alternative, they are different. In yet another alternative, a subset of them is the same, and another subset is different. For example, $O_1$ and $O_2$ are different, but $s_1$, $s_2$, $p_1$, and $p_2$ are the same.

TABLE 64

Master codebook for 1 layer CSI reporting for $(N_1, N_2) = (2, 4)$ and for $(L_1, L_2) = (2, 4)$

| $i_2'$ | 0 | 1 | 2 | 3 |
|---|---|---|---|---|
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2'$ | 4 | 5 | 6 | 7 |
| Precoder | $W_{s_1 i_{1,1}, s_2 i_{1,2}+p_2, 0}^{(1)}$ | $W_{s_1 i_{1,1}, s_2 i_{1,2}+p_2, 1}^{(1)}$ | $W_{s_1 i_{1,1}, s_2 i_{1,2}+p_2, 2}^{(1)}$ | $W_{s_1 i_{1,1}, s_2 i_{1,2}+p_2, 3}^{(1)}$ |
| $i_2'$ | 8 | 9 | 10 | 11 |
| Precoder | $W_{s_1 i_{1,1}, s_2 i_{1,2}+2p_2, 0}^{(1)}$ | $W_{s_1 i_{1,1}, s_2 i_{1,2}+2p_2, 1}^{(1)}$ | $W_{s_1 i_{1,1}, s_2 i_{1,2}+2p_2, 2}^{(1)}$ | $W_{s_1 i_{1,1}, s_2 i_{1,2}+2p_2, 3}^{(1)}$ |
| $i_2'$ | 12 | 13 | 14 | 15 |
| Precoder | $W_{s_1 i_{1,1}, s_2 i_{1,2}+3p_2, 0}^{(1)}$ | $W_{s_1 i_{1,1}, s_2 i_{1,2}+3p_2, 1}^{(1)}$ | $W_{s_1 i_{1,1}, s_2 i_{1,2}+3p_2, 2}^{(1)}$ | $W_{s_1 i_{1,1}, s_2 i_{1,2}+3p_2, 3}^{(1)}$ |

TABLE 64-continued

Master codebook for 1 layer CSI reporting for $(N_1, N_2) = (2, 4)$ and for $(L_1, L_2) = (2, 4)$

| $i_2'$ | 16-31 |
|---|---|
| Precoder | Entries 16-31 constructed with replacing the second subscript $s_1 i_{1,1}$ with $s_1 i_{1,1}+p_1$ in entries 0-15. |

In some embodiments, a UE is configured with two different rank-2 master codebooks for the two antenna port configurations, $N_1 \geq N_2$ (config A) and $N_1 < N_2$ (config B). If $N_1 \geq N_2$, then the master rank-2 codebook is according to TABLE 56 and $N_1 < N_2$, then the master rank-2 codebook is given by TABLE 65. Note that the beam grouping in the two codebooks constitute 4 beams in the longer dimension (4 ports) and 2 beams in shorter dimension. TABLE 35 is constructed similar to TABLE 56 except that the Rel 12 8-Tx rank-2 beam pairs are considered for the 4 beams in vertical dimension (2nd dimension).

Similar to rank-1 case, there are multiple alternatives for the rest of codebook parameters for the two codebooks. In one alternative, the codebook parameters are the same in the two codebooks, i.e., $O_1$, $O_2$, $s_1$, $s_2$, $p_1$, and $p_2$ are the same. In another alternative, they are different. In yet another alternative, a subset of them is the same, and another subset is different. For example, $O_1$ and $O_2$ are different, but $s_1$, $s_2$, $p_1$, and $p_2$ are the same.

TABLE 65

Master codebook for 2 layer CSI reporting for $(N_1, N_2) = (2, 4)$ and for $(L_1, L_2) = (2, 4)$

| $i_2'$ | 0 | 1 |
|---|---|---|
| | $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ |
| $i_2'$ | 4 | 5 |
| | $W^{(2)}_{s_1 i_{1,1}, s_2 i_{1,2}+2p_2, s_1 i_{1,1}, s_2 i_{1,2}+2p_2, 0}$ | $W^{(2)}_{s_1 i_{1,1}, s_2 i_{1,2}+2p_2, s_1 i_{1,1}, s_2 i_{1,2}+2p_2, 1}$ |
| $i_2'$ | 8 | 9 |
| | $W^{(2)}_{s_1 i_{1,1}, s_2 i_{1,2}, s_1 i_{1,1}, s_2 i_{1,2}+p_2, 0}$ | $W^{(2)}_{s_1 i_{1,1}, s_2 i_{1,2}, s_1 i_{1,1}, s_2 i_{1,2}+p_2, 1}$ |
| $i_2'$ | 12 | 13 |
| | $W^{(2)}_{s_1 i_{1,1}, s_2 i_{1,2}, s_1 i_{1,1}, s_2 i_{1,2}+3p_2, 0}$ | $W^{(2)}_{s_1 i_{1,1}, s_2 i_{1,2}, s_1 i_{1,1}, s_2 i_{1,2}+3p_2, 1}$ |
| $i_2'$ | 16 | 17 |
| | $W^{(2)}_{s_1 i_{1,1}+p_1, s_2 i_{1,2}, s_1 i_{1,1}+p_1, s_2 i_{1,2}, 0}$ | $W^{(2)}_{s_1 i_{1,1}+p_1, s_2 i_{1,2}, s_1 i_{1,1}+p_1, s_2 i_{1,2}, 1}$ |
| $i_2'$ | 20 | 21 |
| | $W^{(2)}_{s_1 i_{1,1}+p_1, s_2 i_{1,2}+3p_2, s_1 i_{1,1}+p_1, s_2 i_{1,2}+3p_2, 0}$ | $W^{(2)}_{s_1 i_{1,1}+p_1, s_2 i_{1,2}+3p_2, s_1 i_{1,1}+p_1, s_2 i_{1,2}+3p_2, 1}$ |
| $i_2'$ | 24 | 25 |
| | $W^{(2)}_{s_1 i_{1,1}+p_1, s_2 i_{1,2}+2p_2, s_1 i_{1,1}+p_1, s_2 i_{1,2}+2p_2, 0}$ | $W^{(2)}_{s_1 i_{1,1}+p_1, s_2 i_{1,2}+2p_2, s_1 i_{1,1}+p_1, s_2 i_{1,2}+2p_2, 1}$ |
| $i_2'$ | 28 | 29 |
| | $W^{(2)}_{s_1 i_{1,1}, s_2 i_{1,2}, s_1 i_{1,1}+p_1, s_2 i_{1,2}, 0}$ | $W^{(2)}_{s_1 i_{1,1}, s_2 i_{1,2}, s_1 i_{1,1}+p_1, s_2 i_{1,2}, 1}$ |
| $i_2'$ | 32 | 33 |
| | $W^{(2)}_{s_1 i_{1,1}, s_2 i_{1,2}, s_1 i_{1,1}+p_1, s_2 i_{1,2}+p_2, 0}$ | $W^{(2)}_{s_1 i_{1,1}, s_2 i_{1,2}, s_1 i_{1,1}+p_1, s_2 i_{1,2}+p_2, 1}$ |
| $i_2'$ | 2 | 3 |
| | $W^{(2)}_{s_1 i_{1,1}, s_2 i_{1,2}+p_2, s_1 i_{1,1}, s_2 i_{1,2}+p_2, 0}$ | $W^{(2)}_{s_1 i_{1,1}, s_2 i_{1,2}+p_2, s_1 i_{1,1}, s_2 i_{1,2}+p_2, 0}$ |
| $i_2'$ | 6 | 7 |
| | $W^{(2)}_{s_1 i_{1,1}, s_2 i_{1,2}+3p_2, s_1 i_{1,1}, s_2 i_{1,2}+3p_2, 0}$ | $W^{(2)}_{s_1 i_{1,1}, s_2 i_{1,2}+3p_2, s_1 i_{1,1}, s_2 i_{1,2}+3p_2, 1}$ |
| $i_2'$ | 10 | 11 |
| | $W^{(2)}_{s_1 i_{1,1}, s_2 i_{1,2}+2p_2, s_1 i_{1,1}, s_2 i_{1,2}+2p_2, 0}$ | $W^{(2)}_{s_1 i_{1,1}, s_2 i_{1,2}+2p_2, s_1 i_{1,1}, s_2 i_{1,2}+2p_2, 1}$ |
| $i_2'$ | 14 | 15 |
| | $W^{(2)}_{s_1 i_{1,1}, s_2 i_{1,2}+p_2, s_1 i_{1,1}, s_2 i_{1,2}+3p_2, 0}$ | $W^{(2)}_{s_1 i_{1,1}, s_2 i_{1,2}+p_2, s_1 i_{1,1}, s_2 i_{1,2}+3p_2, 1}$ |

TABLE 65-continued

Master codebook for 2 layer CSI reporting for $(N_1, N_2) = (2, 4)$ and for $(L_1, L_2) = (2, 4)$

| $i_2'$ | 18 | 19 |
|---|---|---|
| | $W^{(2)}_{s_1i_{1,1}+p_1,s_2i_{1,2}+p_2,s_1i_{1,1}+p_1,s_2i_{1,2}+p_2,0}$ | $W^{(2)}_{s_1i_{1,1}+p_1,s_2i_{1,2}+p_2,s_1i_{1,1}+p_1,s_2i_{1,2}+p_2,1}$ |
| $i_2'$ | 22 | 23 |
| | $W^{(2)}_{s_1i_{1,1}+p_1,s_2i_{1,2},s_1i_{1,1}+p_1,s_2i_{1,2}+p_2,0}$ | $W^{(2)}_{s_1i_{1,1}+p_1,s_2i_{1,2},s_1i_{1,1}+p_1,s_2i_{1,2}+p_2,1}$ |
| $i_2'$ | 26 | 27 |
| | $W^{(2)}_{s_1i_{1,1}+p_1,s_2i_{1,2}+p_2,s_1i_{1,1}+p_1,s_2i_{1,2}+3p_2,0}$ | $W^{(2)}_{s_1i_{1,1}+p_1,s_2i_{1,2}+p_2,s_1i_{1,1}+p_1,s_2i_{1,2}+3p_2,1}$ |
| $i_2'$ | 30 | 31 |
| | $W^{(2)}_{s_1i_{1,1}+p_1,s_2i_{1,2},s_1i_{1,1}+p_1,s_2i_{1,2}+p_2,0}$ | $W^{(2)}_{s_1i_{1,1}+p_1,s_2i_{1,2},s_1i_{1,1}+p_1,s_2i_{1,2}+p_2,1}$ |
| $i_2'$ | 34 | 35 |
| | $W^{(2)}_{s_1i_{1,1}+p_1,s_2i_{1,2},s_1i_{1,1},s_2i_{1,2}+p_2,0}$ | $W^{(2)}_{s_1i_{1,1}+p_1,s_2i_{1,2},s_1i_{1,1},s_2i_{1,2}+2p_2,1}$ |

In some embodiments, a UE is configured with two different rank-3 and rank-4 master codebooks for the two antenna port configurations, $N_1 \geq N_2$ (config A) and $N_1 < N_2$ (config B). If $N_1 \geq N_2$, then the master rank-3 and rank-4 codebooks are according to TABLE 40 and TABLE 41, respectively, and if $N_1 < N_2$, then they are given TABLE 8 and TABLE 67, respectively, wherein the corresponding rank 3 precoder is either $$W^{(3)}_{m_1,m_2,m_2',m_2''} = \frac{1}{\sqrt{3Q}} \begin{bmatrix} v_{m_1} \otimes u_{m_2} & v_{m_1} \otimes u_{m_2'} & v_{m_1} \otimes u_{m_2''} \\ v_{m_1} \otimes u_{m_2} & -v_{m_1} \otimes u_{m_2'} & -v_{m_1} \otimes u_{m_2''} \end{bmatrix}$$

or $$\tilde{W}^{(3)}_{m_1,m_2,m_2',m_2''} = \frac{1}{\sqrt{3Q}} \begin{bmatrix} v_{m_1} \otimes u_{m_2} & v_{m_1} \otimes u_{m_2'} & v_{m_1} \otimes u_{m_2''} \\ v_{m_1} \otimes u_{m_2} & v_{m_1} \otimes u_{m_2'} & -v_{m_1} \otimes u_{m_2''} \end{bmatrix},$$

and the corresponding rank 4 precoder is $$W^{(4)}_{m_1,m_2,m_2',n} =$$

-continued $$\frac{1}{\sqrt{4Q}} \begin{bmatrix} v_{m_1} \otimes u_{m_2} & v_{m_1} \otimes u_{m_2'} & v_{m_1} \otimes u_{m_2} & v_{m_1} \otimes u_{m_2'} \\ \varphi_n v_{m_1} \otimes u_{m_2} & \varphi_n v_{m_1} \otimes u_{m_2'} & -\varphi_n v_{m_1} \otimes u_{m_2} & -\varphi_n v_{m_1} \otimes u_{m_2'} \end{bmatrix}.$$

Note that the beam grouping in the two codebooks constitute 4 beams in the longer dimension (4 ports) and 2 beams in shorter dimension. TABLE 66 and TABLE 67 respectively are constructed similar to TABLE 40 and TABLE 41 except that the four orthogonal beam pairs $\{(0,8),(2,10),(4,12),(6,14)\}$ are considered in the vertical dimension (2nd dimension).

In the longer dimension (4 ports), the codebook parameters are legacy Rel12 8-Tx parameters, i.e., if $N_1 \geq N_2$, then $s_1=8$, $p_1=1$, and $i_{1,1}=0$-3, and if $N_1 < N_2$, then $s_2=8$, $p_2=1$, and $i_{1,2}=0$-3. There are multiple alternatives for the parameters in the other dimension of the two codebooks. In one alternative, they are the same in both codebooks, i.e., $O_2$, $s_2$, and $p_2$ in case of $N_1 \geq N_2$ are the same as $O_1$, $s_1$, and $p_1$ in case of $N_1 < N_2$. In another alternative, they are different. In yet another alternative, a subset of them is the same, and another subset is different. For example, $O_1$ in case of $N_1 \geq N_2$ and $O_2$ in case of $N_1 < N_2$ are different, but other parameters are the same.

TABLE 66

Master codebook for 3 layer CSI reporting for $(N_1, N_2) = (2, 4)$ and for $(L_1, L_2) = (2, 4)$

| $i_2'$ | 0 | 1 | 2 | 3 |
|---|---|---|---|---|
| | $W^{(3)}_{s_1i_{1,1},s_2i_{1,2},s_2i_{1,2},s_2i_{1,2}+8}$ | $W^{(3)}_{s_1i_{1,1},s_2i_{1,2}+8,s_2i_{1,2},s_2i_{1,2}+8}$ | $\tilde{W}^{(3)}_{s_1i_{1,1},s_2i_{1,2}+8,s_2i_{1,2},s_2i_{1,2}}$ | $\tilde{W}^{(3)}_{s_1i_{1,1},s_2i_{1,2}+8,s_2i_{1,2}+8,s_2i_{1,2}}$ |
| $i_2'$ | 4 | 5 | 6 | 7 |
| | $W^{(3)}_{s_1i_{1,1},s_2i_{1,2}+2,s_2i_{1,2}+2,s_2i_{1,2}+10}$ | $W^{(3)}_{s_1i_{1,1},s_2i_{1,2}+10,s_2i_{1,2}+2,s_2i_{1,2}+10}$ | $\tilde{W}^{(3)}_{s_1i_{1,1},s_2i_{1,2}+10,s_2i_{1,2}+2,s_2i_{1,2}+2}$ | $\tilde{W}^{(3)}_{s_1i_{1,1},s_2i_{1,2}+10,s_2i_{1,2}+10,s_2i_{1,2}+2}$ |
| $i_2'$ | 8 | 9 | 10 | 11 |
| | $W^{(3)}_{s_1i_{1,1},s_2i_{1,2}+4,s_2i_{1,2}+4,s_2i_{1,2}+12}$ | $W^{(3)}_{s_1i_{1,1},s_2i_{1,2}+12,s_2i_{1,2}+4,s_2i_{1,2}+12}$ | $\tilde{W}^{(3)}_{s_1i_{1,1},s_2i_{1,2}+12,s_2i_{1,2},s_2i_{1,2}+4}$ | $\tilde{W}^{(3)}_{s_1i_{1,1},s_2i_{1,2}+12,s_2i_{1,2}+12,s_2i_{1,2}+4}$ |
| $i_2'$ | 12 | 13 | 14 | 15 |
| | $W^{(3)}_{s_1i_{1,1},s_2i_{1,2}+6,s_2i_{1,2}+6,s_2i_{1,2}+14}$ | $W^{(3)}_{s_1i_{1,1},s_2i_{1,2}+14,s_2i_{1,2}+6,s_2i_{1,2}+14}$ | $\tilde{W}^{(3)}_{s_1i_{1,1},s_2i_{1,2}+14,s_2i_{1,2}+6,s_2i_{1,2}+6}$ | $\tilde{W}^{(3)}_{s_1i_{1,1},s_2i_{1,2}+14,s_2i_{1,2}+14,s_2i_{1,2}+6}$ |
| $i_2'$ | 16-31 | | | |

Entries 16-31 constructed with replacing the second subscript $s_1i_{1,1}$ with $s_1i_{1,1}+p_1$ in entries 0-15.

TABLE 67

Master codebook for 4 layer CSI reporting for $(N_1, N_2) = (2, 4)$ and for $(L_1, L_2) = (2, 4)$

| $i_2'$ | 0 | 1 | 2 | 3 |
|---|---|---|---|---|
| | $W^{(4)}_{s_1i_{1,1},s_2i_{1,2},s_2i_{1,2}+8,0}$ | $W^{(4)}_{s_1i_{1,1},s_2i_{1,2},s_2i_{1,2}+8,1}$ | $W^{(4)}_{s_1i_{1,1},s_2i_{1,2}+2,s_2i_{1,2}+10,0}$ | $W^{(4)}_{s_1i_{1,1},s_2i_{1,2}+2,s_2i_{1,2}+10,1}$ |
| $i_2'$ | 4 | 5 | 6 | 7 |
| | $W^{(4)}_{s_1i_{1,1},s_2i_{1,2}+4,s_2i_{1,2}+12,0}$ | $W^{(4)}_{s_1i_{1,1},s_2i_{1,2}+4,s_2i_{1,2}+12,1}$ | $W^{(4)}_{s_1i_{1,1},s_2i_{1,2}+6,s_2i_{1,2}+14,0}$ | $W^{(4)}_{s_1i_{1,1},s_2i_{1,2}+6,s_2i_{1,2}+14,1}$ |
| $i_2'$ | | 8-15 | | |

Entries 8-15 constructed with replacing the second subscript $s_1i_{1,1}$ with $s_1i_{1,1}+p_1$ in entries 0-7.

Rank 3-4 codebooks corresponding to the case in which we have different beams (0,1) and (1,0) in the shorter dimension (2 ports), according to TABLE 45 and TABLE 52 can be constructed similarly.

In some embodiments, a UE is configured with two different rank 5-8 master codebooks for the two antenna port configurations, $N_1 \geq N_2$ (config A) and $N_1 < N_2$ (config B). If $N_1 \geq N_2$, then the master rank 5-8 codebooks are according to TABLE 43, and if $N_1 < N_2$, then they are given by TABLE 68, wherein the corresponding rank-5 precoder is the four orthogonal beams {0,8,16,24} are considered in the vertical dimension (2nd dimension).

In the longer dimension (4 ports), the codebook parameters are legacy Rel12 8-Tx parameters, i.e., if $N_1 \geq N_2$, then $s_1=2$, $p_1=1$, and $i_{1,1}=0$-3 for rank 5-7 and $i_{1,1}=0$ for rank 8, and if $N_1<N_2$, then $s_2=2$, $p_2=1$, and $i_{1,2}=0$-3 for rank 5-7 and $i_{1,2}=0$ for rank 8. There are multiple alternatives for the parameters in the other dimension of the two codebooks. In one alternative, they are the same in both codebooks, i.e., $O_2$, $s_2$, and $p_2$ in case of $N_1 \geq N_2$ are the same as $O_1$, $s_1$, and $$W^{(5)}_{m_1,m_2} = \frac{1}{\sqrt{5Q}} \begin{bmatrix} v_{m_1} \otimes u_{m_2} & v_{m_1} \otimes u_{m_2} & v_{m_1} \otimes u_{m_2+8} & v_{m_1} \otimes u_{m_2+8} & v_{m_1} \otimes u_{m_2+16} \\ v_{m_1} \otimes u_{m_2} & -v_{m_1} \otimes u_{m_2} & v_{m_1} \otimes u_{m_2+8} & -v_{m_1} \otimes u_{m_2+8} & v_{m_1} \otimes u_{m_2+16} \end{bmatrix},$$

the corresponding rank-6 precoder is $$W^{(6)}_{m_1,m_2} = \frac{1}{\sqrt{6Q}} \begin{bmatrix} v_{m_1} \otimes u_{m_2} & v_{m_1} \otimes u_{m_2} & v_{m_1} \otimes u_{m_2+8} & v_{m_1} \otimes u_{m_2+8} & v_{m_1} \otimes u_{m_2+16} & v_{m_1} \otimes u_{m_2+16} \\ v_{m_1} \otimes u_{m_2} & -v_{m_1} \otimes u_{m_2} & v_{m_1} \otimes u_{m_2+8} & -v_{m_1} \otimes u_{m_2+8} & v_{m_1} \otimes u_{m_2+16} & -v_{m_1} \otimes u_{m_2+16} \end{bmatrix},$$

the corresponding rank-7 precoder is $$W^{(7)}_{m_1,m_2} = \frac{1}{\sqrt{7Q}}$$

$$\begin{bmatrix} v_{m_1} \otimes u_{m_2} & v_{m_1} \otimes u_{m_2} & v_{m_1} \otimes u_{m_2+8} & v_{m_1} \otimes u_{m_2+8} & v_{m_1} \otimes u_{m_2+16} & v_{m_1} \otimes u_{m_2+16} & v_{m_1} \otimes u_{m_2+24} \\ v_{m_1} \otimes u_{m_2} & -v_{m_1} \otimes u_{m_2} & v_{m_1} \otimes u_{m_2+8} & -v_{m_1} \otimes u_{m_2+8} & v_{m_1} \otimes u_{m_2+16} & -v_{m_1} \otimes u_{m_2+16} & v_{m_1} \otimes u_{m_2+24} \end{bmatrix},$$

and the corresponding rank-8 precoder is $$W^{(8)}_{m_1,m_2} = \frac{1}{\sqrt{8Q}}$$

$$\begin{bmatrix} v_{m_1} \otimes u_{m_2} & v_{m_1} \otimes u_{m_2} & v_{m_1} \otimes u_{m_2+8} & v_{m_1} \otimes u_{m_2+8} & v_{m_1} \otimes u_{m_2+16} & v_{m_1} \otimes u_{m_2+16} & v_{m_1} \otimes u_{m_2+24} & v_{m_1} \otimes u_{m_2+24} \\ v_{m_1} \otimes u_{m_2} & -v_{m_1} \otimes u_{m_2} & v_{m_1} \otimes u_{m_2+8} & -v_{m_1} \otimes u_{m_2+8} & v_{m_1} \otimes u_{m_2+16} & -v_{m_1} \otimes u_{m_2+16} & v_{m_1} \otimes u_{m_2+24} & -v_{m_1} \otimes u_{m_2+24} \end{bmatrix}.$$

Note that the beam grouping in the two codebooks constitute 4 orthogonal beams {0,8,16,24} in the longer dimension (4 ports) and 2 beams in shorter dimension. TABLE 68 is constructed similar to TABLE 43 except that $p_1$ in case of $N_1<N_2$. In another alternative, they are different. In yet another alternative, a subset of them is the same, and another subset is different. For example, $O_1$ in case of $N_1 \geq N_2$ and $O_2$ in case of $N_1<N_2$ are different, but other parameters are the same.

TABLE 68

Master codebook for r = {5, 6, 7, 8} layer CSI reporting for
$(N_1, N_2) = (2, 4)$ and for $(L_1, L_2) = (2, 4)$

| $i_{2'}$ | 0 | 1 |
|---|---|---|
| Precoder | $W_{s_1 i_{1,1}, s_2 i_{1,2}}^{(r)}$ | $W_{s_1 i_{1,1}+p_1, s_2 i_{1,2}}^{(r)}$ |

Rank 5-8 codebooks corresponding to the case in which we have different beams (0,1) and (1,0) in the shorter dimension (2 ports), according to TABLE 45 and TABLE 52 can be constructed similarly.

In some embodiment, the configuration about the selected beam group or codebook subset selection from the master codebook of rank 1-8 in this different master codebook case is according to some embodiments of this disclosure, wherein the configuration of the beam group is dependent upon the configured $(N_1, N_2)$. For example, for $N_1 \geq N_2$, the beam groups are as shown in FIG. 47 and for $N_1 < N_2$, they are the transpose of the corresponding beam groups in FIG. 47.

Concrete Example

FD-MIMO codebook of rank 1-8 is configured with $N_1, N_2, O_1, O_2$ via RRC signaling, where the configured values of $N_1$ and $N_2$ are from the set $\{1,2,3,4,6,8\}$ such that $2N_1 \cdot N_2 = \{8, 12, 16\}$, and the configured values of $O_1$ and $O_2$ are from the set $\{2,4,8\}$. The codebook has a double codebook structure: $W=W_1 W_2$, according to some embodiments of this disclosure. In particular, $W_1 =$ $$\begin{pmatrix} X_1^{m_1} \otimes X_2^{m_2} & 0 \\ 0 & X_1^{m_1} \otimes X_2^{m_2} \end{pmatrix},$$

where $m_i$ is the index for $X_i$;

$X_1$ is a $N_1 \times L_1$ matrix with $L_1$ column vectors being an $O_1 \times$ oversampled DFT vector of length $N_1$:

$$v_l = \begin{bmatrix} 1 & e^{\frac{j2\pi l}{N_1 O_1}} & \ldots & e^{\frac{j2\pi (N_1-1)l}{N_1 O_1}} \end{bmatrix}^t;$$

and $X_2$ is a $N_2 \times L_2$ matrix with $L_2$ column vectors being an $O_2 \times$ oversampled DFT vector of length $N_2$:

$$v_l = \begin{bmatrix} 1 & e^{\frac{j2\pi l}{N_2 O_2}} & \ldots & e^{\frac{j2\pi (N_2-1)l}{N_2 O_2}} \end{bmatrix}^t.$$

For rank 1-4 $W_2$, the codebook table has 4×2 beams, i.e., $(L_1, L_2)=(4,2)$ where a 1st dimension is the longer dimension and a 2nd dimension is the shorter dimension of the configured antenna port layout or $(N_1, N_2)$. A subset of codewords from the codebook table is selected for $W_2$ or $i_2$ to be reported.

The number of $i_2$ hypotheses after CSS will be 16 for rank 1, 2 and 3, which is smaller than the total number of $i_2$ indices in the rank-specific codebook table. The CSS allows non-adjacent 2D beam sampling.

The choice of subset is configured via RRC in the form on CSS configuration, which determines a 2D beam group used in $W_1$. For each $(N_1, N_2)$ pair, the indicated 2D beam group satisfies the condition $L_1 \cdot L_2 \leq 4$. For example, the indicated beam group is one of the following four:

BG0: a beam group related to either $(L_1,L_2)=(4,1)$ or $(1,4)$, wherein the 4 beams are along the longer dimension. An example of such a beam group is 820 in FIG. 35;

BG1: a beam group corresponding to $(L_1,L_2)=(2,2)$, which corresponds to a square. A few examples of such a beam group are 830a, 830b, 830c in FIG. 35;

BG2: a beam group corresponding to $(L_1,L_2)=(2,2)$, which corresponds to non-adjacent 2D beams or checkerboard. A few examples of such a beam group are 830d, 380e, 830f in FIG. 35; and BG3: a beam group corresponding to $(L_1,L_2)=(1,1)$, which corresponds to one beam selection. An example of such a beam group is 860 in FIG. 35.

Note that the $W_2$ payload size varies according to 2D beam group configuration. For example, BG0-BG2, the payload is 4 bits for rank-1 $i_2$ reporting, and it is 2 bits for BG3 assuming QPSK alphabet $\{1,j,-1,-j\}$ for co-phase reporting, and no beam selection information is necessary here.

Furthermore, the beam groups (BG) can be classified into two sets:

Set 1: This set corresponds to beam groups with $(L_1, L_2)$ such that either $L_1$ or $L_2 > 1$. An example of beam groups in this set is BG0, BG1, and BG2, which satisfy $L_1 \cdot L_2 = 4$.

$i_2$ payload: The legacy Rel12 $W_2$ (or $i_2$) payload size can be used, i.e., 4 bits for rank 1-3 $i_2$ reporting and 3 bits for rank-4 $i_2$ reporting.

$i_1$ ($i_{1,1}$, $i_{1,2}$) payload: For $W_1$ or $i_1$ reporting, ceil($\log_2(N_1 O_1/2)$)+ceil($\log_2(N_2 O_2/2)$) bits are used where the beam skipping (or beam group spacing) parameters are $s_1=s_2=2$.

Set 2: This set corresponds to $L_1 \cdot L_2 = 1$ (or $L_1 = L_2 = 1$, one beam), and hence no beam selection is needed. An example of this set is BG3.

$i_2$ payload: 2 bits are used for rank 1-4 $i_2$ reporting.

$i_1$ ($i_{1,1}$, $i_{1,2}$) payload: For $W_1$ or $i_1$ reporting, ceil($\log_2(N_1 O_1)$)+ceil($\log_2(N_2 O_2)$) bits are used where the beam skipping (or beam group spacing) parameters are $s_1=s_2=1$.

In some embodiments, a UE can be configured with either Set 1 or Set 2 by RRC. In one example, only one BG is included in Set 1. In another example, the UE is also configured with a BG if Set 1 is configured. Then, the UE will report PMI, of which the payload size is determined dependent upon which set is configured; in addition the UE will use the configured BG to select a beam and corresponding precoder.

In some embodiments, a UE can be configured with a BG out of BG0, BG1, BG2, and BG3 by RRC. The UE determines the set to which the configured BG belongs, which in turn determines the payload size for PMI reporting. The UE then uses the configured BG to select a beam and corresponding precoder.

In some embodiments, a UE is configured to select and report one of Set 1 and Set 2 to eNB, which uses the selected set to configure PMI codebook. In one example, only one BG is included in Set 1. In another example, UE also selects a BG if it reports Set 1.

In some embodiments, a UE is configured to select and report one of BG0, BG1, BG2, and BG3 to eNB, which uses the selected BG to configure PMI codebook.

More Rank-2 Codebook Designs: Design 1

Figure 50:
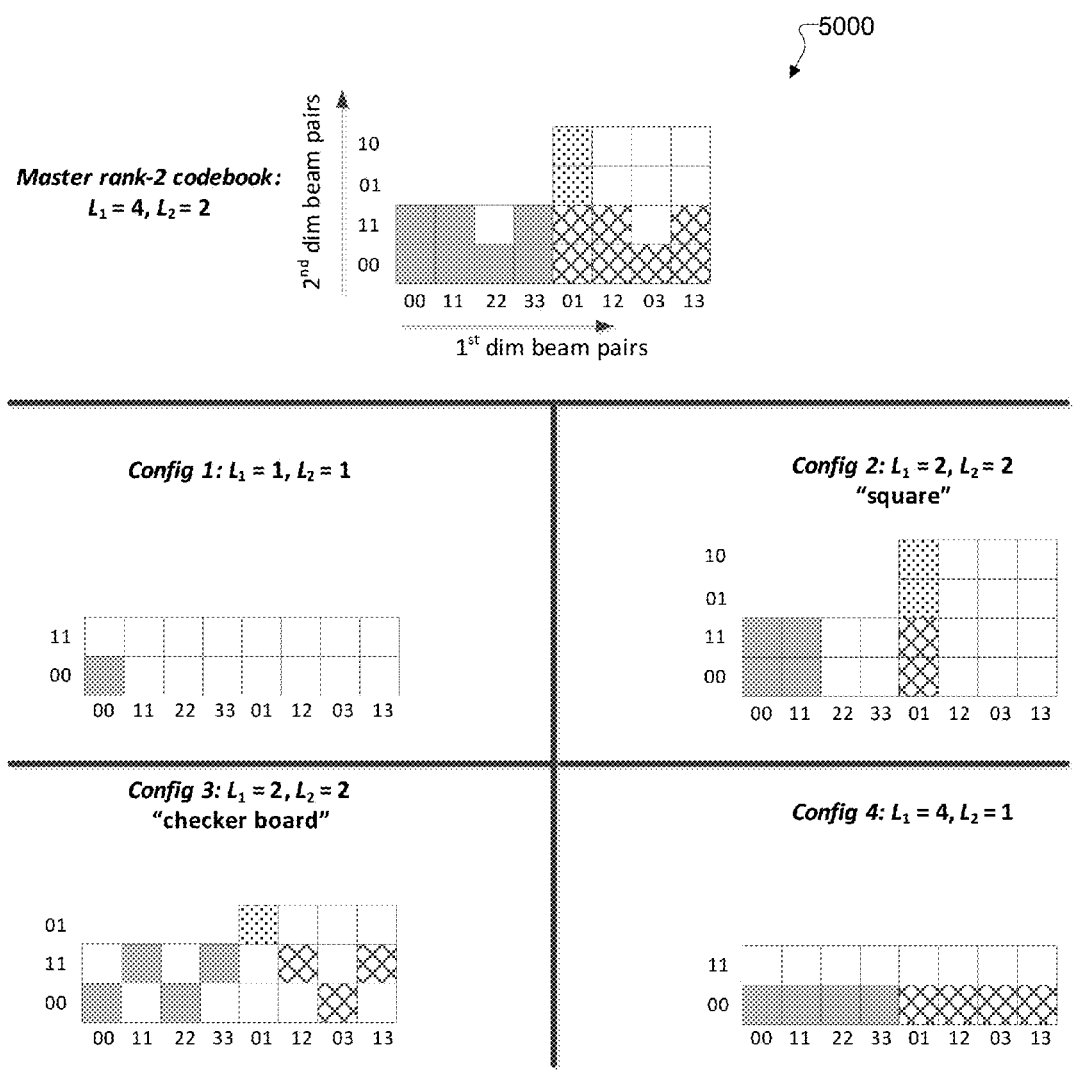
FIG. 50 illustrates the master rank-2 codebook designed according to Design 1 according to the present disclosure.

FIG. 50 illustrates the master rank-2 codebook 5000 designed according to Design 1 according to the present disclosure. The embodiment shown in FIG. 50 is for illustration only. Other embodiments could be used without departing from the scope of the present disclosure.

The codebook comprises of rank-2 beam pairs corresponding to four rank-2 configurations (or beam grouping schemes):

Config 1 is for $(L_1,L_2)=(1,1)$ configuration and the selected rank-2 beam pair is located at $\{(00,00)\}$;

Config 2 is for $(L_1,L_2)=(2,2)$—square configuration, which corresponds to 4 Type 1 pairs $\{(00,00), (00,11), (11,00), (11,11)\}$, 2 Type 2-1 pairs $\{(01,00), (01,11)\}$, and 2 Type 2-3 pairs $\{(01,01), (01,10)\}$;

Config 3 is for $(L_1,L_2)=(2,2)$—checker board configuration, which corresponds to 4 Type 1 pairs $\{(00,00), (00,22), (11,11), (11,33)\}$, 3 Type 2-1 pairs $\{(03,00), (12,11), (13,11)\}$, and 1 Type 2-3 pairs $\{(01,01)\}$; and Config 4 is for $(L_1,L_2)=(4,1)$ configuration and the selected rank-2 beam pairs correspond to 8 pairs located at $\{(x,00)\}$ where x is according to TABLE 37.

In total, the codebook comprises of 16 rank-2 beam pair combinations, which are shown as a shaded and pattern squares in the 2D grid (x,y), where the first component x corresponds to the legacy Rel12 8-Tx based rank-2 beam pairs for the first dimension ($L_1$=4, see TABLE 37) and the second component y corresponds to the beam pairs for the second dimension ($L_2$=2) according to TABLE 52. The shaded and pattern squares represent the rank-2 $i_2$ (or $i_{2,1}$ and $i_{2,2}$) indices that are selected based at least one of the four configurations (or beam grouping schemes) and the white squares represent the indices that are not selected by any configurations.

TABLE 69 shows the rank-2 (2 layer) master codebook according to this design that can be used for any of Q=12, 16 and 32 antenna configurations, wherein TABLE 37 and TABLE 52, respectively are used for the beam pairs in the longer and the shorter dimension to construct the master rank-2 codebook. Note that the number of rank-2 $i_2$ indices in this master codebook is 32.

TABLE 69

Master codebook for 2 layer CSI reporting for $(L_1, L_2) = (4, 2)$

| $i_2'$ | 0-15 |
|---|---|
| Entries 0-15 are identical to those in TABLE 38. | |
| $i_2'$ | 16 — 17 |
| | $W^{(2)}_{s_1 i_{1,1}, s_2 i_{1,2}+p_2, s_1 i_{1,1}, s_2 i_{1,2}+p_2, 0}$ — $W^{(2)}_{s_1 i_{1,1}, s_2 i_{1,2}+p_2, s_1 i_{1,1}, s_2 i_{1,2}+p_2, 1}$ |
| $i_2'$ | 20 — 21 |
| | $W^{(2)}_{s_1 i_{1,1}+3p_1, s_2 i_{1,2}+p_2, s_1 i_{1,1}+3p_1, s_2 i_{1,2}+p_2, 0}$ — $W^{(2)}_{s_1 i_{1,1}+3p_1, s_2 i_{1,2}+p_2, s_1 i_{1,1}+3p_1, s_2 i_{1,2}+p_2, 1}$ |
| $i_2'$ | 24 — 25 |
| | $W^{(2)}_{s_1 i_{1,1}+p_1, s_2 i_{1,2}+p_2, s_1 i_{1,1}+2p_1, s_2 i_{1,2}+p_2, 0}$ — $W^{(2)}_{s_1 i_{1,1}+p_1, s_2 i_{1,2}+p_2, s_1 i_{1,1}+2p_1, s_2 i_{1,2}+p_2, 1}$ |
| $i_2'$ | 28 — 29 |
| | $W^{(2)}_{s_1 i_{1,1}, s_2 i_{1,2}, s_1 i_{1,1}+p_1, s_2 i_{1,2}+p_2, 0}$ — $W^{(2)}_{s_1 i_{1,1}, s_2 i_{1,2}, s_1 i_{1,1}+p_1, s_2 i_{1,2}+p_2, 1}$ |
| $i_2'$ | 0-15 |
| Entries 0-15 are identical to those in TABLE 38. | |
| $i_2'$ | 18 — 19 |
| | $W^{(2)}_{s_1 i_{1,1}+p_1, s_2 i_{1,2}+p_2, s_1 i_{1,1}+p_1, s_2 i_{1,2}+p_2, 0}$ — $W^{(2)}_{s_1 i_{1,1}+p_1, s_2 i_{1,2}+p_2, s_1 i_{1,1}+p_1, s_2 i_{1,2}+p_2, 1}$ |
| $i_2'$ | 22 — 23 |
| | $W^{(2)}_{s_1 i_{1,1}, s_2 i_{1,2}+p_2, s_1 i_{1,1}+p_1, s_2 i_{1,2}+p_2, 0}$ — $W^{(2)}_{s_1 i_{1,1}, s_2 i_{1,2}+p_2, s_1 i_{1,1}+p_1, s_2 i_{1,2}+p_2, 1}$ |
| $i_2'$ | 26 — 27 |
| | $W^{(2)}_{s_1 i_{1,1}+p_1, s_2 i_{1,2}+p_2, s_1 i_{1,1}+3p_1, s_2 i_{1,2}+p_2, 0}$ — $W^{(2)}_{s_1 i_{1,1}+p_1, s_2 i_{1,2}+p_2, s_1 i_{1,1}+3p_1, s_2 i_{1,2}+p_2, 1}$ |
| $i_2'$ | 30 — 31 |
| | $W^{(2)}_{s_1 i_{1,1}, s_2 i_{1,2}+p_2, s_1 i_{1,1}+p_1, s_2 i_{1,2}, 0}$ — $W^{(2)}_{s_1 i_{1,1}, s_2 i_{1,2}+p_2, s_1 i_{1,1}+p_1, s_2 i_{1,2}, 1}$ |

More Rank-2 Codebook Designs: Design 2

Figure 51:
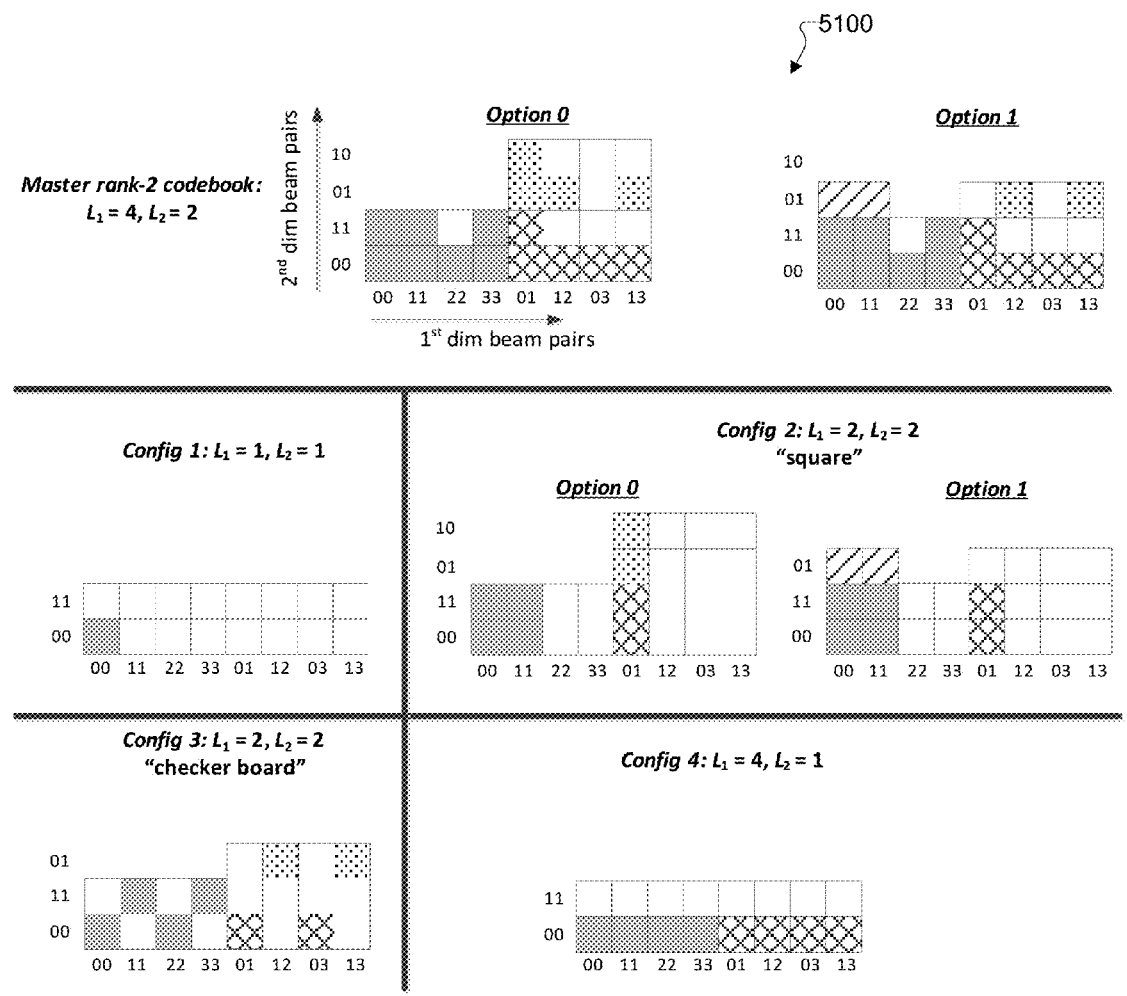
FIG. 51 illustrates the master rank-2 codebook designed according to Design 2 according to embodiments of the present disclosure.

FIG. 51 illustrates the master rank-2 codebook 5100 designed according to Design 2 according to embodiments of the present disclosure. The embodiment shown in FIG. 51 is for illustration only. Other embodiments could be used without departing from the scope of the present disclosure.

The codebook comprises of rank-2 beam pairs corresponding to four rank-2 configurations (or beam grouping schemes):

Config 1 is for $(L_1,L_2)=(1,1)$ configuration and the selected rank-2 beam pair is located at $\{(00,00)\}$;

Config 2 is for $(L_1,L_2)=(2,2)$—square configuration, and has two option:

Option 0 corresponds to 4 Type 1 pairs {(00,00), (00,11), (11,00), (11,11)}, 2 Type 2-1 pairs {(01,00), (01,11)}, and 2 Type 2-3 pairs {(01,01), (01,10)}, and Option 1 corresponds to 4 Type 1 pairs {(00,00), (00,11), (11,00), (11,11)}, 2 Type 2-1 pairs {(01,00), (01,11)}, and 2 Type 2-2 pairs {(00,01), (11,10)};

Config 3 is for $(L_1,L_2)=(2,2)$—checker board configuration, which corresponds to 4 Type 1 pairs {(00,00), (00,22), (11,11), (11,33)}, 2 Type 2-1 pairs {(01,00), (03,00)}, and 2 Type 2-3 pairs {(12,01), (13,01)}; and Config 4 is for $(L_1,L_2)=(4,1)$ configuration and the selected rank-2 beam pairs correspond to 8 pairs located at {(x,00)} where x is according to TABLE 37.

In total, the codebook comprises of 16 rank-2 beam pair combinations for each of Option 0 and Option 1, which are shown as a shaded and pattern squares in the 2D grid (x,y), where the first component x corresponds to the legacy Rel12 8-Tx based rank-2 beam pairs for the first dimension ($L_1$=4, see TABLE 37) and the second component y corresponds to the beam pairs for the second dimension ($L_2$=2) according to TABLE 52. The shaded and pattern squares represent the rank-2 $i_2$ (or $i_{2,1}$ and $i_{2,2}$) indices that are selected based at least one of the four configurations (or beam grouping schemes) and the white squares represent the indices that are not selected by any configurations.

TABLE 70 shows the rank-2 (2 layer) master codebook according to this design that can be used for any of Q=12, 16 and 32 antenna configurations, wherein TABLE 37 and TABLE 52, respectively are used for the beam pairs in the longer and the shorter dimension to construct the master rank-2 codebook. Note that the number of rank-2 $i_2$ indices in this master codebook is 32.

TABLE 70

Master codebook for 2 layer CSI reporting for $(L_1, L_2) = (4, 2)$

| $i_2'$ | 0-15 | |
|---|---|---|
| | Entries 0-15 are identical to those in TABLE 38. | |
| $i_2'$ | 16 | 17 |
| | $W^{(2)}_{s_1i_{1,1},s_2i_{1,2}+p_2,s_1i_{1,1},s_2i_{1,2}+p_2,0}$ | $W^{(2)}_{s_1i_{1,1},s_2i_{1,2}+p_2,s_1i_{1,1},s_2i_{1,2}+p_2,1}$ |
| $i_2'$ | 20 | 21 |
| | $W^{(2)}_{s_1i_{1,1}+3p_1,s_2i_{1,2}+p_2,s_1i_{1,1}+3p_1,s_2i_{1,2}+p_2,0}$ | $W^{(2)}_{s_1i_{1,1}+3p_1,s_2i_{1,2}+p_2,s_1i_{1,1}+3p_1,s_2i_{1,2}+p_2,1}$ |
| $i_2'$ | 24 | 25 |
| | $W^{(2)}_{s_1i_{1,1}+p_1,s_2i_{1,2},s_1i_{1,1}+2p_1,s_2i_{1,2}+p_2,0}$ | $W^{(2)}_{s_1i_{1,1}+p_1,s_2i_{1,2},s_1i_{1,1}+2p_1,s_2i_{1,2}+p_2,1}$ |
| $i_2'$ | 28 | 29 |
| | Option 0: $W^{(2)}_{s_1i_{1,1},s_2i_{1,2},s_1i_{1,1}+p_1,s_2i_{1,2}+p_2,0}$ Option 1: $W^{(2)}_{s_1i_{1,1},s_2i_{1,2},s_1i_{1,1},s_2i_{1,2}+p_2,0}$ | Option 0: $W^{(2)}_{s_1i_{1,1},s_2i_{1,2},s_1i_{1,1}+p_1,s_2i_{1,2}+p_2,1}$ Option 1: $W^{(2)}_{s_1i_{1,1},s_2i_{1,2},s_1i_{1,1},s_2i_{1,2}+p_2,1}$ |
| $i_2'$ | 0-15 | |
| | Entries 0-15 are identical to those in TABLE 38. | |
| $i_2'$ | 18 | 19 |
| | $W^{(2)}_{s_1i_{1,1}+p_1,s_2i_{1,2}+p_2,s_1i_{1,1}+p_1,s_2i_{1,2}+p_2,0}$ | $W^{(2)}_{s_1i_{1,1}+p_1,s_2i_{1,2}+p_2,s_1i_{1,1}+p_1,s_2i_{1,2}+p_2,1}$ |
| $i_2'$ | 22 | 23 |
| | $W^{(2)}_{s_1i_{1,1},s_2i_{1,2}+p_2,s_1i_{1,1}+p_1,s_2i_{1,2}+p_2,0}$ | $W^{(2)}_{s_1i_{1,1},s_2i_{1,2}+p_2,s_1i_{1,1}+p_1,s_2i_{1,2}+p_2,1}$ |
| $i_2'$ | 26 | 27 |
| | $W^{(2)}_{s_1i_{1,1}+p_1,s_2i_{1,2},s_1i_{1,1}+3p_1,s_2i_{1,2}+p_2,0}$ | $W^{(2)}_{s_1i_{1,1}+p_1,s_2i_{1,2},s_1i_{1,1}+3p_1,s_2i_{1,2}+p_2,1}$ |
| $i_2'$ | 30 | 31 |
| | Option 0: $W^{(2)}_{s_1i_{1,1},s_2i_{1,2}+p_2,s_1i_{1,1}+p_1,s_2i_{1,2},0}$ Option 1: $W^{(2)}_{s_1i_{1,1}+p_1,s_2i_{1,2}+p_2,s_1i_{1,1}+p_1,s_2i_{1,2},0}$ | Option 0: $W^{(2)}_{s_1i_{1,1},s_2i_{1,2}+p_2,s_1i_{1,1}+p_1,s_2i_{1,2},1}$ Option 1: $W^{(2)}_{s_1i_{1,1}+p_1,s_2i_{1,2}+p_2,s_1i_{1,1}+p_1,s_2i_{1,2},1}$ |

Figure 52:
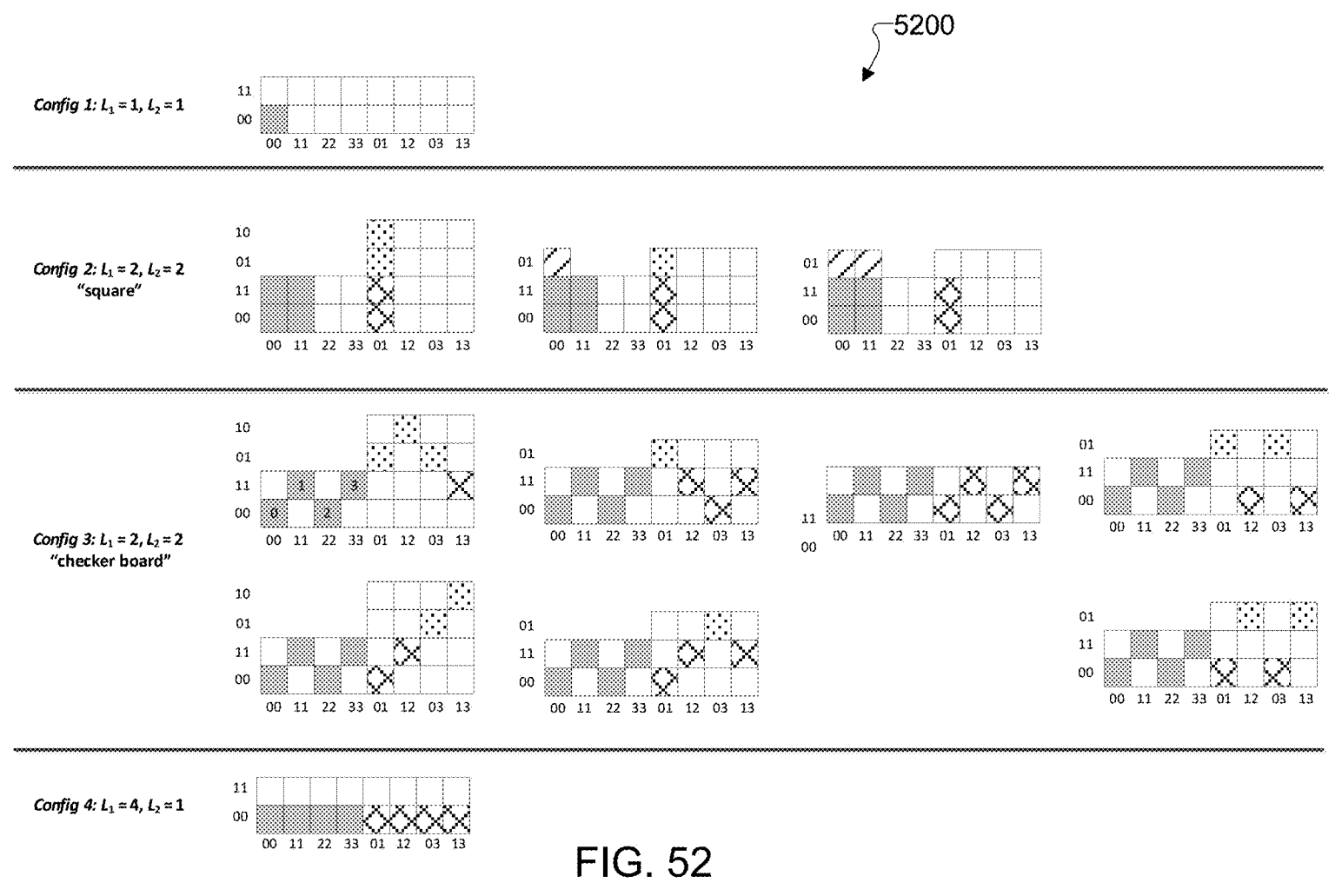

FIG. 52 illustrates beam grouping options 5200 for Config 1, Config 2, Config 3, and Config 4. The embodiment shown in FIG. 51 is for illustration only. Other embodiments could be used without departing from the scope of the present disclosure.

In some embodiments, a UE is configured with one of Option 0 and Option 1 if it is configured with Config 2.

In some embodiments, a UE is configured with Config 2 with the pre-determined option, for example Option 0.

In some embodiments, a UE is configured with one of Config 1, Config 2, Config 3, and Config 4. Depending on the configuration, the UE selects $i'_2$ indices in TABLE 69 (or TABLE 70) according to TABLE 71 and sequentially maps them to 0-1 for Config 1, and 0 0-15 for Config 2-4 in order to report $i_2$ PMI.

In one method, a UE uses the beam group spacing parameters $(s_1, s_2)$ according to TABLE 71 depending on the configuration.

In one method, a UE uses the following values in TABLE 69 (or TABLE 70): $i_{1,1}=0,1,\ldots,O_1N_1/s_1-1$; $i_{1,2}=0,1,\ldots,O_2N_2/s_2-1$; and $p_1=1$ and $p_2=1$.

TABLE 71

Selected $i_2'$ indices according to configurations (TABLE 69 and TABLE 70)

| Config | Selected $i_2'$ indices | $(s_1, s_2)$ |
|---|---|---|
| 1 | 0-1 | (1, 1) |
| 2 | 0-3, 8-9, 16-19, 22-23, 28-31 | (2, 2) |
| 3 | 0-1, 4-5, 12-13, 18-21, 24-27, 28-29 | (2, 2) |
| 4 | 0-15 | (2, 2) |

In some embodiments, a UE reports a preferred configuration, selected from Config 1, Config 2, Config 3, and Config 4.

In some embodiments, the master rank-2 codebook is designed by selecting at least one rank-2 beam pair option from multiple options shown in FIG. 52 for each of Config 1, Config 2, Config 3, and Config 4.

In one method, from the designed master codebook, a UE is configured with one configuration from the Config 1, Config 2, Config 3, and Config 4 that comprise the master codebook according to some embodiments of this disclosure.

In another method, from the designed master codebook, a UE reports one configuration from the Config 1, Config 2, Config 3, and Config 4 that comprise the master codebook according to some embodiment.

Rank 2 Codebook Design Based on Nested Property with Rank 1 Codebook

FIG. 53 illustrates rank 2 beam pairs 5300 based on nested property with rank 1 beams according to embodiments of the present disclosure. The embodiment shown in FIG. 51 is for illustration only. Other embodiments could be used without departing from the scope of the present disclosure.

In some embodiments, the master rank-2 codebook is designed with the nested property with the rank-1 codebook in the sense that the rank-2 beam pairs for the two layers are formed using the beams in the rank-1 codebook (TABLE 35).

In some embodiments, the nested master rank-2 codebook is designed as shown in FIG. 53. The codebook comprises of rank-2 beam pairs corresponding to four configurations (or beam grouping schemes), namely Config 1, Config 2, Config 3, and Config 4, where:

Config 1 is for $(L_1, L_2)=(1,1)$ configuration;
Config 2 is for $(L_1, L_2)=(2,2)$—square configuration;
Config 3 is for $(L_1, L_2)=(2,2)$—checker board configuration; and
Config 4 is for $(L_1, L_2)=(4,1)$ configuration.

Note that Config 1 corresponds to a single beam located at (0,0), and hence the corresponding rank-2 beam pair is (00,00).

Config 2-4 correspond to beam grouping schemes with 4 beams. As shown in the leftmost column of FIG. 53, for each of Config 2, Config 3, and Config 4, the four rank-1 beams are numbered as 0, 1, 2, and 3. From these numbered rank-1 beams, eight rank-2 beam pairs are constructed as follows:

Config 2 has three options to construct nested rank-2 beam pairs:
- Option 0: In this option, the four beams (0,0), (0,1), (1,1), and (1,0) are first numbered as 0,1,2, and 3 respectively, and then legacy 8-Tx rank-2 beam pairs are formed according to TABLE 35;
- Option 1: In this option, the legacy 2-Tx rank-2 beam pairs (0,0), (1,1), and (0,1) are considered in one dimension d={1,2}, and the same beam pair (0,0) and (1,1) are considered in the other dimension; and
- Option 2: In this option, 2 diagonal beam pairs corresponding to {(0,0),(1,1)} and {(0,1),(1,0)}, and 2 horizontal (or first or longer dimension) beam pairs corresponding to {(0,0),(0,1)} and {(1,0),(1,1)} beam pairs are considered; and Config 3 and 4 rank-2 beam pairs are according to the legacy Rel10 rank-2 beam pairs (TABLE 35).

In the middle column of FIG. 53, the corresponding eight rank-2 beam pairs are shown as grey and three different pattern squares, and they are also numbered as 0-7. Note that for Config 2, three different rank-2 beam pairs are shown corresponding to Options 0-2. TABLE 72 tabulates the rank-1 beams and rank-2 beam pairs according to this construction for the four configurations.

The rightmost column of FIG. 53 shows all rank-2 beam pairs according to this construction. Note that there are 18 (17) rank-2 beam pairs for Options 0-1 (Option 2) that are numbered as 0-17 (16) in the figure. The shaded and pattern squares represent the rank-2 beam pairs that are selected based at least one of the four configurations (or beam grouping schemes) and the white squares represent the indices that are not selected by any configurations.

TABLE 72

1: Rank 2 beam pairs with nested property with rank 1 beams

| | Rank 1 beams (1st dim, 2nd dim) | | | | Rank 2 beam pairs (1st dim pair, 2nd dim pair) | | | | | | | |
|---|---|---|---|---|---|---|---|---|---|---|---|---|
| Configurations | 0 | 1 | 2 | 3 | 0 | 1 | 2 | 3 | 4 | 5 | 6 | 7 |
| Config 1 | (0,0) | — | — | — | (00, 00) | — | — | — | — | — | — | — |
| Config 2 (Option 0) | (0,0) | (0,1) | (1,1) | (1,0) | (00, 00) | (00, 11) | (11, 11) | (11, 00) | (01, 00) | (01, 11) | (01, 00) | (01, 10) |
| Config 2 (Option 1) | | | | | | | | | | | (01, 00) | (01, 11) |
| Config 2 (Option 0) | | | | | | | | | | | (01, 01) | (01, 10) |
| Config 3 | (0,0) | (1,1) | (2,0) | (3,1) | (00, 00) | (11, 11) | (22, 00) | (33, 11) | (01, 01) | (12, 10) | (03, 01) | (13, 11) |
| Config 4 | (0,0) | (1,0) | (2,0) | (3,0) | (00, 00) | (11, 00) | (22, 00) | (33, 00) | (01, 00) | (12, 00) | (03, 00) | (13, 00) |

TABLE 73 shows the nested rank-2 (2 layer) master codebook according to this design that can be used for any of Q=12, 16 and 32 antenna configurations, wherein TABLE 72 is used for the nested rank-2 beam pairs. Note that the number of rank-2 $i'_2$ indices in this master codebook is 36 for Options 0-1 and is 34 for Option 2.

In some embodiments, a UE is configured with one of Config 1, Config 2, Config 3, and Config 4. Depending on the configuration, the UE selects $i'_2$ indices in TABLE 73 according to TABLE 74 and sequentially maps them to 0-1 for Config 1, and 0 0-15 for Config 2-4 in order to report $i_2$ PMI.

TABLE 73

| | | |
|---|---|---|
| | Nested master codebook for 2 layer CSI reporting for $(L_1, L_2) = (4, 2)$ | |
| $i_{2'}$ | 0-15 | |
| | Entries 0-15 are identical to those in TABLE 38. | |
| $i_{2'}$ | 16 | 17 |
| | $W^{(2)}_{s_1i_{1,1},s_2i_{1,2}+p_2,s_1i_{1,1},s_2i_{1,2}+p_2,0}$ | $W^{(2)}_{s_1i_{1,1},s_2i_{1,2}+p_2,s_1i_{1,1},s_2i_{1,2}+p_2,1}$ |
| $i_{2'}$ | 20 | 21 |
| | $W^{(2)}_{s_1i_{1,1}+3p_1,s_2i_{1,2}+p_2,s_1i_{1,1}+3p_1,s_2i_{1,2}+p_2,0}$ | $W^{(2)}_{s_1i_{1,1}+3p_1,s_2i_{1,2}+p_2,s_1i_{1,1}+3p_1,s_2i_{1,2}+p_2,1}$ |
| $i_{2'}$ | 24 | 25 |
| | $W^{(2)}_{s_1i_{1,1}+p_1,s_2i_{1,2}+p_2,s_1i_{1,1}+3p_1,s_2i_{1,2}+p_2,0}$ | $W^{(2)}_{s_1i_{1,1}+p_1,s_2i_{1,2}+p_2,s_1i_{1,1}+3p_1,s_2i_{1,2}+p_2,1}$ |
| $i_{2'}$ | 28 | 29 |
| | $W^{(2)}_{s_1i_{1,1}+p_1,s_2i_{1,2}+p_2,s_1i_{1,1}+2p_1,s_2i_{1,2},0}$ | $W^{(2)}_{s_1i_{1,1}+p_1,s_2i_{1,2}+p_2,s_1i_{1,1}+2p_1,s_2i_{1,2},1}$ |
| $i_{2'}$ | 32 | 33 |
| | Option 0 and 2: $W^{(2)}_{s_1i_{1,1},s_2i_{1,2}+p_2,s_1i_{1,1}+p_1,s_2i_{1,2},0}$ Option 1: $W^{(2)}_{s_1i_{1,1}+p_1,s_2i_{1,2},s_1i_{1,1}+p_1,s_2i_{1,2}+p_2,0}$ | Option 0 and 2: $W^{(2)}_{s_1i_{1,1},s_2i_{1,2}+p_2,s_1i_{1,1}+p_1,s_2i_{1,2},1}$ Option 1: $W^{(2)}_{s_1i_{1,1}+p_1,s_2i_{1,2},s_1i_{1,1}+p_1,s_2i_{1,2}+p_2,1}$ |
| $i_{2'}$ | 0-15 | |
| | Entries 0-15 are identical to those in TABLE 38. | |
| $i_{2'}$ | 18 | 19 |
| | $W^{(2)}_{s_1i_{1,1}+p_1,s_2i_{1,2}+p_2,s_1i_{1,1}+p_1,s_2i_{1,2}+p_2,0}$ | $W^{(2)}_{s_1i_{1,1}+p_1,s_2i_{1,2}+p_2,s_1i_{1,1}+p_1,s_2i_{1,2}+p_2,1}$ |
| $i_{2'}$ | 22 | 23 |
| | $W^{(2)}_{s_1i_{1,1},s_2i_{1,2}+p_2,s_1i_{1,1}+p_1,s_2i_{1,2}+p_2,0}$ | $W^{(2)}_{s_1i_{1,1},s_2i_{1,2}+p_2,s_1i_{1,1}+p_1,s_2i_{1,2}+p_2,1}$ |
| $i_{2'}$ | 26 | 27 |
| | $W^{(2)}_{s_1i_{1,1},s_2i_{1,2},s_1i_{1,1}+p_1,s_2i_{1,2}+p_2,0}$ | $W^{(2)}_{s_1i_{1,1},s_2i_{1,2},s_1i_{1,1}+p_1,s_2i_{1,2}+p_2,1}$ |
| $i_{2'}$ | 30 | 31 |
| | $W^{(2)}_{s_1i_{1,1},s_2i_{1,2},s_1i_{1,1}+3p_1,s_2i_{1,2}+p_2,0}$ | $W^{(2)}_{s_1i_{1,1},s_2i_{1,2},s_1i_{1,1}+3p_1,s_2i_{1,2}+p_2,1}$ |
| $i_{2'}$ | 34 | 35 |
| | Option 0 and 1: $W^{(2)}_{s_1i_{1,1},s_2i_{1,2},s_1i_{1,1},s_2i_{1,2}+p_2,0}$ | Option 0 and 1: $W^{(2)}_{s_1i_{1,1},s_2i_{1,2},s_1i_{1,1},s_2i_{1,2}+p_2,1}$ |

109

In one method, a UE uses the beam group spacing parameters ($s_1, s_2$) according to TABLE 74 depending on the configuration.

In one method, a UE uses the following values in TABLE 73: $i_{1,1}=0,1,\ldots,O_1N_1/s_1-1$; $i_{1,2}=0,1,\ldots,O_2N_2/s_2-1$; and $p_1=1$ and $p_2=1$.

TABLE 74

Selected $i_2'$ indices according to configurations (TABLE 73)

| Config | Selected $i_2'$ indices | ($s_1, s_2$) |
|---|---|---|
| 1 | 0-1 | (1, 1) |
| 2 (Option 0) | 0-3, 8-9, 16-19, 22-23, 32-35 | (2, 2) |
| 2 (Option 1) | 0-3, 8-9, 16-19, 22-23, 32-35 | (2, 2) |
| 2 (Option 2) | 0-3, 8-9, 16-19, 22-23, 26-27, 32-33 | (2, 2) |
| 3 | 0-1, 4-5, 18-21, 24-31 | (2, 2) |
| 4 | 0-15 | (2, 2) |

In some embodiments, the nested master rank-2 beam pairs are obtained by selecting eight out of ten rank-2 beam pairs shown in TABLE 75. Note that beam pair indices 0-7 correspond to legacy Rel10 rank-2 beam pairs, and beam pair indices 8-9 correspond to non-Rel10 rank-2 beam pairs.

TABLE 75

List of all rank-2 beam pairs from four beams

| | Beam pair index | | | | | | | | | |
|---|---|---|---|---|---|---|---|---|---|---|
| | 0 | 1 | 2 | 3 | 4 | 5 | 6 | 7 | 8 | 9 |
| (first layer, second layer) | (0, 0) | (1, 1) | (2, 2) | (3, 3) | (0, 1) | (1, 2) | (0, 3) | (1, 3) | (0, 2) | (2, 3) |

The corresponding nested master rank-2 codebook can be constructed similar to the previous and other embodiments of this disclosure.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. §112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A user equipment (UE) capable of communicating with a base station, the UE comprising:
   a transceiver configured to:
      receive downlink signals indicating precoder codebook parameters, the downlink signal including:
         first and second quantities of antenna ports indicating respective quantities of antenna ports in first and second dimensions;
         first and second oversampling factors indicating respective oversampling factors for Discrete Fourier Transform (DFT) beams in the first and second dimensions;
         either at least one beam group configuration among a plurality of beam group configurations or first and second quantities of beams indicating respective quantities of beams in the first and second dimensions forming a beam group; and
         first and second beam skip numbers indicating respective differences of leading beam indices of two adjacent beam groups in the first and second dimensions; and
   a controller configured to:
      determine a precoder, using the received precoder codebook configuration;
      determine a plurality of precoding matrix indicators (PMIs) based on the received downlink signals; and
      cause the transceiver to transmit uplink signals containing the plurality of PMIs to the base station.

2. The UE of claim 1, wherein the transceiver is further configured to:
   receive first and second beam spacing numbers indicating a respective difference of two adjacent beam indices within each beam group in the first and second dimensions.

3. The UE of claim 2, wherein the transceiver is further configured to:
   receive first and second codebook restriction parameters indicating a restriction on at least one of beam skipping performed based on the first and second beam skip numbers, beam spacing performed based on the first and second beam spacing numbers, and beam grouping performed based on at least one beam group configuration in the first and second dimensions,
   wherein each codebook restriction parameter is in a bitmap format.

4. The UE of claim 1, wherein the transceiver is further configured to:
   receive first and second quantities of subset beams indicating respective quantities of subset beams in the first and second dimensions within each beam group of the configured codebook.

5. The UE of claim 1, wherein the transceiver is further configured to:
   receive a configuration number indicating one of a plurality of beam grouping schemes, each beam grouping scheme comprising a pattern of selected beams within each beam group of the configured codebook,
   wherein each beam grouping scheme has a different pattern of selected beams for different first and second quantities of subset beams.

6. The UE of claim 5, wherein the selected beams within each beam group are orthogonal to one another in at least one of the first and second dimensions.

7. The UE of claim 1, wherein the UE is configured with first and second dimension codebook parameters, and codebook restriction parameters via a higher-layer signaling.

8. A base station capable of communicating with a user equipment (UE), the base station comprising:

a transmitter configured to:
  transmit downlink signals indicating precoder codebook parameters, the downlink signal including:
    first and second quantities of antenna ports indicating respective quantities of antenna ports in first and second dimensions;
    first and second oversampling factors indicating respective oversampling factors for c Discrete Fourier Transform (DFT) beams in the first and second dimensions;
    either at least one beam group configuration among a plurality of beam group configurations or first and second quantities of beams indicating respective quantities of beams in the first and second dimensions forming a beam group; and
    first and second beam skip numbers indicating respective differences of leading beam indices of two adjacent beam groups in the first and second dimensions; and
a receiver configured to:
  receive uplink signals containing a plurality of precoding matrix indicators (PMIs) from the UE; and
  determine a precoder, using the received PMIs.

9. The base station of claim 8, wherein the transceiver transmitter is further configured to:
  transmit first and second beam spacing numbers indicating a respective difference of two adjacent beam indices within each beam group in the first and second dimensions.

10. The base station of claim 9, wherein the transmitter is further configured to:
  transmit first and second codebook restriction parameters indicating a restriction on at least one of beam skipping performed based on the first and second beam skip numbers, beam spacing performed based on the first and second beam spacing numbers, and beam grouping performed based on at least one beam group configuration in the first and second dimensions,
  wherein each codebook restriction parameter is in a bitmap format.

11. The base station of claim 8, wherein the transmitter is further configured to:
  transmit first and second quantities of subset beams indicating respective quantities of subset beams in the first and second dimensions within each beam group of the codebook.

12. The base station of claim 8, wherein the transmitter is further configured to:
  transmit a configuration number indicating one of a plurality of beam grouping schemes, each beam grouping scheme comprising a pattern of selected beams within each beam group of the codebook,
  wherein each beam grouping scheme has a different pattern of selected beams for different first and second quantities of subset beams.

13. The base station of claim 12, wherein the selected beams within each beam group are orthogonal to one another in at least one of first and second dimensions.

14. The base station of claim 8, wherein the base station transmits first and second dimension codebook parameters and codebook restriction parameters via a higher-layer signaling.

15. A method of operating a base station capable of communicating with a user equipment (UE), the method comprising:
  transmitting downlink signals indicating precoder codebook parameters, the downlink signal including:
    first and second quantities of antenna ports indicating respective quantities of antenna ports in first and second dimensions;
    first and second oversampling factors indicating respective oversampling factors for Discrete Fourier Transform (DFT) beams in the first and second dimensions;
    either at least one beam group configuration among a plurality of beam group configurations or first and second quantities of beams indicating respective quantities of beams in the first and second dimensions forming a beam group; and
    first and second beam skip numbers indicating respective differences of leading beam indices of two adjacent beam groups in the first and second dimensions;
  receiving uplink signals containing a plurality of precoding matrix indicators (PMIs) from the UE; and
  determining a precoder, using the received PMIs.

16. The method of claim 15, the method further comprising:
  transmitting first and second beam spacing numbers indicating a respective difference of two adjacent beam indices within each beam group in the first and second dimensions.

17. The method of claim 16, the method further comprising:
  transmitting first and second codebook restriction parameters indicating a restriction on at least one of beam skipping performed based on the first and second beam skip numbers, beam spacing performed based on the first and second beam spacing numbers, and beam grouping performed based on at least one beam group configuration in the first and second dimensions,
  wherein each codebook restriction parameter is in a bitmap format.

18. The method of claim 15, the method further comprising:
  transmitting first and second quantities of subset beams indicating respective quantities of subset beams in the first and second dimensions within each beam group of the codebook.

19. The method of claim 15, the method further comprising:
  transmitting a configuration number indicating one of a plurality of beam grouping schemes, each beam grouping scheme comprising a pattern of selected beams within each beam group of the codebook,
  wherein each beam grouping scheme has a different pattern of selected beams for different first and second quantities of subset beams.

20. The method of claim 19, wherein the selected beams within each beam group are orthogonal to one another.

* * * * *